(12) United States Patent
Mercier et al.

(10) Patent No.: US 9,073,106 B2
(45) Date of Patent: Jul. 7, 2015

(54) PROCESS, DECONTAMINANT AND CHEMICAL KIT FOR THE DECONTAMINATING MEDIA POLLUTED WITH METALS AND HYDROPHOBIC ORGANIC COMPOUNDS

(75) Inventors: Guy Mercier, Quebec (CA); Jean-Francois Blais, Beauport (CA); Julia Mouton, Montreal (CA); Patrick Drogui, Beauport (CA); Myriam Chartier, Quebec (CA)

(73) Assignee: INSTITUT NATIONAL DE LA RECHERCHE SCIENTIFIQUE, Quebec, Quebec (CA)

( * ) Notice: Subject to any disclaimer, the term of this patent is extended or adjusted under 35 U.S.C. 154(b) by 1464 days.

(21) Appl. No.: 12/681,554

(22) PCT Filed: Oct. 2, 2008

(86) PCT No.: PCT/CA2008/001766
§ 371 (c)(1),
(2), (4) Date: Sep. 10, 2010

(87) PCT Pub. No.: WO2009/043177
PCT Pub. Date: Apr. 9, 2009

(65) Prior Publication Data
US 2011/0004043 A1    Jan. 6, 2011
US 2013/0012752 A2   Jan. 10, 2013

(30) Foreign Application Priority Data

Oct. 2, 2007 (CA) .................................... 2605053

(51) Int. Cl.
*C02F 1/24* (2006.01)
(Continued)

(52) U.S. Cl.
CPC ... *B09C 1/02* (2013.01); *B01D 1/24* (2013.01); *C02F 1/469* (2013.01); *C02F 1/24* (2013.01);
(Continued)

(58) Field of Classification Search
CPC .............. C02F 1/24; C02F 1/469; C02F 1/52; C02F 1/5209; C02F 1/5263; C02F 1/5236; C02F 1/5272; C02F 2101/20; C02F 2101/30; C02F 2101/32; C02F 2101/322; C02F 2101/327; C02F 1/5227; C02F 1/62; C02F 1/66; B09C 1/02; B09C 1/08; B09C 1/085; A62D 3/00; B03D 1/02; B03D 1/08; B03D 1/087; B03D 1/14; B03D 1/002; B03D 2201/007; B01D 21/02
USPC ............ 210/703–705, 724, 748.01, 805, 909, 210/912; 209/12.1, 164, 166; 588/318, 407; 204/571; 134/28, 42; 423/26, 89, 98
See application file for complete search history.

(56) References Cited

U.S. PATENT DOCUMENTS 2,592,122 A    4/1952    De Jesus
(Continued)

FOREIGN PATENT DOCUMENTS

CA    2119021 A1    4/1993
(Continued)

OTHER PUBLICATIONS

Lopez, J. et al. "Washing of Soil Contaminated with PAHs and Heavy Petroleum Fractions Using Two Anionic and One Ionic Surfactant: Effect of Salt Addition", Journal of Environmental Science and Health, vol. A39, No. 9, 2004, pp. 2293-2306.
(Continued)

*Primary Examiner* — Joseph Drodge
(74) *Attorney, Agent, or Firm* — Merchant & Gould P.C.

(57) ABSTRACT

A process for decontaminating a medium polluted with metals and hydrophobic organic compounds (HOC) includes providing an acidic slurry of water, acid, chloride salt, surfactant, and the polluted medium. Flotation is preformed on the acidic slurry to form a HOC-rich froth and an HOC-depleted slurry and the froth is recovered. The slurry is separated to obtain a treated solid and a liquid effluent rich in metallic ions. Preferably, the process also includes recuperating the metals by chemical precipitation and/or electrodeposition to produce a treated solution. Also provided are a decontaminant having an acid, a chloride salt, and a surfactant as well as a chemical kit for decontaminating the polluted medium including the decontaminant in which the acid, chloride salt and surfactant can be mixed with polluted medium in the presence of water before removing at least a portion of the metals and HOC from the polluted medium.

21 Claims, 66 Drawing Sheets

(51) Int. Cl.
*C02F 1/469* (2006.01)
*C02F 1/52* (2006.01)
*B09C 1/08* (2006.01)
*B03D 1/08* (2006.01)
*B03D 1/14* (2006.01)
*B01D 21/01* (2006.01)
*C02F 1/62* (2006.01)
*C02F 1/66* (2006.01)
*B09C 1/02* (2006.01)
*B01D 1/24* (2006.01)
*B03D 1/002* (2006.01)

(52) U.S. Cl.
CPC ............... *C02F 1/52* (2013.01); *C02F 1/5227* (2013.01); *C02F 1/5236* (2013.01); *B03D 1/002* (2013.01); *C02F 1/66* (2013.01); *B01D 21/01* (2013.01); *C02F 1/5245* (2013.01); *C02F 1/62* (2013.01); *B09C 1/08* (2013.01); *B03D 1/14* (2013.01); *B03D 2201/007* (2013.01)

(56) References Cited

U.S. PATENT DOCUMENTS

| | | | |
|---|---|---|---|
| 3,519,274 A | | 7/1970 | Terbell |
| 4,714,544 A | | 12/1987 | Von Rybinski et al. |
| 4,851,123 A | * | 7/1989 | Mishra ............ 210/609 |
| 4,948,512 A | * | 8/1990 | Gotlieb et al. ............ 210/705 |
| 5,053,119 A | * | 10/1991 | Collins et al. ............ 209/166 |
| 5,078,899 A | * | 1/1992 | Garrison ............ 210/704 |
| 5,223,147 A | * | 6/1993 | Rosenstock et al. ............ 210/705 |
| 5,286,386 A | * | 2/1994 | Darian et al. ............ 210/639 |
| 5,480,558 A | * | 1/1996 | El-Shoubary et al. ............ 210/703 |
| 5,520,985 A | | 5/1996 | Helicher |
| 5,618,727 A | * | 4/1997 | Lajoie et al. ............ 435/262.5 |
| 5,829,691 A | * | 11/1998 | Gaudin ............ 241/46.01 |
| 6,063,281 A | * | 5/2000 | Bonkhoff et al. ............ 210/638 |
| 6,739,454 B2 | | 5/2004 | Rothenberg et al. ............ 209/166 |
| 6,770,607 B2 | | 8/2004 | Chen et al. |
| 6,827,220 B1 | * | 12/2004 | Young et al. ............ 209/166 |
| 6,915,908 B2 | * | 7/2005 | Bergeron ............ 209/164 |
| 7,105,094 B1 | * | 9/2006 | Lee et al. ............ 210/703 |
| 2003/0146135 A1 | * | 8/2003 | Gathje et al. ............ 209/166 |
| 2005/0173310 A1 | * | 8/2005 | Bork et al. ............ 209/172 |
| 2006/0001217 A1 | | 1/2006 | Soltys et al. |
| 2006/0243662 A1 | | 11/2006 | Yim |
| 2007/0056611 A1 | * | 3/2007 | Martin ............ 134/42 |
| 2010/0185039 A1 | * | 7/2010 | Hoag et al. ............ 588/320 |

FOREIGN PATENT DOCUMENTS

| | | |
|---|---|---|
| CA | 2154532 A1 | 1/1997 |
| CA | 2450242 A1 | 12/2002 |
| DE | 44 09 605 A1 | 11/1995 |
| EP | 0 193 109 A2 | 9/1986 |
| EP | 0 479 258 A1 | 4/1992 |
| JP | 2002-086128 A | 3/2002 |
| WO | WO 03/057328 | 7/2003 |
| WO | WO 2004/090156 A2 | 10/2004 |
| WO | WO 2007/083682 | 7/2007 |

OTHER PUBLICATIONS

Legiec, I. "Pb Mobility and Extractant Optimization for Containmated Soils", Environmental Progress, vol. 16, No. 2, 1997, pp. 88-92.

Khodadoust, A. et al. "Effect of different extraction agents on metal and organic contaminant removal from a field soil", Journal of Hazardous Materials, vol. B117, 2005, pp. 15-24.

Semer, R. et al. "Evaluation of soil washing process to remove mixed contaminants from a sandy loam", Journal of Hazardous Materials, vol. 45, 1996, pp. 45-57.

International Search Report for corresponding International Patent Application No. PCT/CA2008/001766 mailed Jan. 30, 2009.

Wang, S. et al., "An evaluation of surfactant foam technology in remediation of contaminated soil", *Chemosphere*, 57(9): 1079-1089 (2004).

Milligan, et al., "Surfactant-enhanced remediation of contaminated soil: a review", *Engineering Geology*, 60(1-4): 371-380 (2001).

Mouton, J. et al., "Amphoteric Surfactants for PAH and Lead Polluted-Soil Treatment Using Flotation", *Water, Air & Soil Pollution*, 13 pages, (2008).

Canadian Office Action for corresponding Canadian Patent Application No. 2,701,000 mailed Apr. 21, 2015.

* cited by examiner

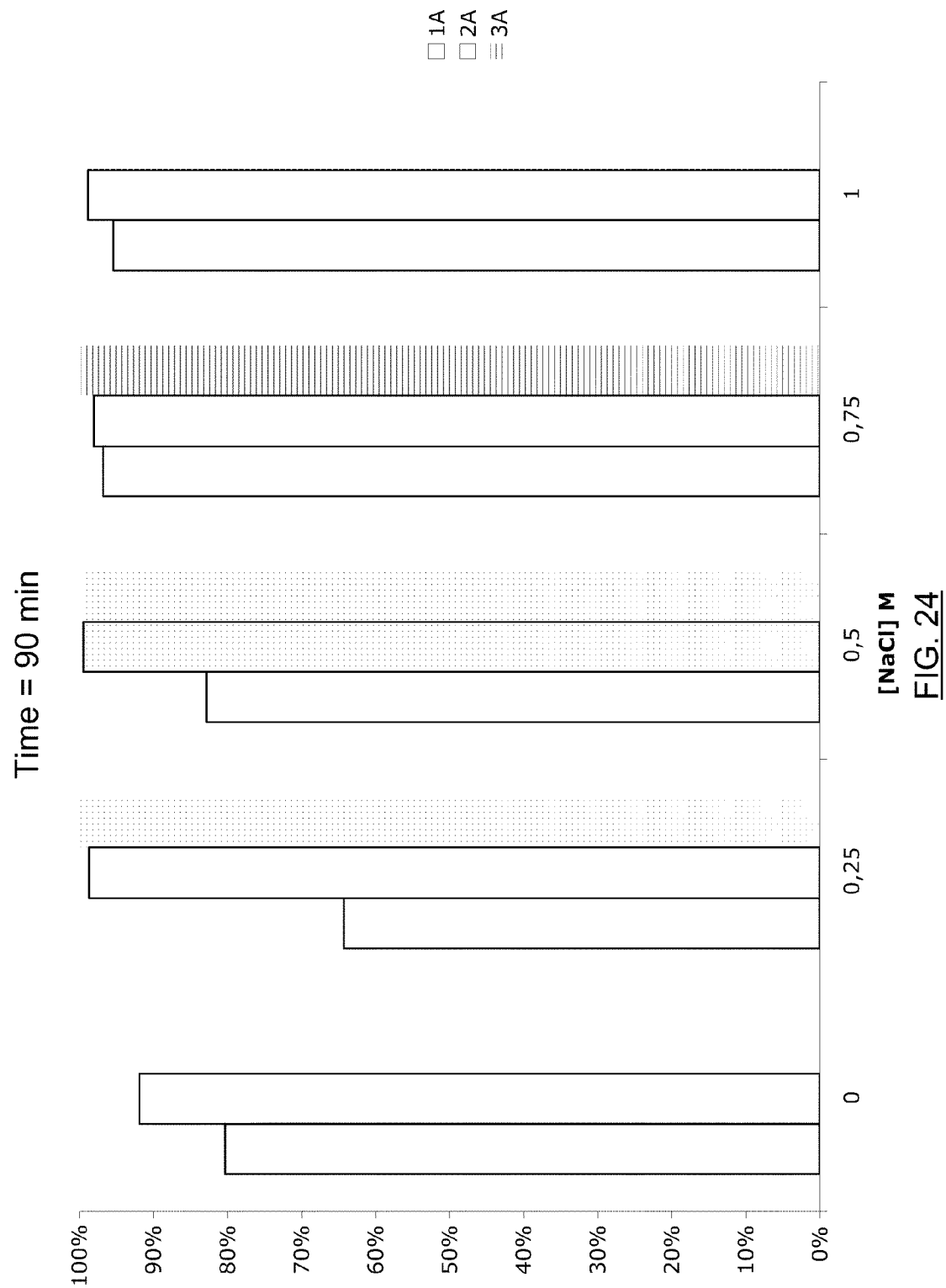

PROCESS, DECONTAMINANT AND CHEMICAL KIT FOR THE DECONTAMINATING MEDIA POLLUTED WITH METALS AND HYDROPHOBIC ORGANIC COMPOUNDS

This application is a National Stage Application of PCT/CA2008/001766, filed 2 Oct. 2008, which claims benefit of Ser. No. 2,605,053, filed 2 Oct. 2007 in Canada and which applications are incorporated herein by reference. To the extent appropriate, a claim of priority is made to each of the above disclosed applications.

FIELD OF THE INVENTION

The present invention relates to a process for the decontamination of a medium polluted with metals and hydrophobic organic compounds. The present invention also concerns a decontaminant and a chemical kit.

BACKGROUND

Polluted sites exist in all industrialized countries. When referring to contaminated sites, this means contaminated locations or lands, on which, in the past, pollutants were introduced into the media, such as soils, in quantities that are dangerous for the soil, the phreatic table and/or their users.

The problem of polluted soils is real and the treatment of these soils is an expanding field. The challenges in markets that are based on decontamination are a function of the contaminants that are present, the types of terrains, the possibility of economic reclamation of a terrain, sanitary aspects vis-à-vis the neighboring populations and the harm caused to the environment.

Contaminants are numerous and diverse. While some have been known for a long time, such as metals and petroleum hydrocarbons, others have only recently recognized, as they resulted from activities at the end of the 20th century. This is the case, for example, of pesticides, PCBs, dioxins, furanes, PAHs, etc.

Studies into the treatment of contaminated substances are numerous for various media (soils, sediments, sewage, industrial waste, etc.) and by various modes of ex situ or in situ treatment (biological, physio-chemical, thermal). While many processes have been commercialized, very few propose the treatment of organic and inorganic contaminants. There thus remains a significant portion of soils that display mixed contamination. Presently, the treatment of these contaminants relies on the sequential application of decontamination processes, thus considerably increasing the costs and limiting the treatment of media displaying mixed contamination. Other challenges related to the decontamination of mixed media result from fundamental differences in the properties of the targeted contaminants (organic and inorganic) as well as in the heterogeneity of the distribution of the organic contaminants in the matrix.

For media presenting mixed and heterogeneous contamination, such as metals and hydrophobic organic compounds like polycyclic aromatic hydrocarbons (PAH), certain treatment methods have been explored.

Soil washing is an ex situ process based on the idea of rinsing with water to remove the contaminants ("ungluing" them from the soil matrix and transferring them to a concentrated side phase). The extraction process of the organic and/or inorganic contaminants of the soil can be done in one of the two following ways: by dissolving or transferring them to the washing solution; by concentrating them to a smaller volume of soil by particle separation, gravimetric, flotation separation and/or attrition.

Soil washing is a chemical process often associated with metallurgical processes. This treatment technique is a pollutant transfer technology, which requires an upstream treatment of the contaminants. It applies principally to soils, sediments, rocks and sewage sludge. Its principle is relatively simple. The contaminants adsorbed on the fine soil particles are separated and extracted from the bulk of soil. The washing capacity of water is increased by the addition of various agents and additives.

As concerns soils polluted by organic compounds, the washing is often performed with the help of surfactants. The majority of the studies pertaining to surfactants and washing contaminated soils utilize pure surfactants. Certain studies have demonstrated the superior action of surfactant mixtures for rehabilitating soils. Other studies have been conducted to compare the extraction efficacy of several surfactants vis-à-vis PAH compounds contained in contaminated soils in the presence of a salt or not. In the study conducted by Lopez entitled, "*Washing of soil contaminated with PAHs and heavy petroleum fractions using two anionic and one ionic surfactant: Effect salt addition*" (Journal of Environmental Science and Health Part a-Toxic/Hazardous Substances & Environmental Engineering 2005; 40:1107), Tween 80 appears as the agent enabling the best PAH solubilization and addition of NaCl enables increased efficacy of the SDS (until then considered as the least efficient of the surface agents used).

Washing of PAHs using surfactants mostly employs anionic or non-ionic surface actives or mixes thereof, rather than other types of surfactants.

As concerns soils polluted with metals, the washing of metals can be done using acids, chelating agents, biosurfactants or oxydants. The agents that are most widely used remain, however, acids and chelating agents. During the process, the metals are solubilized, then a solid-liquid separation (e.g. filtration) enables obtaining the metals in the liquid and decontaminated soils.

In "*Pb mobility and extractant optimization for contaminated soil*" (Environmental Progress, 1997; 16:88), Legiec compared the efficiency of acetic acid, citric acid, hydrochloric acid and caustic soda, as well as sodium chloride as a leaching agent. He showed that the use of HCl, coupled with NaCl 0.5 or 1.0 M gave the best efficiency for removing lead.

For soils presenting mixed and heterogeneous contamination, it was necessary to proceed to a treatment including several washing cells, each being adapted to a type of contaminant. The key for an efficient soil washing using such a method results from the arrangement and configuration of the processing units, as well as the characterization and the comprehension of the pollutant/soil interactions. The candidate contaminants for soil washing are principally metals, semi-volatile organics, PAHs, pesticides, PCBs, and slightly radioactive elements. While washing PAHs is generally associated with the action of a surface active, the washing of metals can be realized by using various agents: pH, chelating agents, biosurfactants, oxidants.

Khodadoust et al. describe in "*Effect of different extraction agents on metal and organic contaminant removal from a field soil*" (Journal of Hazardous Materials 2005; 117:15) the extraction of PAH phenanthrene, lead, and zinc from a contaminated soil using diverse additives including surfactants, co-solvents and acids. Khodadoust et al. find that two sequential extractions are necessary to remove the inorganic and organic contaminants from the soil. Of all these sequential extractions, phenanthrene is extracted only in the presence of surfactants. A first washing using EDTA followed by a subsequent washing using Tween 80 surfactant, or an initial washing using Tween 80 followed by a subsequent washing using citric acid 1 M, are the two sequential conditions enabling a satisfactory extraction. Khodadoust et al. conclude that the sequential washings using a different additive for each wash seems to be necessary for the treatment of soils contaminated with metals and organic compounds.

A study by Semer et al. entitled "*Evaluation of soil washing process to remove mixed contaminants from sandy loam*" (Journal of Hazardous Materials, 1996; 45:45) looks at a process for washing soil using a solution of sulphuric acid 1N and isopropanol.

There are also other processes for decontaminating polluted soils using the techniques of flotation, screening, and/or hydrocycloning.

The known methods for treating media polluted by both metals and hydrophobic organic compounds have many disadvantages and inefficiencies. For example, sequential processes require high economic investments. The quantities of additives suggested by known technologies are significant, the proportions of these additives result in using reactors that are too large, quantities of hazardous compounds that are too great, as well as significant investments, costs and security measures.

There is thus a need in the field to overcome at least one of the disadvantages of what is already known in the field.

SUMMARY OF THE INVENTION

The present invention responds to the above-mentioned need by providing a process, a decontaminant, and a chemical kit.

There is a process for decontaminating a medium polluted with metals and hydrophobic organic compounds (HOC). The process includes the following steps: (a) obtaining an acidic slurry comprising water and an acid, a chloride salt, a surfactant, and the polluted medium; (b) performing flotation on the acidic slurry to form a, HOC-rich froth and an HOC-depleted slurry; (c) recovering the froth; (d) separating the HOC-depleted slurry to obtain a treated solids and an effluent liquid rich in metallic ions.

According to another aspect of the invention, there is provided a decontaminant comprising an acid, a chloride salt, and a surfactant.

According to another aspect of the invention, there is provided a chemical kit for the decontamination of a medium polluted by metals and by HOC, comprising the decontaminant defined here-above and in which the acid, the chloride salt, and the surfactant can be mixed with the polluted medium in the presence of water before removing at least a portion of the metals and HOCs from the polluted medium.

LIST OF ABBREVIATIONS

AAS Atomic absorption spectrometry
AC Characterization or feed at entrance of attrition
AFE Attrition/flotation/electrodeposition
AFP Attrition/flotation/precipitation
AL Attrition washing water
AS Attrition reject soil (>2 mm)
CAS Cocamidopropyl hydroxysultaine
ED Electrodeposition water, annotated i and f (initial and final)
EDR Electrodeposition residue
FC Characterization/feed at entrance of flotation (fraction<2 mm)
FE Flotation/electrodeposition
$FeCl_3$ Ferrite chloride
FL Flotation washing water annotated i and f (initial and final)
FL/R Flotation washing water and rinsing water combined
FM Froth or concentrate of flotation
FML Interstitial water of flotation froth
FMR Rinse water of flotation froth
FMRL Interstitial water of the froth and washing water combined
FS Soil <2 mm treated or reject of flotation
PAH Polycyclic aromatic hydrocarbon
$HNO_3$ Nitric acid
$H_2SO_4$ Sulfuric acid
LD Analytic detection limit
LR Regulatory limit for quality of soils in Quebec (criterion C)
n Number of successive flotations
NaCl Sodium chloride
NaOH Soda or sodium hydroxide
PE-10 Percol E-10
HDPE High density polyethylene
ORP Redox potential
Pp Chemical precipitation residue annotated i and f (initial and final)
R or RP Washing water of the soil
R3 Water from the 3rd washing of the soil with clear water
TCLP Toxicity Characteristics Leaching Procedure
Ti/Pt Titanium platinum electrodes

DESCRIPTION OF PREFERRED EMBODIMENT

The present invention concerns a physiochemical decontamination process of media such as soils polluted with metals such as lead and hydrophobic organic compounds (HOC) such as polycyclic aromatic hydrocarbons (PAH).

The process may also eliminate other types of HOCs, such as polychlorinated biphenyls (PCBs), monocyclic aromatic hydrocarbons (MAH), phenolic compounds, as well as petroleum hydrocarbons. The process may also be able to eliminate metals other than lead such as, for example, cadmium, chromium, copper, nickel, zinc, etc.

The media to treat are generally obtained by excavation of a polluted site. The polluted sites are generally large industrial terrains such as coking plants, iron and steel mills, incinerators, refineries, etc., which generate large volumes of soils to treat. The media may also come from other types of sites or polluted materials.

The Process

FIGS. 1, 10, 27, 32, 33, 34 and 36 show preferred embodiments of the process. Certain optional steps and quantities are indicated on these figures, by way of example only.

Figure 1:
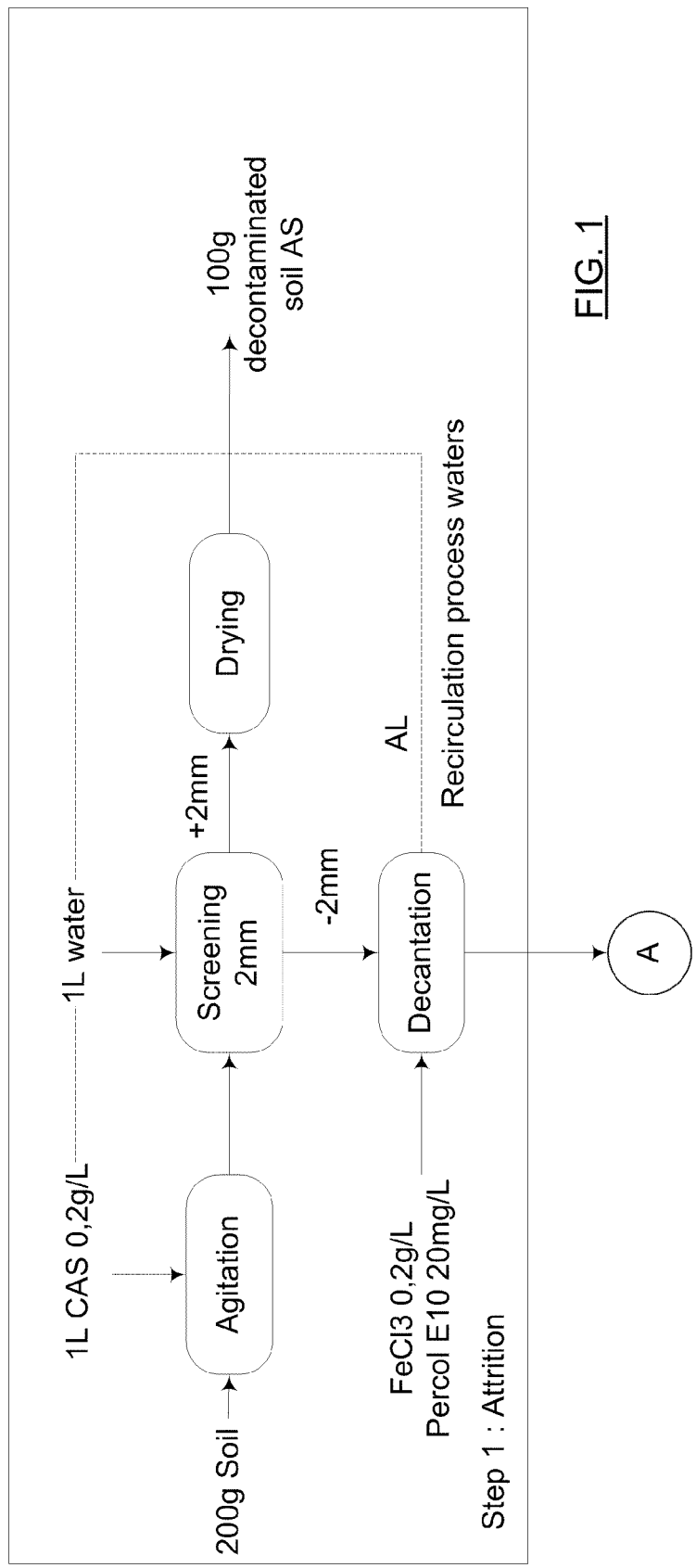
FIG. 1 is a schematic of the process (FE) showing the loops performed on soil TR23 according an embodiment of the present invention.
Figure 1:
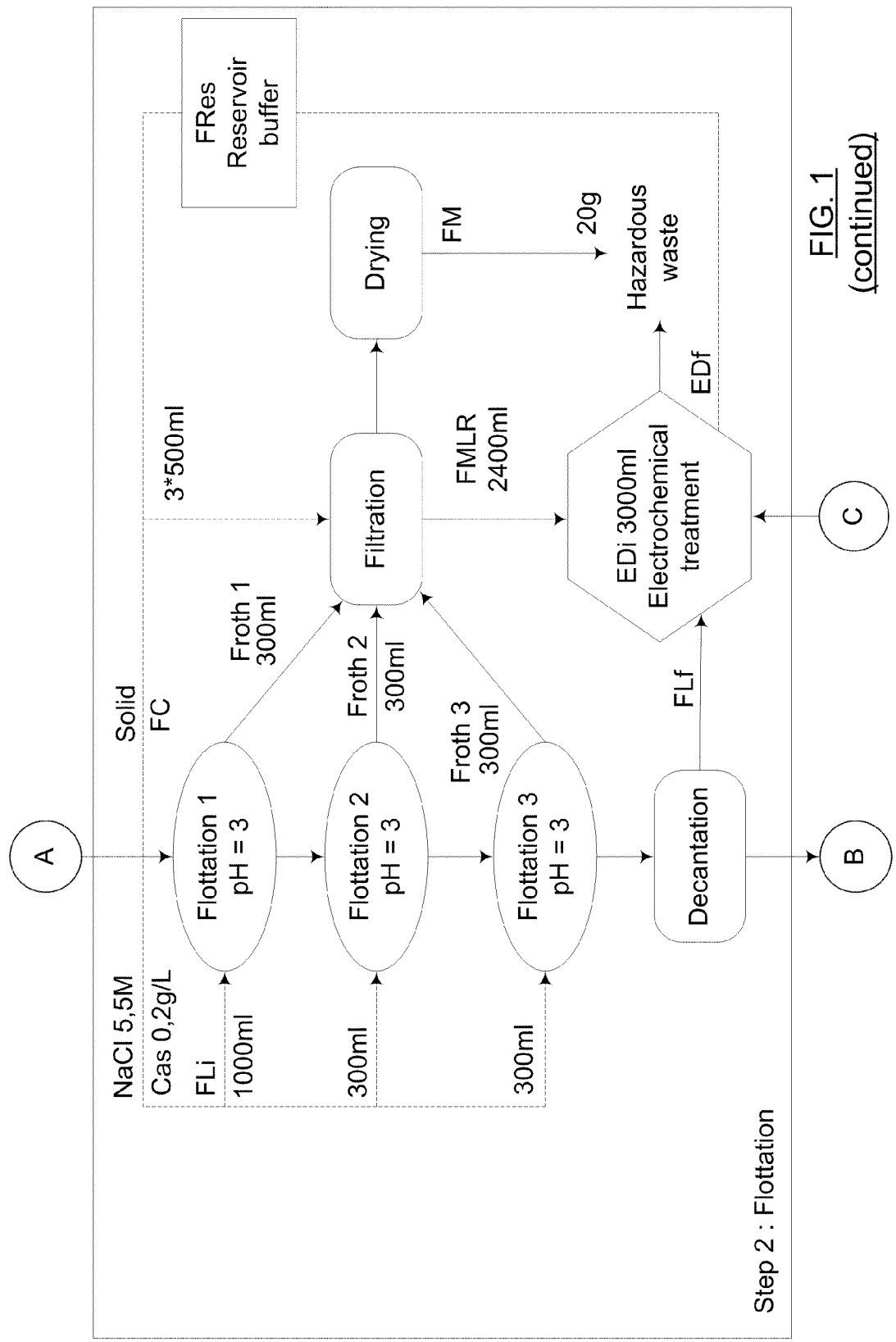
Figure 1:
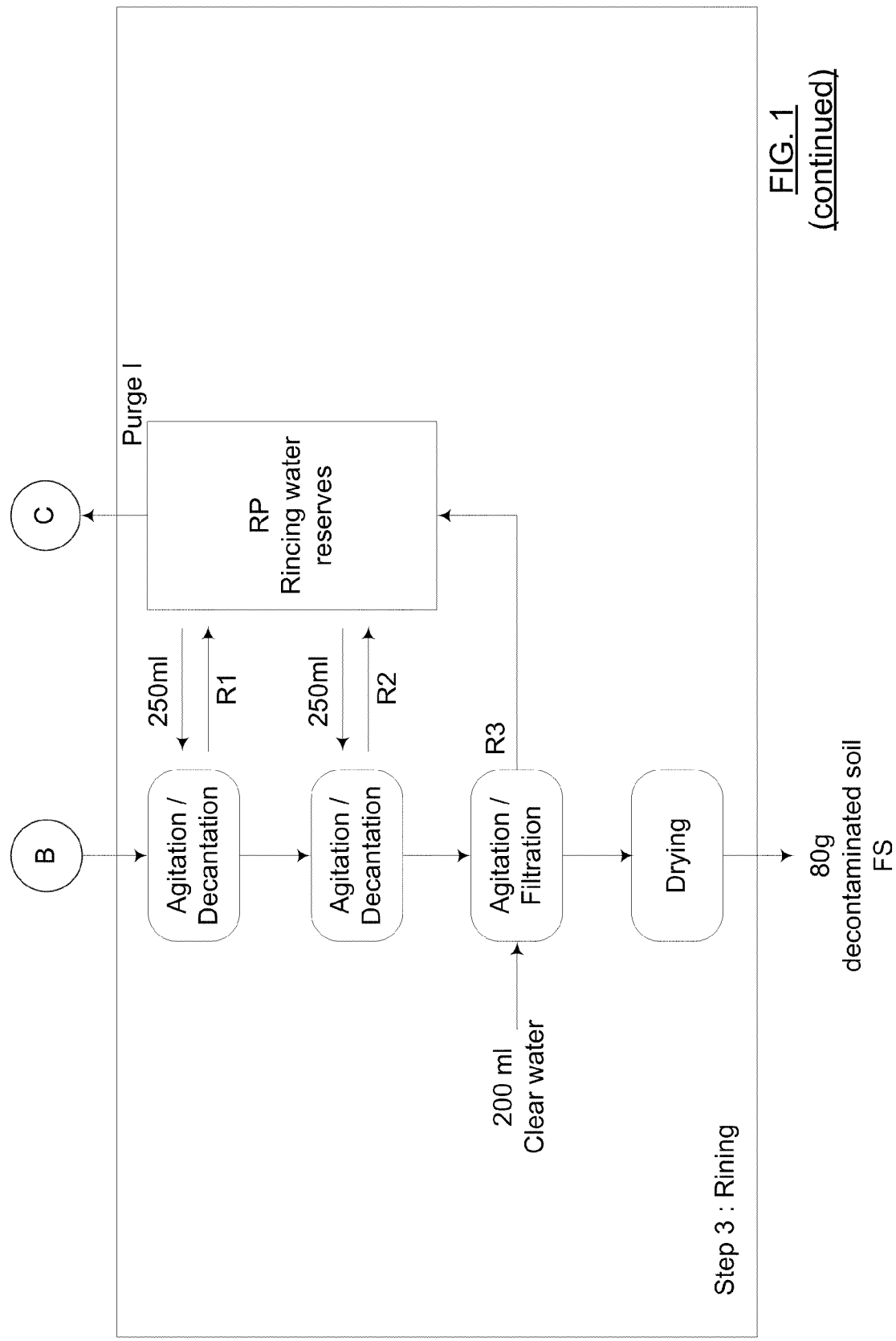

Referring to FIG. 1, a preferred embodiment of the present invention includes at least steps (a), (b), (c) and (d).

Step (a) includes obtaining an acidic slurry which includes water, an acid, a chloride salt, a surfactant, and the polluted medium, the polluted medium being polluted with metals and HOCs.

Optionally, the HOC can include polycyclic aromatic hydrocarbons (PAH) and the metals can include lead only or lead in combination with other metals, such as Cu, Zn, Cd, Ni, Cr, As and/or Hg. Water can be added in order to obtain a concentration between about 1% and about 25% w $v^{-1}$ of total solids, and preferably around 10%.

The acid can be inorganic such as sulfuric acid, hydrochloric acid, nitric acid and/or phosphoric acid. The acid can be organic such as acetic acid, propionic acid, butyric acid, citric acid, and/or malic acid. The acid may also be a used acid such as used sulfuric acid and/or green phosphoric acid. The acid can also be a mixture of acids. Preferably, the acid is added in order to obtain a pH of the slurry between about 1 and about 5, and preferably a pH of about 3.

The term "acid" includes an organic acid, an inorganic acid, or a used acid. "Used acid" is defined as being an acid used in an industrial process but that still has strong reactivity after this first use and which can be used for another application. It goes without saying that these acids are generally less expensive. An example is sulfuric acid that is used in certain processes to remove water (in petroleum, among others) and which, after this first process, still contains the majority of its acidifying power. Green phosphoric acid (75% $H_3PO_4$) sold by Vopak™ in North America is another example of a used acid.

The chloride salt can be of sodium, potassium, calcium, or magnesium, or a mixture of these. The salt can be added to obtain a concentration above 0.5 M in the acidic slurry, and preferably between about 4.0 M and about 6.0 M.

The surfactant that is used can be a non-ionic cationic, anionic, or amphoteric surfactant, or a combination of two or more surfactants. It can also include a biosurfactant. In one preferred embodiment of the process, the surfactant includes or is cocamidopropyl hydroxysultaine (CAS).

"Surfactants" are amphiphilic chemical compounds constituted by a long carbonated chain with lipophilic properties (tail) and a polar group (head). Surface agents are also commonly identified under the names: surfactants, surface active agents, detergents, etc. Table 1 shows a classification of surface active agents according to the nature of this group.

TABLE 1

Classification of surface active agents

| Type of surfactant | Anionic | Cationic | Zwitterionic | Non ionic |
|---|---|---|---|---|
| Charge | − | + | +, − | O |
| Example | $RSO_3$ Sulfonates | $RNH_3^+$ Amines, quaternary ammonium compounds | $RN^+NH_2CH_2COO^-$ Betaine | $RC_6H_4(OC_2H_4)_xOH$ Polyoxyethylene alkyl phenol |

The surfactant is preferably added in order to obtain a concentration above the critical micellar concentration (CMC). Preferably, it is added at or below the effective critical micellar concentration ($CMC_{eff}$), the CMC being for a water/surfactant system and the $CMC_{eff}$ being for a soil/water/surfactant system. The surfactant can also be added in order to obtain a concentration between about 0.05% and about 2% with respect to the weight of dry soil (w/w), and preferably between about 0.1% and about 0.3% w/w. In this regard, the surfactants above the critical micellar concentration (CMC), form aggregates in the water called micelles. The micelles are capable of solubilizing PAHs and other HOCs. This solubilization depends on the type and quantity of surfactant that is used, the contact time, the soil/surfactant interactions, the hydrophobicity. It is possible to use mixtures of surfactants and/or additives such as alcohols or salts. In order to be economical and in accordance with sustainable development, the surfactants are preferably regenerated and reused in the washing process, particularly if they are expensive.

The CMC is therefore a characteristic which guides the choice of surfactants according to the desired applications. Generally, the CMC (or the $CMC_{eff}$) defines the optimal conditions of detergence, froth, etc. The solubilizing capacity of the surfactants is evident at a concentration around the CMC and increases with addition above the CMC. This CMC is a specific characteristic of each surfactant. Indeed, this parameter varies for each surfactant and is a function of temperature, ionic bonds, and whether or not organic or mineral additives are present.

Step (b) includes effecting flotation on the acidic slurry in order to form an HOC-rich froth and an HOC-depleted slurry, and step (c) includes the recovery of the froth.

"Flotation" is a complex physio-chemical process, in which the principle resides in the natural or simulated surface properties of the matrix in question (hydrophilic or hydrophobic behavior). The system consists of a slurry (matrix/water/flotation agents), preferably maintained under agitation and undergoing over defined time intervals air injection at flow rates that are preferably precise. It is this latter process which enables the contaminants to be floated by selective transport of the hydrophobic particles. In effect, the particles having hydrophobic surfaces link to the air bubbles which undergo collisions between each other, while the hydrophilic particles remain in solution. The air bubbles entrain the hydrophobic particles to the surface of the slurry where they form a loaded froth (contaminated). In other words, flotation is a washing process performed under gas injection, preferably air.

As shown in FIG. 1, the consecutive steps (b) and (c) are preferably performed several times before proceeding to step d). For example, these steps can be repeated three times (Flotation 1, 2 and 3). In the embodiments shown in FIGS. 32 and 33, steps (b) and (c) are repeated six times.

According to an embodiment of the process, step (a) is performed in a single reactor. On the other hand, it is possible to mix the additives with the water in a separate unit before adding them to the polluted medium in another container. Optionally, the acidic slurry is formed in a flotation reactor so that steps (a) and (b) are performed in a single reactor. Such a reactor can include one or many mechanical agitators so that the acidic slurry is agitated or "stirred" during and/or between the flotations.

Step (d) includes the separation of the slurry poor in HOCs in order to obtain a treated solid and an effluent liquid rich in metallic ions.

The liquid rich in metallic ions can be treated in another step (e) of recuperating the metals, enabled by chemical precipitation (FIG. 36) or electrodeposition (FIGS. 1, 10, 27, 32, 33 and 34) to recuperate the metallic compounds and obtain a treated solution. The chemical precipitation is performed by adding a soluble alkaline compound enabling the formation of insoluble metallic compounds. For example, the alkaline compound may be a hydroxide of sodium, calcium, magnesium, or ammonium, or a mixture of these, enabling the formation of insoluble metal hydroxides.

According to an optional aspect of the process, at least a part of the treated solution is reused for water in step a). The advantages of such a recirculation will be discussed hereinbelow mainly in EXAMPLE 2.

According to an embodiment of the process, the process may include preliminary steps including attrition and washing of the raw polluted medium in an attritor and in the presence of water and a surfactant; and screening to separate the coarse materials from the fine materials, the fine materials then constituting the polluted medium of step a) of the process. These preliminary steps are illustrated in FIGS. 1, 32, 33, 34 and 36 under the subtitle "Step 1: Attrition".

The Decontaminant

The decontaminant of the present invention includes an acid, a chloride salt, and a surfactant. These three compounds can be in the form of a mixture or separate, in solid, liquid, or another phase. In addition, the decontaminant may also include other additives or several types of surfactants, salts, and/or acids. The decontaminant may also be in the form of an aqueous solution.

The acid may be inorganic such as sulfuric acid, hydrochloric acid, nitric acid, and/or phosphoric acid. The acid may be organic such as acetic acid, proponeic acid, butyric acid, citric acid, and/or malic acid. The acid may also be used such as used sulfuric acid and/or green phosphoric acid. It is worth mentioning that the acid may include a mixture of different acids that are inorganic, organic, and/or used. Preferably, the acid is added in order to obtain a pH of the slurry between about 1 and about 5, and preferably a pH of about 3. The acid may be present in a quantity enabling obtaining an acid content between 0.02 N and 1N in the aqueous slurry.

The chloride salt can be of sodium, potassium, calcium, or magnesium, or a mixture thereof. The salt can be added in order to obtain a concentration above 0.5 M in the acidic slurry, and preferably between about 5.0 M and about 6.0 M.

The surfactant that is used can be a non-ionic, cationic, anionic, or amphoteric surfactant, or a combination of two or more thereof. In a preferred embodiment of the process, the surfactant includes or is cocamidopropyl hydroxysultaine (CAS).

The surfactant is preferably added in order to obtain a concentration above its critical micellar concentration (CMC) and/or in order to obtain a concentration between about 0.05% and about 2% w/w of dry soil, and preferably between about 0.1% and about 0.3%.

The decontaminant is preferably used to decontaminate a slurry including a medium polluted with metals and hydrophobic organic compounds. It can be used, for example, in step (a) of the process of the present invention, but it can also be used for other processes for decontamination comprising another type of washing, another type of solvent, etc.

In a non-limiting example, the commercial decontaminant product can enable the treatment of about 150 g/L of soil in a flotation cell and is composed as follows:

One liter of this solution contains acid to obtain an acidic content between 0.02 N and 1 N, NaCl (or any other chloride salt) to obtain between 0.5 and 5.5 M of chloride and CAS (or any other effective surfactant) is present in a quantity between 0.15 (0.1%) and 3 g/L$^{-1}$ (2% w/w dry).

The Chemical Kit

The chemical kit of the present invention also includes an acid, a chloride salt, and a surfactant which may be mixed together and mixed with the polluted medium and water for proceeding to the extraction of at least a portion of metals and HOC of the polluted medium. Optionally, the chemical kit is used in an embodiment of the process of the present invention, the three components forming with water and the polluted medium an acidic aqueous slurry to treat by flotation.

In effect, the chemical kit includes the decontaminant described hereinabove in a non-mixed form. The acid, the chloride salt, and the surfactant are destined to be mixed with the polluted medium, in the presence of water, preferably in a single reactor. Preferably, the kit also includes instructions to perform the decontamination of the polluted medium according to the process of the present invention. The kit can also be combined with a flotation treatment or another type of washing.

EXAMPLES AND STUDIES

Example 1

Experimental Methodology

Experimental Section

All mass concentrations, presented in mass % or in mg/Kg, are expressed on a dry basis. The abbreviations LD and LR are respectively used for indicating the detection limits relative to analysis and regulatory limits concerning criterion C for soil quality, as defined in the rules guiding soil quality in Quebec.

Soil Characterization

Throughout this study, five soils (namely: PALSN, SNW, NCY, Tr23 and Tr29), all except Tr29 having a mixed contamination of PAH and Pb, were used to develop and improve an efficient simultaneous decontamination process. The physio-chemical characteristics of the soils are presented in Table 2, while the contamination levels of each soil and the regulatory limits are presented in Table 3. The same limits are reported on proportion basis (%) in different granulometric fractions in Table 4, for the following screenings: 2-1-0.5-0.25-0.125-0.053 mm. All concentrations shown in Table 2 and Table 3 concern only the granulometric fraction below 2 mm, which was the only fraction to be introduced into the downstream washing process. While PALSN, SNW, and NCY have pH around 7, the pH of Tr23 and Tr29 are above 8.

TABLE 2

Physio-chemical characteristics of studied soils

| Parameters | Units | PALSN | SNW | TR23 | TR29 | NCY |
|---|---|---|---|---|---|---|
| Solid (%) | % (w/w) | 88.3 | 89.0 | 92.1 | 96.8 | 89.3 |
| Density | g/cm$^3$ | 2.8 | 3.2 | 2.7 | 2.7 | 3.0 |
| Granulometry | % > 2 mm | 15.8 | 16.4 | 43.3 | 24.1 | 27.0 |
| | 2 < % > 1 mm | 15.1 | 9.4 | 26.0 | 5.6 | 22.1 |
| | 1 < % > 0.5 mm | 21.2 | 17.9 | 9.7 | 45.5 | 17.1 |
| | 0.5 < % > 0.25 mm | 21.7 | 28.2 | 8.3 | 18.5 | 13.7 |
| | 0.25 < % > 0.125 mm | 14.1 | 18.1 | 5.3 | 4.9 | 9.9 |
| | 0.125 < % > 0.053 mm | 6.3 | 6.7 | 4.2 | 0.9 | 6.5 |
| | % < 0.053 mm | 5.8 | 3.2 | 3.2 | 0.5 | 3.8 |

TABLE 2-continued

Physio-chemical characteristics of studied soils

| Parameters | Units | PALSN | SNW | TR23 | TR29 | NCY |
|---|---|---|---|---|---|---|
| pH | — | 6.81 | 6.73 | 8.18 | 8.40 | 6.95 |
| Total carbon (C) | g/kg | 52.3 ± 0.9 | 38.0 ± 1.0 | 101 ± 2 | 86.2 ± 0.2 | 67.8 ± 1.1 |
| Total nitrogen (N) | g/kg | 2.2 ± 0.1 | 1.6 ± 0.2 | 3.3 ± 0.1 | 1.6 ± 0.1 | 3.3 ± 0.3 |
| Sulfur (S) | g/kg | 2.2 ± 0.1 | 1.5 ± 0.1 | 1.4 ± 0.1 | 0.9 ± 0.5 | 45.9 ± 0.1 |
| Phosphorus (P) | g/kg | 1.4 ± 0.1 | 0.5 | — | — | 2.6 ± 0.1 |
| Calcium (Ca) | g/kg | 38.6 ± 0.8 | 19.4 | 132 ± 5 | 37.1 ± 5.7 | 118 ± 5 |
| Sodium (Na) | g/kg | 15.0 ± 0.4 | 20.5 | 0.6 ± 0.1 | 0.3 ± 0.1 | 3.7 ± 0.3 |
| Potassium (K) | g/kg | 15.8 ± 0.5 | 17.2 | 1 690 | 691 | 8.4 ± 0.8 |

TABLE 3

Contaminant characteristics of the studied soils (mg/kg).

| | PALSN | SNW | NCY | Tr23 | Tr29 | LR |
|---|---|---|---|---|---|---|
| NPN | 2.94 ± 0.79 | 3.70 ± 0.95 | 21.1 ± 1.6 | 9 ± 1.99 | 33.5 ± 8.4 | 50 |
| ACN | 5.20 ± 1.12 | 5.52 ± 0.95 | 36.1 | 18 ± 3.12 | 43.3 ± 5.4 | 100 |
| FLU | 6.86 ± 1.59 | 7.47 ± 1.26 | — | 19.0 ± 4.1 | 80.2 ± 10.4 | 100 |
| PHE | 53.1 ± 13.4 | 72.80 ± 9.01 | 50.2 | 195 ± 13 | 647 ± 136 | 50 |
| ATN | 15.3 ± 4.2 | 18.7 ± 2.6 | 76.5 ± 4.6 | 37.0 ± 8.3 | 148 ± 22 | 100 |
| FLR | 90.9 ± 14.4 | 108 ± 8 | 41.8 ± 6.0 | 244 ± 22 | 662 ± 137 | 100 |
| PYR | 74.5 ± 14.0 | 84.9 ± 7.1 | 165 ± 19 | 185 ± 15 | 497 ± 103 | 100 |
| BAN | 52.1 ± 9.3 | 50.2 ± 5.7 | 123 ± 14 | 96.0 ± 5.8 | 277 ± 39 | 10 |
| CRY | 54.0 ± 16.2 | 48.9 ± 5.9 | 89.3 ± 13.9 | 107 ± 8 | 280 ± 49 | 10 |
| BJK | 71.4 ± 15.3 | 77.6 ± 12.2 | 100 ± 11 | 168 ± 11 | 392 ± 64 | 30 (b + j + k) |
| BAP | 44.6 ± 8.0 | 46.4 ± 5.7 | 187 ± 24 | 73.0 ± 16.9 | 216 ± 43 | 10 |
| INP | 39.7 ± 11.6 | 36.1 ± 7.3 | 89.8 ± 18.9 | 68.0 ± 6.9 | 158 ± 39 | 10 |
| DBA | 11.9 ± 2.3 | 11.2 ± 1.9 | 28.1 ± 2.6 | 14.0 ± 1.1 | 39.0 ± 8.4 | 10 |
| BPR | 27.6 ± 10.6 | 28.4 ± 7.1 | 74.8 ± 13.5 | 47.0 ± 9.0 | 126 ± 27 | 10 |
| PAH | 558 ± 131 | 637 ± 68 | 1047 ± 14 | 1240 ± 88 | 3470 ± 580 | — |
| Pb | 1 348 ± 34 | 2990 ± 250 | 580 ± 14 | 1520 ± 99 | 521 ± 110 | 1000 |
| Zn | 1 206 ± 54 | 282 ± 15 | 2360 ± 10 | — | — | 1500 |
| Cr | 319 ± 55 | 312 ± 75 | 1801 ± 231 | — | — | 800 |

TABLE 4

Concentrations of total PAH (mg/Kg) according to the granulometric fractions of the studied soils

| | PALSN | | SNW | | NCY | | Tr23 | | Tr29 | |
|---|---|---|---|---|---|---|---|---|---|---|
| | mg/Kg | % | mg/Kg | % | mg/Kg | % | mg/Kg | % | mg/Kg | % |
| % < 0.053 mm | 82 | 0% | 226 | 1% | 1097 | 5% | 1060 | 0% | 1728 | 0% |
| 0.5 < % > 0.053 mm | 125 | 1% | 300 | 3% | 1270 | 9% | 1067 | 1% | 2053 | 0% |
| 0.5 < % > 0.125 mm | 145 | 2% | 289 | 8% | 1265 | 14% | 950 | 1% | 6735 | 2% |
| 0.5 < % > 0.25 mm | 186 | 4% | 565 | 25% | 1117 | 17% | 1006 | 1% | 1947 | 3% |
| 1 < % > 0.5 mm | 285 | 6% | 634 | 17% | 903 | 17% | 1273 | 2% | 784 | 5% |
| 2 < % > 1 mm | 547 | 8% | 2422 | 35% | 889 | 22% | 1677 | 7% | 1734 | 28% |
| % > 2 mm | 4879 | 78% | 421 | 11% | 587 | 17% | 385 | 87% | 1055 | 61% |
| Total | 988 | 100% | 649 | 100% | 912 | 100% | 425 | 100% | 1 212 | 100% |

Sampling

The soil is received in laboratory in containers, in which the PAH-type organic contaminants are distributed very heterogeneously. In order to decrease uncertainty relative to the sampling, the experiments were conducted in batches. The characteristics of the contaminants presented in Table 3 result from calculated averages for each group of experiments.

For each group of experiments, a quantity, pre-estimated according to an experimental plan, is screened to 2 mm. The fraction above 2 mm is set aside and only the fraction below 2 mm is considered in the Erlenmeyer washing tests and the flotation tests, which are described hereinafter. The fraction below 2 mm manipulated using a splitter, to sample the quantity of soil necessary for each experiment. Three characterizations of the initial soil are performed per group of experiment.

Washing of the Soil in an Erlenmeyer

All preliminary washing trials performed in an Erlenmeyer were effectuated on PALSN and aimed to define the improved chemical conditions to remove PAH and then lead.

Basic Principle

Soil samples (20 g) are washed using detergent solutions (200 ml) for a slurry density of 10% (w/w dry), under various operating conditions. The soil sample is placed in an Erlenmeyer and the washing solution is then added. The mixture is then subjected to mechanical agitation at 175 turns per minute during 1 h. After separation of the contaminated washing solution and the "clean" soil by filtration (Whatman 934-AH, 1.5 μm porosity), analyses of the metals and the PAHs were performed on the decontaminated soil. All experiments were done in triplicate.

Studied Washing Parameters

Nature and Concentration of the Surfactant

Washing PAHs using surfactants is a widely studied process and over the set of surfactants evaluated in this application, the non-ionic ones, and more particularly TW80, appeared to be those presenting the highest potential for washing PAHs. Conversely, the surfactants highly prized in the cosmetic industry, amphoteric ones, have not often been evaluated in terms of solubilization of PAHs. Thus, it was envisioned to evaluate the solubilization capacity of several surfactants: two non-ionic (BJ35 and TW80 obtained from Aldrich™) and two amphoteric (CAS and BW obtained from Chemron™) over a range of concentrations varying between 0.25% to 2.5% (w·w$^{-1}$ dry). Table 5 presents some characteristics of these surfactants.

stage, the physical state of the reaction medium remains unknown and there is no indication that the PAHs in micellar form do not consolidate on the cake formed during the filtration. Separation tests should therefore be considered throughout other techniques.

The centrifugation tests were commenced under various centrifugal forces (500, 1000, 1500, 2 000 and 3 000×g), for washing performed using TW80 at 1% (w·w$^{-1}$ dry) on PALSN, and according to the previously described washing protocol. The type of centrifuge used was a Beckman coulter Allergra™ 6.

Flotation

While the experiments presented over the preliminary tests are performed in triplicate for SNW and NCY, a large number of experiments, done for improving the process, was conducted on SNW in single runs, in order to sweep a maximum of operating parameters. Each of these experiments that led to the consideration of a parameter as being significant to the efficiency of the process was then pursued in triplicate on Tr23 and/or Tr29.

The washing tests were performed in the laboratory on 100 g of soil, in a flotation cell (Denver lab-1), in a volume of 1 L, under sequential agitation over 15 and 5 minute flotation. The pH is set using sulfuric acid 36N (EMD™) and is maintained through the washings where pH adjustment is desired. At the end of treatment, soil and washing solution are separated by

TABLE 5

Presentation of the tested surfactants

|  | Brij 35<br>Polyethylene glycol dodecyl ether | Tween 80<br>Polyoxyethylenesorbitan monooleate |
|---|---|---|
| Non ionic | P.M. = 1 200 g.mol$^{-1}$, d = 1.05 g.ml$^{-1}$,<br>HLB = 16.9, CMC = 9.2 × 10$^{-5}$ M<br>$CH_3(CH_2)_{11}(OCH_2CH_2)_n$—OH (n = 23) | P.M. = 1 310 g.mol$^{-1}$, d = 1.06 g.ml$^{-1}$,<br>HLB = 15, CMC = 1.2 × 10$^{-5}$ M<br>$C_{64}H_{124}O_{27}$ |
|  | ChemCas<br>Cocamidopropyl Hydroxysultaine | ChemBw<br>Alkyl dimethylammonio acetate |
| Zwitterionic | d = 1.11 g.ml$^{-1}$<br>$CH_3(CH_2)_{13}$—N(OH)—$(CH_2)_3$—N$^+(CH_3)_2$—<br>$CH_2$—CHOH—$CH_2SO_3^-$ | d = 1.04 g.ml$^{-1}$<br>$CH_3(CH_2)_{13}$—N(OH)—$(CH_2)_3$—N$^+(CH_3)_2$—<br>$CH_2$—CH2COOH | pH

While the use of a surfactant was envisaged for solubilizing the PAHs, it still remained to investigate metal solubilization for the mixed process in development. The acidity of the reaction medium is known to produce this solubilization. For this reason, washing tests using surfactants conducted in triplicate were commenced at pH 2 and pH 3 according to the same protocol as presented in the previous section. The pH set using HCl 12N (EMD™) and maintained constant during the one hour washing.

Salts

While acidity is a factor enabling solubilization of metals, the use of sodium chloride-type salts or EDTA (chelating agent) was also considered. The studies that we realized generally used sodium salts but other chloride salts could be used.

Thus, tests were commenced with surfactant/EDTA and surfactant/NaCl washings, in accordance with the same operation as before and under the following conditions:

CAS/EDTA: CAS 0.5%+EDTA 0.025N
CAS/NaCl: CAS 0.5%+NaCl 5.5M+pH3

The proposed tests used $(NH_4)_2$-EDTA, obtained from Alfa Aesar™, and NaCl obtained from EMD™.

Centrifugation

The developed washing process uses filtration at 1.5 μm of porosity as the solid/liquid separation technique. At this filtration at 1.5 μm porosity. Various parameters were pursued and tested: CAS concentration, NaCl concentration, slurry density, temperature, number of flotation sequences.

The process resulted in obtaining 2 solid phases and 2 liquid phases:

FS: reject or decontaminated soil
FM: froth or flotation concentrates
FLR: Washing water of the reject
FMR: Washing water of the froths Analyses of the metals and the PAHs were pursued for the solid fractions. The washing waters are analyzed for metals. Some samples of water were also analyzed for PAH.

Decantation

The decantation steps, introduced during the follow-up tests on the looped process, were realized in graduated cylinders using Percol E-10 at 1 g/L for a final concentration of 0.1 g/L.

Electrochemical Treatment of the Effluents

Since the flotation effluents are loaded with NaCl, metals, CAS and soil particles, a multitude of chemical and electrochemical reactions, presented in Table 6, can occur in the electrochemical system. The metals are essentially reduced at the cathode while chlorine gas emissions occur at the anode by oxydation of the chloride ions in solution. Reduction reactions of water and oxygen also occur, ensuring generation of OH⁻ ions in the medium and therefore an increase in pH.

Although no measurements of dry material or dissolved organic material in the effluents were undertaken, it is not unreasonable, considering moreover the presence of CAS, to suppose that traces of such material remain in solution. Thus, competing reduction reactions of the organic material could be occurring.

TABLE 6

Chemical and electrochemical reactions in the cell

| Reactions | Equations | |
|---|---|---|
| Metal reduction | $N^{x+}_{(aq)} + xe^-$ | $\leftrightarrows M_{(s)}$ |
| H2O reduction | $2H_2O_{(l)} + 2e^-$ | $\leftrightarrows H_{2(g)} + 2OH^-$ |
| O2 reduction | $2H_2O_{(l)} + O_{2(g)} + 4e^-$ | $\leftrightarrows 4OH^-$ |
| Cl- oxydation | $2Cl^-_{(aq)}$ | $\leftrightarrows Cl_{2(g)} + 2e^-$ |
| Organic material reduction | $HCOOH_{(aq)} + 2H^+ + 2e^-$ | $\leftrightarrows CH_3OH_{(aq)}$ |
| | $HCOOH_{(aq)} + 2H^+ + 2e^-$ | $\leftrightarrows HCHO_{(aq)} + H_2O_{(l)}$ |
| Metal complexation | $MCl_y^{(x-y)-} + yOH^-$ | $\leftrightarrows MOH_y^{(x-y)-} + yCl^-_{(aq)}$ |

The electrochemical cell that is used is made of PVA in dimensions able to receive a set of ten electrodes, each being spaced apart by 1 cm, and a total volume of 1.6 L. The system uses insoluble anodes of the type Ti/Pt and iron cathodes inserted in the cell and supplied by a continuous current generator (Xantrex). Agitation is maintained in the system using a magnetic bar. Samples of 25 ml are removed over time and filtered using a Wahtman 934AH. The redox potential (ORP) and pH are measured before the water is conditioned at 5% $HNO_3$ for analysis of lead and Na. Chloride analyses were also performed on some samples at the entrance and exit of the electrochemical treatment.

Several parameters were tested concerning the efficiency of the electrodeposition, such as the applied current (I=1-2-3 A), the electrodeposition time (t=0, 10, 20, 40, 60, and 90 min), and the concentration of NaCl in the effluents ([NaCl] =0-0.25-0.50-0.75-1M).

Analytic Section
Analysis of the PAHs

The analysis of the PAHs is done using a mass spectrometer, coupled to a separation technique by chromatography in gas phase (GCMS—Perkin Elmer™, model Clarus 500™), after a Soxhlet-type extraction for the solid samples and a solid phase extraction (SPE) for the liquid samples.

Soxhlet Extraction

According to the operating parameters developed by the Centre d'expertise en analyse environnementale du Québec, the soil sampling (~5-10 g), dried with an identical quantity of $MgSO_4$ (EMD™), is placed in an extraction cartridge adapted to the extraction system in the laboratory. Using reflux maintained at 60° C. during 24 h, the PAHs are solubilized in the total volume of about 350 ml of dichloromethane (EMD™). The extracts, thus recovered, are filtered on $MgSO_4$ in order to eliminate all trace of humidity, then concentrated or not using a rotary evaporator according to the PAH content in the extracts. The sample thus obtained is stocked at 4° C., sheltered from light, before being analyzed by GCMS.

For each group of experiments, a control is performed by extracting the PAHs from a reference soil (BCR no. 524 obtained from the Institute for Reference Materials and Measurements). Recovery standards (Acenaphtene D-10, Anthracene D-10, Pyrene D-10 and Chrysene D-12 obtained from Supelco™) are also introduced at known quantities according at the beginning of the extraction, in order to evaluate the yield of each extraction. Thus, over the set of analyses that were performed over the totality of the project, the average yield rate of Soxhlet extraction reached 89±5%, for ANT-D10.

GC-MS Analyses
Instrument Setting

The analytical method developed in this project enables following some 24 compounds, including: 4 recovery standards enabling efficiency evaluation of the preliminary extraction. Certain PAHs are not sufficiently abundant in the concentration volumes of the extracts to be detected during the analysis, which is why no results concerning these compounds will be presented. No distinction is made between the b, j or k benzofluoranthene, and all the results associated therewith are presented as an aggregate of benzo[b+j+k]fluoranthene. The analyses are controlled using a certified solution (Mix64 obtained from Supelco™)

Analysis of the Metals

The analysis of the metals in the solid fractions requires a step of digesting the samples, previously grinded at 80 μm (method 3030 I). The leachate is analyzed by ICP-AES. For each undertaken test series, a control digestion control is performed on a reference marine sediment (PACS2 obtained from the Conseil National de Recherche du Canada).

The process waters are sampled in 5% $HNO_3$ (EMD™), in order to limit the effect of metal precipitation over time, and analyzed using ICP-AES or AAS, depending on the type of effluent. In effect, for the tests using saturated solutions of NaCl, the lead analysis cannot be performed by ICP-AES, since the load is too great and can damage the torch. These measurements were done by AAS.

ICP-AES Analyses

The analyses by ICP-AES use the model "Vista-AX simultaneous ICP-AES" from Varian™. The analytical method developed in this project enables tracking 23 elements: As, B, Ba, Ca, Cd, Cr, Cu, Fe, K, Mg, Mn, Na, Ni, P, Pb, S, Si, and Zn. The dosage method considered essentially the metals and semi-metals, but also some non-metals such as sulfur and phosphorus. During the analyses, controls are also ensured over the series of metals using certified solutions obtained from SCP Science™ (Laval, QC, Canada) and ensure a confidence interval of 2% for Ca, Cd, Cr, Cu, Ni, P, Pb, and Zn, 1% for Fe, and 5% for Na.

AAS Analyses

Atomic absorption spectrometry is used for dosing Pb and Na in the liquid fractions of the process loaded with NaCl, that is, FLR, FMR, EDi, and Edf. A matrix of NaCl=0.3N and $HNO_3$=5% is used for dosing the Pb and $HNO_3$=5% for dosing the Na. The control solutions are identical to those used in the ICP-AES analyses.

Other Analyses
Electrochemical Measurements

The pH and ORP are measured. Chloride assays (Cl—) are realized to evaluate the loss of Cl— in $Cl_2$ over the electrochemical treatment, according to the operating procedures developed. The method used is a colorimetric analysis using $Fe(SCN)_3$, as presented in equation 1. The thiocyanate iron complex is highly colored and highly absorbant of a wavelength of 480 nm. The measured absorption corresponds to the concentration in $Fe(SCN)_3$, itself being proportional to the Cl⁻ concentration. The calibration range extends from 6 to 300 mg/L of Cl⁻.

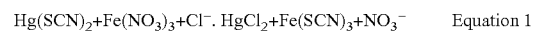
$$Hg(SCN)_2 + Fe(NO_3)_3 + Cl^- . HgCl_2 + Fe(SCN)_3 + NO_3^- \qquad \text{Equation 1}$$

Results And Discussion
Preliminary Tests
Selection of Surfactant for Washing PAHs According to the washing protocol presented in a previous section, four surfactants were tested for their solubilization capacity of PAHs: two non-ionic surfactants well-known in literature (BJ35 and TW80) and two amphoteric surfactants (CAS and BW); for a concentration range going from 0.25% to 2.5% (w·w$^{-1}$ dry).

Non-Ionic Surfactants

Of the two tested non-ionic surfactants, TW80 appears to be the preferred efficient surfactant in terms of PAH solubilization which thus confirms the results appearing in literature. Table 7 presents the PAH reduction, calculated as the difference between the initial and final concentrations obtained after washing using different concentrations of TW80. The results show that an increase in the TW80 concentration to a certain value improves the PAH solubilization. This solubilization increases to a maximum for all of the observed PAHs with the use of TW80 between 0.5 and 1%. This observation speaks to the interfacial behavior in the surfactant in the reaction medium and confirms the notion of an improved utilization concentration for a target application (CMC for a water/surfactant system or $CMC_{eff}$ for a soil/water/surfactant system). The solubilization of the PAHs seems to reach a maximum around the CMC, this being a function of the type of surfactant and the reaction medium (type of soil, slurry density, concentration of contaminants, etc.). Thus, for the soil under study in the tested washing conditions, the $CMC_{eff}$ seems to be situated between 0.5 and 1% (w·w$^{-1}$ dry). This phenomenon of $CMC_{eff}$ as the concentration at which the solubilizing properties of the surfactants are at their maximum, is clearly represented in FIG. 2. The best concentrations of TW80 that were tested, that is at 0.5 and 1%, ensure average removal rates of PAH of 55 and 58% respectively.

For concentrations of TW80 above 1%, the PAH solubilization decreases until reaching residual concentrations at the exit of the treatment greater than the entering concentrations. This behavior can be explained, likely from the fact that interactions persist within the slurry between water, surfactant, soluble particles, hydrophobic particles, mineral particles, PAH, metals. According to the concentrations of each of these, an equilibrium is reached for each possible interaction within the system. Thus, it seems that while the PAH/surfactant and PAH/hydrophobic particle/surfactant interactions are dominant for a concentration below 1%, this tendency changes for increased concentrations, that is, a change in the system's equilibrium toward preferred interactions of the following type: hydrophobic particles/surfactants, mineral materials/surfactant, soluble material/water. Thus, the high concentrations of TW80 favor the solubilization of particulate material while concentrating the contaminants to higher contents.

Figure 2:
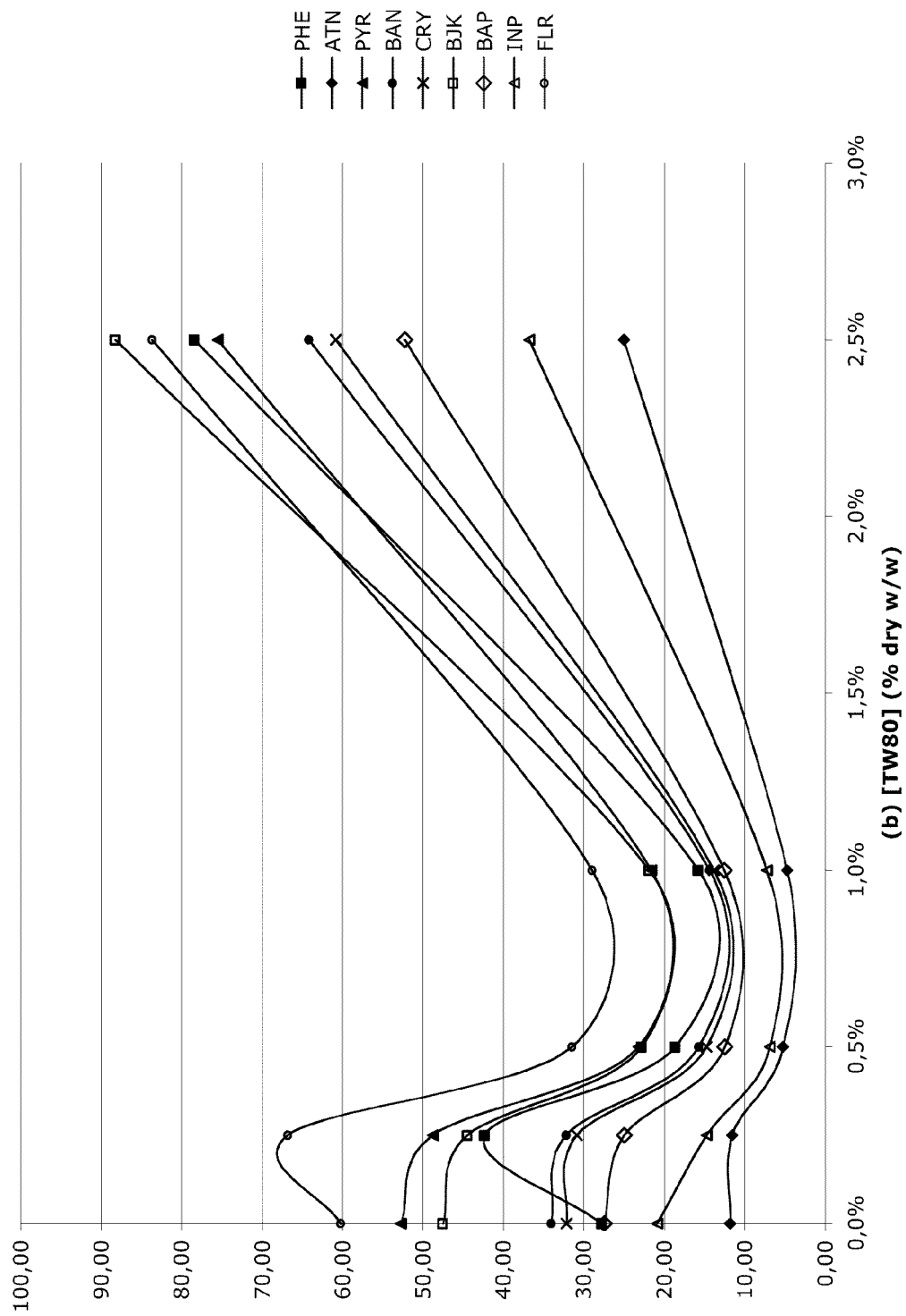
FIG. 2 is a graph showing the residual quantities of PAH in mg/Kg after washing for one hour with 10% (% $w \cdot w^{-1}$) of soil slurry PALSN with different concentrations of TW80.
Figure 3:
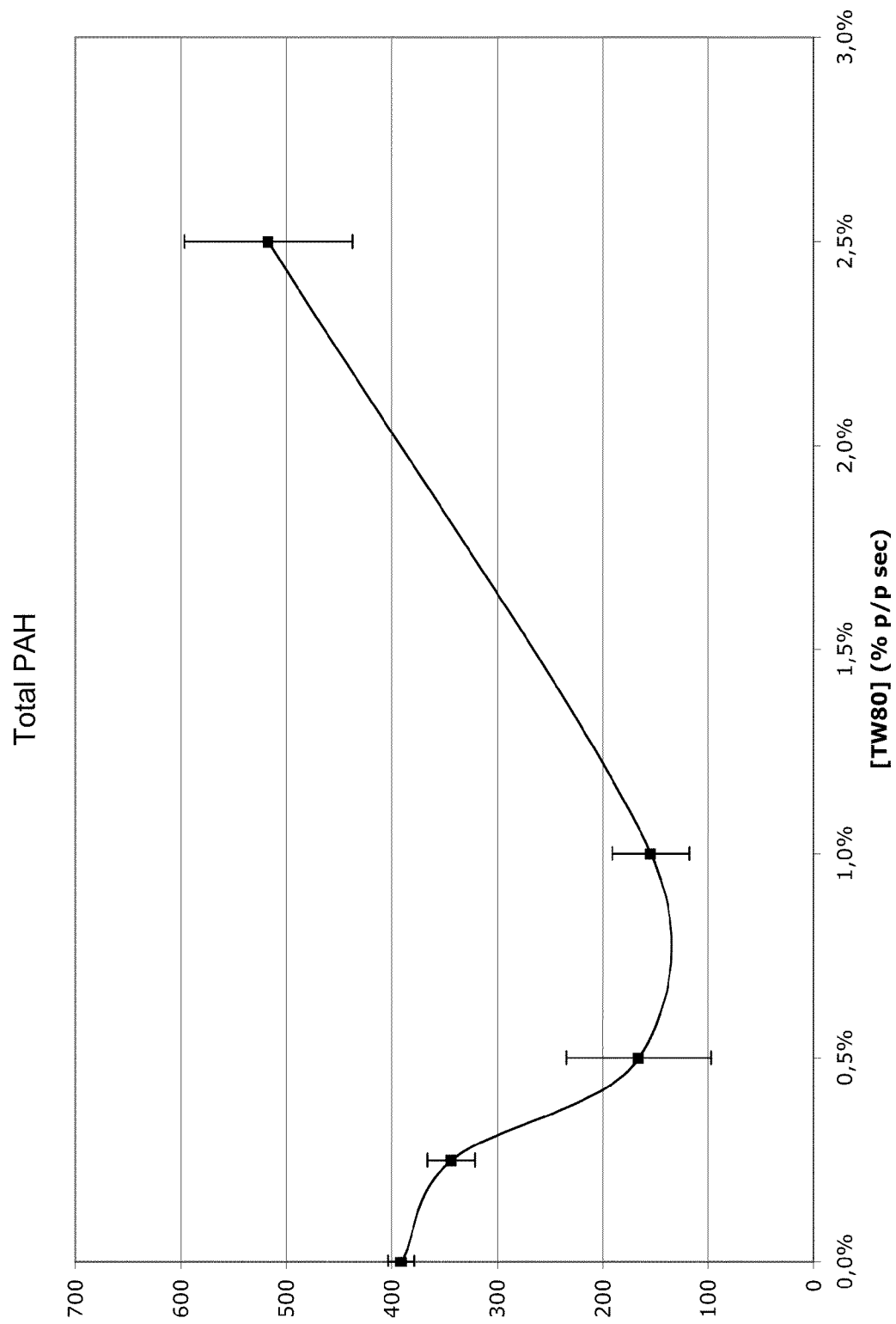
FIG. 3 is a graph showing the residual quantities (mg/kg) and uncertainties of the total PAH of PALSN after one hour of washing at 10% (% $w \cdot w^{-1}$) at different concentrations of TW80.

FIG. 2 also shows that the observed tendencies are valid for all of the PAHs under study. This observation leads one to consider the PAH contamination as an aggregate of the latter in order to estimate and appreciate in terms of confidence interval the results obtained, as presented in FIG. 3.

TABLE 7

Removal yield (%) of PAHs after 1 h of washing soil PALSN at 10% (% w.w$^{-1}$) at different concentrations of Tween 80.

| PAH | 0% | 0.25% | 0.50% | 1% | 2.50% |
|---|---|---|---|---|---|
| NPN | 25 ± 16% | −9 ± 19% | 40 ± 7% | 38 ± 19% | −120 ± 108% |
| ACN | −4 ± 20% | −6 ± 11% | 43 ± 21% | 47 ± 12% | −90 ± 33% |
| FLU | −11 ± 16% | −8 ± 13% | 46 ± 23% | 51 ± 6% | −94 ± 55% |
| PHE | −15 ± 24% | −17 ± 12% | 49 ± 29% | 56 ± 9% | −117 ± 68% |
| ATN | −17 ± 25% | −78 ± 16% | 19 ± 27% | 26 ± 24% | −286 ± 41% |
| FLR | −31 ± 16% | −11 ± 7% | 48 ± 25% | 52 ± 11% | 54 ± 80% |
| PYR | −22 ± 18% | 13 ± 5% | 58 ± 19% | 61 ± 9% | 55 ± 78% |
| BAN | −22 ± 20% | 23 ± 7% | 62 ± 15% | 66 ± 8% | −53 ± 11% |
| CRY | −20 ± 21% | 23 ± 7% | 63 ± 16% | 66 ± 8% | −52 ± 5% |
| BJK | −14 ± 19% | 26 ± 7% | 62 ± 14% | 63 ± 6% | −48 ± 8% |
| BAP | −18 ± 20% | 34 ± 6% | 67 ± 12% | 67 ± 7% | −39 ± 16% |
| INP | −2 ± 24% | 47 ± 9% | 75 ± 6% | 74 ± 9% | −33 ± 4% |
| DBA | −16 ± 14% | 47 ± 3% | 69 ± 2% | 80 ± 29% | −37 ± 5% |
| BPR | −5 ± 32% | 39 ± 4% | 67 ± 5% | 65 ± 7% | −47 ± 7% |
| PAH total | −17 ± 17% | 14 ± 6% | 59 ± 17% | 62 ± 9% | −29 ± 20% |
| Average | −12 ± 13% | 9 ± 33% | 55 ± 15% | 58 ± 14% | −65 ± 82% |

Amphoteric Surfactants

Figure 4:
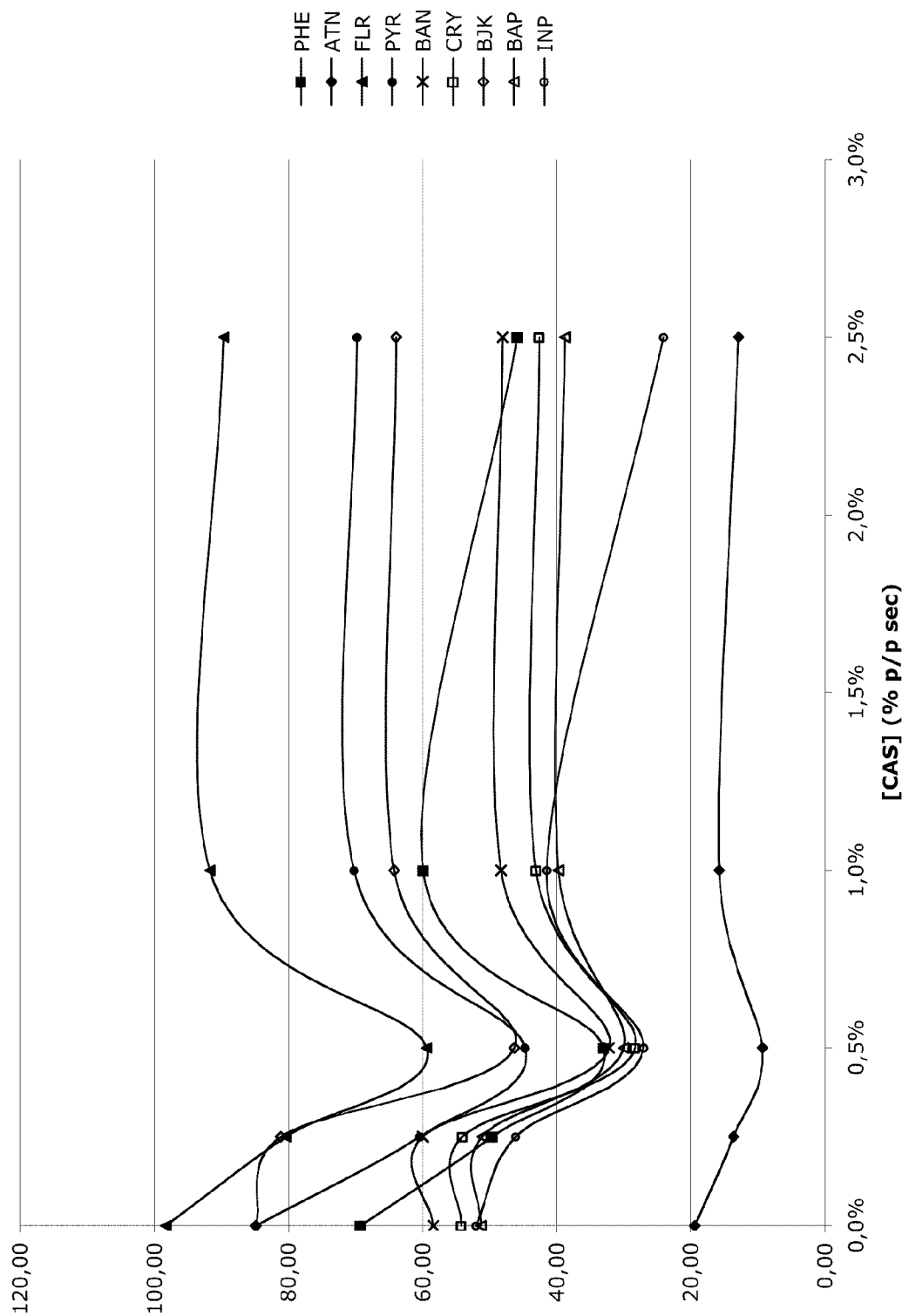
FIG. 4 is a graph showing the residual quantities of PAH (mg/kg) after one hour of washing at 10% (% $w \cdot w^{-1}$) of soil slurry PALSN with different concentrations of CAS.

Of the two surfactants that were tested, the CAS seems to enable a preferred solubilization of the PAHs for a $CMC_{eff}$ neighboring 0.5% (w·w$^{-1}$ dry) as presented in FIG. 4, thus enabling a removal yield of 46% of the PAHs (Table 8). This figure also clearly shows the micellar behavior discussed in the previous section for the case of TW80, that is, a $CMC_{eff}$ at which the surfactant's solubilization properties are increased. In effect, up to a concentration of 0.5% (w·w$^{-1}$ dry), the CAS seems to form hydrophilic micelles and ensures PAH solubilization. Above this concentration, the PAH solubilization decreases, reflecting a change in the micellar behavior toward the solubilization of the hydrophobic soil particles and/or the mineral material.

TABLE 8

Removal yield (%) of PAH after 1 h washing soil PALSN at 10% (% w.w$^{-1}$) at different concentrations of CAS.

| [CAS] w/w dry | 0% | 0.25% | 0.50% | 1% | 2.50% |
|---|---|---|---|---|---|
| NPN | 5 ± 24% | −1 ± 43% | 54 ± 11% | −12 ± 17% | 55 ± 22% |
| ACN | −4 ± 20% | −51 ± 76% | 45 ± 10% | −39 ± 2% | 30 ± 15% |

TABLE 8-continued

Removal yield (%) of PAH after 1 h washing soil PALSN
at 10% (% w.w$^{-1}$) at different concentrations of CAS.

| [CAS] w/w dry | 0% | 0.25% | 0.50% | 1% | 2.50% |
|---|---|---|---|---|---|
| FLU | −3 ± 12% | 11 ± 26% | 36 ± 9% | −27 ± 11% | 25 ± 9% |
| PHE | −1 ± 2% | 28 ± 22% | 52 ± 8% | 13 ± 48% | 34 ± 10% |
| ATN | −3 ± 8% | 30 ± 17% | 52 ± 6% | 19 ± 43% | 34 ± 5% |
| FLR | −32 ± 23% | 18 ± 14% | 40 ± 3% | 7 ± 44% | 9 ± 9% |
| PYR | −18 ± 24% | 29 ± 12% | 47 ± 3% | 17 ± 41% | 18 ± 10% |
| BAN | −21 ± 28% | −3 ± 55% | 45 ± 1% | 17 ± 40% | 18 ± 12% |
| CRY | −18 ± 29% | 0 ± 54% | 48 ± 0% | 20 ± 39% | 21 ± 11% |
| BJK | −13 ± 27% | 4 ± 48% | 45 ± 2% | 24 ± 35% | 25 ± 12% |
| BAP | −19 ± 29% | 0 ± 48% | 41 ± 2% | 22 ± 38% | 24 ± 13% |
| INP | 3 ± 33% | 11 ± 47% | 48 ± 3% | 20 ± 3% | 54 ± 15% |
| DBA | −20 ± 18% | 1 ± 26% | 44 ± 4% | 29 ± 15% | 15 ± 15% |
| BPR | −2 ± 44% | 29 ± 27% | 45 ± 6% | 42 ± 40% | 55 ± 11% |
| PAH total | −14 ± 23% | 24 ± 13% | 46 ± 2% | 18 ± 36% | 26 ± 8% |
| Average | −10 ± 11% | 8 ± 21% | 46 ± 5% | 11 ± 22% | 30 ± 15% |

Discussion

Figure 5:
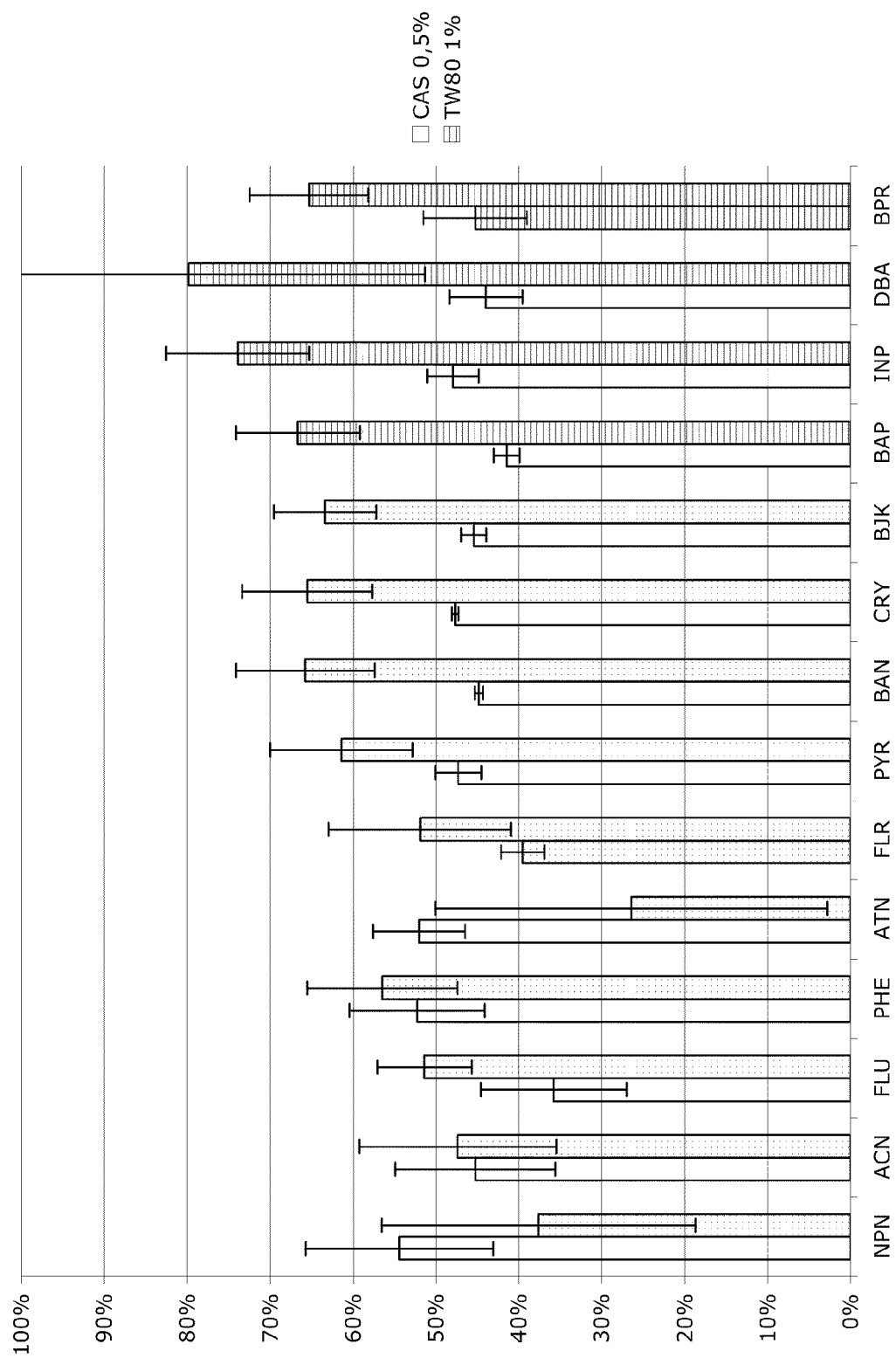
FIG. 5 is a graph showing a comparison of removal yield (y is in %) of PAH after washing for one hour with 10% (% $w \cdot w^{-1}$) of soil slurry PALSN with TW80 and CAS.

Of the four tested surfactants, two proved to be preferred vis-à-vis PAH: TW80 at 1% (w·w$^{-1}$ dry) and CAS at 0.5% (w·w$^{-1}$ dry). The $CMC_{eff}$ that were observed are different for anionic and amphoteric surfactants, which shows that this characteristic is unique for each surfactant. FIG. 5 presents the removal percentage of the PAH after treatment by each of the surfactants at their $CMC_{eff}$. Thus, with the exception of some components (NPN, ACN, and ANT), the TW80 appears as better washing agent than CAS. Table 9 presents removal percentages of total PAHs for all of the concentrations that were tested for each surfactant under study.

By observing the results presented in Table 9, the choice of surfactant is weighted more towards the non-ionic type (TW80). A recent study, however, curtails the use of these compounds. In effect, while current processes use TW80 in the treatment of organic contaminants, it has been raised that these non-ionic compounds could cause environmental harm. After treating media that are organically contaminated, the surfactants accumulate in municipal and/or industrial wastewaters. Several studies on the metabolism of non-ionic surfactants have shown that their degradation liberates a long carbon chain derivative of 4-alkylphenol, which acts as an estrogen disruptor in several aquatic animal species. Due to their persistence and polarity in water, alkyphenols can traverse water treatment stations and can be released into aquatic environments. For this reason, while the better observed results in terms of PAH solubilization concern TW80 (62±9% removal of total PAH at 1% w/w utilization), the latter was not considered for the subsequent experiments. The mixed washings to be undertaken will use therefore CAS as the washing agent for the PAH (46±5% removal of total PAH at 0.5% w/w utilization).

TABLE 9

% of average removal of the total PAHs according to the surfactants used and their concentration.

| Surfactants | 0.25% | 0.50% | 1% | 2.50% |
|---|---|---|---|---|
| TW80 | 14 ± 6 | 59 ± 17 | 62 ± 9 | −19 ± 20 |
| BJ35 | 2 ± 3 | 0 ± 0 | 20 ± 10 | 8 ± 10 |
| CAS | 24 ± 13 | 46 ± 2 | 18 ± 36 | 26 ± 8 |
| BW | 0 ± 0 | 5 ± 7 | 13 ± 6 | 26 ± 3 |

Selection of Mixed Washing Conditions

Figure 6:
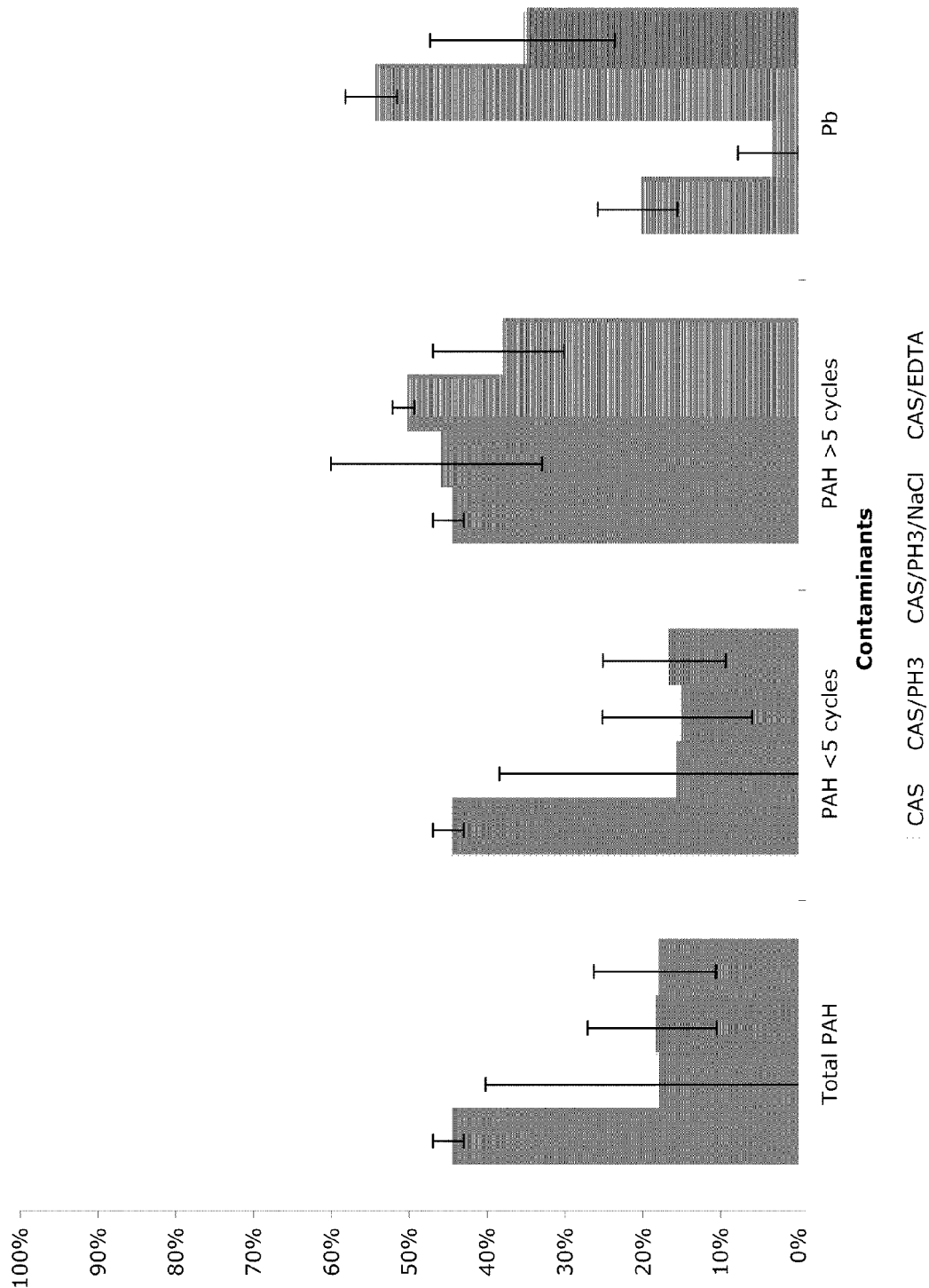
FIG. 6 (y is in %) is a graph showing the removal yield of the total PAH and Pb of PALSN for different washing conditions at 10% slurry in an Erlenmeyer (CAS, CAS/pH3, CAS/pH3/NaCl and CAS/EDTA).

The first tests concerned the effect of pH (pH2 and pH3) in relation to the solubilization of Pb and PAHs for washings at 10% slurry density operated using CAS 0.5%. The results at pH2 are not presented. As presented in FIG. 6, while the adjustment of pH3 does not seem to have an effect on Pb solubilization, it also seems to decrease from 45 to 16% the removal of light PAHs (below 5 cyclic groups). The solubilization of heavier PAHs (above 5 cyclic groups) remains at 46%.

The addition of NaCl up to saturation of the solution (5.5M) maintained at pH3 seems to ensure the same behavior as the simple adjustment of the pH to 3, that is, a decrease in the solubilization of lighter PAHs from 45% to 16% and a maintenance of the solubilization of the heavier PAHs (from 45% to 51%). The same observation can also be made for treatments using EDTA. The observation of the regulatory limits currently in effect in Quebec show that these vary from 100 to 10 mg/Kg of dry soil, depending on the toxicity of the PAH that is considered. Thus, these limits are generally around 50 and 100 mg/Kg for light compounds (NPN, ACN, FLU, PHE, FLR, PYR), and 10 mg/Kg for the heavier ones (BAN, CRY, BAP, BJK, INP, DBA, BPR). It therefore appears foreseeable to propose three possible routes of treatment according to the type of contamination and the reclamation objectives. For contamination with PAH exclusively, the use of CAS at 0.5% seems promising. For the case of a mixed contamination PAH/Pb, the use of salts seem to be advantageous, and it seems that using NaCl is as potentially conceivable as using EDTA. In effect, the washings realized using EDTA and NaCl enable an increase in removal percentages of lead from 21±5% to 35±12% and 55±3% respectively. The addition of salts causes the formation of soluble metallic complexes: chloro-complexes ($PbCl^+$, $PbCl_2$, $PbCl_3^-$, $PbCl_4^{2-}$), or EDTA complexes ($[Pb(EDTA)]^{2-}$, $[Pb(HEDTA)]^-$, $[Pb(H_2EDTA)]$).

The developed washing protocol up to now uses filtration at 1.5 µm, as the separation technique of the soil and the washing solution. The physical properties of the reaction matrix remain unknown and there is no indications that the PAHs in micellar form do not consolidate on the cake formed during filtration. The solubilization values presented do not reflect the quantitative equilibrium in the micellar medium, due to the fact of the upstream separation steps and the possible and probable reabsorption of hydrophobic particles and micellar PAHs on the soil particles at the moment of filtration. For this reason, various separation tests were pursued by centrifuging and flotation.

Filtration tests at different porosities could also be interesting and inform on the size of micelles produced by the association ChemCas/PAH. In this regard, the literature says that the size of micelles brought about by surfactants associated with hydrocarbons is situated around 3 nm and 10 to 100 nm in microemulsion. These data concerning the micelles formed in aqueous solutions and not in a water/soil/surfactant system should therefore be considered with care.

Selection of Solid/Liquid Separation Method

Centrifuging

Figure 7:
FIG. 7 is a graph showing the removal yield PAH after washing for one hour with 10% (% $w \cdot w^{-1}$) of soil slurry PALSN with TW80—1% w/w dry according to the centrifugal force applied and the application of filtration.

The washing protocol developed up to now uses filtration at 1.5 µm, as the separation technique of the soil and washing solution. Centrifuging tests were commenced under various centrifugal forces (500, 1000, 1500, 2 000 and 3 000×g), for washings undertaken with TW80 at 1% (w·w$^{-1}$ dry). For centrifugal forces above 500×g, no removal of PAH was observed. It is plausible to think that under the action of centrifugal force, the micelles deposit on the previously decontaminated soil. While the centrifuging results that were obtained confirm the presence of micelles in the reaction medium, this study was above all undertaken to ensure that the developed soil washing process using filtration at 1.5 µm was coherent. Thus, without being able to affirm that filtration is the best separation technique, it clearly appears from FIG. 7, that it is more appropriate than centrifuging, and this for all of the PAHs that were considered.

Though the centrifuging results are encouraging as to the validity of the filtration step in the developed process, other separation tests were conducted using flotation. In effect, the latter technique seems to be more appropriate for the treatment of organic contaminants since it hinders the reabsorption of the contaminants on the solid matrix.

Flotation

The first flotation tests were performed on SNW and NCY for 15 minutes flotation sequences after 15 minutes of conditioning under the following conditions: CAS 0.5% and CAS 0.5%+NaCl 5.5M+pH3. The entrainment of particles is calculated as the ratio between the mass of the floated particles (FM) and the mass of the initial soil (FC) on a dry basis and is expressed in percentage. This parameter varies between 4 and 9% depending on the soils and operating conditions. Preliminary tests for the washings using NaCl led to the introduction of steps of rinsing the froths and the soil at the end of the process. In effect, without rinsing the NaCl content represents 97% of the dry mass of the collected froth. Sodium was followed through each fraction of the flotation process: 31±1% were collected in the rinsing waters of the froth (FMR), 67±10% in the washing and rinsing waters (FLR) of the combined soil and 1.2±0.6% residing in the final soil at the end of the process (FS).

Figure 8:
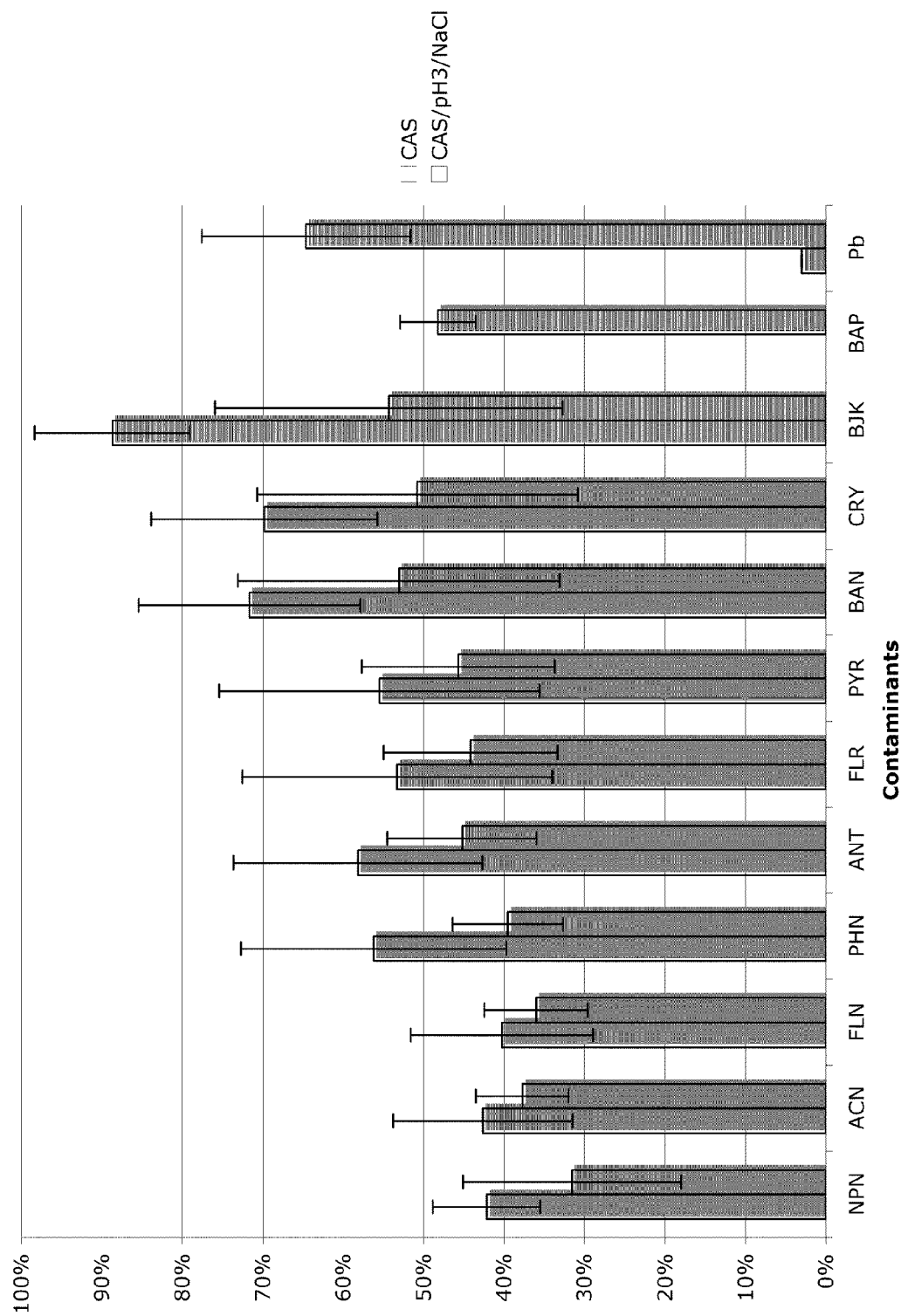
FIG. 8 is a graph showing the removal percentage of PAH and Pb for SNW under different flotation conditions.
Figure 9:
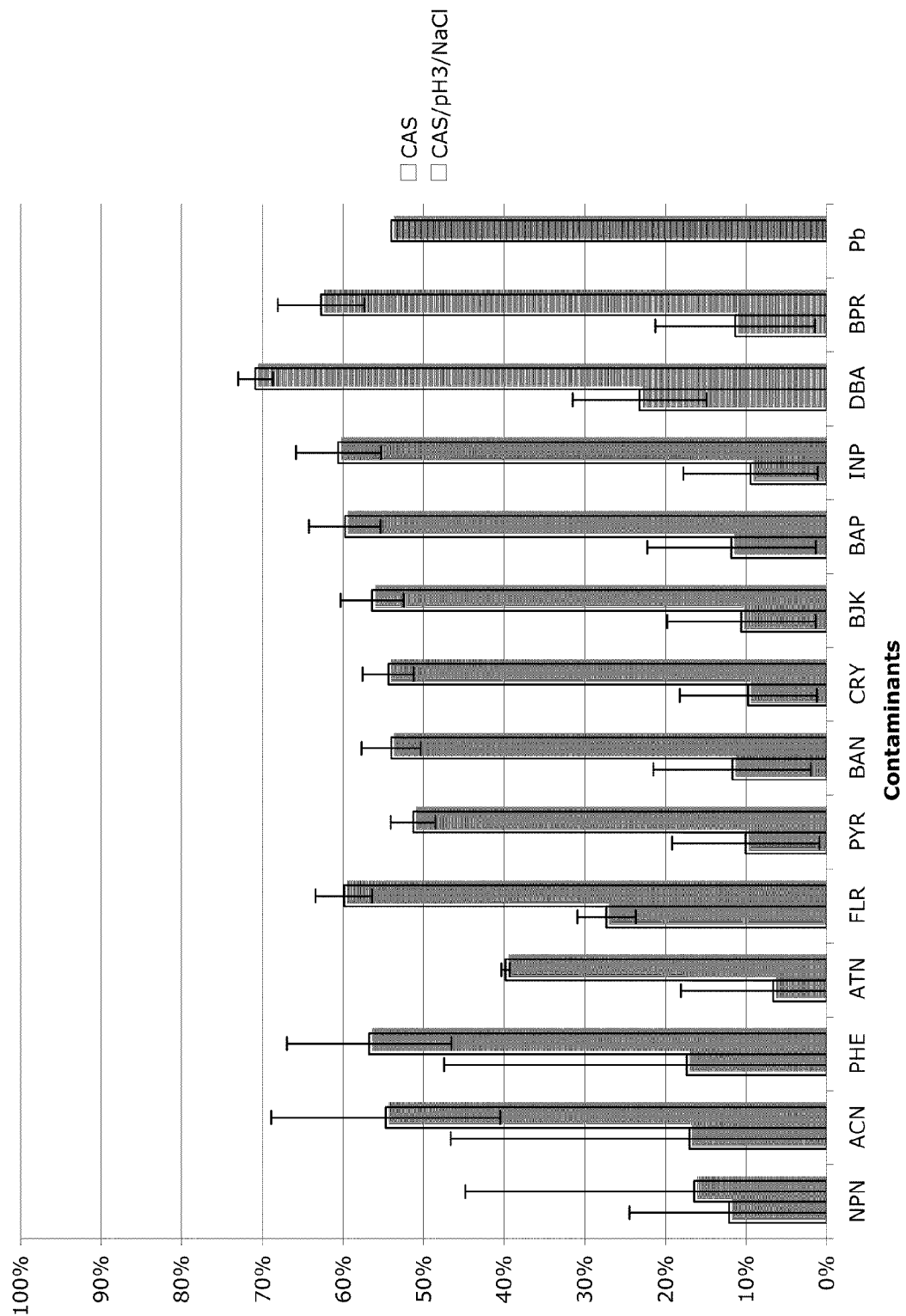
FIG. 9 is a graph showing the removal percentage of PAH and Pb for NCY under different flotation conditions.

The removal percentages of lead and PAH presented in FIGS. 8 and 9, are calculated as the ratio of the quantity of solubilized contaminants (FC-FS) and this initial quantity (FC). The removal percentages remain, for the two test conditions, higher in the case of SNW (FIG. 8) than NCY (FIG. 9). Thus, for SNW the average reductions of PAH reach 58±14% and 44±12% respectively for washings with CAS and CAS/pH3/NaCl. For NCY, these same rates are respectively 14±12 and 54±7%. Thus, the washing with CAS alone seems less efficient than in the case of NCY. While the results in terms of process efficiency accord generally for the two treated soils in salt mode, they are different for these same treated soils in non-salted medium.

The mass balance of the flotation system that was tested on NCY may be followed using Table 10. It seems that a significant mass loss takes place over the process (8%). This observation leads one to reconsider the calculations of the reductions in terms of the quantity of contaminants that were eliminated more in terms of a simple reduction in concentration. In effect, due to the fact that the particle entrainment and the probable solubilization of the soil particles in the operating conditions, the mass of washed soil at the end of the process decreases. The contaminants can therefore find themselves being concentrated. For these reasons, all the removal results presented for the flotation tests consider the masses of the process as well as the measured concentration. Thus, while the totality of the PAHs seem to be covered by the solid fractions of the process, only 11% of lead is found in these fractions FS and FM, while the removal of lead, measured over the quality of end process reject, reveals a removal yield of 54%, which leads one to suppose that the majority of the lead is solubilized by the formation of chloro-complexes within the process waters. The analysis of the saline process waters confirms and validates the presence of 39% dissolved Pb in the FLR and 2% in the FMR. 18% of lead is found in the froths. The study of the reaction medium, the behavior of the contaminants and the additives in the flotation process, is detailed hereunder.

TABLE 10

Mass balance of measured contaminants for NCY in the entrance and exit of the process for a treatment of 15 minutes by flotation using CAS/pH3/NaCl.

|  | Quantities (g·L) | ΣPAH (mg/Kg) | Pb (mg/Kg) |
|---|---|---|---|
| Characterization (FC) | 89.0 | 1047 | 580 |
| Reject (FS) | 72.7 | 757 | 333 |
| Froths (FM) | 9.3 | 4578 | 983 |
| Washing and rinsing of soil (FLR) | 1.6 | <LD | 12 |
| Rinsing of froths (FMR) | 0.5 | <LD | 2 |
| Recovery | 92% | 105% | 105% |

Synthesis

After various surfactant tests, CAS, while slightly less efficient than TW80, was retained as the surfactant for solubilizing PAHs with an efficiency of 46±2% over all of the PAHs. While improving the lead solubilization by 21±5%, at this same concentration, this rate could be improved, which is one reason why further tests of mixed washing of PAH and Pb were performed. Over the tested operating conditions, two seemed to present a significant efficiency potential in relation to soils presenting mixed contamination of the type PAH/Pb, that is: CAS 0.5%+NaCl 5.5M at pH3 and CAS 0.5%+EDTA 0.025M. Only one of these two procedures was retained for the next series of tests, the treatments using NaCl.

After having selected the chemical conditions, physical tests related to the separation of the soil and washing solution after treatment were conducted. Thus, filtration at 1.5 um, centrifugation under various centrifugal forces and flotation 3 l/min were compared. While centrifugation does not seem to be an ideal technique in this case, filtration and flotation give respectively 19±8% (PALSN) and 44±12% (SNW) removal of total PAHs using treatment with NaCl. These values validate the preceding hypotheses concerning the possible reabsorption of solubilized PAHs on the soil particles during filtration. Concerning lead, 55±3% (PALSN) and 60±8% (average of SNW and NCY) reduction respectively are obtained for filtration and flotation, which shows that the lead is perfectly solubilized in the process waters. The comparison of these results still remains subtle due to the fact that different matrices were used. Indeed, the filtration tests were done on PALSN while the flotation tests were done on SNW and NCY. Thus, from the overall preliminary tests that were realized, the notion that a mixed PAH/Pb process can be seen under the conditions presented in FIG. 10. However, it is noted, as presented in FIGS. 11, 12, 13 and 14, that while efficient operating conditions were retained, none permitted obtaining the regulatory limits in force in Quebec regarding PAHs, which is why the proposed process was further improved. The next section is devoted to the development and the improvement of this flotation process in mixed conditions.

Flotation Process

Figure 10:
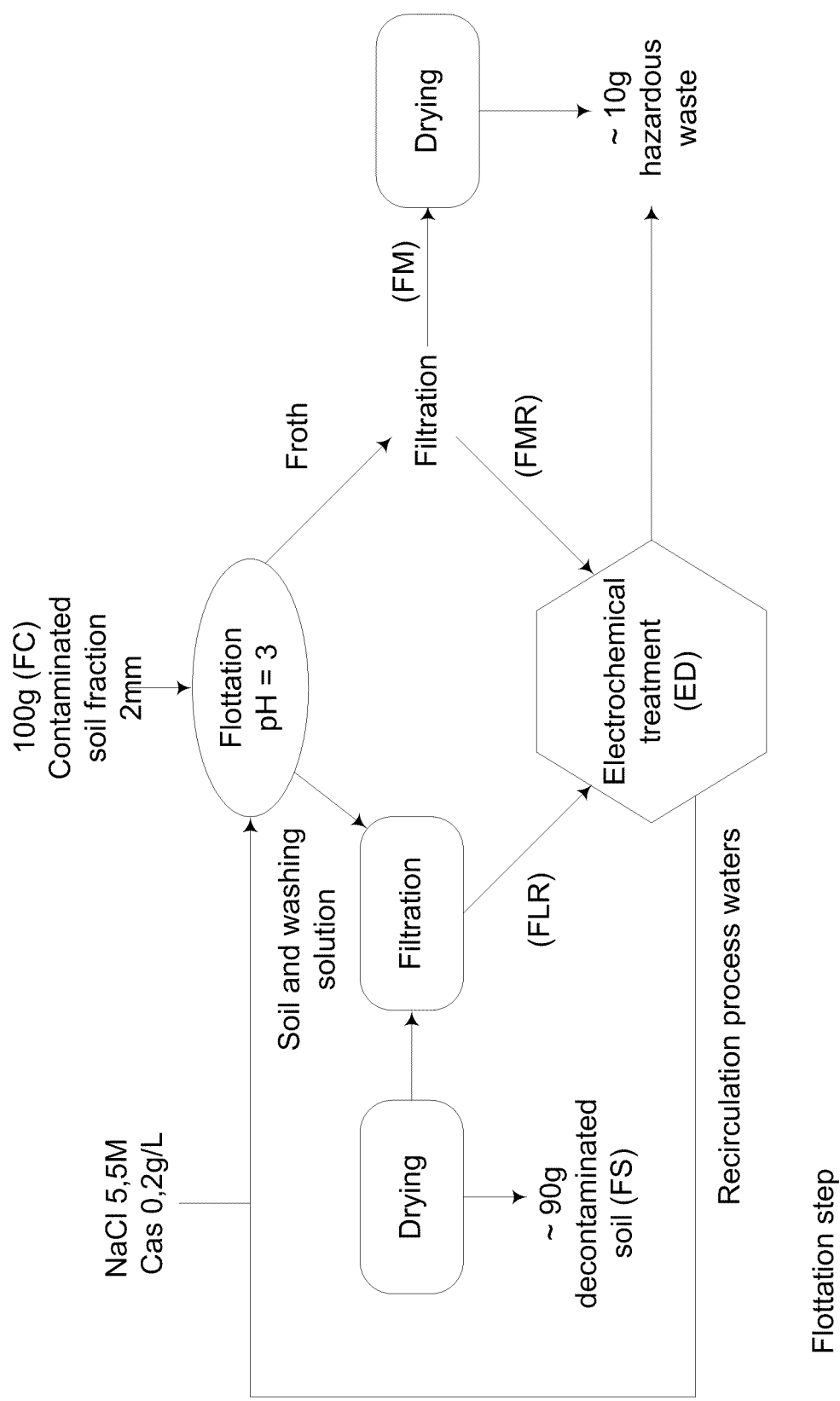
FIG. 10 is a schematic of a mixed flotation process under standard operating conditions, proposed for the improvement phase, according to an embodiment.
Figure 11:
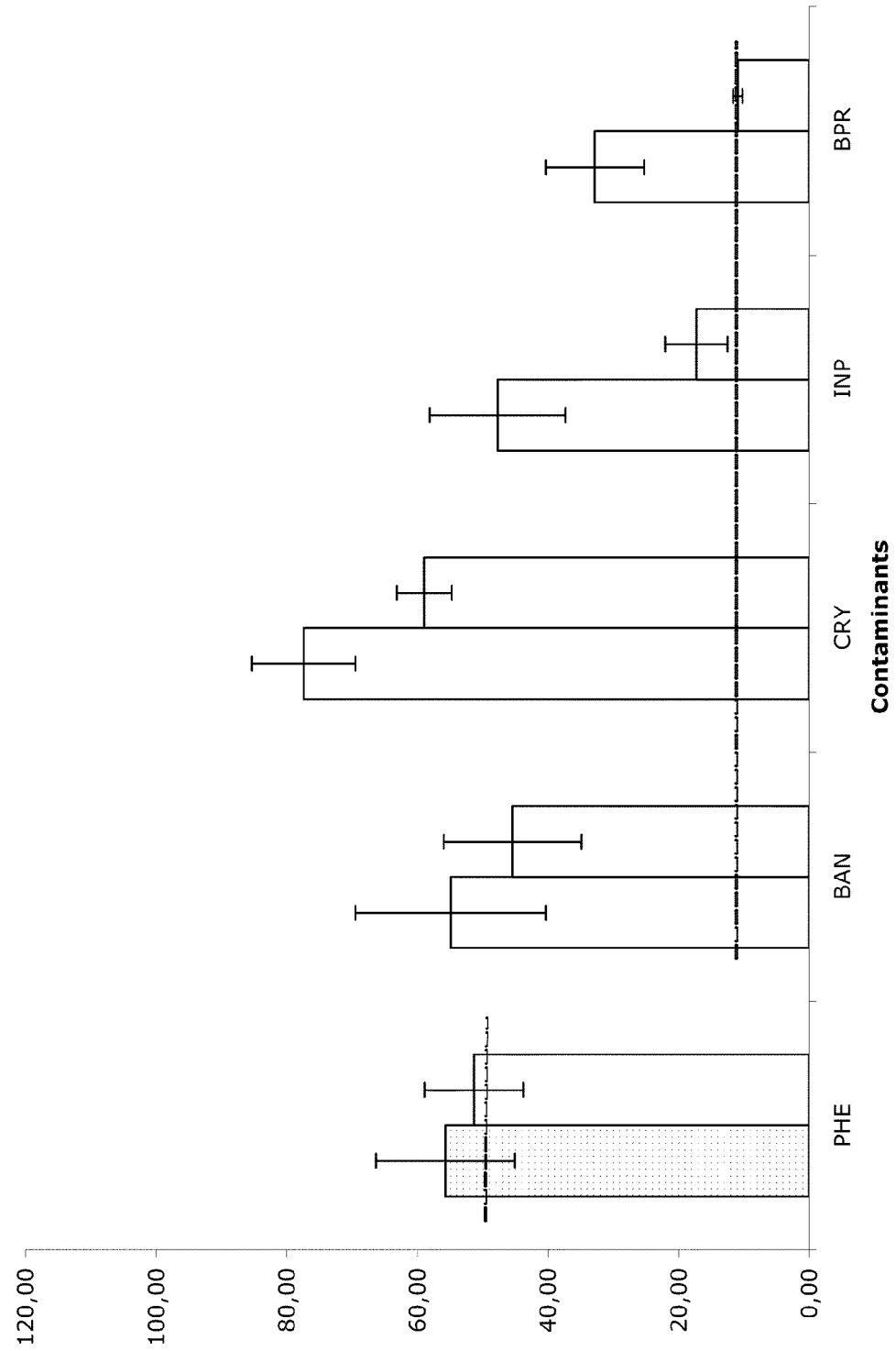
FIG. 11 is a graph showing the residual quantities of PAH (mg/kg) respecting the regulatory limits of PALSN before and after one hour of washing with CAS/NaCl at 10% (% $w \cdot w^{-1}$) of soil slurry PALSN.
Figure 12:
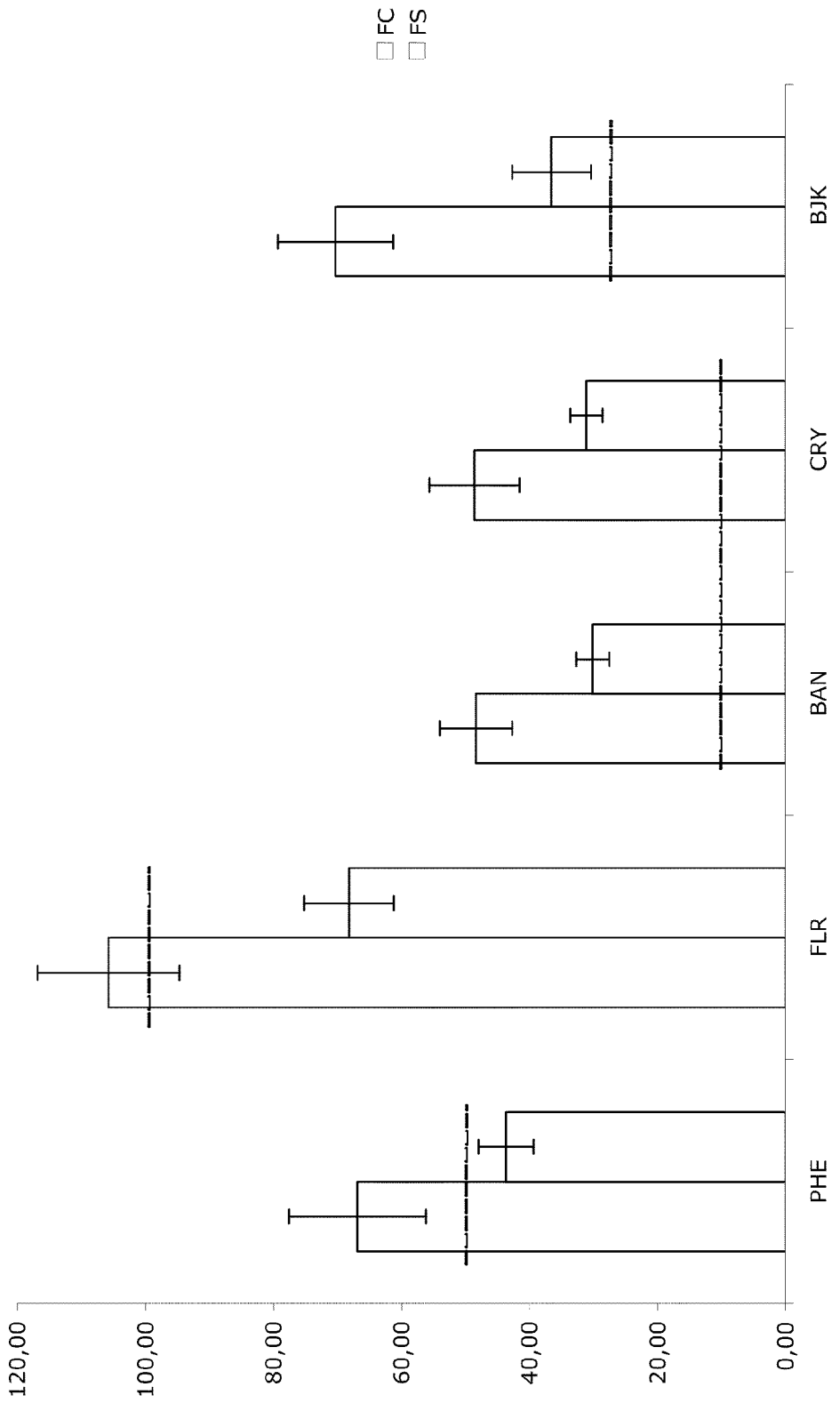
FIG. 12 is a graph showing the residual quantities of PAH in mg/kg, respecting the regulatory limits of SNW before and after 15 minutes of flotation at 10% (% $w \cdot w^{-1}$) of density of slurry with CAS/NaCl/pH 3.
Figure 13:
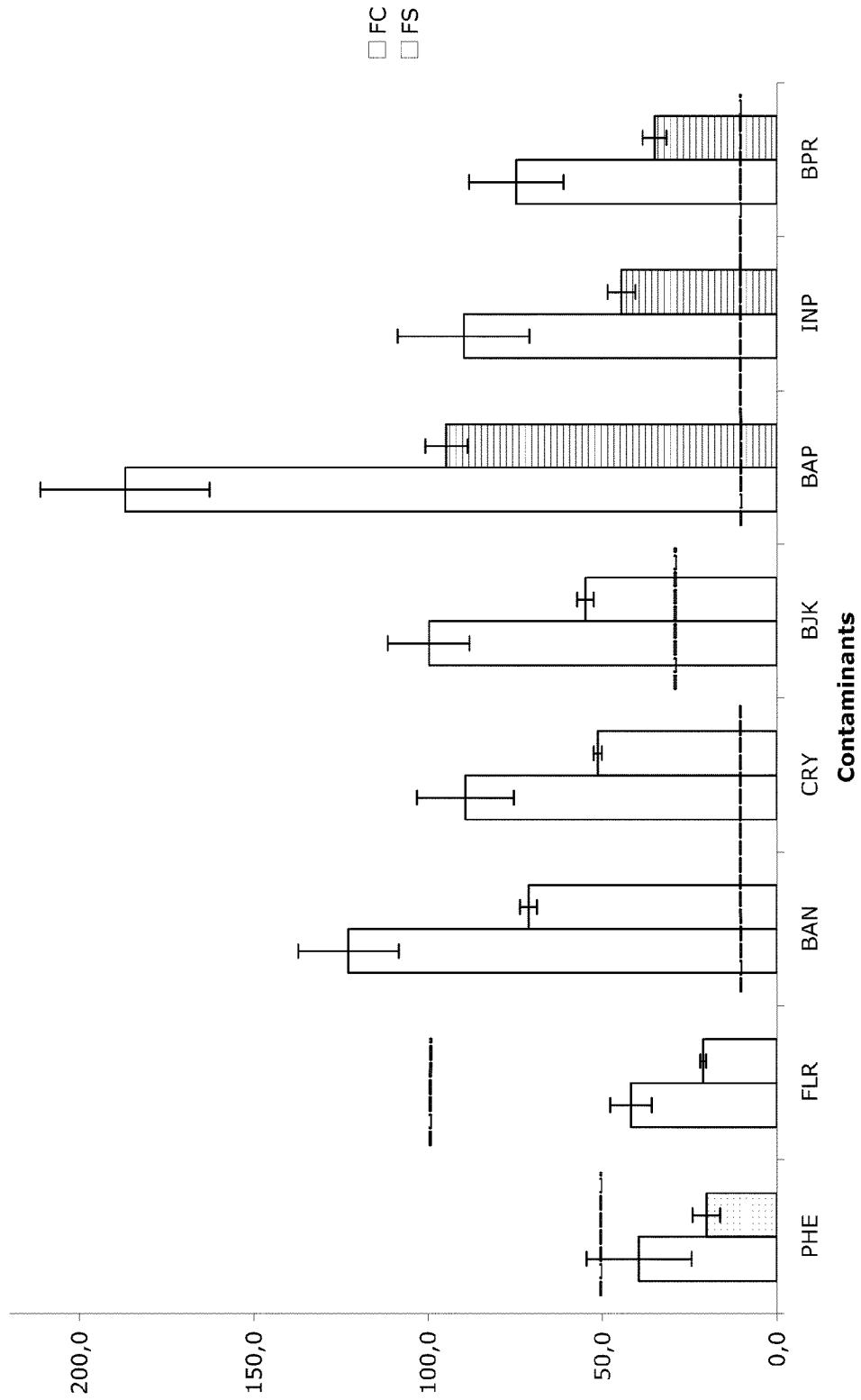
FIG. 13 is a graph showing the residual quantities of PAH in mg/kg respecting the regulatory limits of NCY before and after 15 minutes of flotation at 10% (% $w \cdot w^{-1}$) of density of slurry with CAS/NaCl/pH 3.
Figure 14:
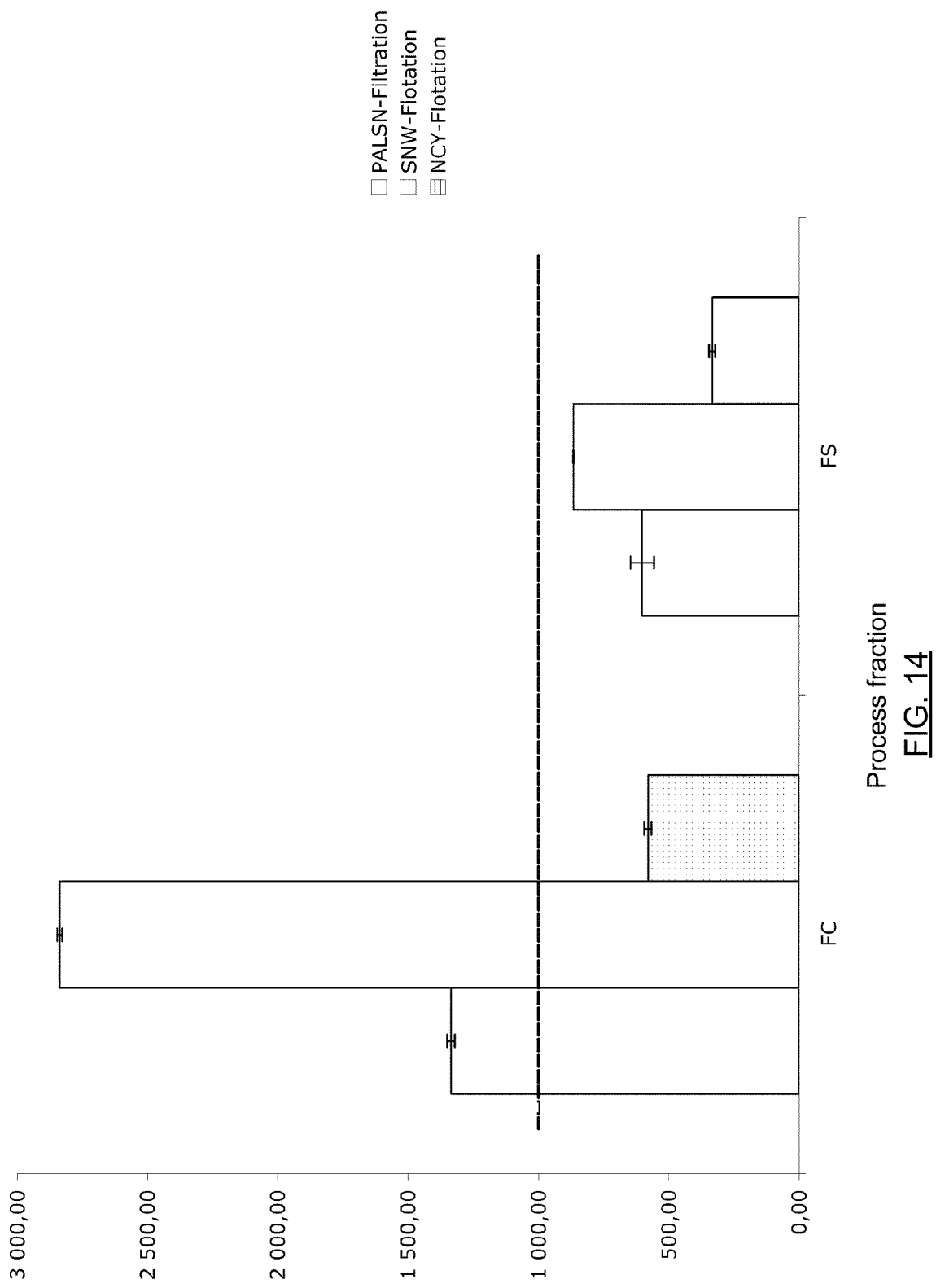
FIG. 14 is a graph showing the residual quantities of Pb (mg/kg) respecting the regulatory limits of PALSN, SNW, and NCY before and after washing or flotation at 10% (% $w \cdot w^{-1}$) of density of slurry with CAS/NaCl at pH 3.

The preliminary tests led to the conception of a treatment process presented in FIG. 10. The operating conditions that were defined as standards (CStdO) are: d=10%, [CAS]=0.2% w/w, [NaCl]=5.5M, pH=3, $t_{Tlottation}$=15 min, $Q_{Tlottation}$=3 L·min, agitation speed is 1800 tr·min, T=20° C.

This section pertains to the "soil washing" process developed using flotation for removal of PAH and lead. For this process, various parameters were assessed and tested: concentration of CAS, concentration of NaCl, density of the slurry, temperature, number of flotation sequences. Three soils were used in this part of the study, namely: SNW, Tr23 and Tr29. A large number of experiments were conducted in individual runs on SNW, in order to obtain a wide sweep of a maximum of operating conditions. Each of the experiments that led to the evaluation of a parameter as being significant in the efficiency of the process, was then pursued in triplicate on Tr23 and/or Tr29.

Selection of Preferred Operating Conditions

Particle Entertainment

Figure 15:
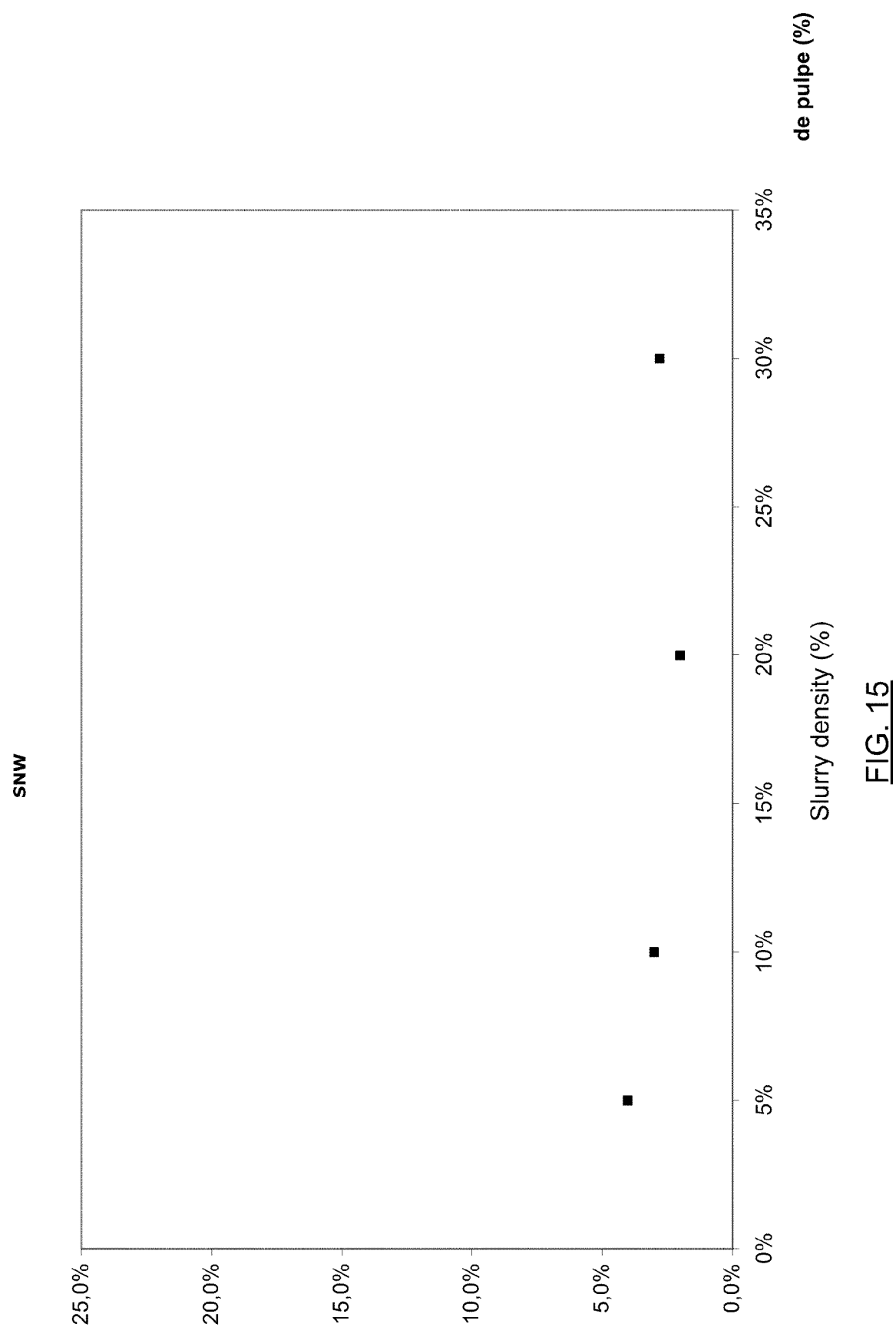
FIG. 15 presents graphs showing the variation in particle entrainment caused by flotation of SNW and Tr29 for different densities of slurry, concentrations of NaCl, and concentrations of CAS at pH 3.
Figure 15:
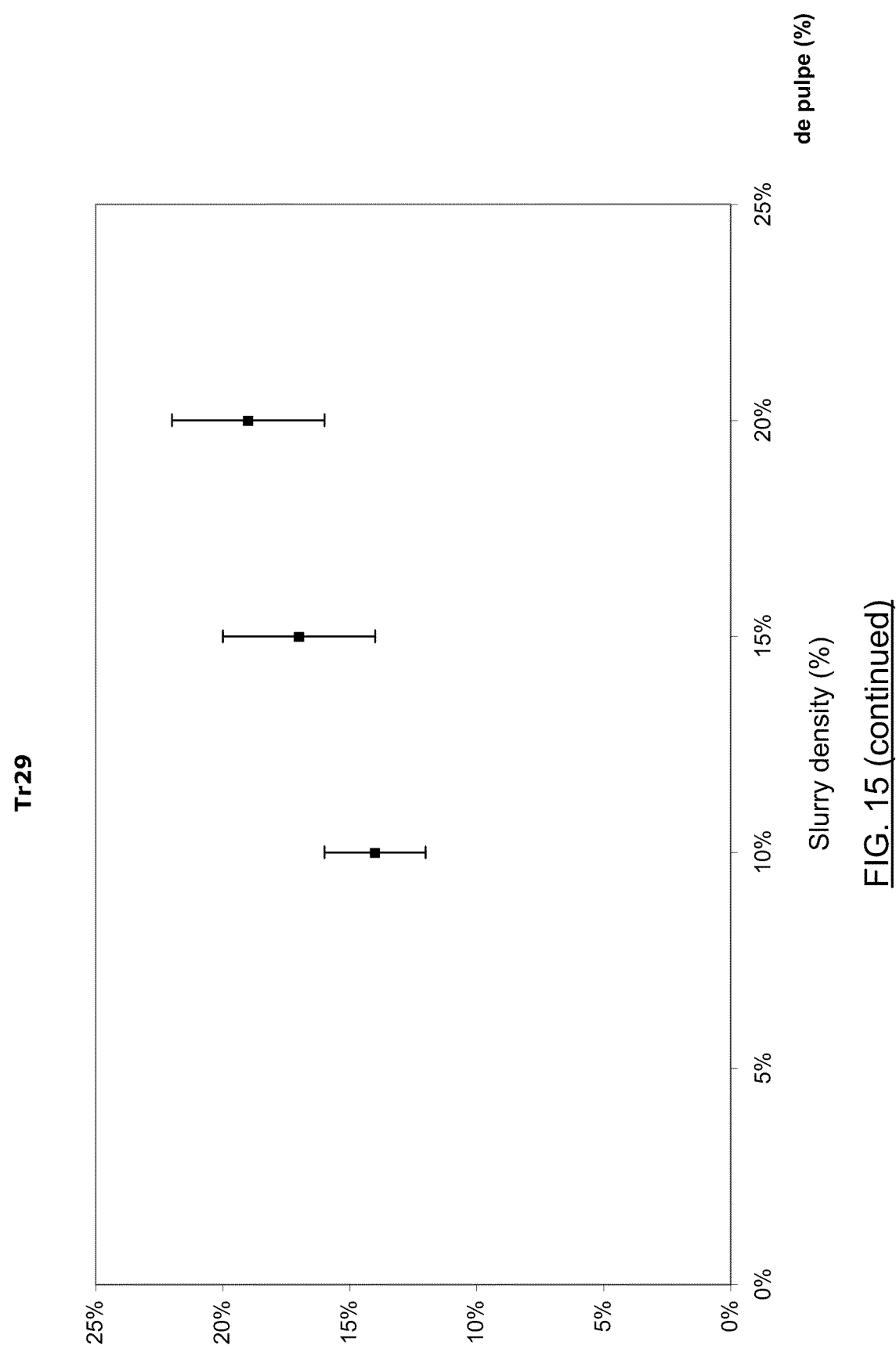
Figure 15:
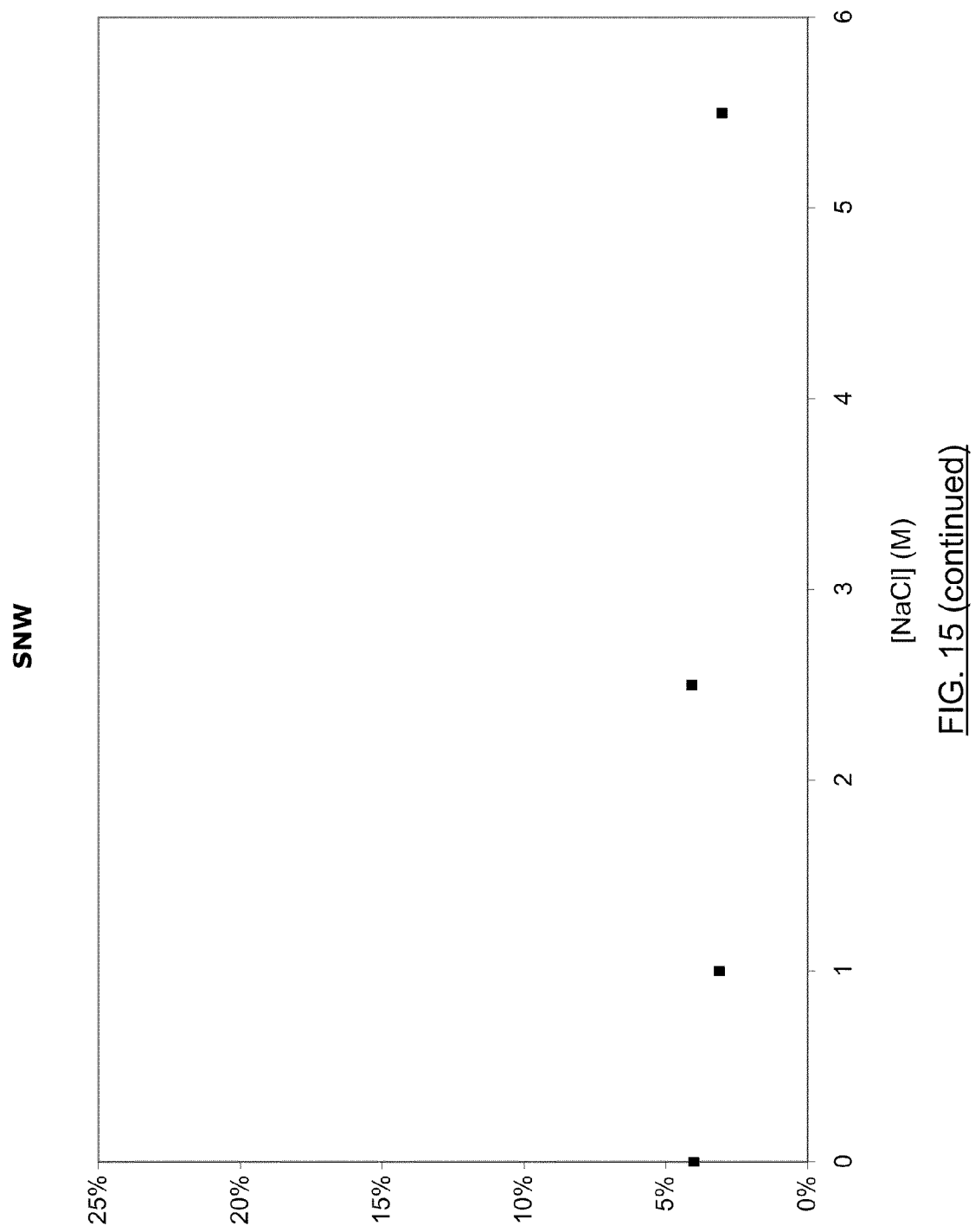
Figure 15:
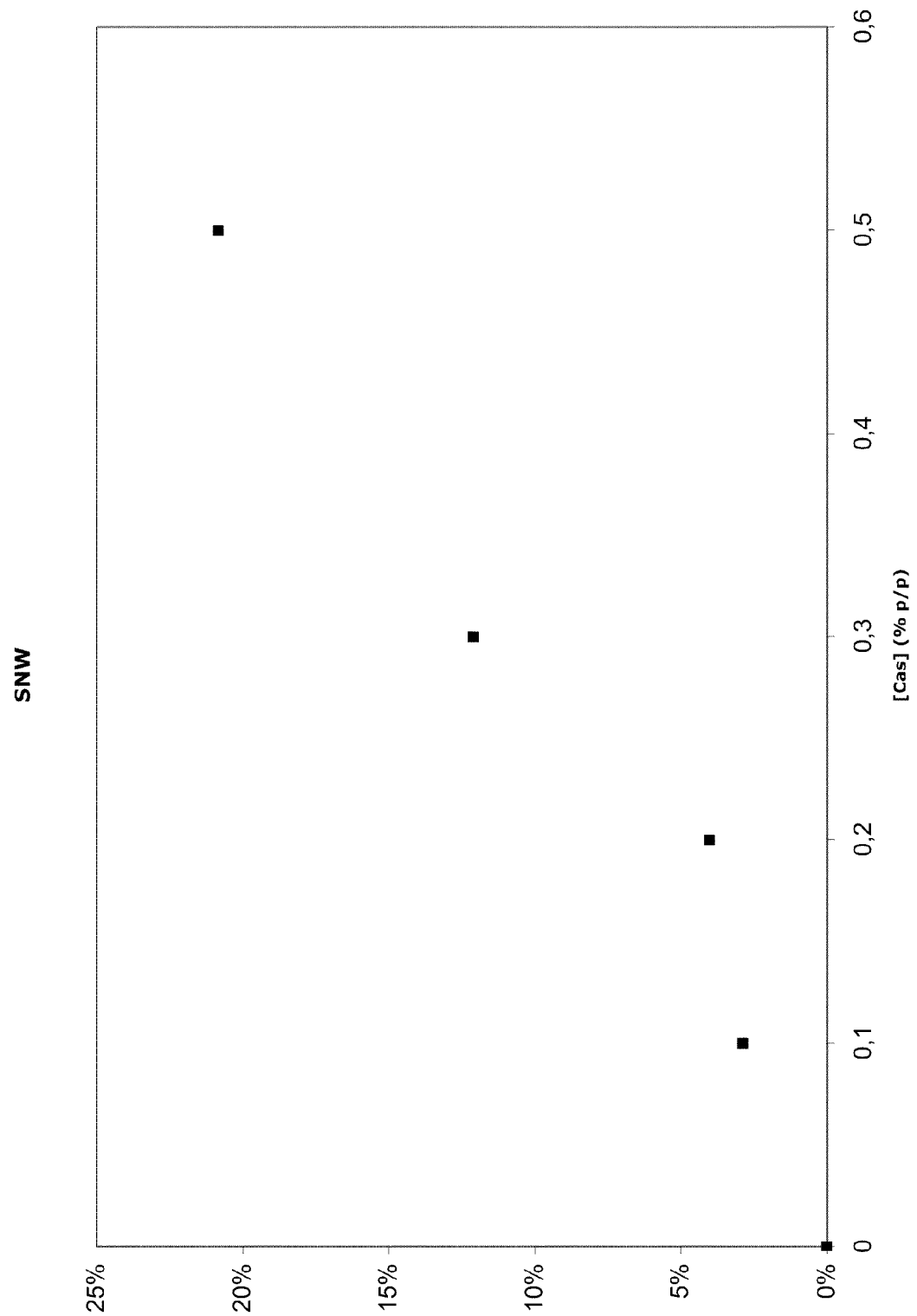

For the CstdO, the particle entrainment neighbors 3%+/−1% and, while it stays constant for SNW, it increases for Tr29 with increased density of the slurry, as presented in FIG. 15. Operating at 10% slurry and 0.2% w/w of CAS, the tests conducted on the influence of NaCl concentration, reveal that this parameter does not seem to affect the particle entrainment in the soil within the froths. The tests concerning the particle entrainment as a function CAS concentration are realized with 10% slurry with a salt concentration of 5.5 M. Thus, the density of the slurry and the concentration NaCl were shown to have no effect on the particle entrainment, while the increase in CAS concentration to 0.5% w/w, considerably increases (21%) this parameter.

Contamination Reduction

Figure 16:
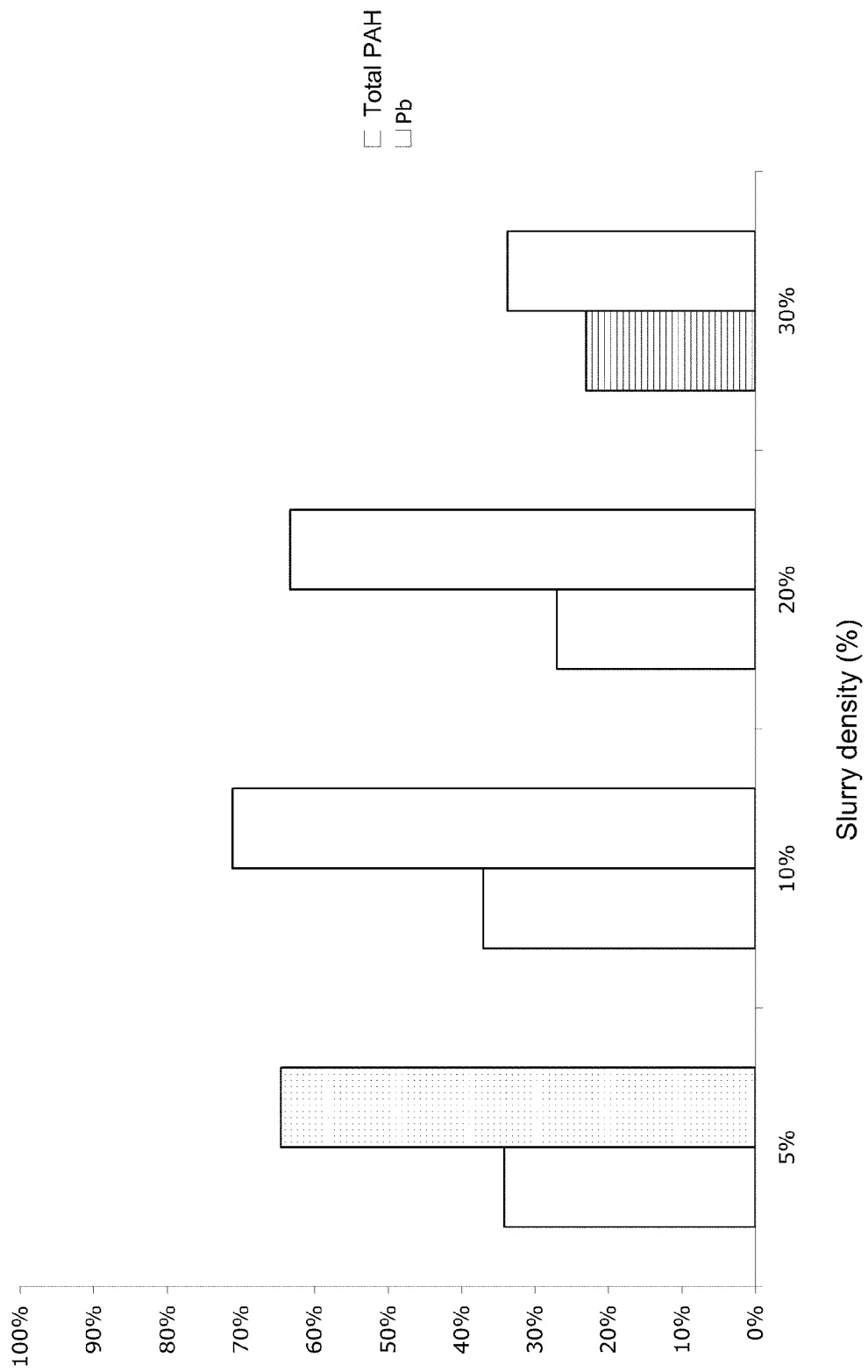
FIG. 16 presents graphs showing the removal percentage of total PAH and lead for SNW and Tr29 as a function of the slurry density (%).
Figure 16:
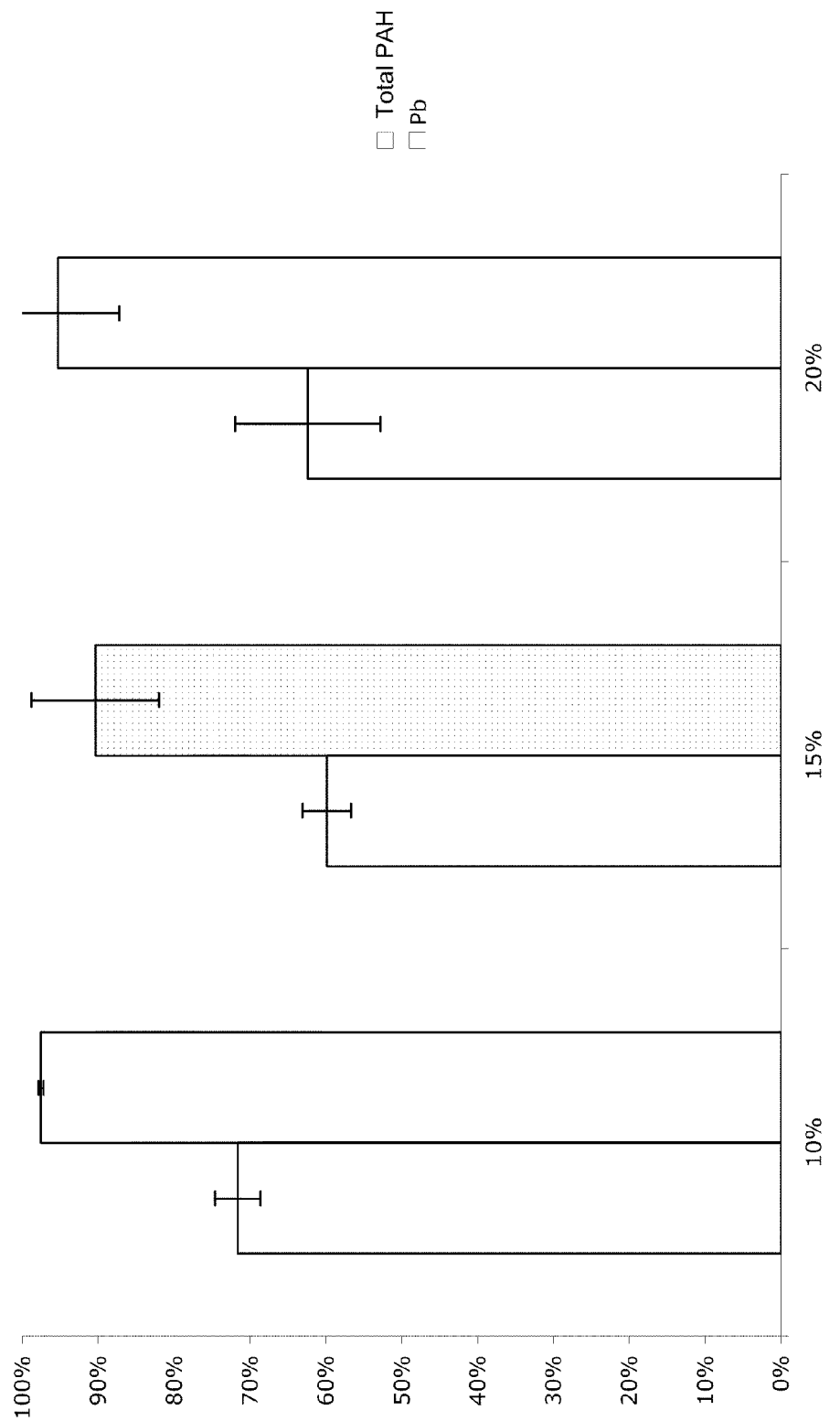

While the density of the slurry does not seem to have an effect on particle entrainment generated during flotation, no significant influence of this same parameter seems to occur in relation to contamination reduction, as much in relation to PAHs as to lead, as is shown in FIG. 16. The tests were conducted at CStdO, for slurry densities of 5, 10, 20 and 30% on SNW and 10, 15 and 20% for Tr29. Only the tests done at 30% slurry density on SNW, showed a certain reduction in the removal of lead (1.97 times less solubilized lead at 30% than at 10% slurry).

Figure 17:
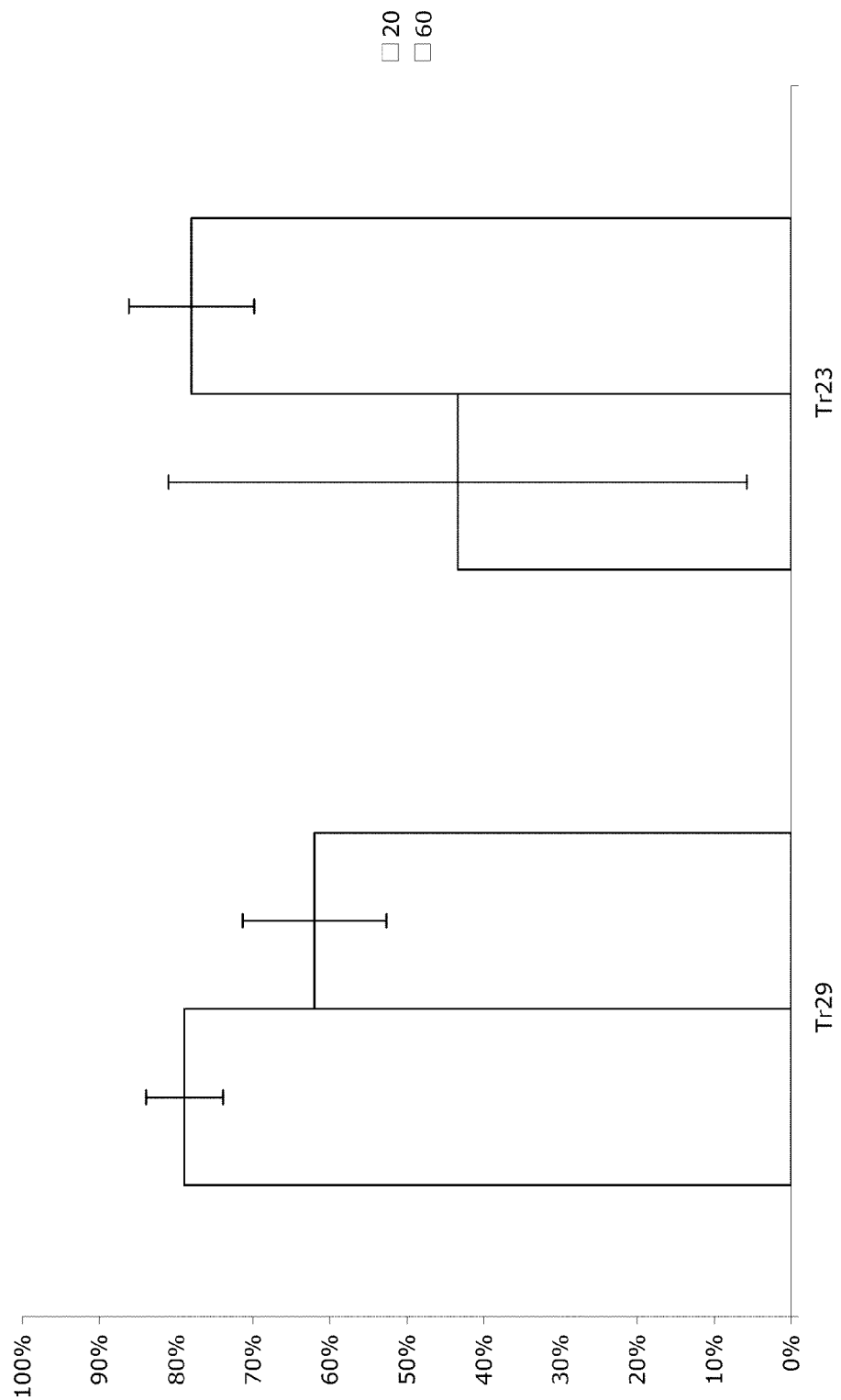
FIG. 17 presents graphs showing the removal percentage of total PAH and lead of Tr23 and Tr29 after flotations at 10% slurry realized at 20 and 60° C.
Figure 17:
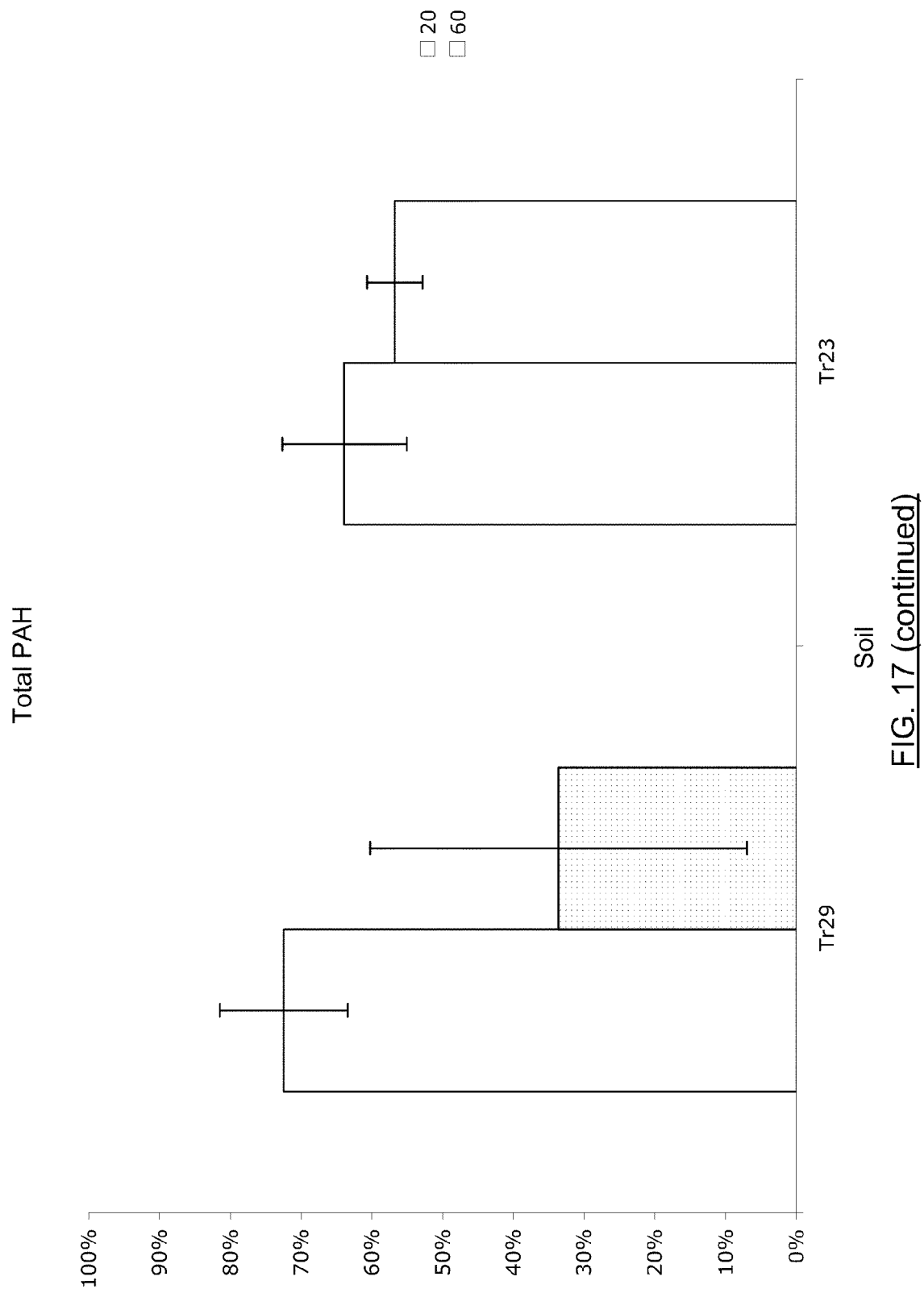

Temperature tests were also conducted at 20 and 60° C. at CStdO. As illustrated in FIG. 17, neither of the two tested temperatures showed to be more efficient than the other for removal of PAHs or Pb.

Figure 18:
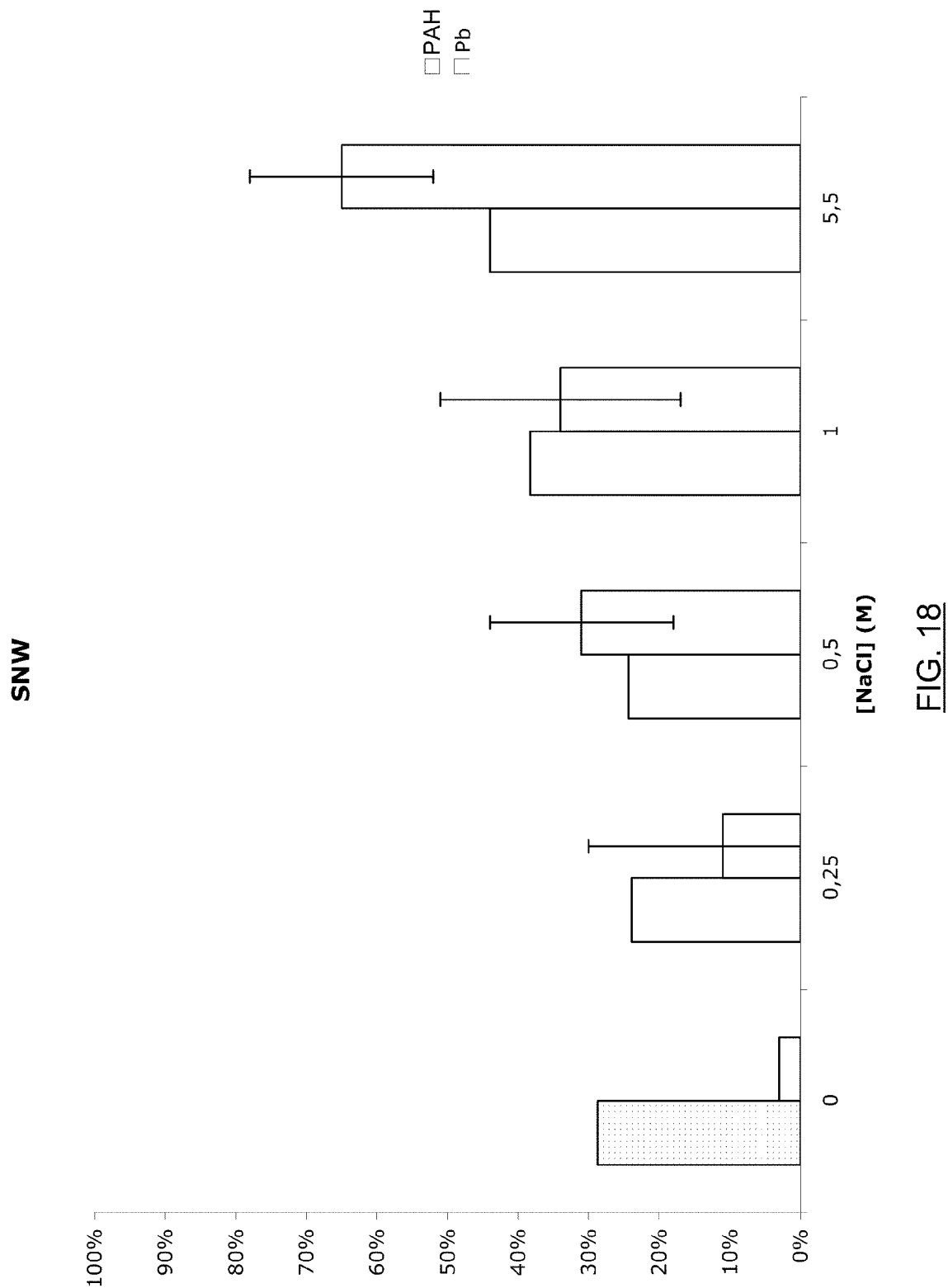
FIG. 18 presents graphs showing the removal percentage of total PAH and lead for SNW after flotations of 15 minutes realized at CStdO for different concentrations of NaCl.

The NaCl concentration was tested for a range of 0.25 to 5.5M at CStdO. It seems, as presented in FIG. 18, that the increase in concentration of salt until saturation ensures a better process efficiency in terms of PAH removal (29% and 44% respectively for [NaCl]=0 and 5.5M) and lead (3% and 65% respectively for the same salt concentrations).

Figure 19:
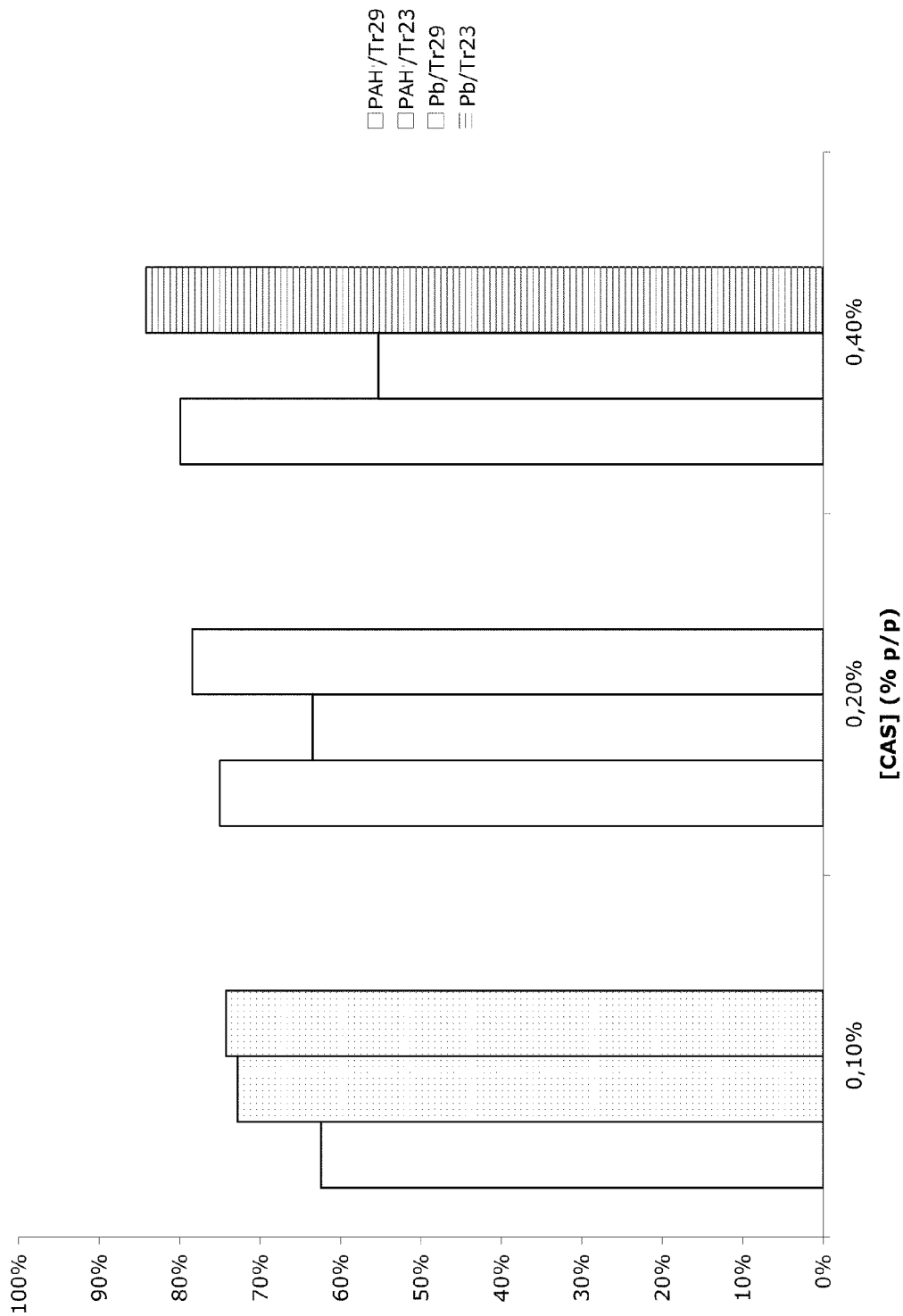
FIG. 19 presents graphs showing the removal percentage of total PAH and lead for Tr23 and Tr29 after flotations at 10% slurry realized at 20° C. for different concentrations of CAS.
Figure 20:
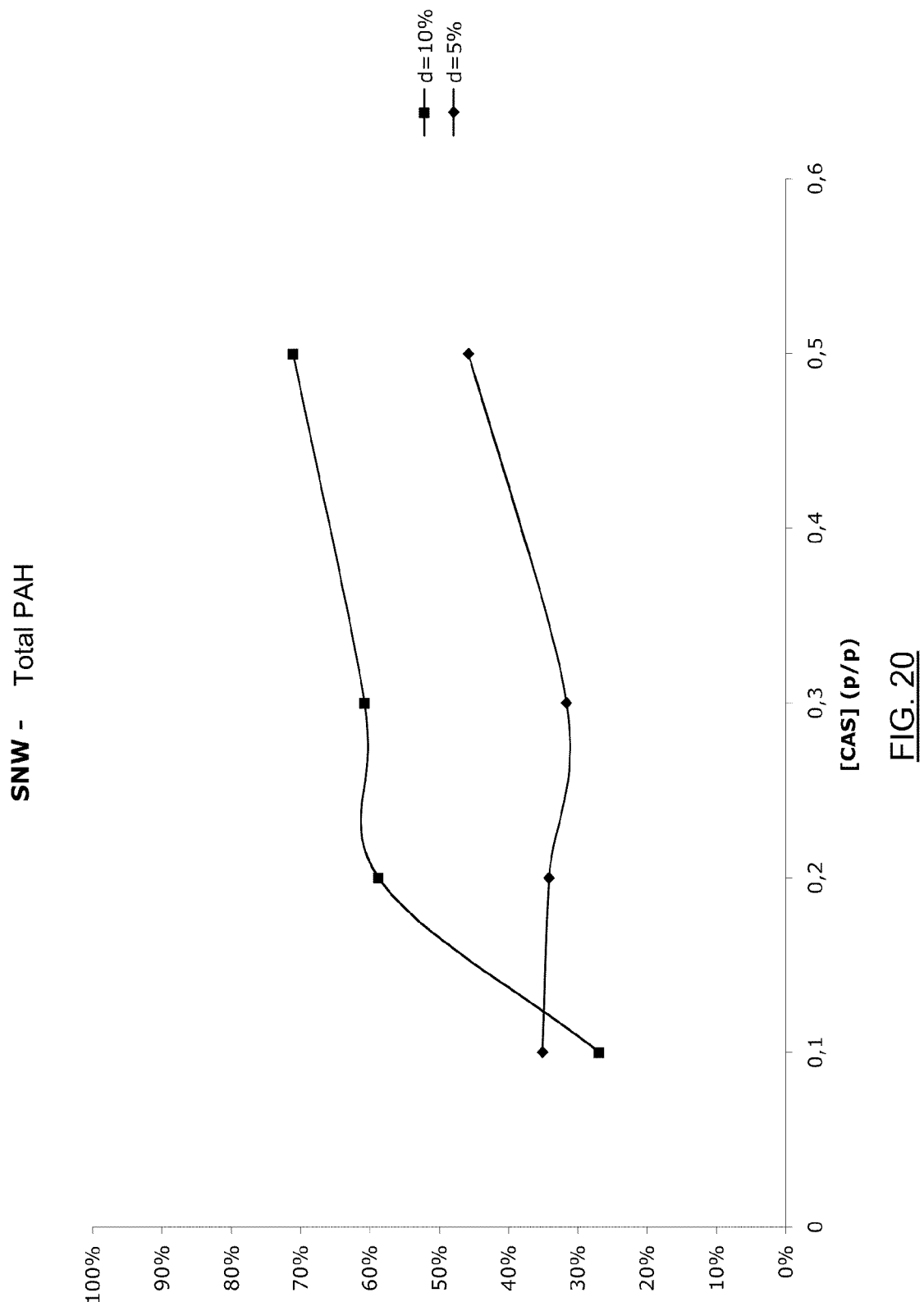
FIG. 20 presents graphs showing the removal percentage of total PAH and lead for SNW after flotations of 15 minutes realized at 20° C., at 5% at 10% slurry for different concentrations of CAS.
Figure 20:
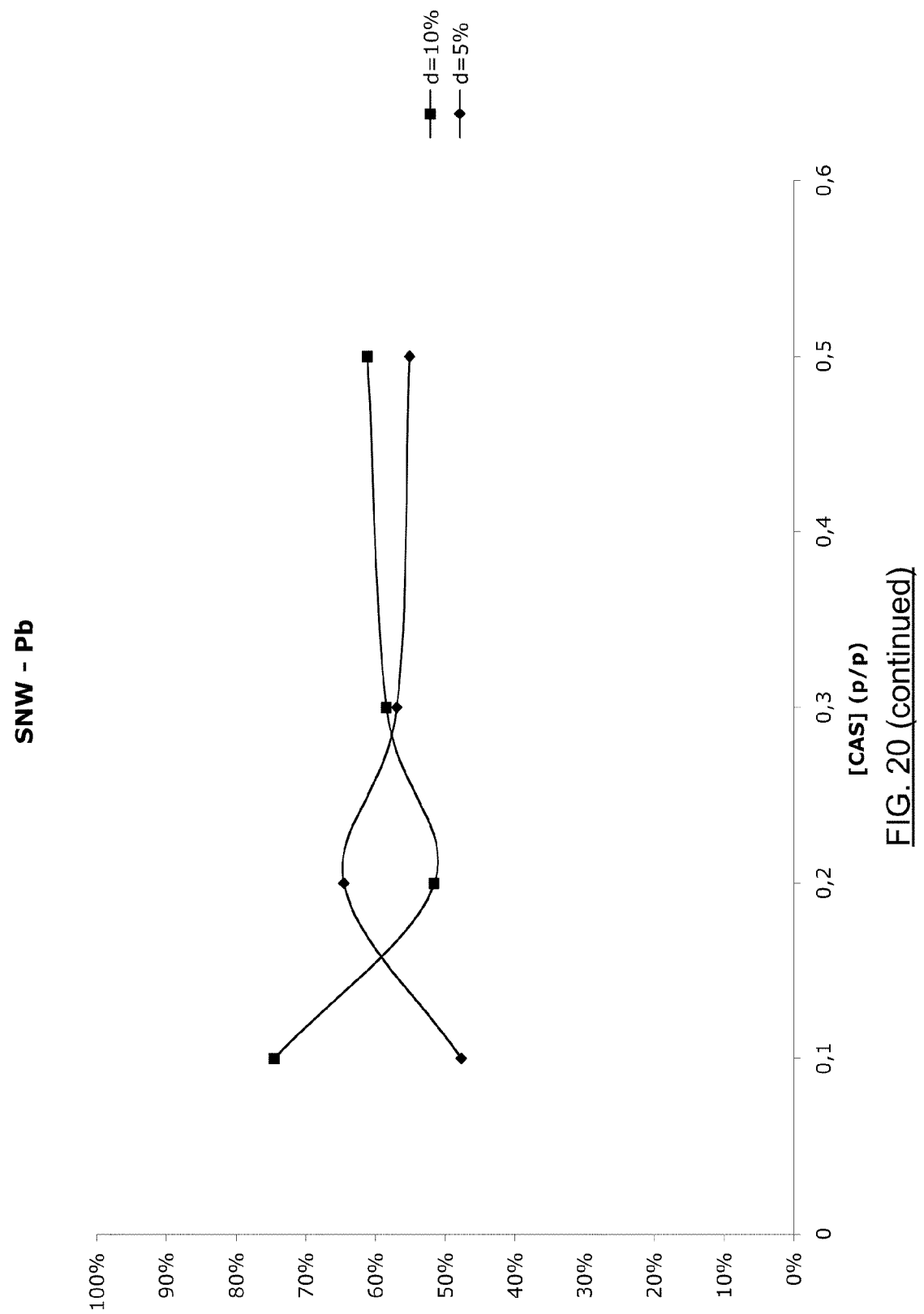
Figure 21:
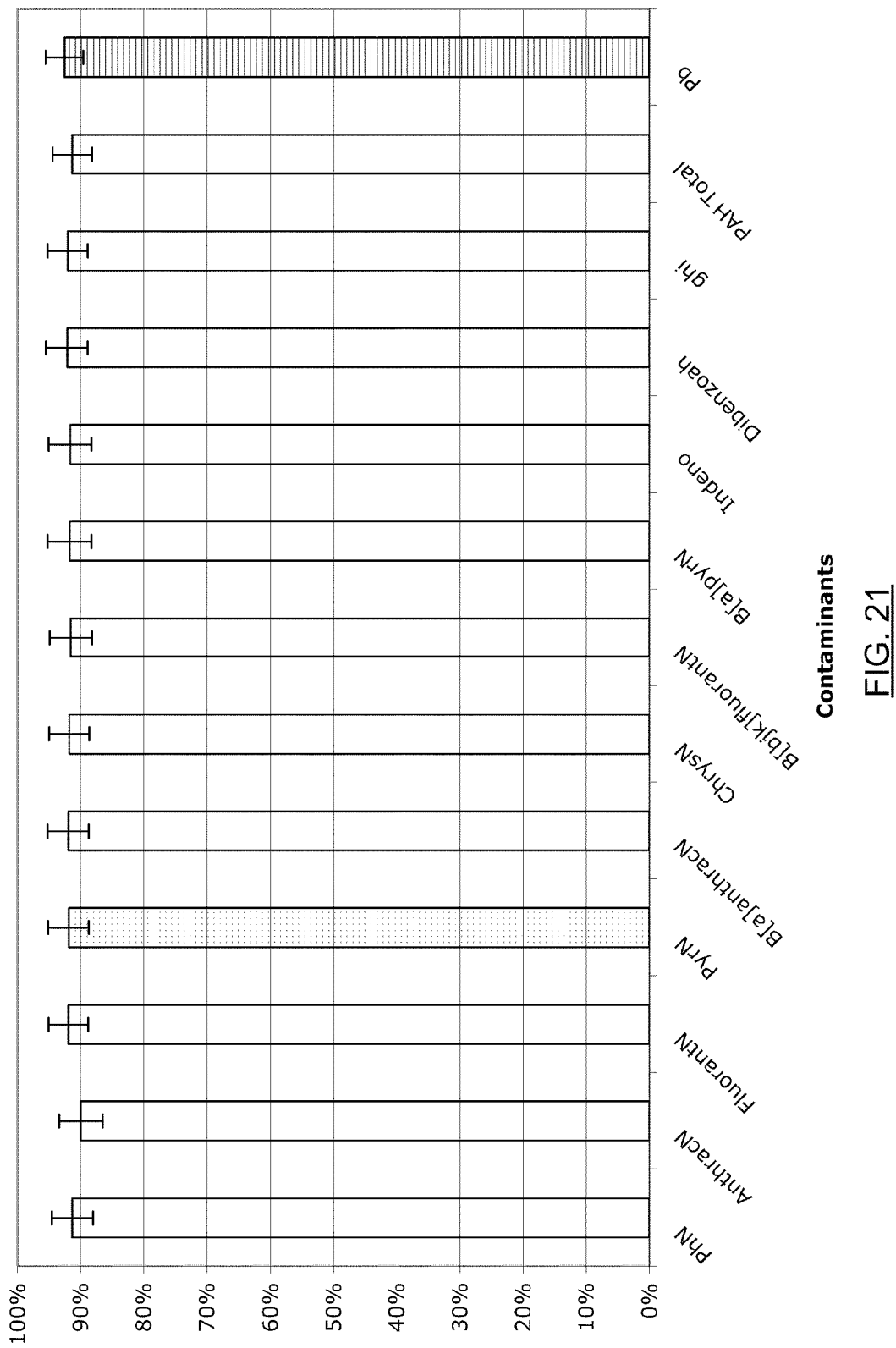
FIG. 21 presents graphs showing the removal percentage of total PAH and lead for Tr23 and Tr29 according to the number of successive flotations applied at CStdO.
Figure 21:
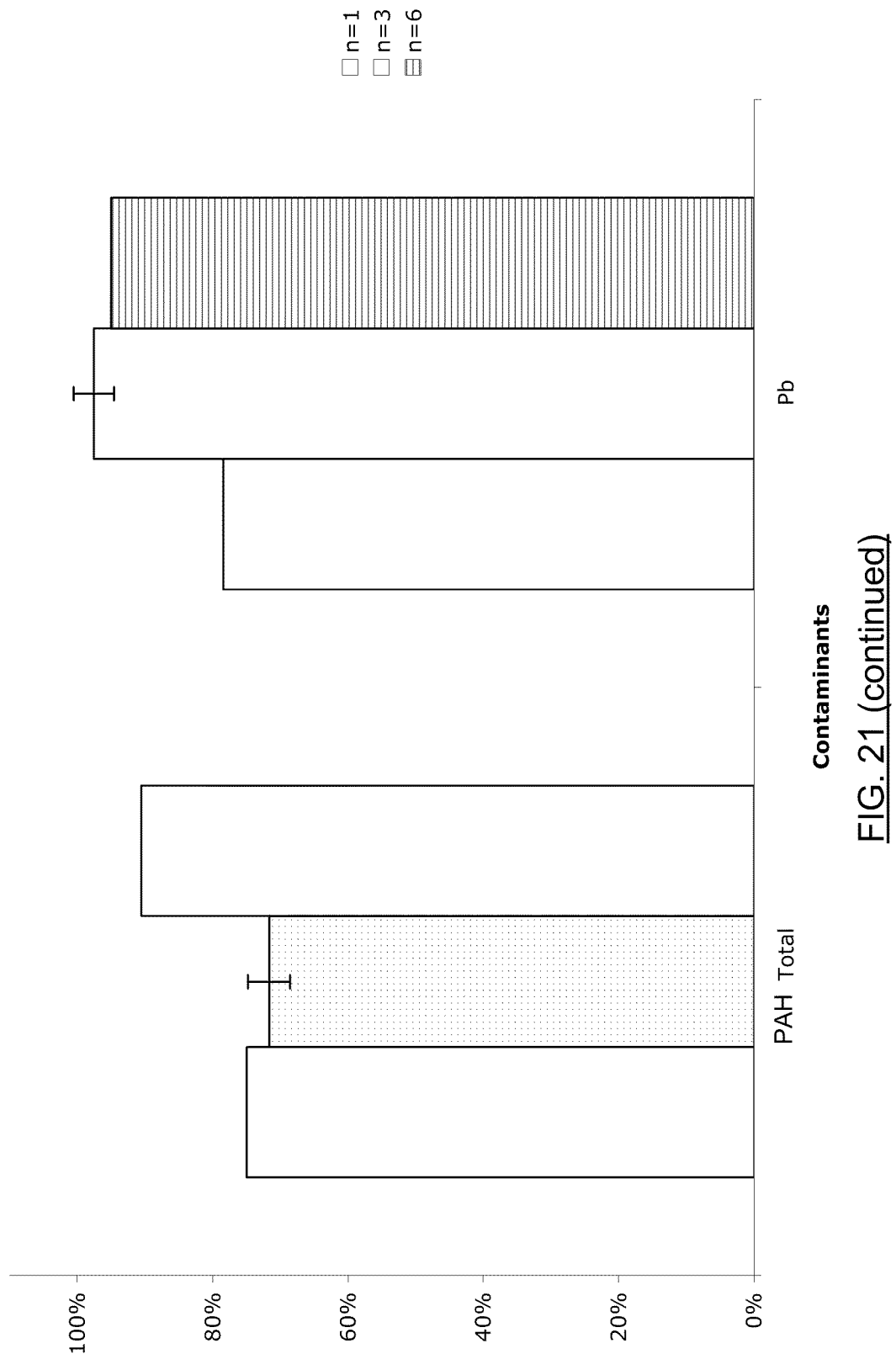
Figure 22:
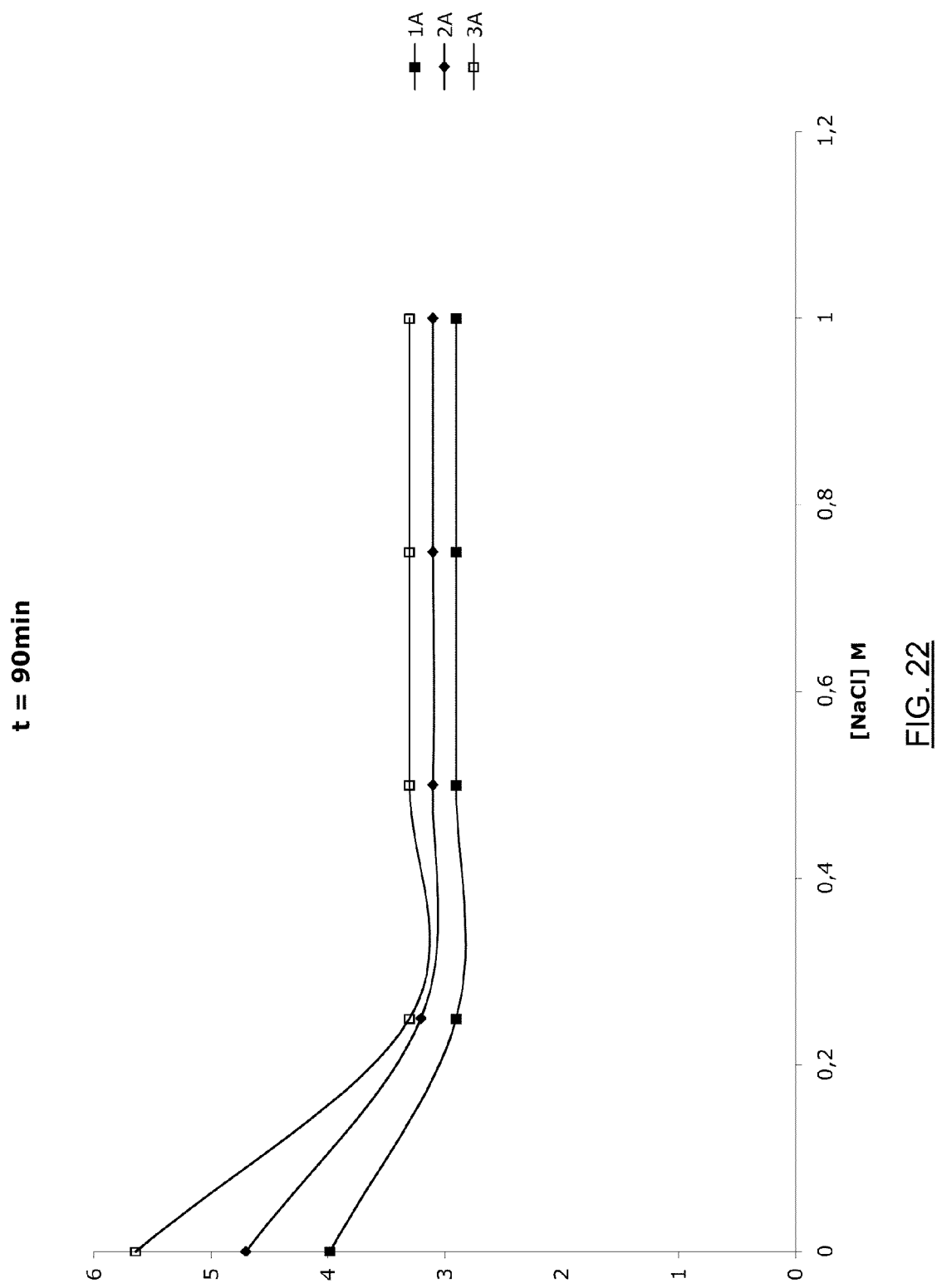
FIG. 22 is a graph showing the applied voltages according to the NaCl concentrations of the effluents of the flotation treatments, for different currents.

The CAS concentration was also studied at CStdO, over a range of 0.1 to 0.5% for SNW, and 0.1 to 0.4% for Tr29 and Tr23. The major observations from these tests are presented in FIGS. 18 and 19. While the removal rate of PAH increases with increasing CAS concentration in the case of Tr29 (respectively 62%, 75% and 80% pour [CAS]=0.1%-0.2%, 0.4%), it decreases in the case of Tr23 (respectively 73%, 63% and 55% at the same CAS concentration). This phenomenon may be explained by comparing the initial contamination limits of these two soils. Tr23 being considerably less contaminated than Tr29, it is possible that the excess CAS present in the slurry causes flotation of the soil particles. A same quantity of solubilized PAHs for a higher particular floated mass (verified in FIG. 15), causes a concentration effect in the reject, reducing therefore the calculated reductions. FIG. 20 presents the results that were obtained for the tests realized at CStdO on SNW for CAS=0.1%-0.2%-0.3%-0.5% w/w and d=5%-10%. The reductions for the tests at 10% slurry are higher than those realized at 5%, both for PAHs and Pb. As in the case of Tr29, the PAH reduction increases slightly with increasing concentration of CAS (respectively 27%, 59%, 61% and 71% for [CAS]=0.1%-0.2%-0.3%-0.5%). Thus, while the results in terms of reduction encourage using CAS at higher concentrations, the study on particle entrainment puts a hold on this notion. Indeed, in the case of matrices highly contaminated with PAH, the reduction is slightly improved by high concentrations of CAS, but this also results in a larger quantity of recovered material in the froths to be disposed. FIG. 15 puts [CAS]=0.2% w/w as the concentration at which particle entrainment increases rapidly. From this, and due to the slight improvement of removal of PAHs enabled by increasing the concentration of CAS above this value, the latter has been considered as the "optimal" value for PAH removal (it should be understood that the term "optimal" concerns the conditions and regulatory levels under study, but one may also envision different and/or improved values at other operating conditions). Thus, the final "optimization" of the process aims more to study the optimal number of flotations for removal of the contaminants below the regulatory limits. Thus, the application of three successive flotations on Tr23 enables increasing the removal rate from 63% to 91% for the PAHs and 63% to 93% for Pb. For the tests concerning Tr29, six successive flotations are performed to obtain such relative reductions in PAHs (90%), while only three are sufficient for reducing the lead by 98%. The results are presented in FIG. 21.

Discussion

In this section, various parameters were tested with a view to improving and "optimizing" the flotation process that was developed in terms of removal of organic contaminants such as PAH and inorganic contaminants such as lead. It should first be noted that the series of tests parameters ([CAS], [NaCl], number of successive flotations, temperature, slurry density) seem generally independent of the nature of the treated soil. In any case, the optimization of the process does not consider the contaminant reduction rate as an exclusive criterion. In effect, during flotation pollutants and particulate matter are concentrated in the froth (FM). This fraction is destined for disposal in waste disposal centers, which is why it may be easily understood that this factor should be as small as possible, due the costs associated with the management of these froths. The notion of optimizing the process, therefore, leads to the consideration of this particle entrainment factor, which was found to be highly dependent on CAS concentration, slurry density and the nature of the soil. Thus, the CAS concentration and the slurry density were estimated as optimal for [CAS]=0.2% w/w and d=10% w/w. The NaCl concentration does not seem to influence the particle entrainment, and ensures a better efficiency of PAH and lead removal when it is increased up to 5.5M. The temperature did not seem to affect the efficiency of the process. Finally, the number of successive flotations applied seems to be another improvement parameter. The observation of the entirety of the results leads to the supposition that the micellar solution is saturated at CStdO, which does not permit the solubilization of all contaminants present in the matrix. The application of successive flotations enables, by recreating the same conditions, to go solubilize contaminants that were not able to be solubilized during the first flotation sequence. The number of flotation sequences is thus dependant on in the initial concentration of contaminants in the treated matrix. The notion of this possible saturation is studied in the following paragraph, in order to comprehend and analyze the process in its solid and liquid fractions at the optimal conditions of flotation defined in this section CoptF, that is: d=10%, [CAS]=0.2% w/w, [NaCl]=5.5M, pH=3, $t_{Tlottation}$=15 min, $Q_{Tlottation}$=3 L·min, agitation speed 1800 tr·min, T=20° C.

Quality of Different Process Fractions in CoptF

This section reports the quality of each of the solid and liquid process fractions that are generated FS, FM, FLR, FMR, in order to better understand the distribution of contaminants and additives and therefore the behavior of the micellar medium of flotation under study. The results that are presented are from tests done on Tr23 and Tr29 at CoptF, with n=3.

Solid Fractions

Table 11 presents the measured concentrations of PAH, Pb and Na in Tr23 and Tr29 before and after treatment at CoptF as well as the regulatory limits in force in Quebec. It appears that while the three successive flotations ensure that these limits are respected for the final reject waste from the process for all of the PAHs and Pb, this level of decontamination is not attained for Tr29, for which none of the organic contaminants is reduced to ideal levels. This phenomenon may be explained by the fact that Tr29 contains a higher initial concentration of PAHs (3 960±333 mg/Kg of dry soil), in relation to Tr23 (1 330±2.3 mg/Kg of dry soil). Thus initially more concentrated, the treatment of Tr29 requires the addition of successive flotation steps up to n=6 to obtain these same levels. Standard deviations are shown concerning the concentrations of light PAHs in the reject waste (FS) of the tests conducted on Tr23, and this from the low quantities situated at the detection limits of the analytical method for the PAHs.

The comparison of the quality of the froths presented in Table 11, show that the flotation froth collected for Tr29 is about 2.7 times more concentrated in PAHs than that collected for the flotation on Tr23, while the concentrations in lead are of a same level for the froths coming from the same soils. The lower PAH concentration for the Tr23 froths can be explained using this same lower concentration of the initial matrix. Thus, the quality of the generated froth seems to be related to the nature of the soil introduced into the system. Table 12 illustrates the quantity of total floated PAHs in the first, second, and third froths and the reductions enabled by each flotation. A decrease in the quantity of solubilized PAHs is observed throughout the applied flotations to Tr23, particularly from the significant decrease in contamination of the matrix after the first flotation. This observation cannot be said to occur for the tests concerning soil Tr29, which after three successive flotations is still contaminated to the same degree as Tr23 before treatment.

TABLE 11

Quality in mg/Kg of dry material of the solid fractions FC. FS, FM, coming from flotation at COptF of Tr23 and Tr29 and criteria of soil quality in force in Quebec (LR) for the contaminants under study.

| | | Tr23 | | | | Tr29 | | | |
|---|---|---|---|---|---|---|---|---|---|
| | LR | FC | FS | FM | Particle entrainment % | FC | FS | FM | Particle entrainment % |
| NPN | 50 | 11.3 ± 0.6 | 3.74 ± 3.59 | 35.9 ± 6.3 | 20 +/− 1% | 37.7 ± 3.8 | 15.2 ± 1.9 | 96.6 ± 31.5 | 14 +/− 2% |
| ACN | 100 | 20.9 ± 0.8 | 4.78 ± 4.48 | 89.0 ± 24.3 | | 46.9 ± 3.9 | 16.6 ± 2.2 | 210 ± 65 | |
| FLU | 100 | 19.4 ± 1.4 | 5.19 ± 4.79 | 86.1 ± 20.5 | | 86.9 ± 8.2 | 32.0 ± 5.1 | 378 ± 151 | |
| PHE | 50 | 200 ± 5 | 23.4 ± 7.0 | 878 ± 23 | | 711 ± 64 | 257 ± 36 | 2 768 ± 816 | |
| ANT | 100 | 30.5 ± 0.4 | 4.15 ± 1.15 | 162 ± 10 | | 158 ± 18 | 57.7 ± 8.0 | 672 ± 194 | |
| FLR | 100 | 259 ± 3 | 28.2 ± 8.8 | 1 220 ± 16 | | 725 ± 57 | 233 ± 33 | 3 017 ± 463 | |
| PYR | 100 | 191 ± 3 | 20.9 ± 6.8 | 926 ± 10 | | 538 ± 44 | 167 ± 23 | 2 403 ± 457 | |
| BAN | 10 | 99.8 ± 1.3 | 10.9 ± 3.6 | 543 ± 11 | | 297 ± 25 | 90.1 ± 14.1 | 1 448 ± 235 | |
| CRY | 10 | 101 ± 6 | 11.2 ± 3.5 | 538 ± 8 | | 283 ± 23 | 86.2 ± 12.9 | 1 384 ± 275 | |
| BJK | 30 | 160 ± 1 | 18.2 ± 5.8 | 930 ± 20 | | 424 ± 35 | 125 ± 19 | 2 246 ± 411 | |
| BAP | 10 | 91.6 ± 1.8 | 10.2 ± 3.5 | — | | 258 ± 20 | 75.8 ± 11.5 | — | |
| IND | 10 | 76.1 ± 1.8 | 8.55 ± 2.80 | 512 ± 8 | | 194 ± 15 | 58.1 ± 9.4 | 1 121 ± 118 | |
| DBA | 10 | 15.6 ± 0.7 | 1.65 ± 30.56 | — | | 46.4 ± 4.0 | 12.6 ± 2.3 | — | |
| PER | 10 | 57.3 ± 0.8 | 6.16 ± 2.00 | 347 ± 17 | | 157 ± 13 | 45.5 ± 7.4 | 876 ± 179 | |
| PAH | — | 1330 ± 2.3 | 157 ± 46 | 6 260 ± 173 | | 3960 ± 333 | 1 270 ± 185 | 16 600 ± 3400 | |
| Pb | 1000 | 1610 ± 60 | 162.84 ± 57 | 937 | | 542 ± 131 | 42.6 ± 8.3 | 844.3 | |

TABLE 12

Quantity of total PAHs and entrained particulate material in the froth after each flotation sequence at CoptF.

| Soil | N° sequence | [PAH] mg/Kg | Particle entrainment % | PAH mg | R % |
|---|---|---|---|---|---|
| Tr23 | 1 | 18709 | 5% | 89.8 | 73% |
| | 2 | 3198 | 9% | 25.7 | 21% |
| | 3 | 1211 | 7% | 7.8 | 6% |
| | Total | 6385 | 21% | 123.4 | 101% |
| Tr29 | 1 | 14845 | 7% | 95.0 | 25% |
| | 2 | 27248 | 5% | 140.1 | 36% |
| | 3 | 13217 | 4% | 49.2 | 13% |
| | Total | 18626 | 16% | 284.2 | 74% |

Liquid Fractions

The study of lead distribution between the washing waters (FL) and rinsing waters (FR) of the reject waste, presented in Table 13, indicates that a good portion of solubilized lead is concentrated in these washing waters. The residual concentrations that are measured in the rinsing waters neighbor the detection limit of the analytical method, that is, 2 mg/L for the waters coming from the rinsing of Tr23 and 0.5 mg/L for those coming from Tr29. While the reduction level of lead differs between Tr23 and Tr29, due to the fact that they have different initial contamination levels, it is noted that the quantities of solubilized lead in the washing waters are similar. The same remark can be made concerning the concentrations in NaCl, which is distributed in the washing and rinsing waters in the same proportions for the tests on Tr23 and Tr29.

The rinsing waters for the froth (FMR) along with the FLR coming from Tr23 present higher concentrations of Pb compared to those coming from Tr29, on account of the higher initial concentration in Tr23. The quantities of solubilized Pb in the FMR neighbor those of the corresponding FL (or FLR), and this, for each soil. This observation seems to confirm that the lead is perfectly solubilized in the form of chloro-complexes in the rinsing waters. After observing the volumes, the lead entrained in the froth is none other than the lead present in the interstitial water of the froth, while at no time the operating conditions cause flotation of the chloro-complexes (or of the lead under one form or another).

balance shows a recovery yield of 92% for Tr23 and 103% for Tr29. The mass losses are in part relative losses from process handling, but this phenomenon occurs also due to the potential solubilization of soil particles at the operating conditions. This factor is thus found to be dependent on the matrix to be treated and the applied treatment conditions.

The total PAHs are recovered at 101% for Tr23 and 89% for Tr29 on the solid fraction. The contents in FM (6263 for Tr23 and 16 660 for Tr29) compared to the contents presented in Table 12 concerning the flotation sequences on Tr23 (18 709, 3198 and 1211 mg/Kg respectively for the first, second, and third flotation sequences), confirms the notion of the saturation of the micellar solution in its PAH solubilization capacity, which may be situated around 20 000 mg/Kg depending on the initial soil.

The recovery of lead is not conclusively random, 70% for Tr23 and 130% for Tr29. The concentrations are higher for Tr23 than for T29 for each of the fractions, on account of the higher initial concentration. Thus, the similar levels of Pb distribution in FL and FMR, confirms the notion of perfect homogeneity of the medium in the process of solubilizing the contaminants between the different fractions.

TABLE 13

Quality of washing waters (FL) and rinsing waters (FR) of the soil and the rinsing waters of the froth after treatment by flotation at CoptF on Tr23 and Tr29.

|  | Tr23 | | | Tr29 | | |
| --- | --- | --- | --- | --- | --- | --- |
|  | FL | FR | FMR | FL | FR | FMR |
| Pb (mg/L) | 34 ± 3 | 2 ± 1 | 15.6 ± 2.3 | 23 ± 4 | 0.23 ± 0.16 | 9.00 ± 1.17 |
| Volume (ml) | 943 ± 140 | 500 ± 20 | 2750 ± 241 | 1280 ± 156 | 1053 ± 23 | 2520 ± 61 |
| Pb (mg) | 32 ± 4 | 0.98 ± 0.41 | 42.5 ± 2.3 | 29 ± 1 | 0.25 ± 0.17 | 22.7 ± 3.3 |
| Pb % | 22 ± 3% | 1 ± 0.3% | 29 ± 2% | 56 ± 1% | 0.5 ± 0.3% | 43 ± 6% |
| Na (g/L) | 84.8 ± 19.8 | 17.0 ± 5.6 | 36 ± 2 | 81.9 ± 7.3 | 9400 ± 6490 | 27 ± 2 |
| Volume (ml) | 943 ± 140 | 500 ± 20 | 2670 ± 276 | 1280 ± 156 | 1053 ± 23 | 2500 ± 64 |
| Na (g) | 81 ± 25 | 9 ± 3 | 95 ± 4 | 104 ± 5 | 10 ± 7 | 68 ± 6 |
| NaCl (g) | 204 ± 63 | 22 ± 8 | 239 ± 11 | 262 ± 12 | 25 ± 18 | 171 ± 16 |
| NaCl (%) | 37 ± 11% | 4 ± 1 | 43% ± 2 | 48 ± 2% | 5 ± 3 | 31 ± 3% |

Mass Balance

As was suggested during the preliminary flotation tests, Table 14 confirms the notion that while the PAHs are distributed in the solid fractions of the process, the inorganic material is distributed in the solid and liquid fractions. The mass

TABLE 14

Mass balance of various fractions of the process for Tr23 and Tr29.

|  |  | Tr23 | | | Tr29 | | |
| --- | --- | --- | --- | --- | --- | --- | --- |
|  |  | Dry mass (g) | Concentration (mg/Kg or mg/L) | Distribution (%) | Dry mass (g) | Concentration (mg/Kg or mg/L) | Proportion |
| PAH | FC | 92 | 1333 | 100% | 97 | 3960 | 100% |
|  | FS | 67 | 157 | 9% | 86 | 1 270 | 28% |
|  | FM | 18 | 6 263 | 92% | 14 | 16600 | 61% |
|  | Balance | 92% | — | 101% | 103% | — | 89% |
| Pb | FC | 92 | 1613 | 100% | 97 | 542 | 100% |
|  | FS | 67 | 163 | 7% | 86 | 42.6 | 7% |
|  | FM | 18 | 937 | 11% | 14 | 844 | 22% |
|  | FL | 943 | 34 | 22% | 1280 | 23 | 57% |
|  | FR | 500 | 2 | 1% | 1053 | 0 | 0% |
|  | FMR | 2747 | 15.6 | 29% | 2518 | 9.00 | 43% |
|  | Balance | 92% | — | 70% | 103% | 130% | 130% |
| Na | FC | 92 | 0 | 0% | 97 | 0 | 0% |
|  | FS | 67 | 10 402 | 0.3% | 86 | 6 402 | 0.3% |
|  | FM | 18 | 19 369 | 0.2% | 14 | 5 117 | 0% |
|  | FL | 943 | 84800 | 37% | 1280 | 81900 | 48% |
|  | FR | 500 |  |  | 1053 |  |  |

TABLE 14-continued

Mass balance of various fractions of the process for Tr23 and Tr29.

| | Tr23 | | | Tr29 | | |
|---|---|---|---|---|---|---|
| | Dry mass (g) | Concentration (mg/Kg or mg/L) | Distribution (%) | Dry mass (g) | Concentration (mg/Kg or mg/L) | Proportion |
| FMR | 2747 | 35600 | 45% | 2518 | 27200 | 32% |
| Balance | 92% | — | 82% | 103% | — | 80% |

Electrochemical Treatment of the Effluents Generated by Flotation

The cell that was used has a system of 10 electrodes (5 Ti/Pt electrodes, 5 iron electrodes) for a treatment volume of 1600 ml. The effluents introduced come from a combination of washing effluents (FL=1000 ml) and froth rinsing effluents (FMR=600 ml) eminating from the upstream process. Time, pH, current, metallic concentration are all parameters that were followed for each test. The determining factors that were considered were the level and rate of lead removal, as well as the applied voltage to the electrochemical cell. Various parameters were tested: treatment time, salt concentration, current, enabling determination of the "optimal" electrochemical conditions for a complete removal of the lead distributed in the flotation effluents.

In the absence of salt, the measured voltage at the ends of the cell vary between 3.9 and 5.6 for the respective currents of 1 and 3 A. In the presence of salt for all tested concentrations, an increase in applied current did not result in any increase in associated voltage. This consistency can be explained by the fact of the presence of $Na^+$ and $Cl^-$ ions, which ensure a better ionic conductivity and thus a better electronics of the medium.

Figure 23:
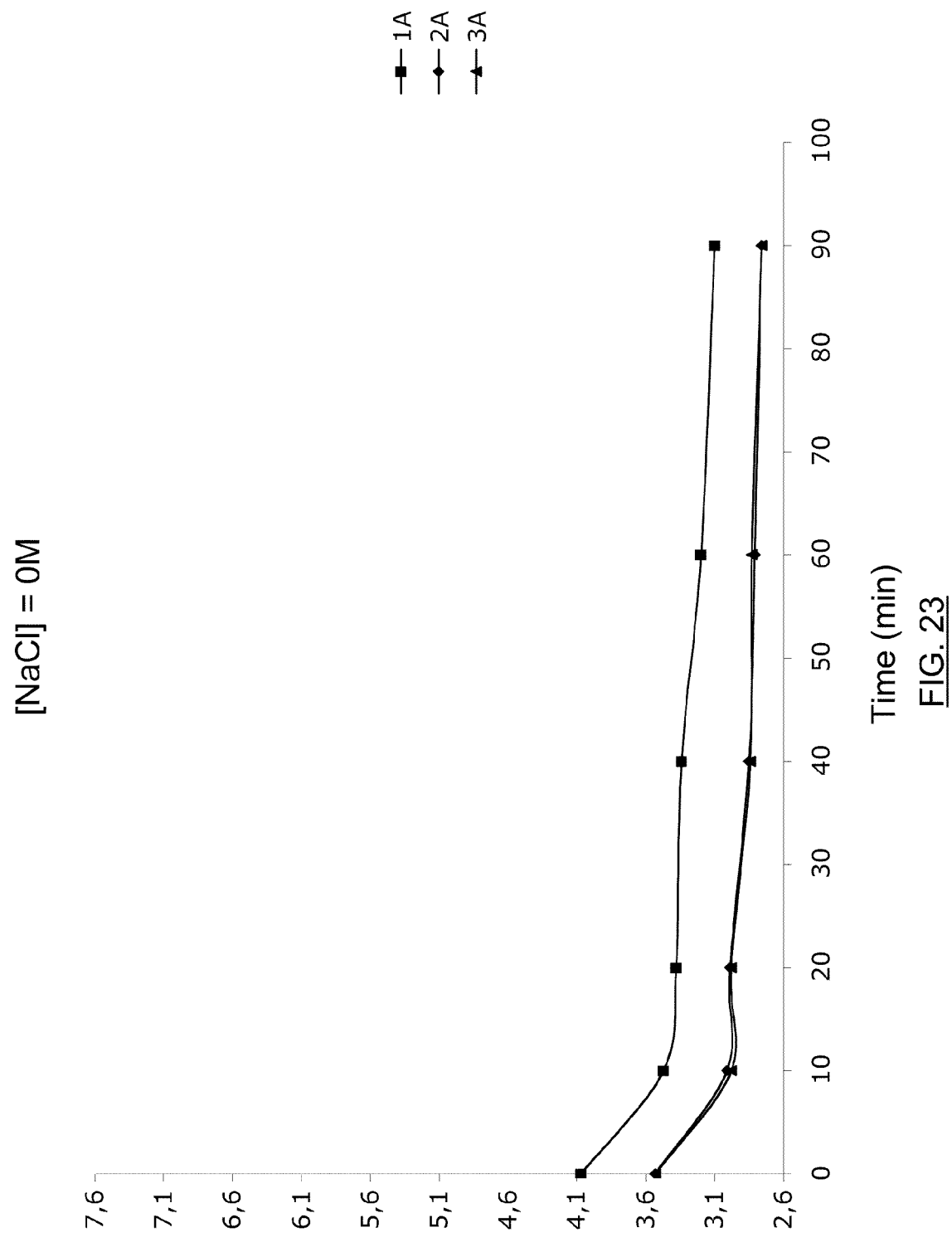
FIG. 23 presents graphs showing pH and applied voltages to the electro-chemical process according to concentration of NaCl applied to the flotation process.
Figure 23:
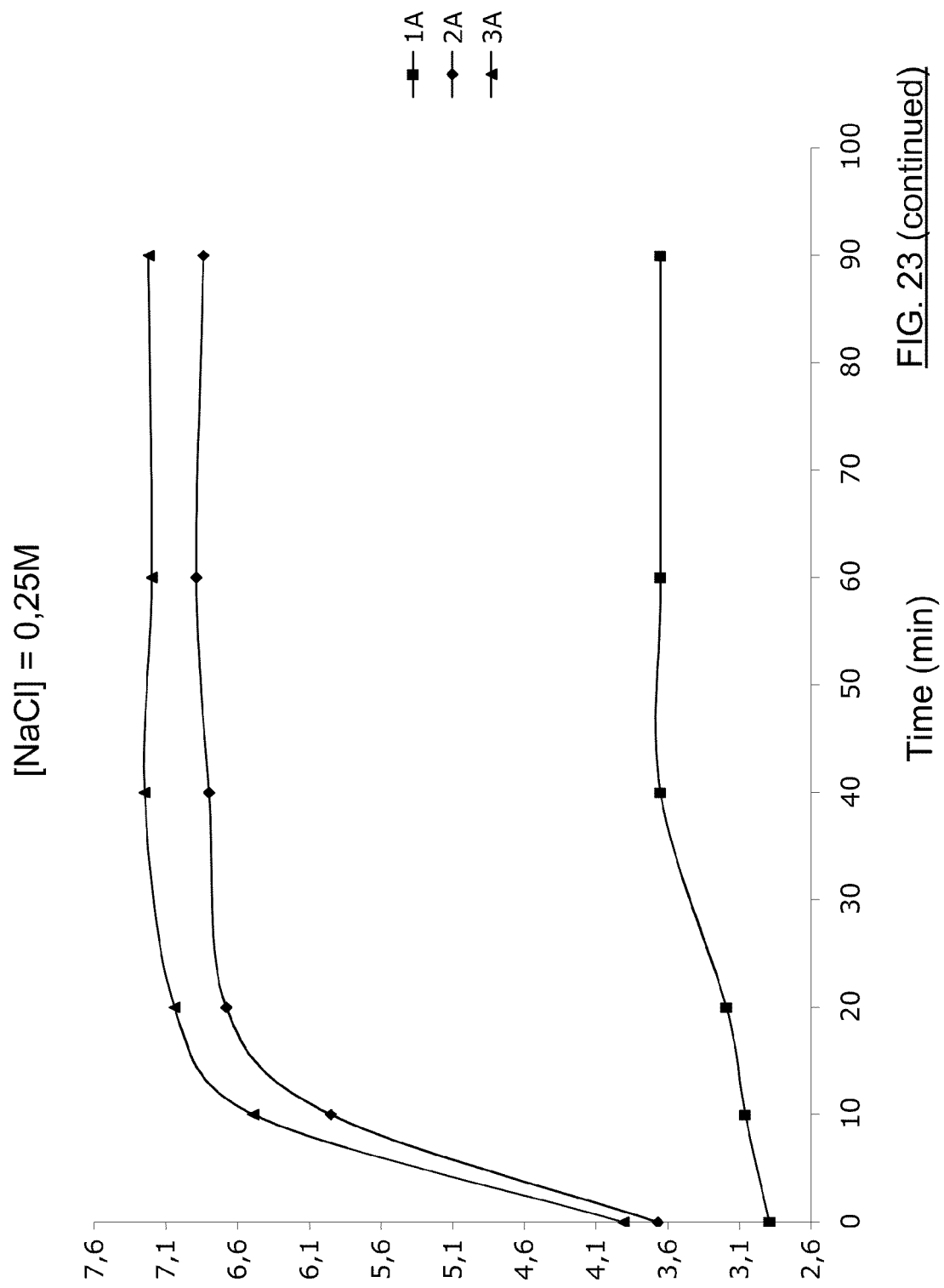
Figure 23:
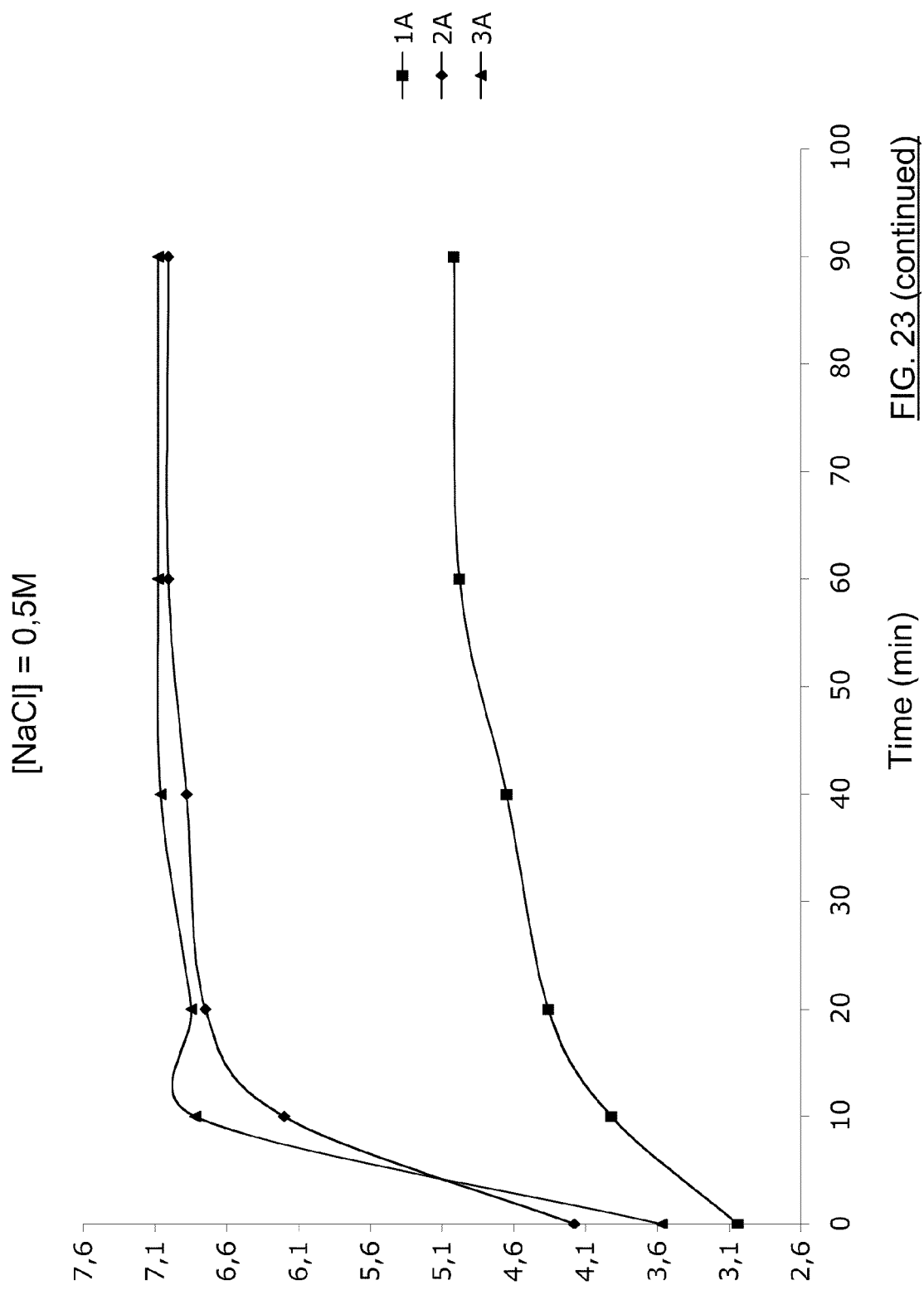
Figure 23:
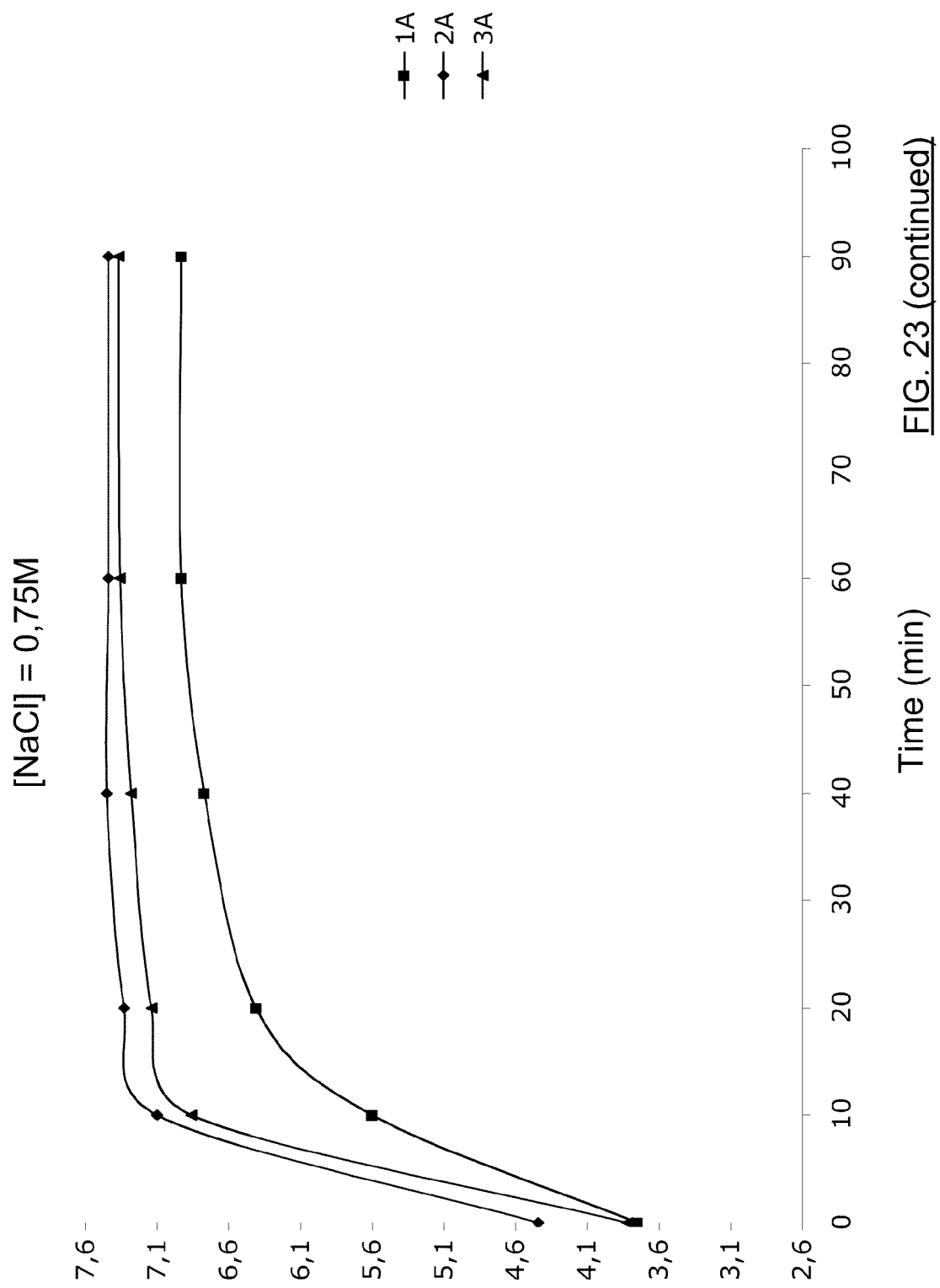
Figure 23:
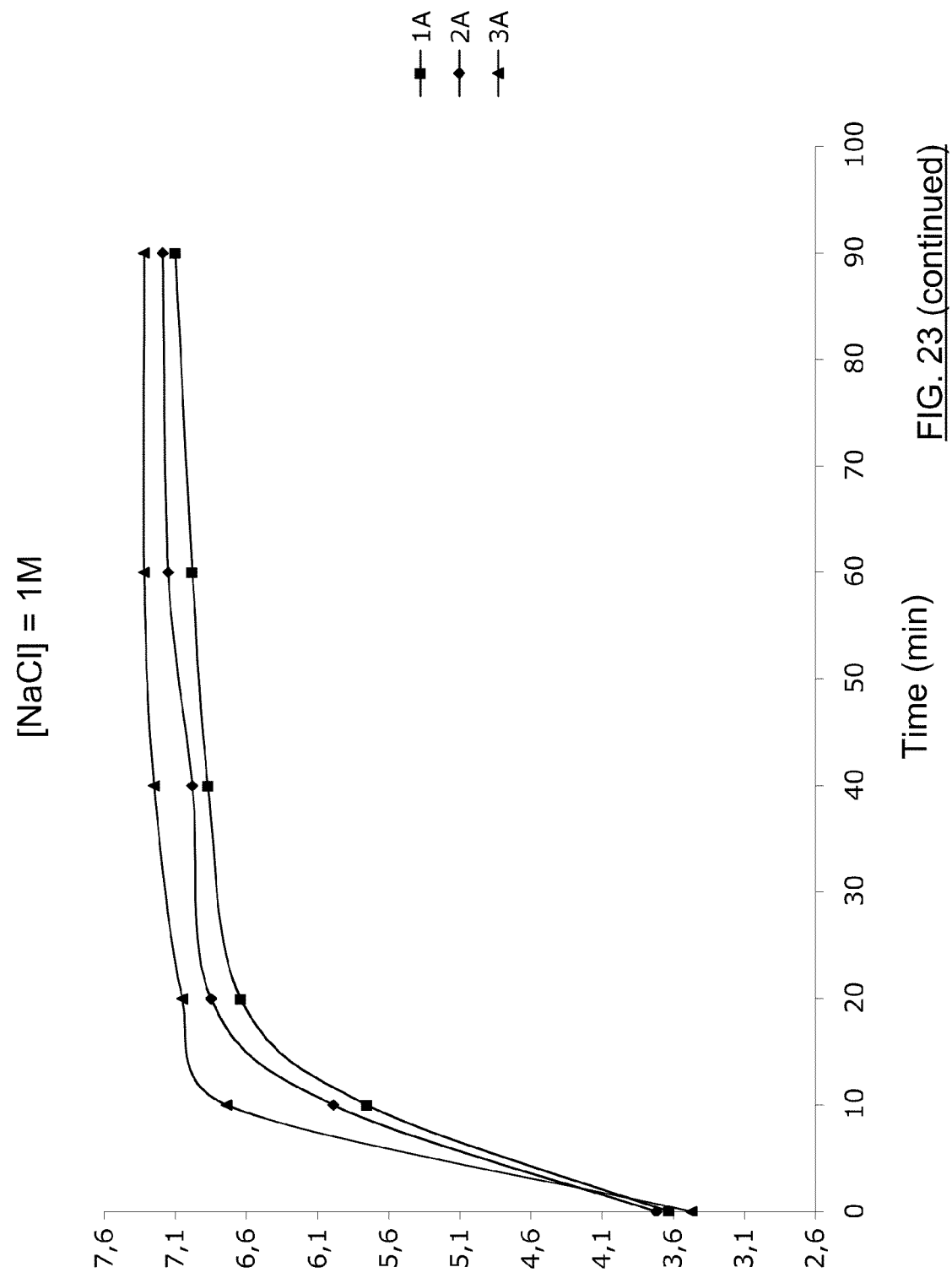
Figure 23:
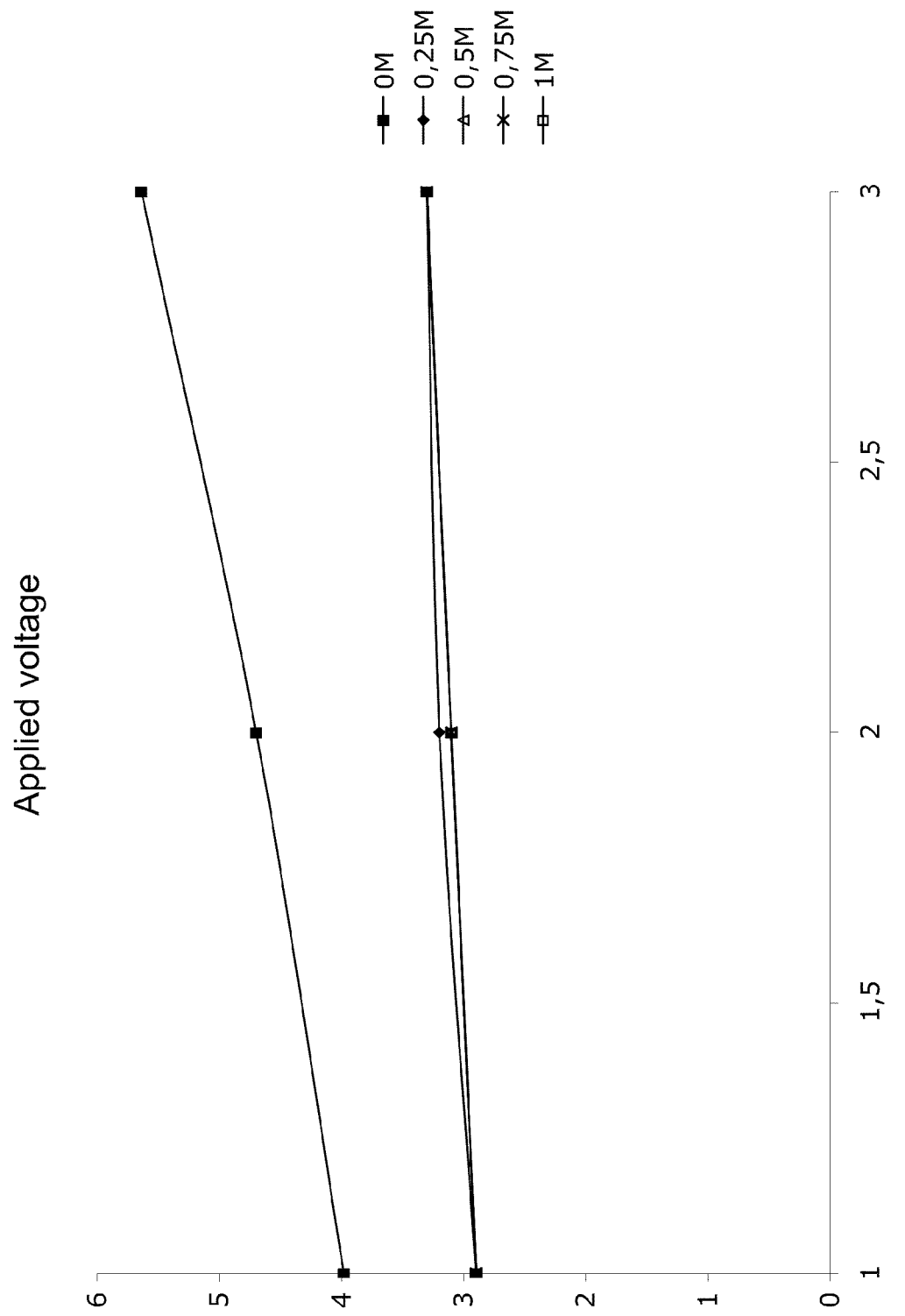

The increase in pH, observed in FIG. 23 for flotation effluents loaded with NaCl, results from the production of OH— ions during the reduction of oxygen at these conditions. No increase in pH was seen for the tests performed on the unsalted flotation effluents, going from 3 to 2.7 between t=0 min and t=90 min of the electrochemical treatment, which indicates that no secondary reduction-type reactions of water and/or oxygen are occurring at the applied currents.

Figure 24:
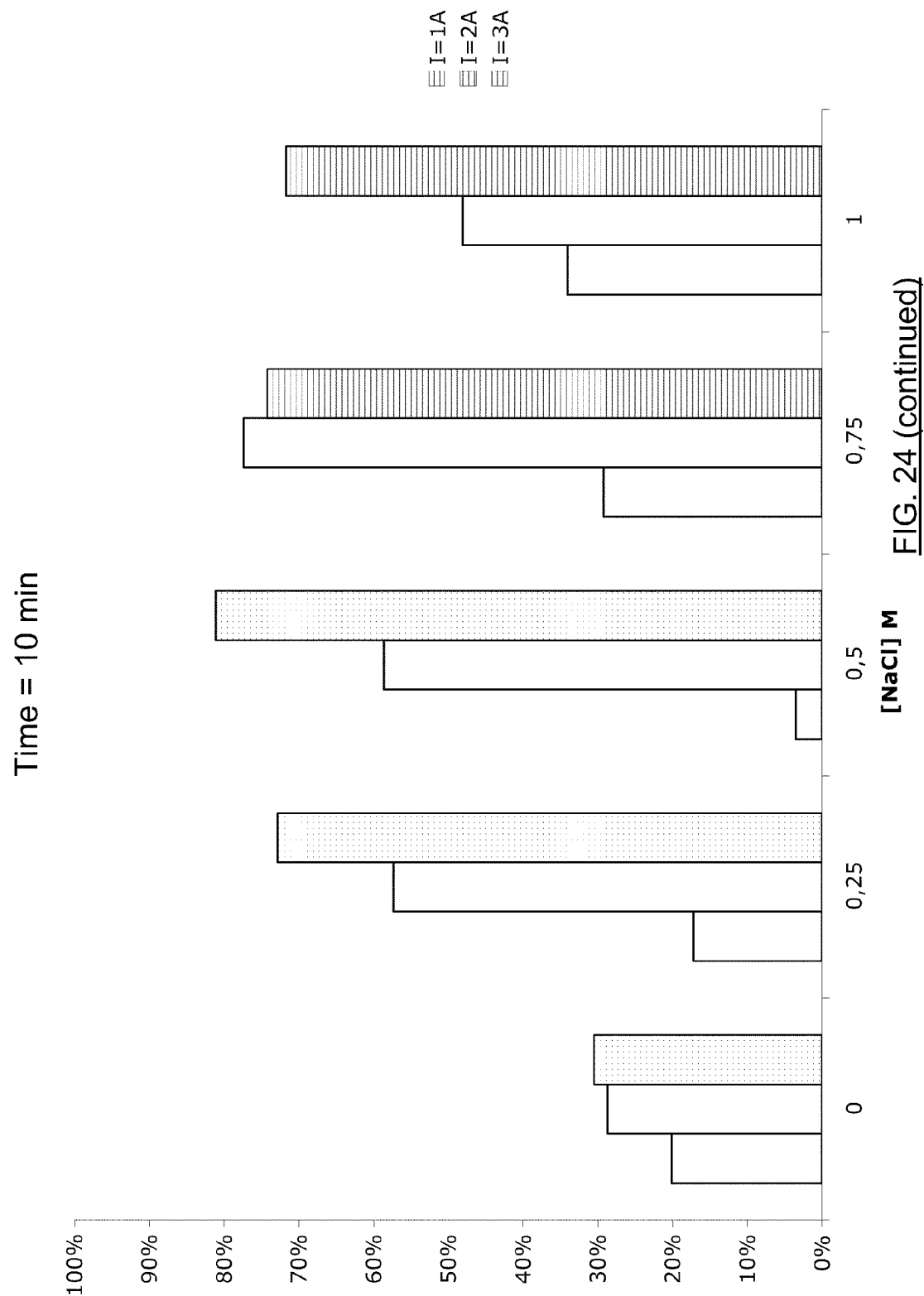
FIG. 24 presents graphs showing the decrease in % of lead after 10 and 90 minutes of the electro-chemical treatment under currents of 1, 2, and 3 A, the flotation effluents being recuperated after flotation of SNW using different concentrations of NaCl.

Similar tests on the pH (FIG. 23) and the reduction (%) of Pb over time as a function of the applied currents (FIG. 24), show that the reduction reactions of Pb and water are not dominant one over the other but are consecutive. Following the consumption $Pb^{2+}$ by reduction at the cathode, the electrons participate in reduction of water in saline conditions and the formation of metallic hydroxides by complexation reactions is therefore very improbable. Thus, the observations of pH show, in a qualitative manner, the behavior of lead in the cell.

Figure 25:
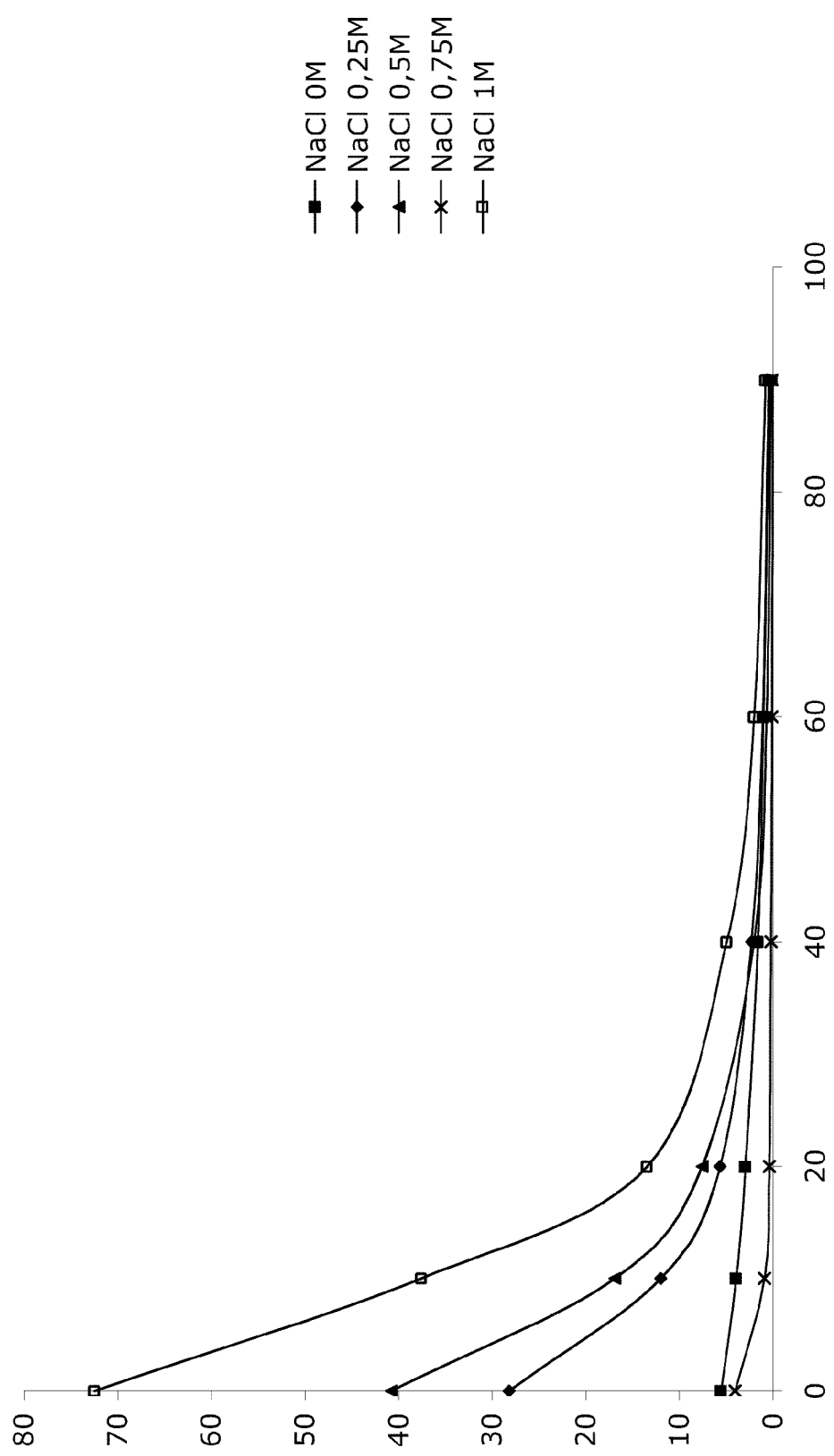
FIG. 25 is a graph showing the kinetic of precipitation of Pb (y in mg/L) under a current of 2 A, for effluents recovered after a flotation after SNW using different concentrations of NaCl.
Figure 26:
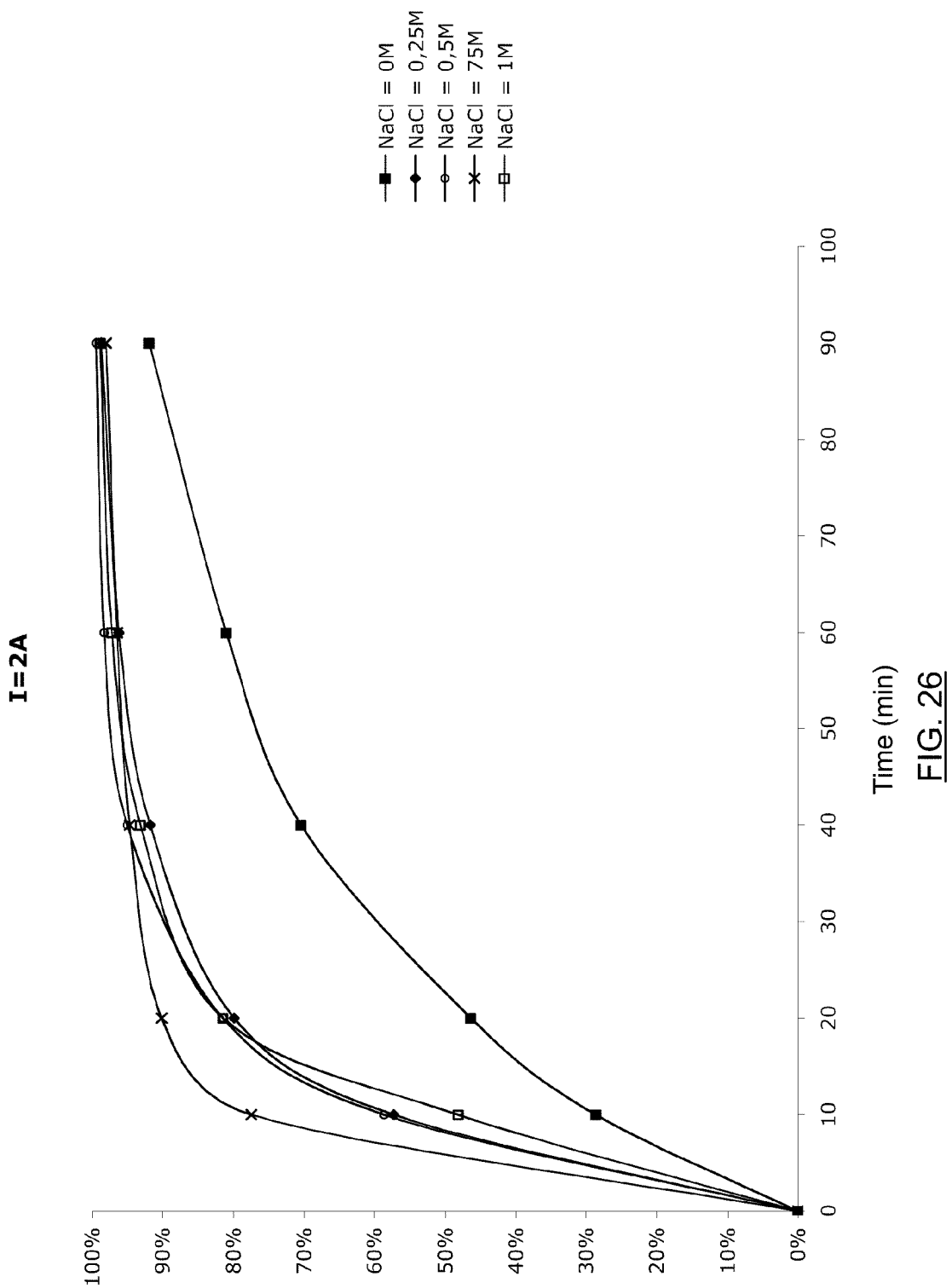
FIG. 26 is a graph showing the kinetic removal of Pb under a current of 2 A, for effluents recovered after flotation of SNW using different concentrations of NaCl.
Figure 27:
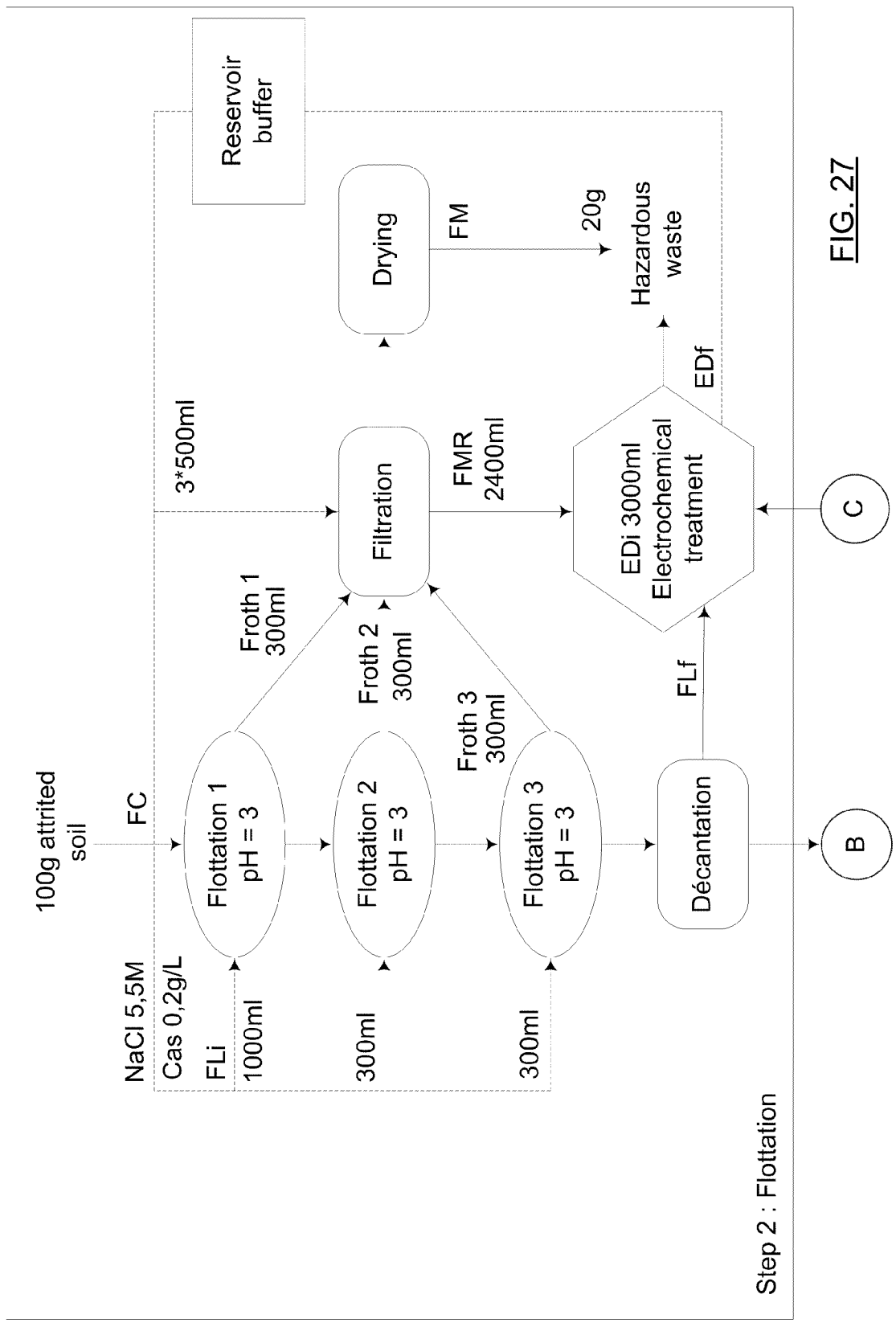
FIG. 27 is a process schematic with loops for Tr23, according to an embodiment.
Figure 27:
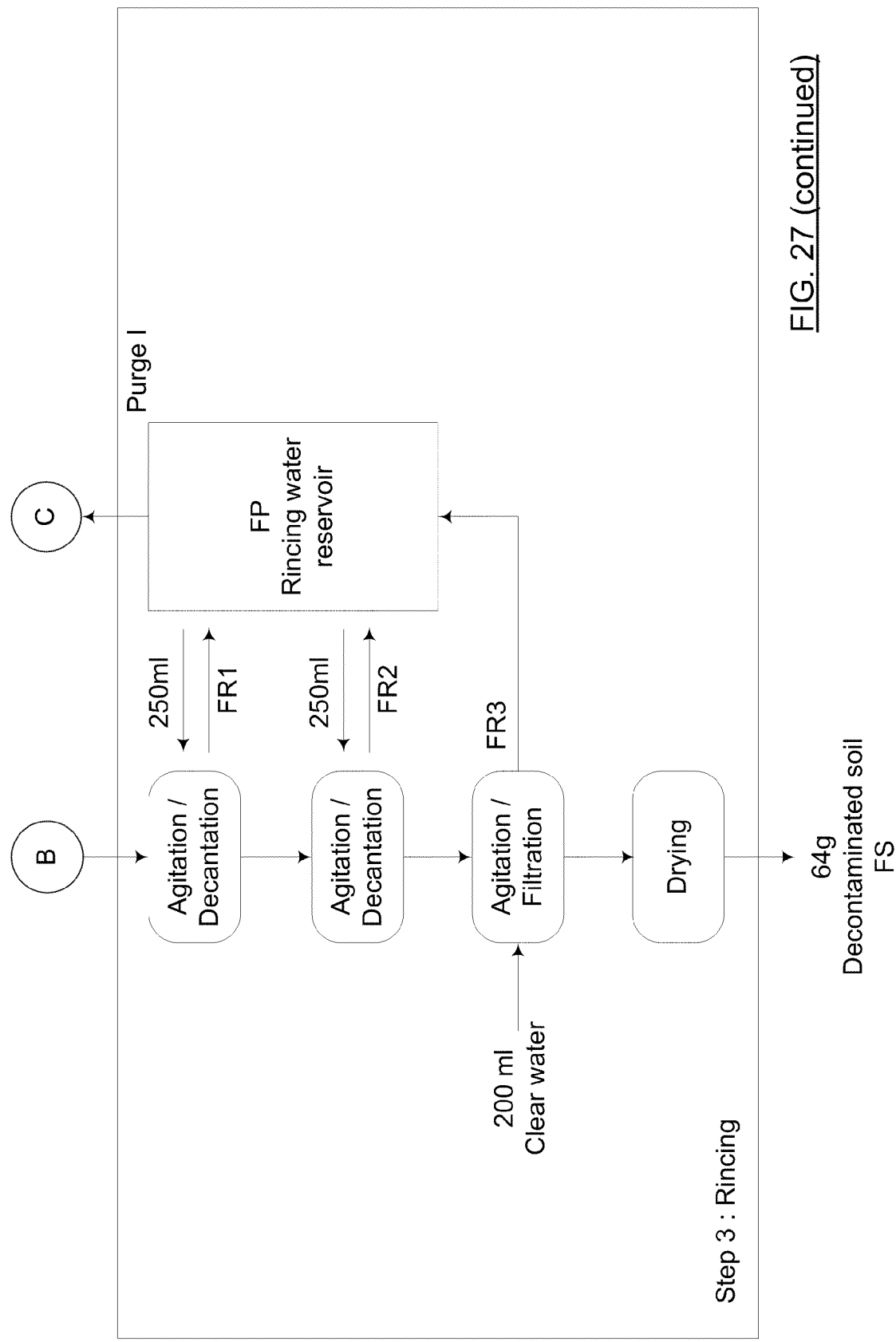

Increasing the salinity of the effluents favors an increase in pH, that is reduction reactions of water and/or oxygen. This observation leads one, after what was said in a preceding section, to maintain that an increase in the salinity of the effluents improves the lead removal rate, as illustrated in FIG. 25. Care should be taken in considering this figure. It is observed that the quality of the electrochemical waters varies with the salt concentration in the flotation process. Thus, the higher the salt concentration in the flotation process, the higher the lead concentration found going into the electrochemical cell. Thus, it seems more appropriate to follow the kinetics as represented in FIG. 26, in relation to the removal level of Pb over time. Thus, starting at a salt concentration of 0.25M and for a current above or equal to 2 A, the kinetic curves for lead removal superimpose while one must go up to 0.75M of salt for 1 A.

The comparison of the removal levels of lead after 90 minutes of electrodeposition indicates that a large amount of the lead (<90%) is eliminated for currents above or equal to 2 A, independently of the salt load in the medium. For lower currents, it is required to attain NaCl concentrations of about 0.75M to realize similar removal levels.

During the electrodeposition process, a release of $Cl_2$ occurs at the anode. Thus, a probable imbalance of ionic charges of the medium, which can inhibit the activity of the medium in terms of removal of the target contaminants, led to observing the $Cl^-$ ions before and after electrochemical treatment. The results that followed show no variation in $Cl^-$ concentrations. With the NaCl concentrations that were used, the $Cl^-$ loss during electrodeposition is considered to be negligible.

Synthesis

The improvement and optimization of the flotation process that has been developed enabled the developments of an embodiment able to efficiently decontaminate in a simultaneous manner soils presenting mixed contaminations (PAH/Pb type). The flotation conditions defined as "optimal" are: d=10%, [CAS]=0.2% w/w, [NaCl]=5.5M, pH=3, $t_{Tflotation}$=15 min, $Q_{Tflotation}$=3 L·min, agitation speed à 1800 tr·min, T=20° C. Under these conditions, the management of the number of applied flotations (n), enables reducing the level of contaminants to concentrations that are acceptable with regard to the referenced legislation. Thus, the more the initial matrix is contaminated, the more the removal of contaminants to regulatory limits requires the addition of an increased number n of successive flotations. This observation can also translate into an increase in processing costs in accordance with the level of contamination of the matrix to be treated.

The study of the same process at the defined optimal conditions enabled for each type of contaminant to target different preferred parts of the process. Thus, while the PAHs are found completely in the solid fractions of the process (FM and FS), the lead is mostly present in the liquid fractions (FLR and FMR). A non-negligible quantity of the latter is also concentrated in the flotation froth (FM). The sodium is distributed in the liquid fractions, but traces thereof subsist in the solid fractions at the end of the process.

The tests concerning electrodeposition of the lead show that an increase in the concentration of salt and the applied current ensures an improved lead removal rate. Thus, for the tests that were conducted at [NaCl]=1M, an intensity of 2 A ensures a maximum removal level at a rapid rate. The flotation process at CoptF uses [NaCl]=5.5M and thus generates effluents loaded around this concentration. At these concentrations that are higher than those under study, it is possible to suppose that a current of 1 A would suffice. In the absence of salt, an increased current implies an associated increased energy demand (U). At the saline concentrations that were tested, the ionic conductivity and therefore the electronics of the medium is such that an increase in applied current has no effect on the associated voltage. The measurements of solubilized Pb and pH confirmed the presence of electrochemical reactions at play and validated the notion that consecutive reactions dominate over competitive reactions.

Improvement and Optimization of Looped Process

Flotation Process on Tr23

In this section, it is proposed to follow the process that was retained in the preceding section on a cycle having five loops (that is, with recirculation of the process waters). This phase of testing applies uniquely to the treatment of Tr-23. This process is presented in FIG. 27.

Solid Fractions of the Process

Looking at the quantities reported in Table 15, it seems that the mass of froth recuperated from the flotation increases with subsequent loops while the mass of soil stays the same. This increase seems to be due to an accumulation of NaCl. The froths are rinsed using recycled processed water. The NaCl load of these waters seems to reduce the efficiency of froth rinsing. The cell dosage will therefore be studied to improve this step.

Figure 28:
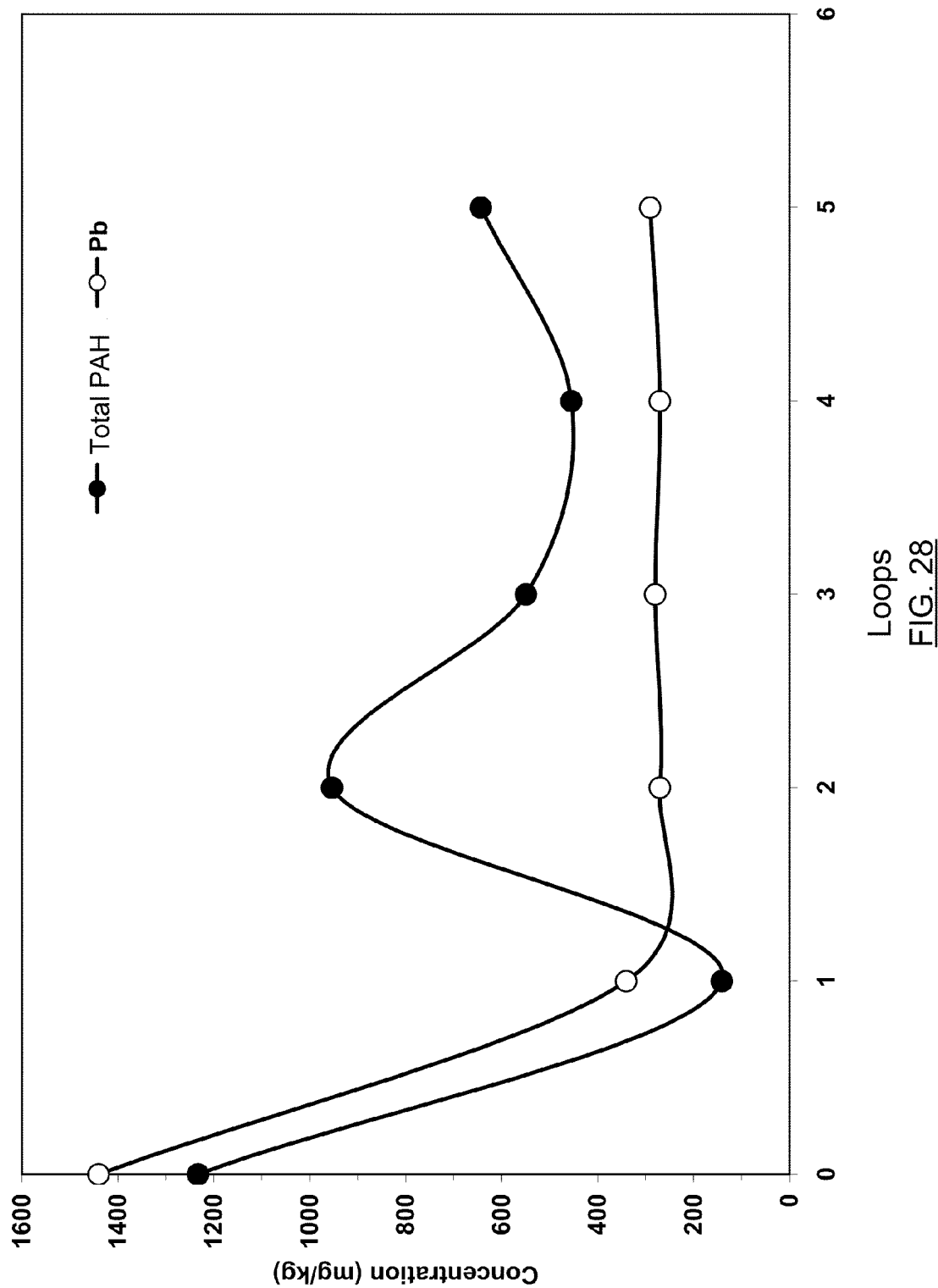
FIG. 28 is a graph showing the evolution of the quality of rejects (FS) from the loops.

In accordance with the results obtained in the preceding section and as presented in Table 16, the quality of soil recuperated at the end of the process of the first loop satisfies the regulatory requirements for PAH and for lead. On the other hand, and with the exception of lead, it is impossible to ensure this same level of quality of soil for the subsequent loops. In effect, while the first loop enables reduction of 93% in total PAHs (Table 17), the calculated reduction for the subsequent loops is situated between 50 and 78%. FIG. 28 illustrates, in term of the solubilization of the contaminants, the non-reproducibility of the efficiency of the process over the loops. The study of sodium over the different loops confirms an accumulation of salt in the reject at the end of the process (FS): 1.7-9.8-11.7-25.6 and 27.7 g/Kg respectively for loops 1-2-3-4 and 5 while the initial sodium is 0.4 g/Kg. An improvement or optimization of this step of rinsing the soil at the end of the process is therefore preferable.

Figure 29:
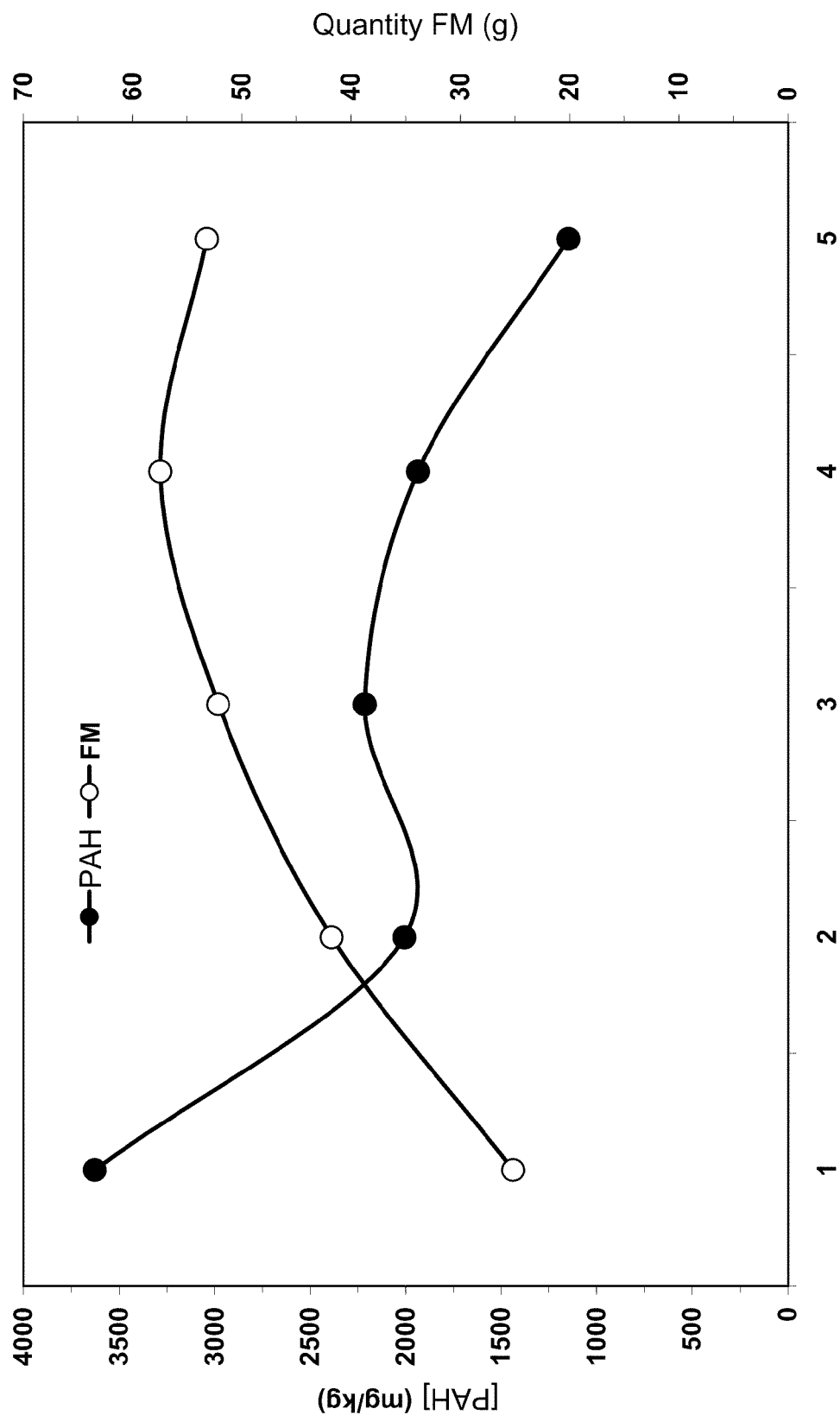
FIG. 29 presents graphs showing the concentration of total PAH in the froths and of the quantity of froth collected over the loops.
Figure 29:
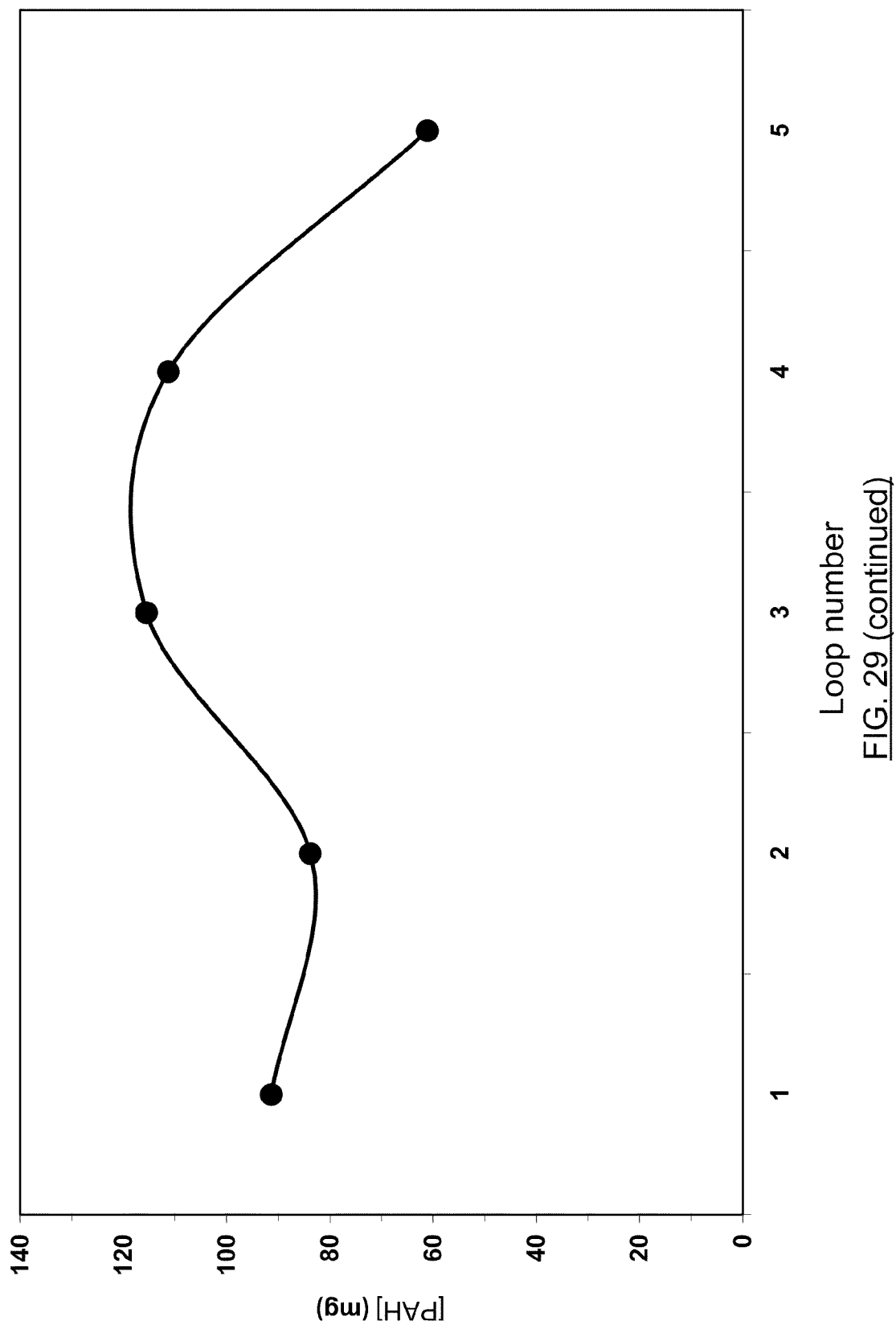

The study of the quality of the generated froth shows, as presented in FIG. 29, that while the total PAH concentration diminishes over the loops, the floated mass increases. The study of the quantity of PAH in mg floated shows that there is little to no variation over loops 1 to 4, ensuring an average of 101+/−15 mg of total floated PAH. In the fifth loop, this quantity reduces to 61 mg. The study of sodium in the froth shows that the concentration of floated salt increases over the loops: 30.0-39.3-28.4-51.6 g/Kg respectively for loops 2-3-4 and 5. Thus, on account of an excess of salt, it is probable that the surfactant causes the flotation of insoluble salt instead of PAHs.

The metallic residue coming from the chemical treatment (EDR) is produced at a level of 6 g/kg of dry treated soil, with an electrolytic lead deposit of 1.4 kg per ton of residue, and presents a concentration of 91 000 mg of lead per kg of produced residue. The quantities of sodium in the metallic residue range from 125 to 202 mg/Kg respectively for loops 1 and 3.

TABLE 15

Balance of quantities of the process over the loops for Tr23

| | | Quantities (g or mL) Loops | | | | | |
|---|---|---|---|---|---|---|---|
| | Identifier/unit | 1 | 2 | 3 | 4 v | 5 | Average |
| Inputs | NaCl (g) | 520 | 400 | 350 | 200 | 125 | 319.00 |
| | Surfactant (g) | 0.18 | 0.18 | 0.18 | 0.18 | 0.18 | 0.18 |
| | $H_2SO_4$ (ml) | 9 | 10 | 9 | 9.5 | 9 | 9.30 |
| | P-E10 (ml) | 5 | 7.5 | 5 | 5 | 5 | 5.50 |
| | FC (g) | 100 | 100 | 100 | 100 | 100 | 100.00 |
| | Fli1 (ml) | 950 | 950 | 950 | 950 | 950 | 950.00 |
| | Fli2 (ml) | 300 | 300 | 300 | 300 | 300 | 300.00 |
| | Fli3 (ml) | 300 | 300 | 300 | 300 | 300 | 300.00 |
| Intermediaries | FLf (ml) | 440 | 350 | 360 | 360 | 450 | 392.00 |
| | FMR (ml) | 1820 | 2190 | 2210 | 2230 | 2110 | 2112.00 |
| Outputs | Edi (ml) | 3000 | 2800 | 3000 | 3000 | 3000 | 2960.00 |
| | FS (g) | 62.6 | 64 | 61.89 | 60.24 | 70.7 | 63.89 |
| | FM (g) | 25.17 | 41.77 | 52.16 | 57.49 | 53.2 | 45.96 |
| | EDR (g) | 0.61 | 0.84 | 0 | 1.3 | 2.5 | 1.05 |
| | Edf (ml) | 2900 | 2780 | 2900 | 2930 | 3120 | 2926.00 |
| | FP (ml) | 750 | 1040 | 960 | 800 | 820 | 874.00 |

TABLE 16

Quality of Tr23 before and after treatment by flotation and the generated froths (mg/kg dry).

| Types | Loop | Dry mass (g) | PHE | FLR | PYR | BAN | CRY | BJK | BAP | IND | DBA | PER | Pb | pH |
|---|---|---|---|---|---|---|---|---|---|---|---|---|---|---|
| FC | Average | 98.6 | 188.0 | 224.0 | 172.0 | 97.6 | 105.8 | 168.0 | 62.0 | 63.6 | 13.8 | 49.0 | 1440.0 | 8.18 |
| | Error | 0 | 13.04 | 11.40 | 8.37 | 3.36 | 5.76 | 10.95 | 9.19 | 2.97 | 0.45 | 2.35 | 54.77 | 0.04 |
| | CV | 0% | 7% | 5% | 5% | 3% | 5% | 7% | 15% | 5% | 3% | 5% | 4% | 1% |
| | NbVal | 5 | 5 | 5 | 5 | 5 | 5 | 5 | 5 | 5 | 5 | 5 | 5 | 5 |
| FS | 1 | 62.6 | 20.0 | 21.0 | 16.0 | 9.1 | 9.8 | 16.0 | 7.7 | 5.9 | 1.3 | 4.7 | 340.0 | 7.3 |
| | 2 | 64 | 160.0 | 170.0 | 130.0 | 70.0 | 75.0 | 120.0 | 61.0 | 45.0 | 9.6 | 35.0 | 270.0 | 7.1 |
| | 3 | 61.89 | 94.0 | 100.0 | 74.0 | 40.0 | 43.0 | 68.0 | 34.0 | 25.0 | 5.2 | 19.0 | 280.0 | 7.4 |

TABLE 16-continued

Quality of Tr23 before and after treatment by flotation and the generated froths (mg/kg dry).

| Types | Loop | Dry mass (g) | PHE | FLR | PYR | BAN | CRY | BJK | BAP | IND | DBA | PER | Pb | pH |
|---|---|---|---|---|---|---|---|---|---|---|---|---|---|---|
|  | 4 | 60.24 | 75.0 | 82.0 | 61.0 | 32.0 | 35.0 | 55.0 | 27.0 | 20.0 | 4.3 | 15.0 | 270.0 | 7.3 |
|  | 5 | 70.7 | 110.0 | 120.0 | 87.0 | 47.0 | 50.0 | 80.0 | 40.0 | 29.0 | 6.0 | 22.0 | 290.0 | 7.3 |
| FM | 1 | 25.17 | 590.0 | 680.0 | 520.0 | 260.0 | 270.0 | 400.0 | 210.0 | 150.0 | 36.0 | 120.0 | 680.0 | 6.7 |
|  | 2 | 41.77 | 300.0 | 370.0 | 270.0 | 160.0 | 170.0 | 270.0 | 130.0 | 99.0 | 24.0 | 75.0 | 370.0 | 6.2 |
|  | 3 | 52.16 | 330.0 | 420.0 | 310.0 | 170.0 | 180.0 | 300.0 | 150.0 | 110.0 | 25.0 | 82.0 | 290.0 | 6.2 |
|  | 4 | 57.49 | 280.0 | 350.0 | 260.0 | 150.0 | 170.0 | 270.0 | 130.0 | 98.0 | 23.0 | 75.0 | 600.0 | 6.4 |
|  | 5 | 53.2 | 180.0 | 230.0 | 170.0 | 98.0 | 11.0 | 170.0 | 84.0 | 62.0 | 14.0 | 48.0 | 520.0 | 6.5 |

TABLE 17

Calculated reduction for each loop on the quality of the reject waste (FS) from the flotations on Tr23 (%).

| Loops | PhN | FluorantN | PyrN | B[a]anthracN | ChrysN | B[bjk]fluorantN | B[a]pyrN | Indeno | Dibenzoah | ghi | Pb |
|---|---|---|---|---|---|---|---|---|---|---|---|
| 1 | 93% | 94% | 94% | 94% | 94% | 94% | 92% | 94% | 94% | 94% | 85% |
| 2 | 45% | 51% | 51% | 54% | 54% | 54% | 36% | 54% | 55% | 54% | 88% |
| 3 | 69% | 72% | 73% | 74% | 75% | 75% | 66% | 75% | 76% | 76% | 88% |
| 4 | 76% | 78% | 78% | 80% | 80% | 80% | 74% | 81% | 81% | 81% | 89% |
| 5 | 58% | 62% | 64% | 66% | 66% | 66% | 54% | 67% | 69% | 68% | 86% |

Process Waters

Two samples of process water of the fifth loop, at the entrance and exit of the electrochemical treatment, were analyzed by Bodycote™. Thus, it is possible to reduce the lead concentration in the collected waters at the entrance of electrodeposition from 41 mg/L to 4.6 mg/L, that is, removal of 89% at the electrochemical treatment.

Figure 30:
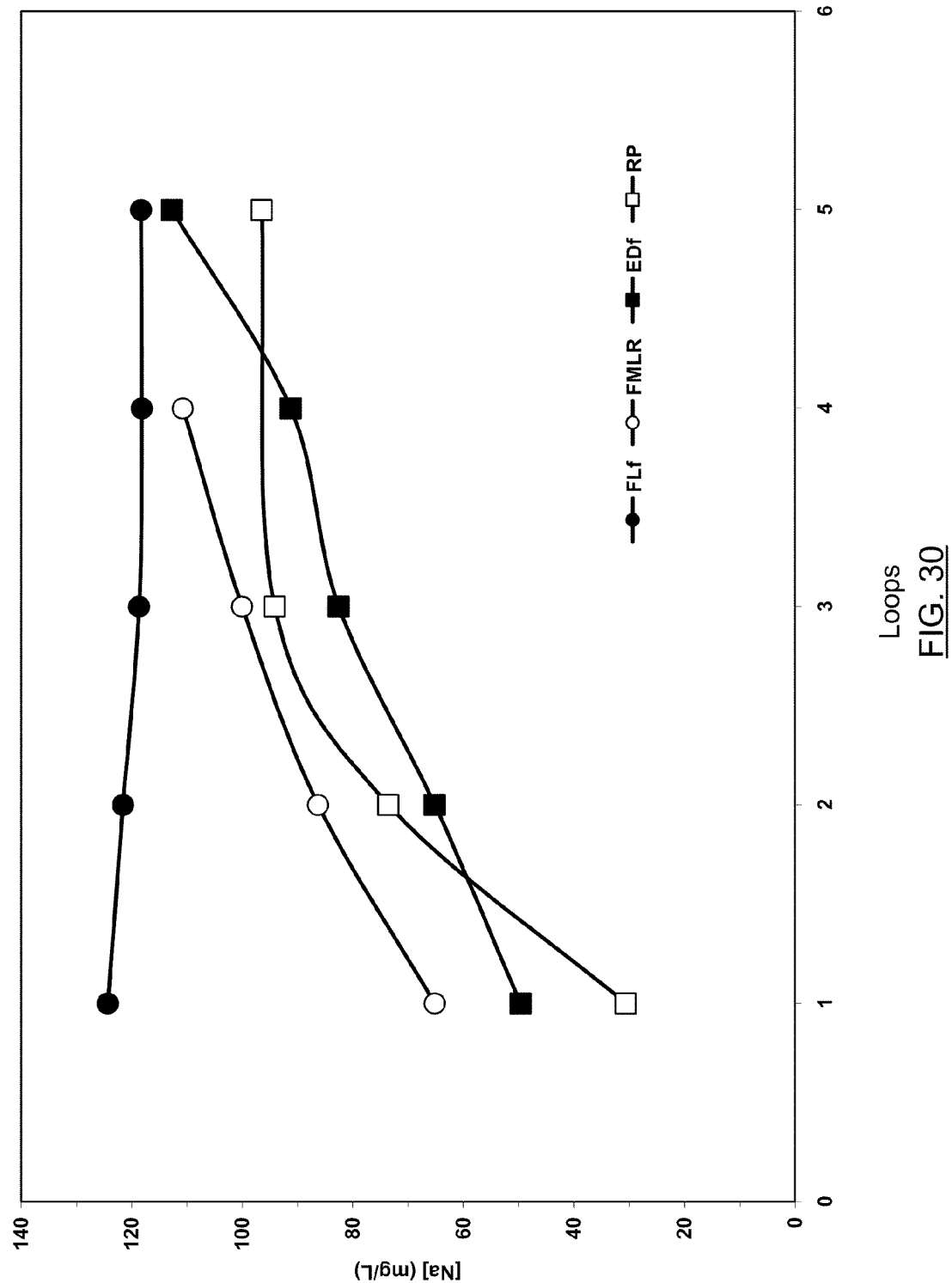
FIG. 30 is a graph showing the evolution of the concentration of Na (g/L) in the flotation effluents (FLf, FMR, and EDf) and the soil rinsing effluents (FRP) for the loops of flotation on Tr23.

A study of the sodium over the loops, for the waters coming from the flotation step (Flf, FMR and EDf), is presented in FIG. 30. The accumulation of the sodium in the rinsing waters of the froths (FMR) over the loops is visible and reflected also in the electrodeposition waters (EDf). Conversely, no increase in concentration of this element was observed for the washing waters at the end of flotation (Flf). The excess of NaCl in the previous section, according to Table 15, do not appear in the analyses of this fraction. This observation can be explained by the degrees of NaCl saturation in the solutions. Indeed, the solubility of salt in pure water at 25° C. is 359 g/L (6, 1M), that is, a concentration in Na of 141 mg/L. The measured concentration in the samples FLf is 120±3 g/L over the totality of the five loops and seems to correspond well with the solubility limit of salt in the considered reaction medium (water/surfactant/pH3/Tr23). Thus, the sampling of the saturated solutions cannot reflect the actual state of the medium since a part of the salt is in particulate solid form mixed with the soil (therefore non-sampled).

Figure 31:
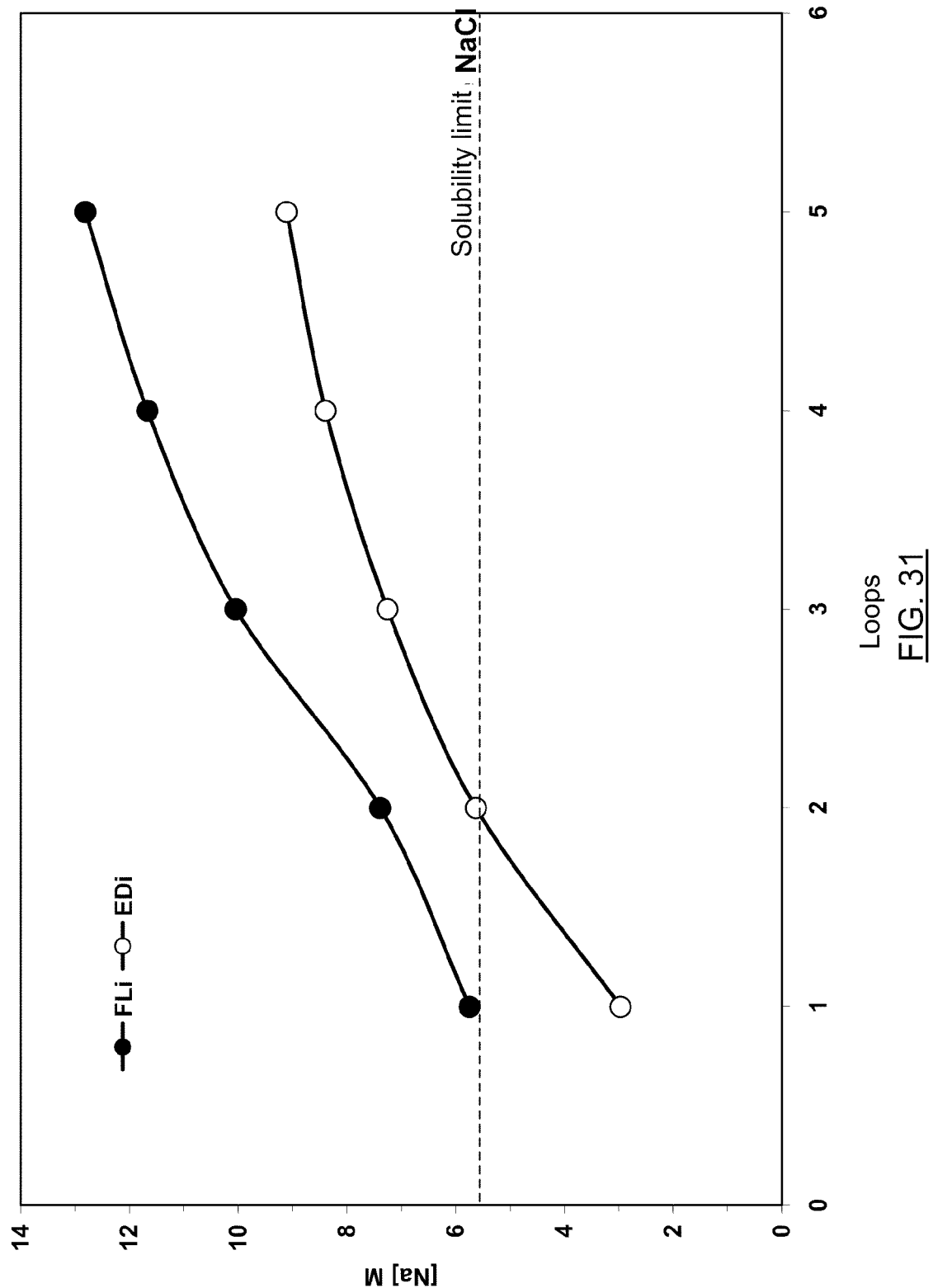
FIG. 31 is a graph showing the concentration of Na (g/L) of streams FLi and EDi, evaluated according to the quantity of added NaCl and the operating volumes.
Figure 32:
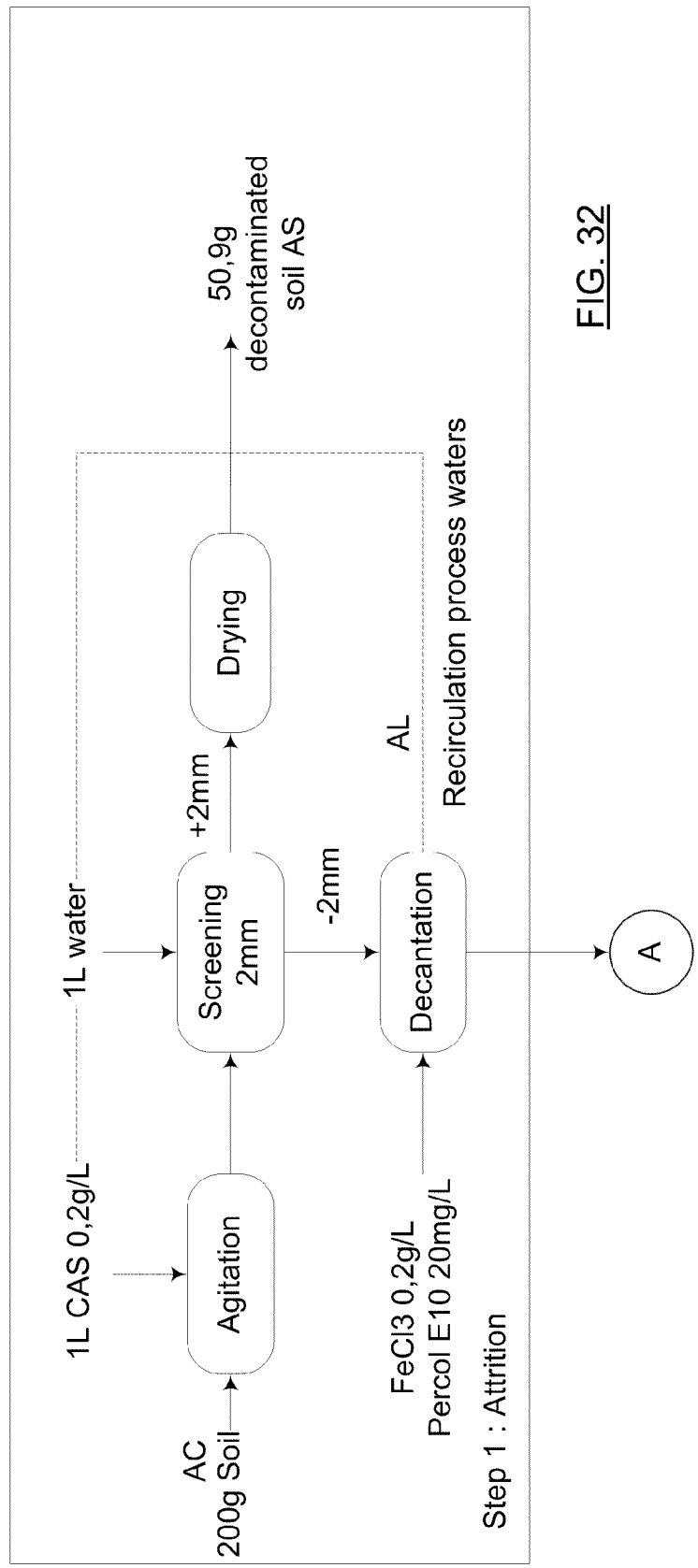
FIG. 32 is a process schematic applied to Tr29, according to an embodiment.
Figure 32:
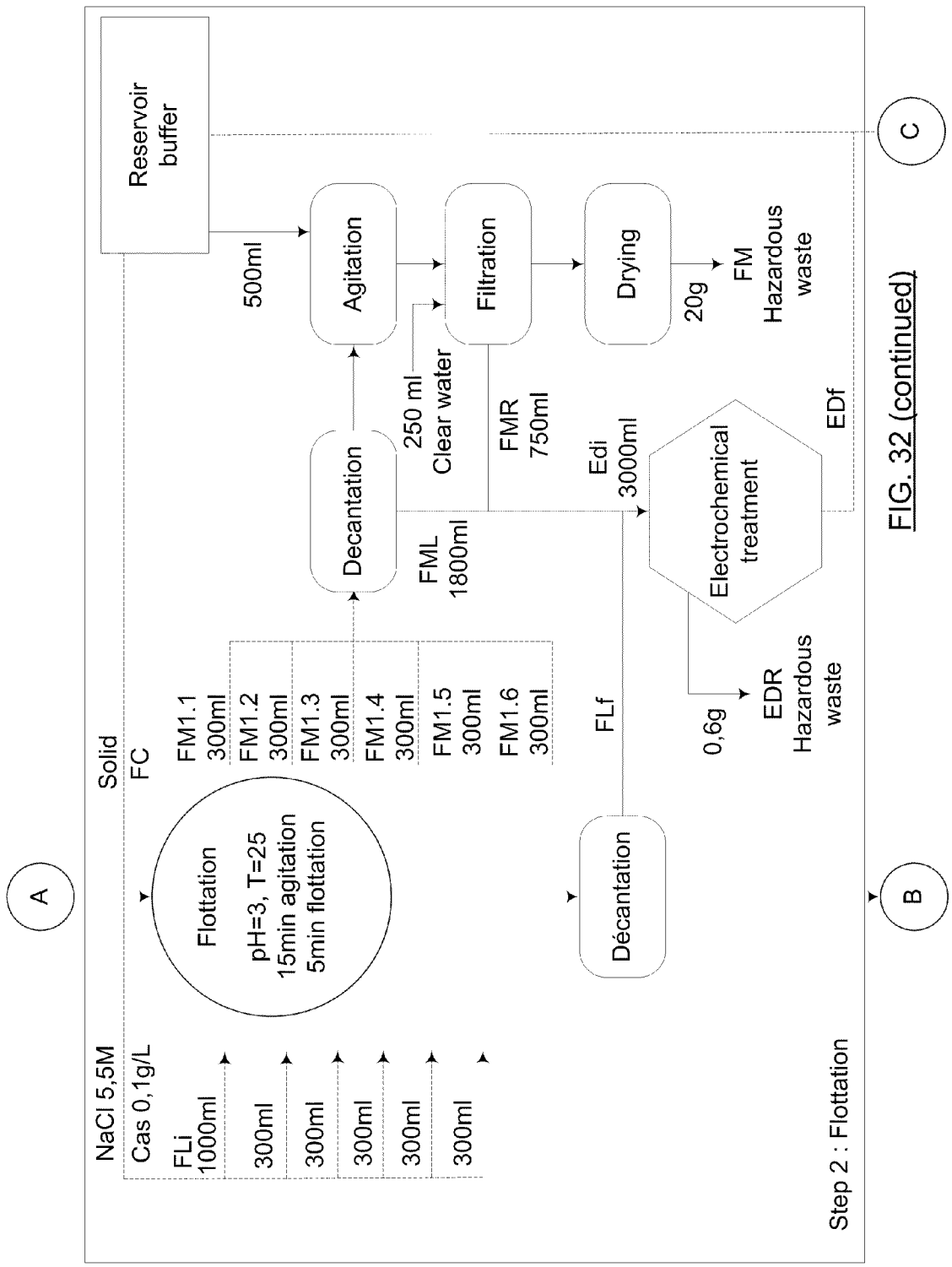
Figure 32:
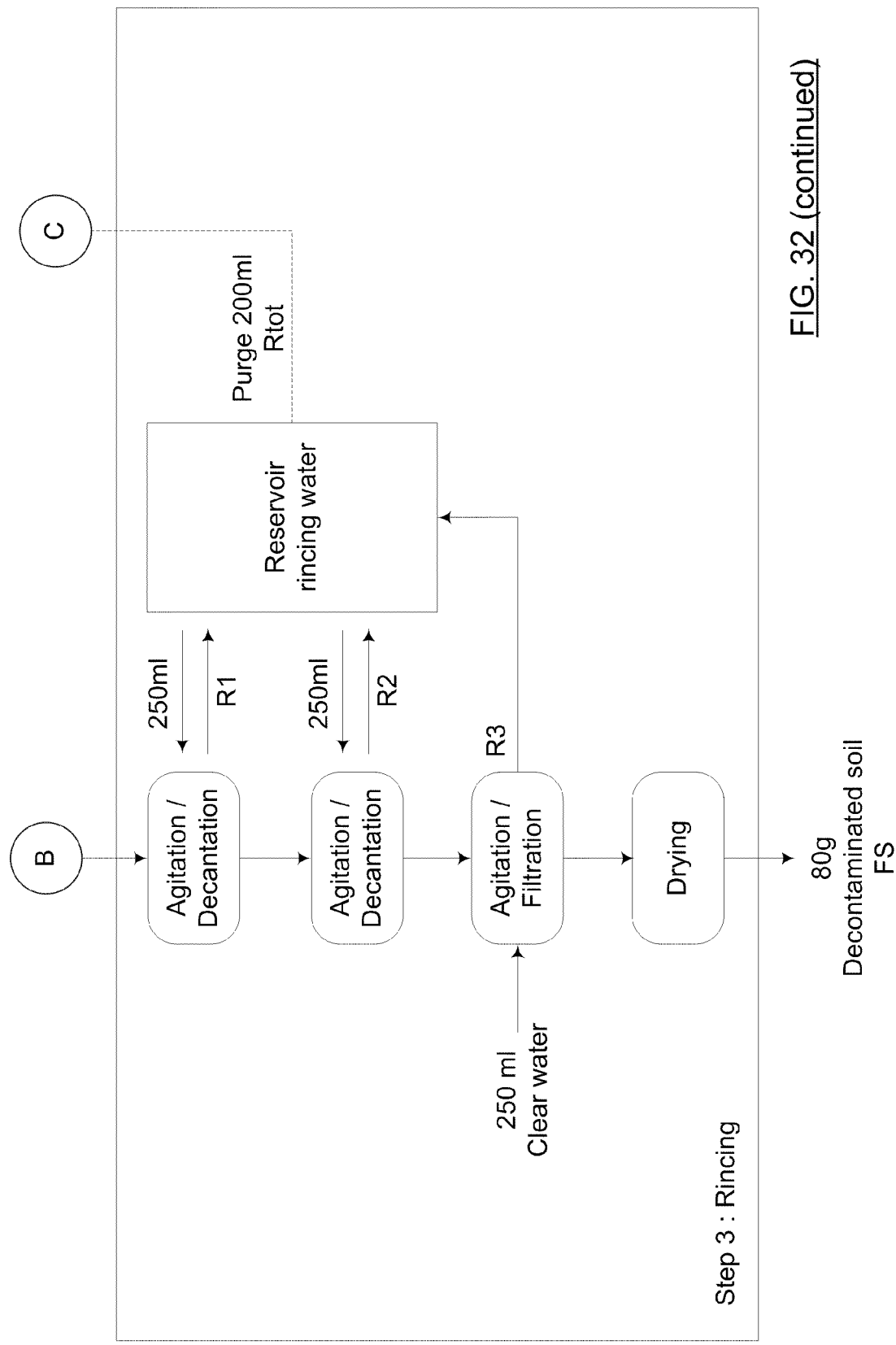
Figure 33:
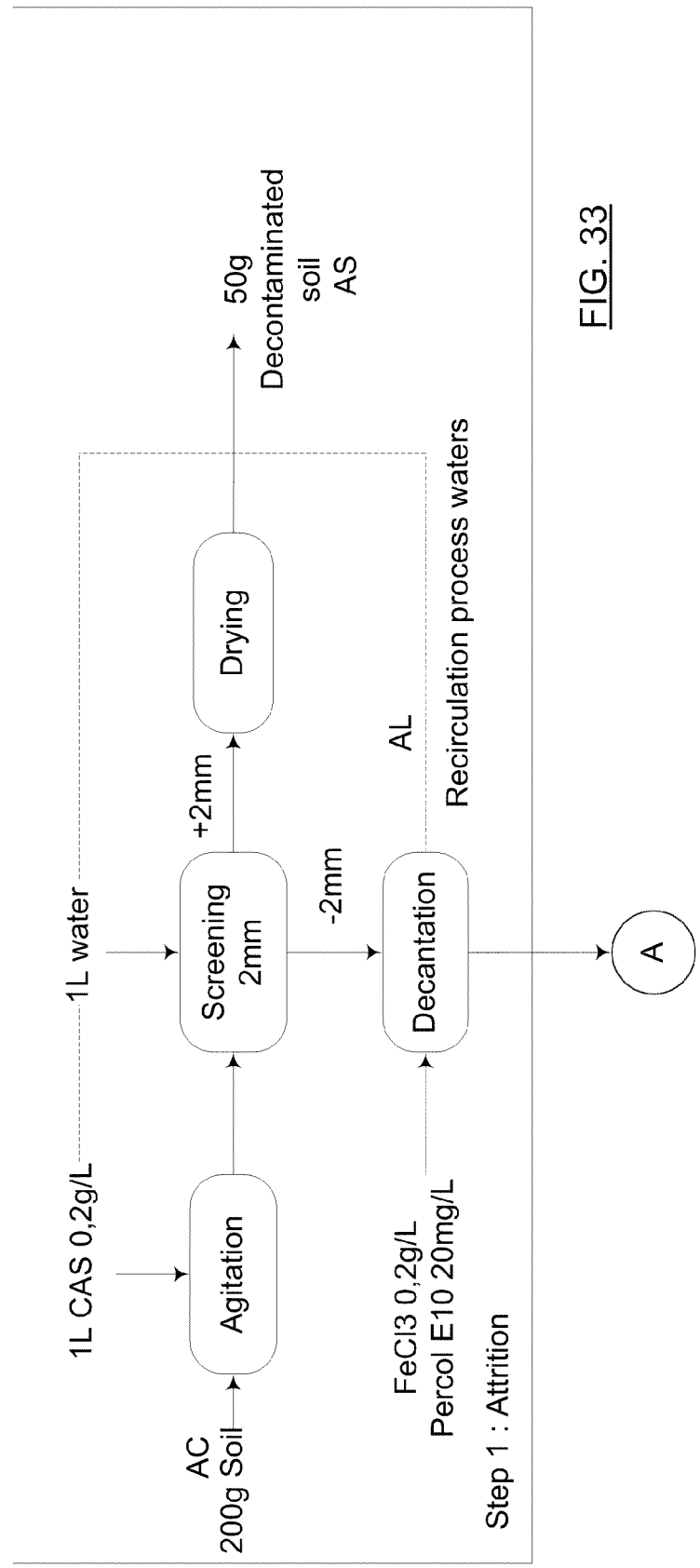
FIG. 33 is a process schematic (AFE) applied to TR29, according to an embodiment.
Figure 33:
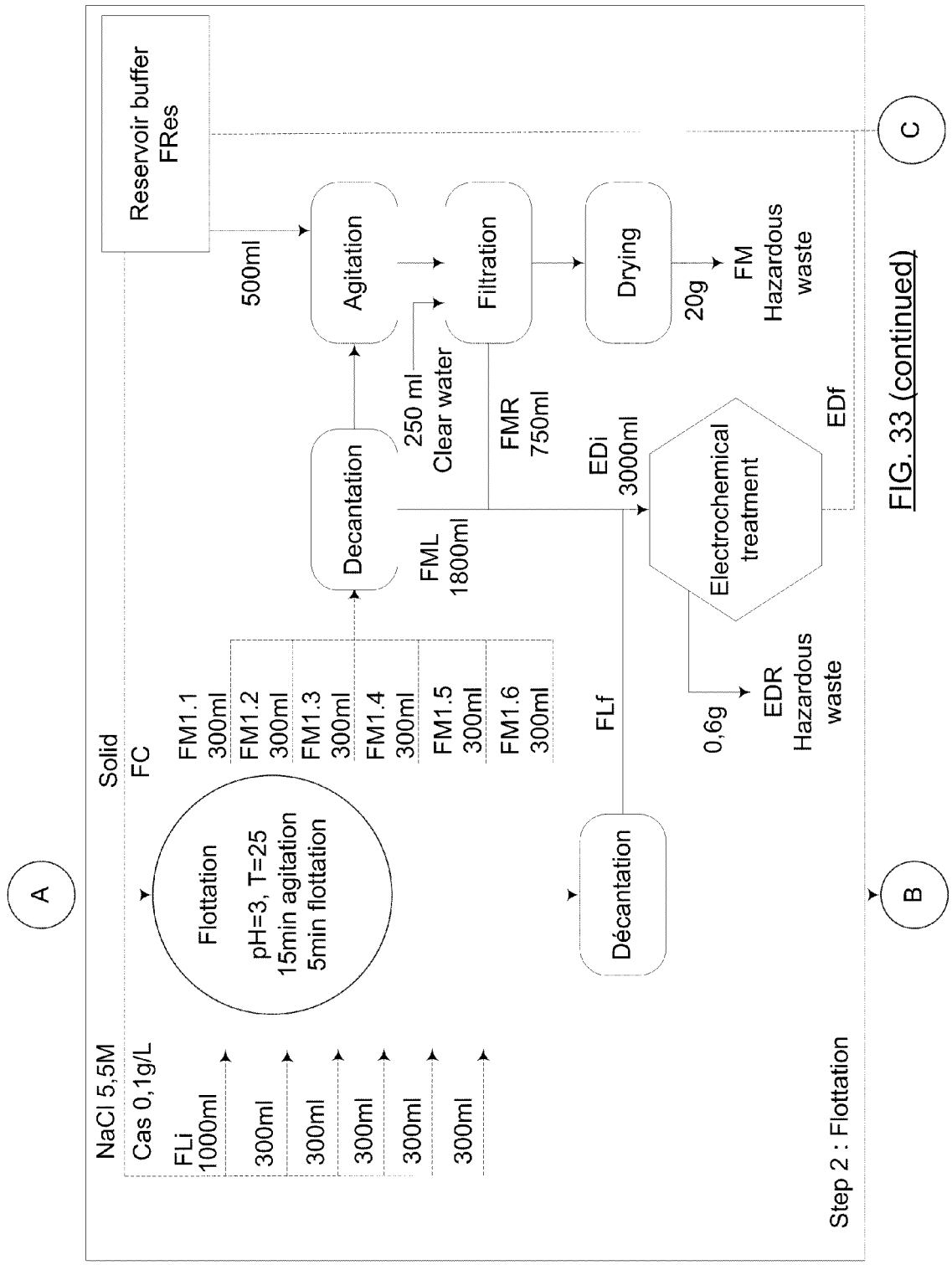
Figure 33:
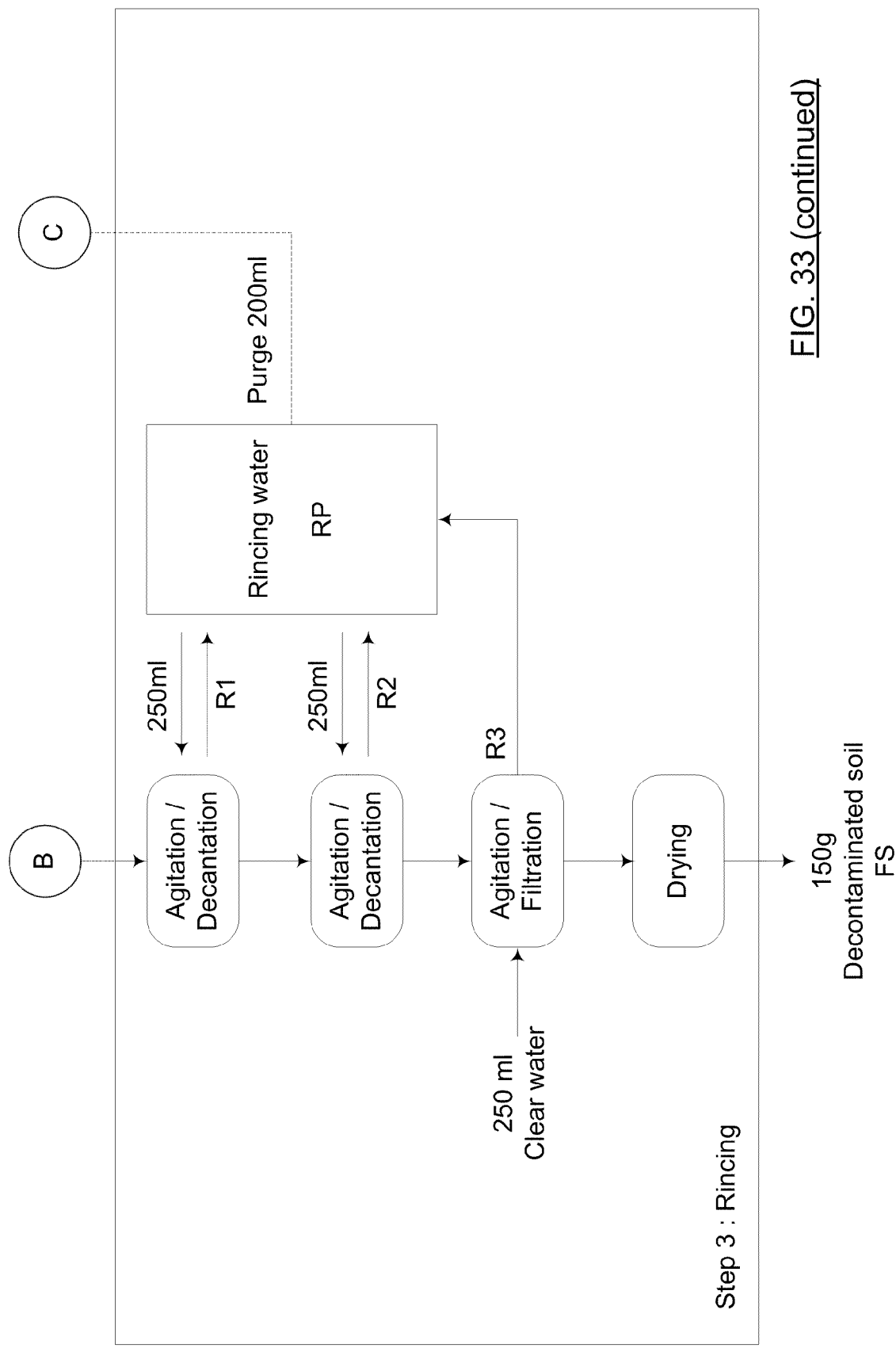
Figure 34:
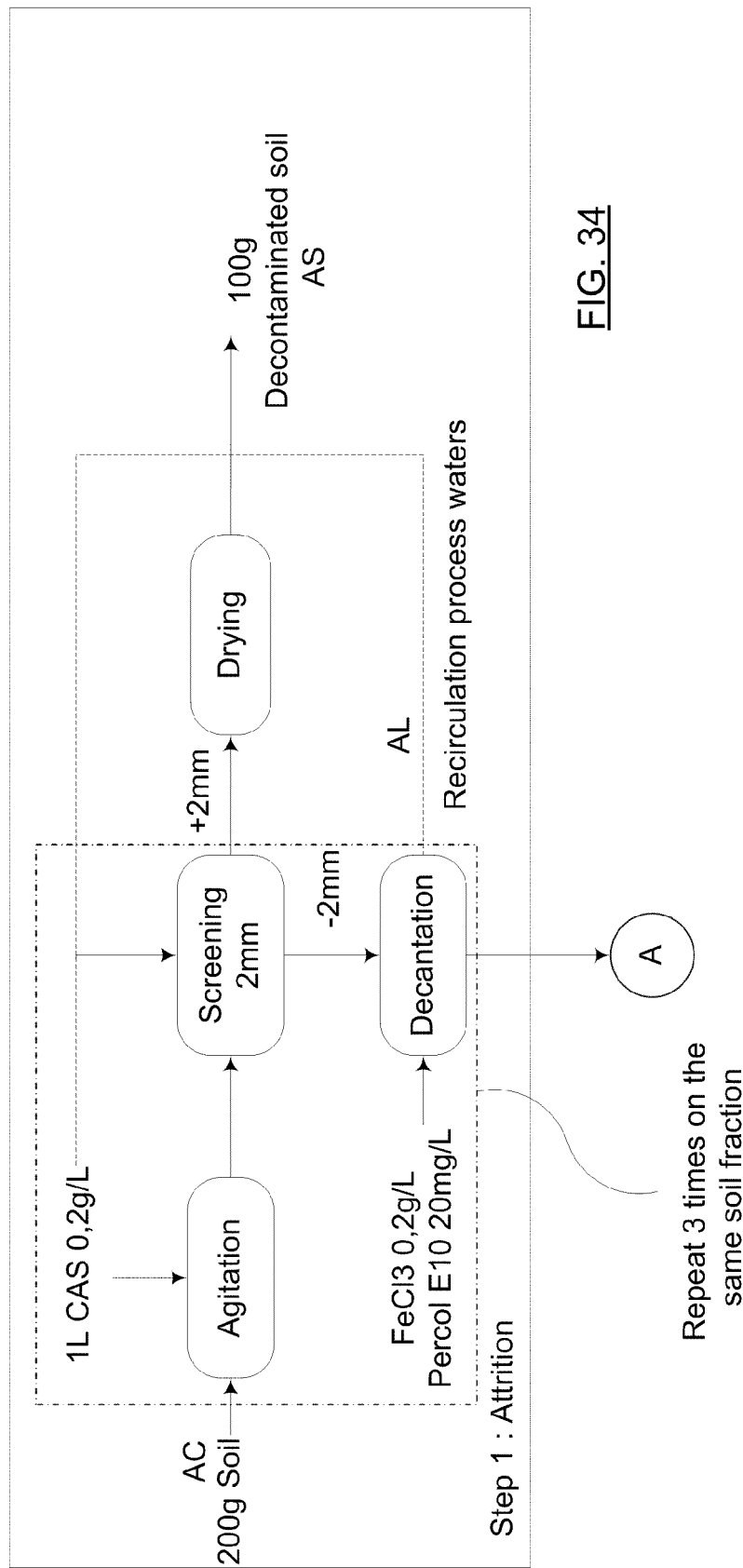
FIG. 34 is a process schematic (AFE) applied to TR23, according to an embodiment.
Figure 34:
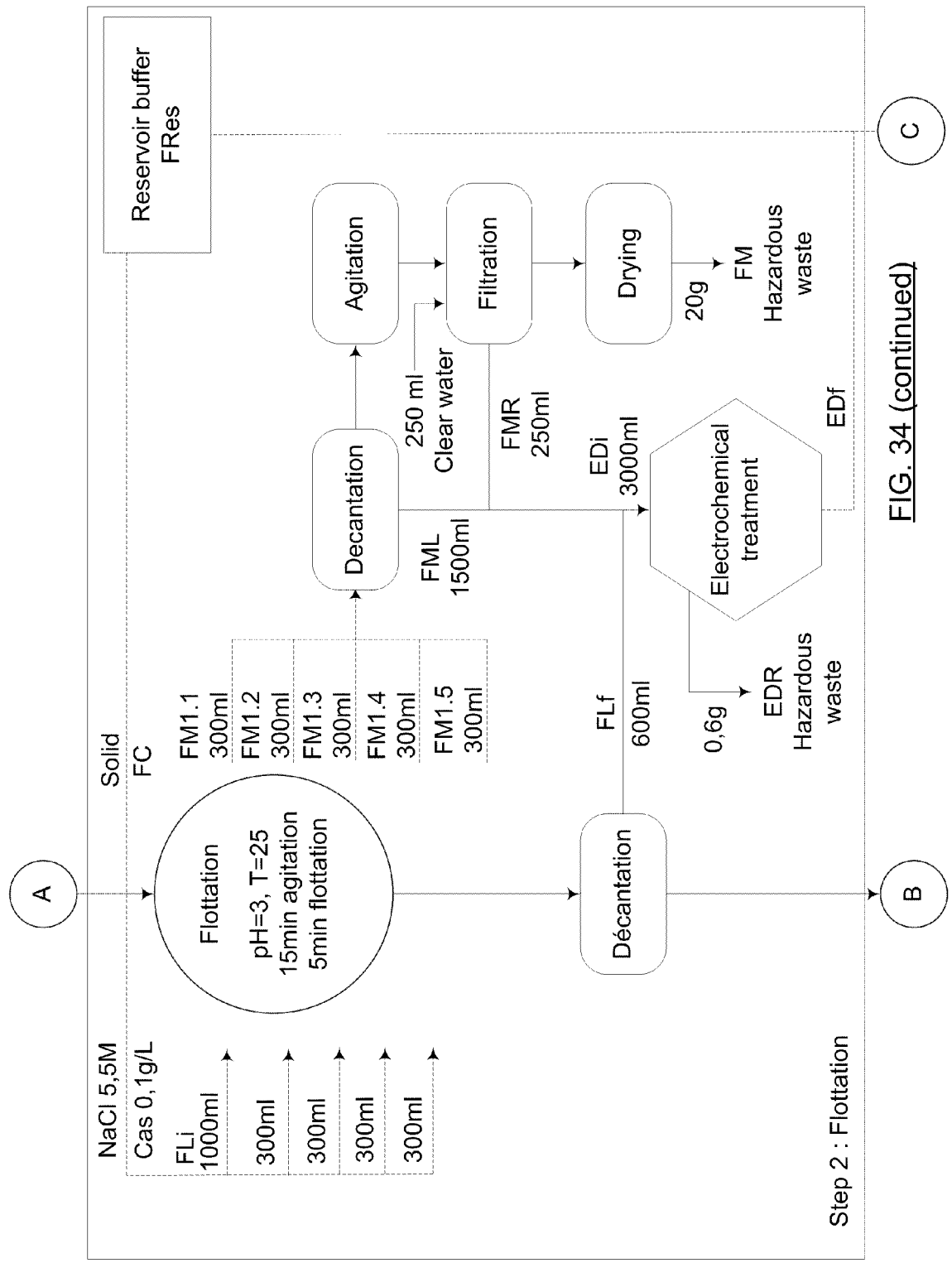
Figure 34:
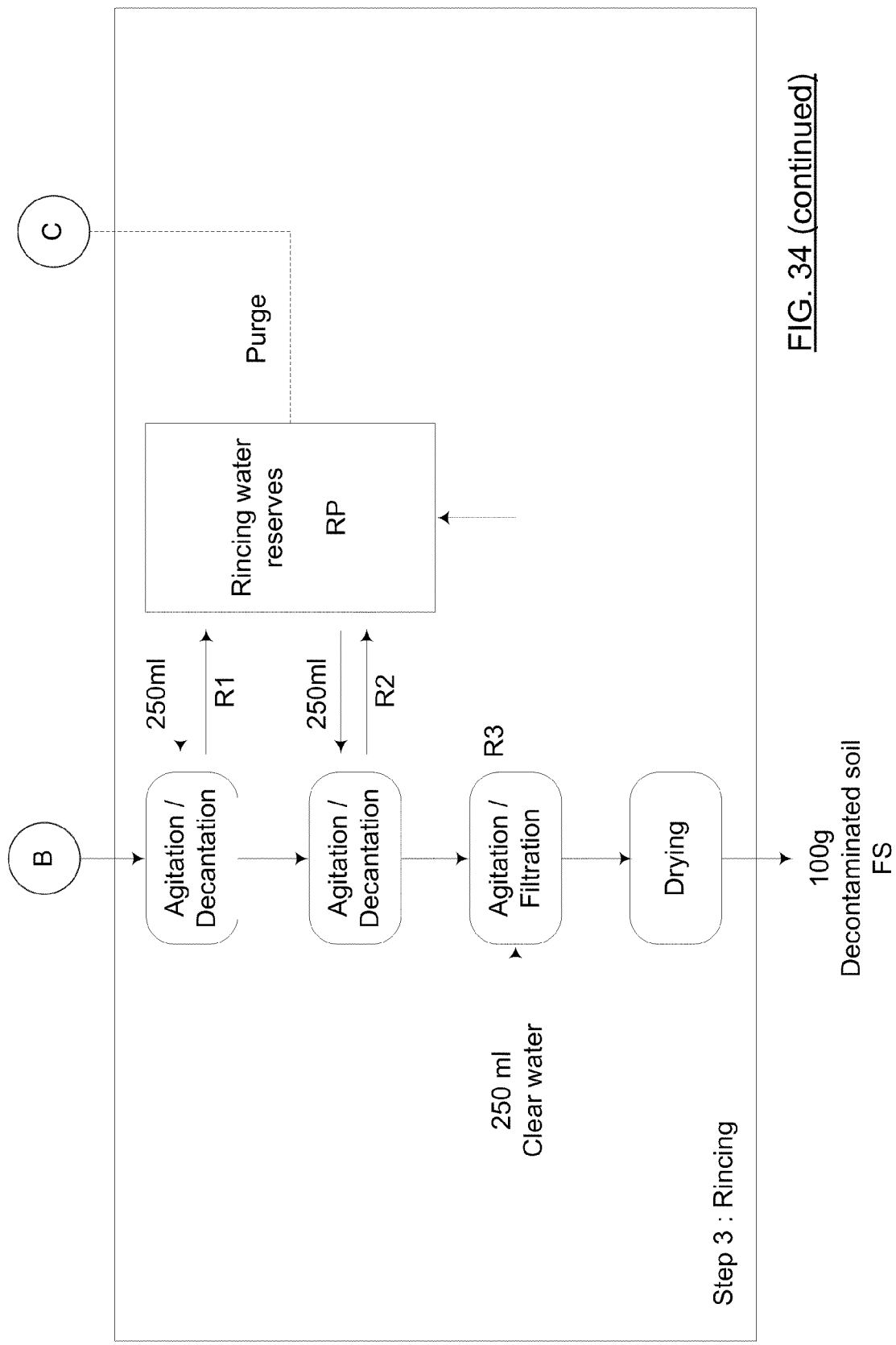

FIG. 31 presents the evolution of NaCl concentrations over the loops, calculated according to the quantities of NaCl introduced, and the volumes that were recirculated and/or added. It is quite clear, starting at loop 2, that the quantities of salt introduced could be reduced.

The concentrations of Na taken for FMR and EDf, respectively in loops 4 and 5, show that these effluents reach a level of saturation of NaCl: 280 and 285 g/L. The reserve waters FP coming from rinsing of the soil show that the concentration of Na stabilizes at loop 3 around 95 g/L. Thus, while the solution is not saturated with salt due to the rinsing with clear water operated in the third rinsing, it remains close to the values of FMR and EDf.

The study of the quality of rinsing waters of the reject waste over the loops is presented in Table 18. The quantity of rinsed salt, during the rinsing of the soil, seems to stabilize around the third loop and thus confirms the notion that the excess of salt introduced is floated and therefore accumulated in the froth rinsing waters and the froth itself. The first and second rinses are performed by recirculation of the rinsing waters, which seems to attain a salt saturation around the third loop. The third rinsing is performed with clear water for each loop and the sodium concentration increases to values that are close to the saturation starting at the third loop. These results confirm those concerning the reject of the flotation (FS), for which the Na concentration increases considerably at loops 4 and 5. Therefore, it seems that at the quantities of salt used for these tests, the excess salt present in the flotation reject in loop 3 is sufficient to saturate the 200 ml of clear water that is introduced. In addition, the rinsing volumes of the reject should be considered in the next tests as well as the quantities of NaCl.

TABLE 18

Evolution of the concentration of Na (g/L) in the rinsing effluents of the soil (FR1, FR2, FR3 and FRP) over the loops on Tr23.

|  | 1 | 2 | 3 | 4 | 5 |
|---|---|---|---|---|---|
| FR1 | 57.40 | 99.90 | 115.22 | 106.53 | 142.08 |
| FR2 | 22.12 | 96.68 | 130.37 | 94.30 | 124.38 |
| FR3 | 7.58 | 46.42 | 98.77 | 85.52 | 67.19 |
| FRP | 30.59 | 73.53 | 94.08 | — | 96.47 |

Discussion

The quality of recuperated soil at the end of the process of the first loop satisfies the regulatory requirements for both PAH and lead. On the other hand, and with the exception of lead, it is preferable to ensure this same level of quality in the soils for the subsequent loops of the process. Indeed, while the first loop enables a reduction of 93% in total PAH, the calculated removal for the subsequent loops is situated between 50-78%.

One remark on the tests that were realized concerns the quantities of NaCl introduced at the head of the flotation, which placed the system above the 5.5M foreseen for CStdF, and therefore above the solubility limit of NaCl in the medium. The excess of salt is preferentially floated within the froth, increasing therefore the floated mass and decreasing the efficiency of the process. The portion of the sodium that was measured in the flotation reject and in the froth increases over the loops. The salt load is such that the operating volumes for the reject and froth rinsing are insufficient to perfectly "rinse" these fractions.

To further improve the process, one may, for example, increase the rinsing volumes FR1, FR2, FR3 and FMR, introduce a step of rinsing the froth with clear water, etc.

Complete Process on Tr29

In this section, it is proposed to study the process that was retained on one of five loops (that is, with recirculation of the process waters). This phase of testing applies uniquely to the treatment of Tr-29. This process is presented in FIG. 32. Table 19 shows the quantities introduced in each loop.

Attrition Step

The fraction above 2 mm at the exit of the attrition step (AS) does not meet the regulatory standards. Indeed, as presented in Table 20, this fraction, covered in a layer of fine particles, remains very contaminated with PAHs. The attrition phase could be improved and optimized, for example, by increasing the number of sequences and the mode of attrition, in order to solubilize the fine fractions adsorbed on the fractions larger than 2 mm.

Flotation and Rinsing Steps

Solid Fractions

As presented in Table 20, the reject (FS) satisfies the regulatory requirements, at the end of the first loop, for all the PAHs under study, giving average reductions of 97% of the total PAHs and 98% of Pb. On the other hand, it is preferred to ensure this same level of quality for the subsequent loops. Indeed, while the first loop enables a reduction of 96% of total PAHs, the calculated removal for the subsequent loops is located between 70-84% (Table 21) and does not enable one to attain the regulatory objectives. The reduction in lead decreases from 98 to 94% over loops 1 and 5.

The portion of sodium detected in the reject (FS) remains very low over the loops: 0.7-0.7-0.8-1.1-1.7 g/Kg respectively for loops 1-2-3-4 and 5, which suggests good rinsing of this fraction at volumes used in operation. This same element within the froth (FM) shows a better control of the volumes and rinsing modes of the froth, in comparison to the tests previously done on Tr23, with contents of 5.9-10.4-42.3-14.2-17.2 g/Kg, respectively for the same loops.

TABLE 19

Balance of quantities of the process over the loops for Tr29

| | | Quantities (g or mL) Loops | | | | | |
|---|---|---|---|---|---|---|---|
| | Samples | 1 | 2 | 3 | 4 | 5 | Average |
| Inputs | AC (g) | 200 | 200 | 200 | 200 | 200 | 200.00 |
| | NaCl (g) | 820 | 300 | 200 | 125 | 125 | 314.00 |
| | Cas (g) | 0.52 | 0.5 | 0.36 | 0.28 | 0.26 | 0.38 |
| | ALi (ml) | 2000 | 2000 | 2000 | 2000 | 2000 | 2000.00 |
| | H2SO4 (ml) | 2.5 | 3.5 | 3 | 3 | 2 | 2.80 |
| | P-E10 (ml) | 50 | 86 | 60 | 50 | 53 | 59.80 |
| | FeCl3 (ml) | — | — | 0.8 | 0.6 | 0.6 | 0.67 |
| Intermediaries | FC (g) | 100 | 100 | 100 | 100 | 100 | 100.00 |
| | Fli1 (ml) | 950 | 950 | 950 | 950 | 950 | 950.00 |
| | Fli2 (ml) | 300 | 300 | 300 | 300 | 300 | 300.00 |
| | Fli3 (ml) | 300 | 300 | 300 | 300 | 300 | 300.00 |
| | Fli4 (ml) | 300 | 300 | 300 | 300 | 300 | 300.00 |
| | Fli5 (ml) | 300 | 300 | 300 | 300 | 300 | 300.00 |
| | Fli6 (ml) | 300 | 300 | 300 | 300 | 300 | 300.00 |
| | FLf (ml) | 650 | 810 | 650 | 640 | 530 | 656.00 |
| | FML | 1660 | 1500 | 1500 | 1600 | 1600 | 1572.00 |
| | FMR (ml) | 900 | 920 | 1100 | 960 | 1000 | 976.00 |
| | Edi (ml) | 3130 | 3160 | 3060 | 3120 | 3020 | 3098.00 |
| Outputs | AS (g) | 50.9 | 50.9 | 50.9 | 50.9 | 50.9 | 50.90 |
| | FS (g) | 58.99 | 60.8 | 61.9 | 59.6 | 63 | 60.86 |
| | FM (g) | 18.3 | 15.4 | 19 | 17.5 | 16.8 | 17.40 |
| | EDR (g) | 1.3 | 1.5 | 2.1 | 2.3 | 2.5 | 1.94 |
| | Edf (ml) | 3040 | 3120 | 3000 | 3040 | 2980 | 3036.00 |
| | RTot (ml) | 780 | 1100 | 1380 | 1600 | 1870 | 1346.00 |
| | Alf (ml) | 2000 | 2000 | 2000 | 2000 | 2000 | 2000.00 |

TABLE 20

Quality of various solid fractions (mg/kg dry).

| Process step | Types | Loops | Mass (g) | PAH* | Pb* | Na (g/Kg) | pH* |
|---|---|---|---|---|---|---|---|
| Attrition | (AC) | Average | 197 | 2858.60 | 498 | — | 8.4 |
| | | Error | 0 | 468.74 | 40 | — | 0 |
| | | CV | 0% | 16% | 8% | — | 0% |
| | | NbVal | 5 | 5 | 5 | — | 5 |
| | (AS) | 1 | 50.9 | 3 191 | 47 | — | 8.8 |
| | | 2 | 50.9 | 5 478 | 150 | — | 8.8 |

TABLE 20-continued

Quality of various solid fractions (mg/kg dry).

| Process step | Types | Loops | Mass (g) | PAH* | Pb* | Na (g/Kg) | pH* |
|---|---|---|---|---|---|---|---|
| | | 3 | 50.9 | 2 202 | 170 | — | 8.6 |
| | | 4 | 50.9 | 2 975 | 120 | — | 8.5 |
| | | 5 | 50.9 | 4 114 | 170 | — | 8.6 |
| Flotation | (FC) | Average | 97 | 2896 | 452 | 0.4 | 8.4 |
| | | Error | 0 | 190 | 42.7 | 0.1 | 0 |
| | | CV | 0% | 7% | 9% | 12% | 0% |
| | | NbVal | 5 | 5 | 5 | 5 | 5 |
| | (FS) | 1 | 58.99 | 402 | 33 | 0.7 | 8.9 |
| | | 2 | 60.8 | 1 818 | 54 | 0.7 | 8.6 |
| | | 3 | 61.9 | 2 060 | 80 | 0.8 | 7.2 |
| | | 4 | 59.6 | 2 843 | 96 | 1.1 | 8.5 |
| | | 5 | 63 | 1 421 | 89 | 1.7 | 8.0 |
| | (FM) | 1 | 18.3 | 10 418 | 530 | 5.9 | 8.4 |
| | | 2 | 15.4 | 7 295 | 640 | 10.4 | 6.5 |
| | | 3 | 19 | 3 815 | 530 | 42.3 | 5.4 |
| | | 4 | 17.5 | 6 747 | 590 | 14.2 | 6.0 |
| | | 5 | 16.8 | 6 822 | 610 | 17.2 | 5.4 |

TABLE 21

Reduction (%) of PAH and Pb for each step of the process over the loops for Tr29

| Loops | Attrition ΣPAH | Flotation Pb | Process ΣPAH | Pb | ΣPAH | Pb |
|---|---|---|---|---|---|---|
| 1 | 71% | 98% | 90% | 95% | 96% | 98% |
| 2 | 50% | 92% | 56% | 92% | 80% | 97% |
| 3 | 80% | 91% | 49% | 87% | 77% | 95% |
| 4 | 73% | 94% | 32% | 85% | 70% | 94% |
| 5 | 63% | 91% | 64% | 86% | 84% | 94% |

Process Water

Referring to Table 22, the measured quantities of sodium in the washing waters at the beginning and end of flotation (FLi and FLf), as well as in the froth water (FML), show good conservation of the salt concentration throughout the loops in the flotation cell. This same concentration for the froth washing waters (FMR) increases between loops 1 and 2 and then stabilizes above the saturation limit, which confirms the notion of controlling the salt quantities.

This hypothesis is validated by observing the sodium quantities (and therefore quantities of salt) in the rinsing waters of the soil after flotation. This step is performed by two rinsing steps with 250 ml of recycled water (FRP) and a third rinsing step using 250 ml of clear water (R3). The study of R3 shows that the portion of solubilized salt during the last rinsing with clear water remains very low over the loops. There is thus no accumulation of salt in the reject of the flotation (FS). It is the same observation for the evolution of this same concentration in the FRP waters.

TABLE 22

Concentration of sodium in the solid fractions of the process in g/L.

| | 1 | 2 | 3 | 4 | 5 |
|---|---|---|---|---|---|
| Fli | 130 | 123 | 126 | 120 | 125 |
| FLf | 126 | 122 | 112 | 124 | 120 |
| FML | 124 | 113 | 128 | 112 | 131 |
| FMR | 23 | 78 | 88 | 86 | 85 |
| Frec | 98 | 99 | 113 | 103 | 113 |
| FR3 | — | 20 | 9 | 9 | 15 |
| FRP | — | 45 | 54 | 57 | — |

Example 2

EXAMPLE 2 relates to an ex situ process that may be commercially operated on-site or off-site. The on-site option is generally preferred if there is a sufficient quantity to treat. Excavation and replacement of the treated soil generally accounts for 5 to 10% of the treatment cost when done in a reasonable manner. Mixed contamination, that is combined pollution of soils with lead (Pb) and PAHs, is widespread and problematic. For processes that have been proven and applied commercially, this kind of mixed contamination requires treatment using processes that are applied one after the other in a series of processes. Thus, PAHs are removed in a first process, for example a soil-washing system using a surfactant, and then the metals are solubilized in a second process, such as a chemical leaching step or mining processes. This process design is often costly in relation to contamination by only one kind of contaminant. Technologies for treating these two types of pollutants separately are relatively numerous, although decontamination in relation to PAHs with 4, 5 or 6 aromatic rings is far from easy.

This study analyzed the combination, in a single reactor, of extracting metals (mainly Pb) by chemical leaching and PAHs using a new non-toxic biodegradable surfactant. The main parameters are the choice of surfactant, the choice of acids and sequestering agents, the quantity of solids in the reactor, the temperature, the reaction time, the number of washing steps, the methods of recuperating the PAH-surfactant micelles and the various types of soils in terms of granulometry and composition (pH, organic matter content, etc.). Clayey soils will surely be treated in a different manner than sandy soils. Developing an economical simultaneous process will have the advantage of being able to treat mixed contaminations which are currently too costly to treat, in addition to the advantage of applying it to cases in which the contamination is simple (metals or PAH). This opportunity will considerably enlarge the market potential of such a technology. This study was focused on improving and "optimizing" the process including cycles of five loops (that is, with five steps of recirculating the effluents generated by the process). This embodiment of the process includes three distinct steps:

i) Step of attrition: this step is performed on the entirety of the granulometric fractions and is performed in order to eliminate the fine particles adsorbed on the coarse fractions by attrition, before separating these by screening at 2 mm.

ii) Step of flotation: this steps only applies to the treatment of the granulometric fractions below 2 mm and is performed in order to concentrate the organic contaminants of the PAH-type in the flotation froth (FM), and to solubilize the inorganic contaminants within the washing waters (FL) in the form of chloro-complexes. A unit for treating the effluents generated by flotation (ED or Pp according to the treatment mode that is applied) and a phase of rinsing the collected froth (FMRL), are also part of this step.

iii) Step of rinsing: this step applies to the soils produced by the flotation step in order to limit the traces of salt within this solid fraction (FS).

Attrition Step

The soil (AC~200 g humid) is obtained and placed in solution (1 L) with CAS surfactant at 0.2 g/L (Cocamydopropyl hydroxysultaine obtained from Chemron™). The container made of HDPE is closed and placed under agitation in a container for TCLP testing. After 10 min of agitation, the mixture is screened at 2 mm and rinsed with 1 L of clear water. The coarse fraction above 2 mm (AS) is then placed in a dryer at 60° C. over 24 h, and then analyzed for PAHs. Some Pb analyses on these fractions were also realized by Bodycote™ in Quebec. The suspension that is obtained (FC) is decanted. The decanted mud is placed in a dryer at 60° C. before being introduced into the flotation step in the next stage of treatment. The decantation waters (AL) are recuperated and recirculated to the beginning of the attrition for a new fraction of soil (AC).

The decantation steps are performed in graduated cylinders using Percol E-10 (obtained from CIBA™) at 1 g/L for a final concentration of 0.1 g/L and $FeCl_3$ (obtained from Eaglebrook Environment inc.). The addition of $FeCl_3$ facilitates decantation by initiating the formation of metallic flocks that are more easily decantable. The decantation varies with the type of material to decant, generally between 5 and 1 min, the slower decantations being those for the flotation froth.

Flotation Step

Flotation:

The flotation tests are performed on 100 g of dry soil, in a flotation cell (Denver lab-1™) of 1 L in volume, under agitation sequences of 15 min and flotation sequences of 5 min. The washing solution contains NaCl (EMD™) at 5.5 M and CAS at 0.2 g/L. The pH is set using sulfuric acid 18 M (EMD™) and is maintained throughout the washing steps where adjustment of the pH is desired. At the end of the treatment, the soil and the washing solution are separated by filtration on Whatman™ 934-AH membranes of 1.5 μm porosities. The number of sequential flotations that are applied vary between 1 and 6 according to the given soil and given test.

This process resulted in obtaining two solid phases and two liquid phases:
FS: Reject or decontaminated soil;
FM: Froth or flotation concentrates;
FL/R: Washing waters and combined rinsing and reject waters;
FMLR: Washing waters and froth rinsing waters.

Analyses of metals and PAHs are then performed on the solid fractions. The washing waters are analyzed for metals.

Effluent Treatment

Electrodeposition:

The effluents from the flotation step being loaded with NaCl, metals, CAS, and soil particles, a multitude of chemical and electrochemical reactions presented in Table 23, may occur within the electrochemical system. The metals are essentially reduced at the cathode, while chlorine gas emissions occur at the anode by oxidation of the chloride ions in the solution. Oxidation reactions and reduction reactions of the water and oxygen also occur, ensuring the formation $OH^-$ ions in the medium and therefore increasing the pH. Although no measurement of dry material or dissolved organic material was made in these effluents, it is not unreasonable, considering also the presence of CAS, to suppose that traces of these materials subsist in solution. Therefore, there may be competing oxidation and reduction reactions of organic matter.

The electrochemical cell is made of PVA (polyvinyl acetate) and has dimensions for receiving a set of 10 electrodes, each being spaced apart by 1 cm, and a total volume of 1.6 L. Each electrode has a specific surface of 220 $cm^2$. The system uses insoluble Ti/Pt anodes and iron cathodes inserted in the cell, and supplied by continuous current from a generator (Xantrex™ XFR40-70). Agitation is maintained in the system using a magnetic bar. Samples of 25 mL are removed over time and filtered through Whatman™ 934AH membranes. The redox potential (ORP) and the pH are measured while the waters are conditioned with 5% $HNO_3$ analyses of Pb and Na. Analyses of chlorides were also performed on some samples at the entrance and exit of the electrochemical treatment.

TABLE 23

Chemical and electrochemical reactions in the cell

| Reactions | Equations |
|---|---|
| Metal reduction | $M^{x+}_{(aq)} + xe^- \leftrightarrows M_{(s)}$ |
| H2O reduction | $2H_2O_{(l)} + 2e^- \leftrightarrows H_{2(g)} + 2OH^-$ |
| O2 reduction | $2H_2O_{(l)} + O_{2(g)} + 4e^- \leftrightarrows 4OH^-$ |
| H2O oxidation | $2H_2O_{(l)} \leftrightarrows O_{2(g)} + 4H^+_{(aq)} + 4e^-$ |
| Cl- oxidation | $2Cl^-_{(aq)} \leftrightarrows Cl_{2(g)} + 2e^-$ |
| Organic matter reduction | $HCOOH_{(aq)} + 2H^+ + 2e^- \leftrightarrows CH_3OH_{(aq)}$ |
|  | $HCOOH_{(aq)} + 2H^+ + 2e^- \leftrightarrows HCHO_{(aq)} + H_2O_{(l)}$ |
| Metal complexation | $MCl_y^{(x-y)-} + yOH^- \leftrightarrows MOH_y^{(x-y)-} + yCl_{(aq)}$ |

Precipitation:

Tests were done using NaOH 0.1 M, in order to precipitate metallic ions in solution in the form of metallic hydroxides, according to $M^{x+} + xOH^- \rightarrow M(OH)_x$. The effluents at the entrance of precipitation, called Ppi and Ppf at the exit of the treatment (respectively at pH 7.0 and 8.5 for test numbers 1 and 2), are sampled and an amount of 5% $HNO_3$ added before being analyzed by AAS. The NaOH was obtained from EMD™.

Analytical Methods:

These were substantially similar to the methods described hereinabove in EXAMPLE 1.

Results of the Complete AFE Process (Attrition, Flotation, Electrodeposition) on TR29

In this section, it is proposed to follow the process proposed during the tests realized in EXAMPLE 1, in loops for the treatment of the ensemble of the granulometric fractions, including a step of attrition comprising separation by screening at 2 mm, a step of flotation comprising rinsing the washed/floated fractions and an electrochemical treatment of the effluents thereby produced, as well as a rinsing step of the soil at the end of the process. This phase of testing applies uniquely to the treatment of TR29 and includes a series of six successive flotations. The process under study is presented in FIG. 33. The washing and rinsing waters of the froth, as well as the washing waters of the soil, respectively FML, FMR and FLf are sampled separately, before being mixed and introduced into the electrochemical treatment. Table 24 presents the quantities introduced into each loop (in g for the solids and in mL for the liquids).

Attrition Step

Although a significant reduction in the concentration of Pb is observed between the entrance and the exit of the attrition step, the fraction above 2 mm (AS) does not meet the regulatory requirements. Indeed, as presented in Table 25, this fraction, encompassed by a layer of fine particles, remains very contaminated with PAHs.

The attrition phase could be improved and optimized, for example, by increasing the number of sequences and the mode of attrition, in order to solubilize the fine fractions adsorbed on the coarse fractions larger than 2 mm.

Step of Flotation and Rinsing
Solid Fractions

As presented in Table 25, the reject (FS) satisfies the regulatory requirements, at the end of the first loop, for all of the PAHs under study, which is equivalent to reduction of 90% of the total PAHs and 95% of the Pb in the flotation step. On the other hand, it is difficult to ensure this same level of quality for the subsequent loops. Indeed, while the first loop enables a reduction of 90% in total PAHs, the calculated removal for the subsequent loops is situated between 32 and 64% (Table 26) and does not enable attaining the regulatory objectives. The removal of Pb decreases from 95 à 85% between loops 1 and 5 for the lone flotation step. The portion of Na detected in the reject (FS) remains very low throughout the loops: 0.7, 0.7, 0.8, 1.1 and 1.7 g/kg respectively for loops 1 to 5, which allows one to suppose good rinsing of this fraction at the volumes that were used for operation. The same element in the froth (FM) reveals a much better control of the volumes and modes of rinsing of the froth, in comparison to the tests that were realized on TR23, with contents reaching 5.9, 10.4, 42.3, 14.2 and 17.2 g/kg, respectively for the same loops.

This process, as operated, and as presented in Table 27, was not able to be validated. The mass balance of the system reports that, at this stage, only 47% of the initial mass of soil introduced into the head of the process, is decontaminated at the end of the treatment. 39% of this same initial mass, comprising the flotation froths (FM) and the fraction of soil above 2 mm (AS), remains too contaminated with PAHs and must be disposed of in toxic waste disposal centers. For loop 1 only, the soil at the end of the treatment contains 6% of PAHs and 3% of Pb that were initially present, resulting in this one satisfying the regulatory requirements. The recovery of material at 84% reflects the possible dissolving of mineral material during the treatment, but is also due to the laboratory scale of the experimentation (loss).

TABLE 24

Mass balance of the process during the treatments (AFE) on TR29

| Balance | Samples | Loops | | | | | Average |
|---|---|---|---|---|---|---|---|
| | | 1 | 2 | 3 | 4 | 5 | |
| Inputs | AC (g) | 190 | 190 | 190 | 190 | 190 | 200 |
| | NaCl (g) | 820 | 300 | 200 | 125 | 125 | 314 |
| | Cas (g) | 0.52 | 0.5 | 0.36 | 0.28 | 0.26 | 0.38 |
| | ALi (mL) | 2 000 | 2 000 | 2 000 | 2 000 | 2 000 | 2 000 |
| | $H_2SO_4$ (mL) | 2.5 | 3.5 | 3 | 3 | 2 | 2.8 |
| | PE-10 (mL) | 50 | 86 | 60 | 50 | 53 | 60 |
| | $FeCl_3$ (mL) | — | — | 0.8 | 0.6 | 0.6 | 0.7 |
| Intermediaries | FC (g) | 100 | 100 | 100 | 100 | 100 | 100 |
| | Fli1 (mL) | 950 | 950 | 950 | 950 | 950 | 950 |
| | Fli2 (mL) | 300 | 300 | 300 | 300 | 300 | 300 |
| | Fli3 (mL) | 300 | 300 | 300 | 300 | 300 | 300 |
| | Fli4 (mL) | 300 | 300 | 300 | 300 | 300 | 300 |
| | Fli5 (mL) | 300 | 300 | 300 | 300 | 300 | 300 |
| | Fli6 (mL) | 300 | 300 | 300 | 300 | 300 | 300 |
| | FLf (mL) | 650 | 810 | 650 | 640 | 530 | 656 |
| | FML | 1 660 | 1 500 | 1 500 | 1 600 | 1 600 | 1 570 |
| | FMR (mL) | 900 | 920 | 1 100 | 960 | 1 000 | 976 |
| | Edi (mL) | 3 130 | 3 160 | 3 060 | 3 120 | 3 020 | 3 100 |
| Outputs | AS (g) | 50.9 | 50.9 | 50.9 | 50.9 | 50.9 | 50.9 |
| | FS (g) | 59 | 60.8 | 61.9 | 59.6 | 63 | 60.9 |
| | FM (g) | 18.3 | 15.4 | 19 | 17.5 | 16.8 | 17.4 |
| | EDR (g) | 1.3 | 1.5 | 2.1 | 2.3 | 2.5 | 1.9 |
| | Edf (mL) | 3 040 | 3 120 | 3 000 | 3 040 | 2 980 | 3 040 |
| | RP (mL) | 780 | 1 100 | 1 380 | 1 600 | 1 870 | 1 350 |
| | Alf (mL) | 2 000 | 2 000 | 2 000 | 2 000 | 2 000 | 2 000 |
| Solid input | $AC_{calculated}$ (g)* | 132 | 132 | 132 | 132 | 132 | 132 |
| Solid output | FS + FM + EDR (g) | 130 | 129 | 134 | 130 | 133 | 131 |
| | Ratio (%) | — | 98% | 97% | 101% | 99% | 101% | 99% |

*$AC_{calculated}$ represents the portion of soil introduced at the head of the process for meeting the conditions of the flotation that was used (d = 10%).
A quantity AC > $AC_{calculated}$ is in fact introduced in order to ensure sampling of the matrix at the entrance of the flotation step.

TABLE 25

Characteristics of the solid fractions after treatment (AFE) on TR29

| Steps of the process | Types | Loops | Mass (g) | PAH[a] (mg/kg dry) | Pb[a] (mg/kg dry) | Na (g/kg dry) | pH[a] |
|---|---|---|---|---|---|---|---|
| Attrition | AC | Average | 193 | 2 860 | 498 | — | 8.4 |
| | | Standard deviation | 0 | 469 | 40 | — | 0.0 |
| | | CV | 0% | 16% | 8% | — | 0% |
| | | Nb | 5 | 5 | 5 | — | 5 |
| | AS | 1 | 50.9 | 3 190 | 47 | — | 8.8 |
| | | 2 | 50.9 | 5 480 | 150 | — | 8.8 |
| | | 3 | 50.9 | 2 200 | 170 | — | 8.6 |
| | | 4 | 50.9 | 2 980 | 120 | — | 8.5 |
| | | 5 | 50.9 | 4 110 | 170 | — | 8.6 |
| Flotation | FC | Average | 97 | 2 900 | 452 | 0.4 | 8.4 |
| | | Standard deviation | 0 | 190 | 42.7 | 0.1 | 0.0 |
| | | CV | 0% | 7% | 9% | 12% | 0% |
| | | Nb | 5 | 5 | 5 | 5 | 5 |
| | FS | 1 | 59.0 | 402 | 33 | 0.7 | 8.9 |
| | | 2 | 60.8 | 1 820 | 54 | 0.7 | 8.6 |
| | | 3 | 61.9 | 2 060 | 80 | 0.8 | 7.2 |
| | | 4 | 59.6 | 2 840 | 96 | 1.1 | 8.5 |
| | | 5 | 63.0 | 1 420 | 89 | 1.7 | 8.0 |
| | FM | 1 | 18.3 | 10 400 | 530 | 5.9 | 8.4 |
| | | 2 | 15.4 | 7 300 | 640 | 10.4 | 6.5 |
| | | 3 | 19.0 | 3 820 | 530 | 42.3 | 5.4 |
| | | 4 | 17.5 | 6 750 | 590 | 14.2 | 6.0 |
| | | 5 | 16.8 | 6 820 | 610 | 17.2 | 5.4 |

TABLE 26

Reduction (%) of PAH and Pb on FS for flotation step during the loops TR29

| | Flotation | |
|---|---|---|
| Loops | ΣPAH | Pb |
| 1 | 90 | 95 |
| 2 | 56 | 92 |
| 3 | 49 | 87 |
| 4 | 32 | 85 |
| 5 | 64 | 86 |

TABLE 27

Mass balance of different fractions of the process (AFE) for loop 1

| | Mass (g) | PAH (mg/kg) | Pb (mg/kg) |
|---|---|---|---|
| Entering soil into the process (AC) | 193 | 2 860 | 498 |
| Soil >2 mm (AS) | 51 | 3 590 | 152 |
| Soil <2 mm (FS) | 86 | 402 | 33 |
| Flotation concentrate (FM) | 25 | 10 420 | 530 |
| % recuperation | 84% | 86% | 25% |
| % decontaminated | 45% | 6% | 3% |
| % for disposal* | 39% | 80% | 22% |

*This value includes fractions AS and FM which at these operating conditions remain contaminated with PAH.

Process Waters

The measured Na content in the washing waters at the beginning and the end of flotation (FLi and FLf), as well as the froth liquids (FML), show good maintenance of salt concentration over the loops in the flotation cell (Table 28). The same concentrations in the froth rinsing waters (FMR) increase between loops 1 and 2 and then stabilize above the saturation limit, confirming the notion of good control of salt content. This hypothesis is validated by the observation of the Na levels (and therefore salt levels) in the soil rinsing waters after flotation. This step is performed by two rinsing sub-steps using 250 mL of recirculated water (RP) and a third rinsing step using 250 mL of clear water (R3). The study of R3 shows that the portion of solubilized salt during the last rinsing step with clear water remains very low over the loops. There is therefore no accumulation of salt in the flotation reject (FS). This is the same for the evolution of this same concentration in the RP waters.

TABLE 28

Concentration (g/L) in Na of the liquid fractions of the process (AFE) on TR 29

| | Loops | | | | |
|---|---|---|---|---|---|
| Fractions | 1 | 2 | 3 | 4 | 5 |
| Fli | 130 | 123 | 126 | 120 | 125 |
| FLf | 126 | 122 | 112 | 124 | 120 |
| FML | 124 | 113 | 128 | 112 | 131 |
| FMR | 23 | 78 | 88 | 86 | 85 |
| FRes | 98 | 99 | 113 | 103 | 113 |
| R3 | — | 20 | 9 | 9 | 15 |
| RP | — | 45 | 54 | 57 | — |

Discussion

The results presented for the attrition step show that it does not decontaminate the soil that is introduced since the PAH contents are very similar between the entrance and the exit of the treatment. At this stage, this step is more like a step of separation at 2 mm, than a veritable treatment step. TR29, which is very rich in organic material, takes the form of agglomerates of fine particles, highly contaminated with PAH, on the coarser fractions. At the volumes and concentrations of CAS that were used, it does not seem improbable that the aqueous phase is rich in suspended material. Thus, it is proposed to improve this step by increasing the number of attrition steps, while recirculating the washing waters.

The mass balance of salt quantities in the process reveals rather good management of the rinsing volumes used on the soil fractions at the end of the process (FS) and the flotation froth (FM). Although traces still remain in the soil at the end of the process, these quantities are still quite minimal. The quantities of salt (of Na) in the FM is more significant (up to 17.2 g/kg in loop 5). This step could be improved, thus reducing the associated costs. Indeed, it is preferable to limit the mass of this fraction, which is destined for disposal at a toxic waste center or incineration. The accumulation of salt in this fraction has economic repercussions on the cost of the process.

A hypothesis is suggested to explain the decreased efficiency of the process over the loops. The possible presence of CAS molecules in the solubilization of particulate mass in the form of dissolved material would limit the portion of macromolecules available in solution for the solubilization and flotation of PAHs, and consequently, would reduce the efficiency of the flotation step. For this reason, it is proposed to use a number of successive flotation steps above two flotations, the "optimal" number to be evaluated during preliminary tests. For example, for TR23 for which $n_{opt}=3$ ($n_{opt}$ is the number of successive flotations to be applied to obtain a reduction in contaminants that respects the regulatory limits), it would be proposed to use a number $n_{eff}=5$ ($n_{eff}=n_{opt}+2$) of successive flotations on the same soil sample for the loops subsequent to the first loop. For TR29, $n_{opt}=6$, one would have to use up to eight successive flotations to have an assumed decontamination of the material. If this hypothesis is verified, an "optimization" of the process over the loops by increasing the number of flotation steps, could not be considered feasible, on account of the associated economic repercussions on the cost of the process.

Therefore, it is proposed to pursue a test of supplementary loops on TR23, "optimizing" the attrition phase by repetition of this step and the flotation phase by applying the number of successive flotations n=3 in loop 1, and n=5 for the following loops.

Results of the Complete AFE Process (Attrition, Flotation, Electrodeposition) on TR23

This phase of testing concerns the treatment of TR23. The process under study is presented in FIG. 34. Table 29 presents the quantities introduced into each loop (in g for the solids and mL for the liquids). While the first loop uses a succession of three flotations, the subsequent loops use five successive flotations.

Solid Fractions

Figure 35:
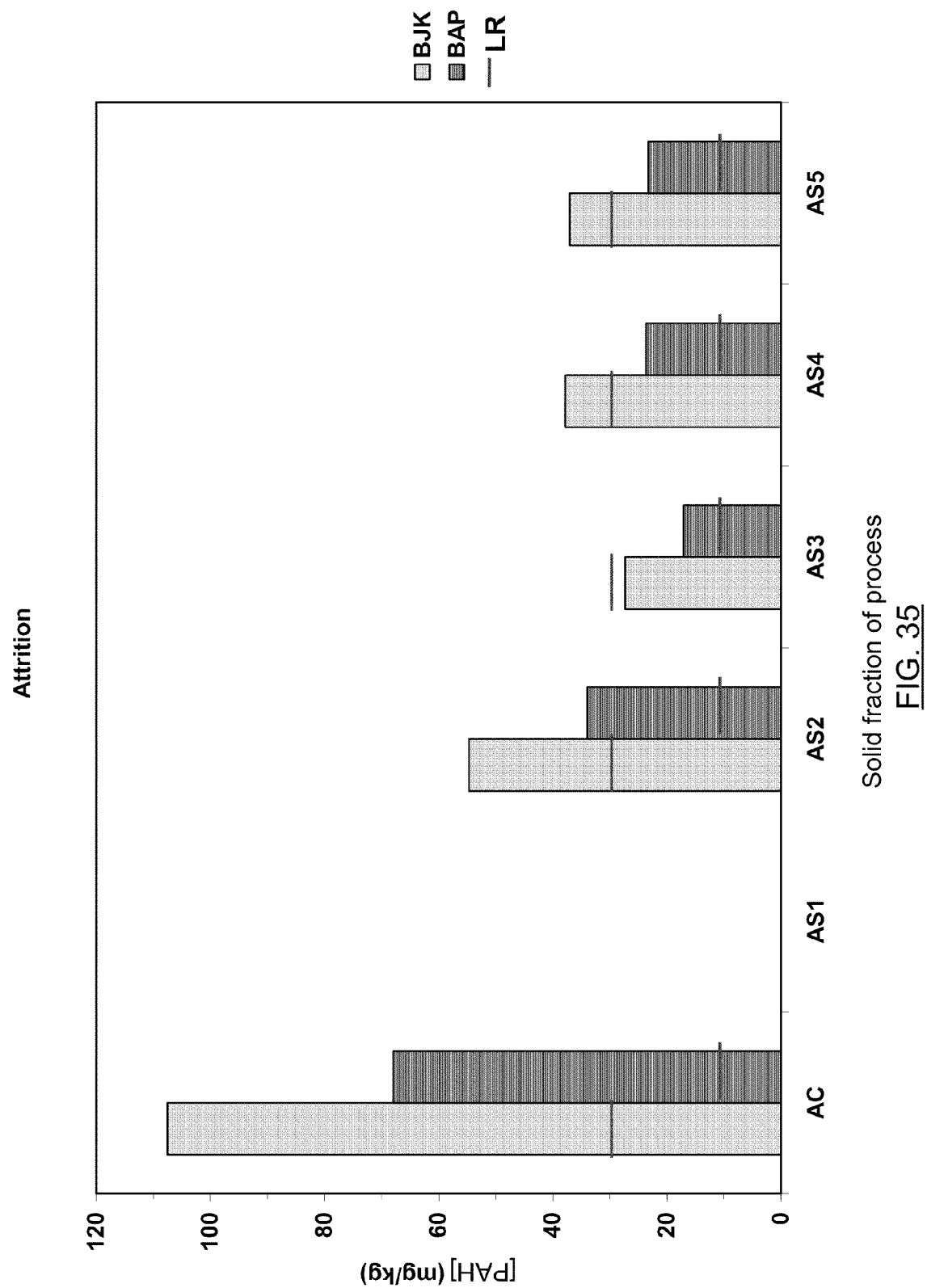
FIG. 35 presents graphs showing the quantities of BJK and BAP in mg/kg of the fractions of soil at the entrance and exit of the process for the steps of attrition and flotation over the loops.
Figure 35:
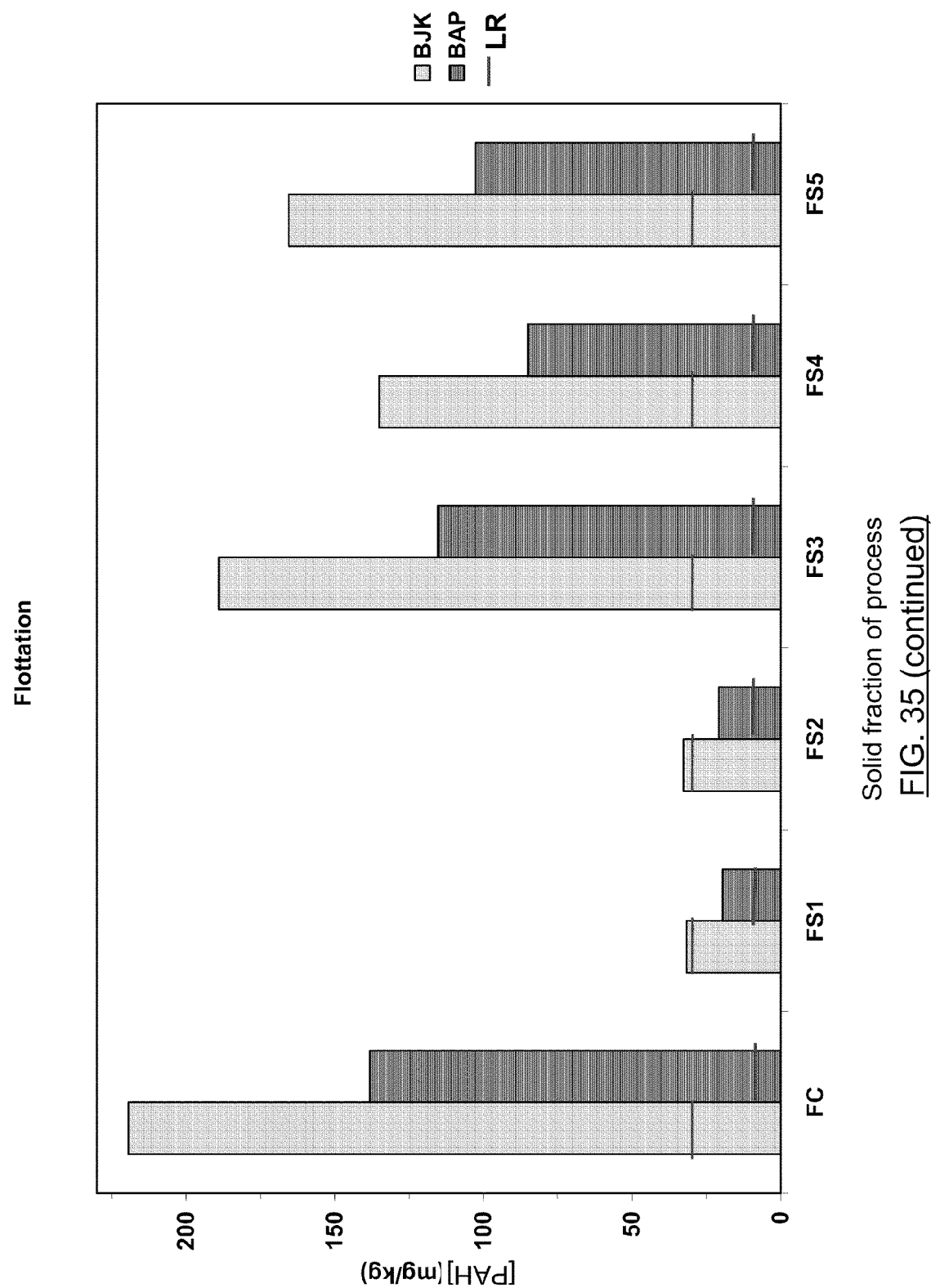
Figure 36:
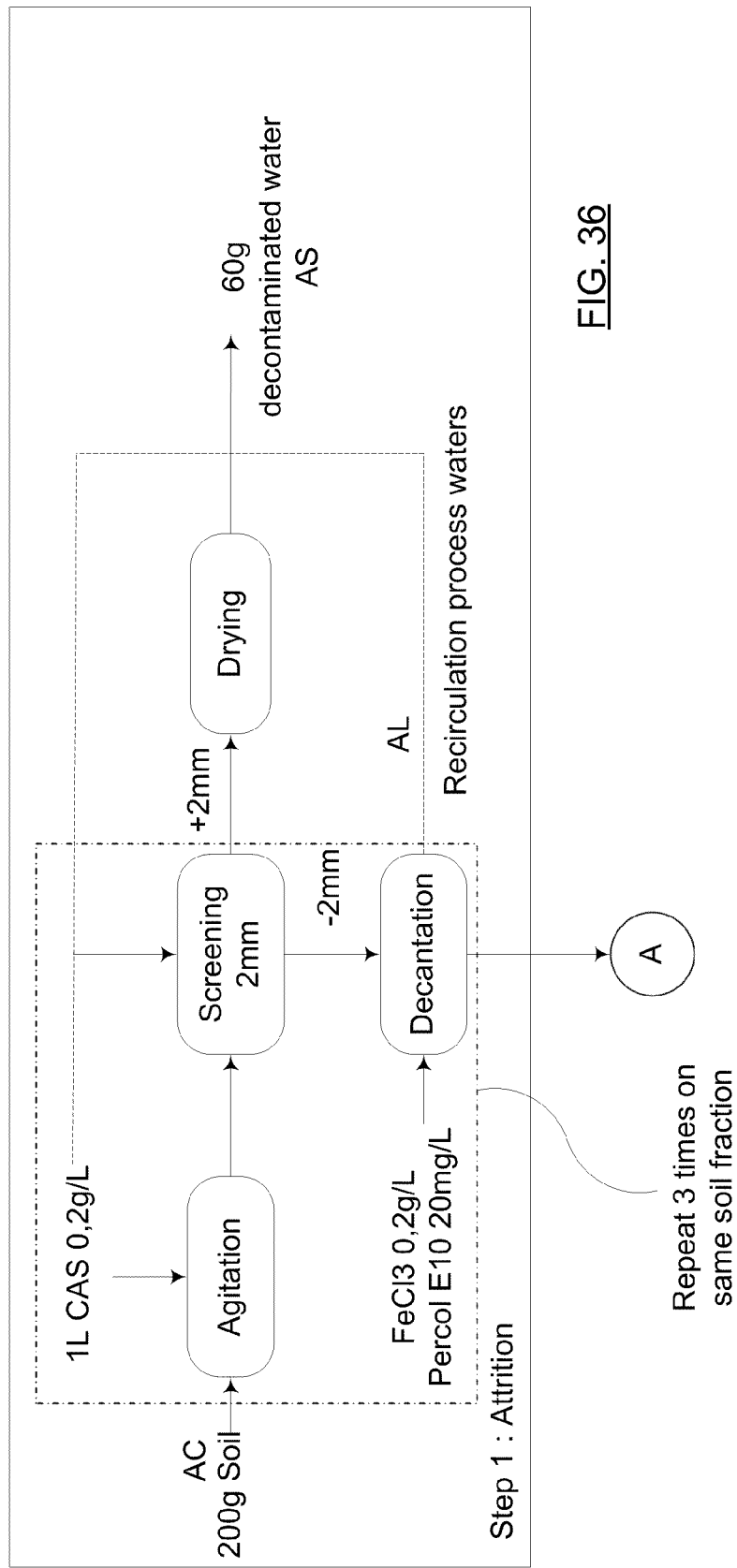
FIG. 36 is a process schematic (AFP) applied to TR23, according to an embodiment.
Figure 36:
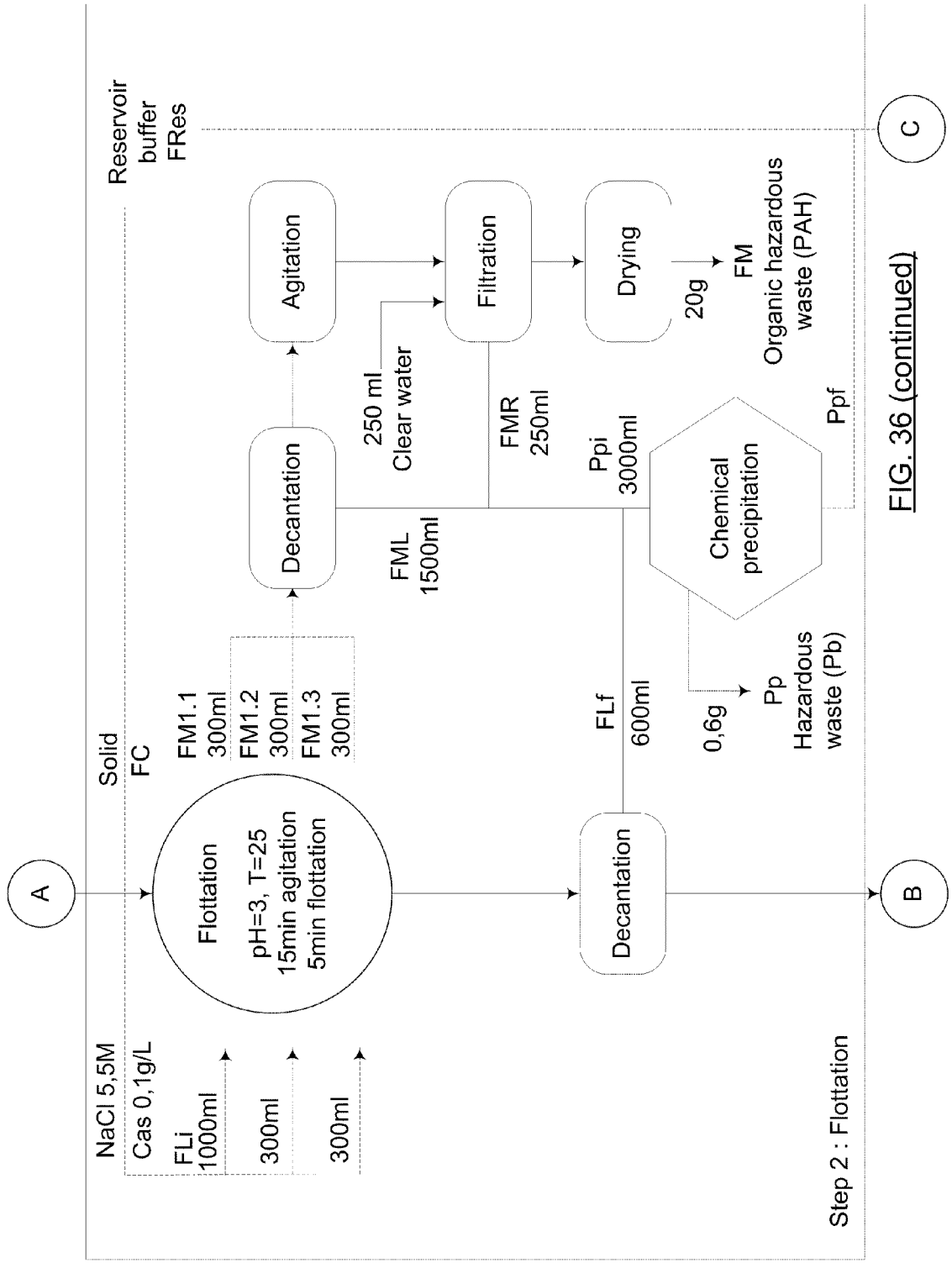
Figure 36:
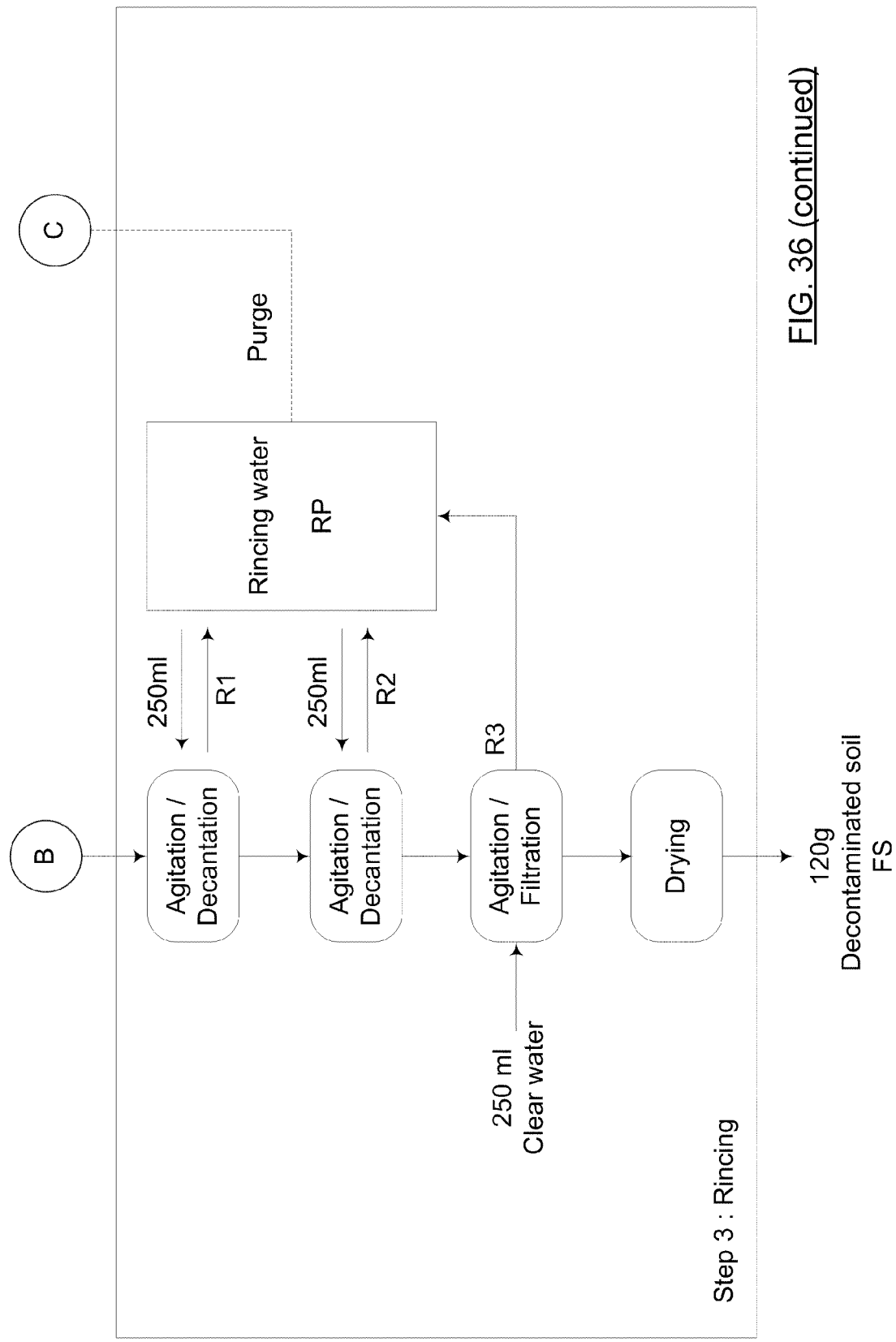

In light of the results (AS) presented in Table 30 and FIG. 35, an overall improvement in the attrition phase is apparent since, while the fraction above 2 mm is not always brought below the LR, the PAH contents stay very close to these limits, and this, throughout the loops. Comparatively, the efficiency of the flotation step is not constant over loops 3, 4 and 5, concerning the PAH contents in FS, well above LR for these loops. For Pb, the two solid fractions AS and FS are decontaminated at the end of the process, respectively at 520 and 409 mg/kg. Trace amounts of salt seem to persist in the fraction below 2 mm at the end of the process, which has Na concentrations around 2 times those at the entrance. Table 31 presents the reductions in total PAH and Pb, calculated for the solid fraction FS for the only flotation step. Thus, while the removal of Pb stays constant 79% and 84% respectively for loops 1 and 5, the reduction in PAH content diminishes from 91% to 54% for these same loops. The efficiency of the process in relation to PAH removal ensures a removal of 90% in the second loop.

TABLE 29

Mass balance of the process over the treatments (AFE) on TR23

| Balance | Identifier | Loops | | | | | |
| --- | --- | --- | --- | --- | --- | --- | --- |
| | | 1 | 2 | 3 | 4 | 5 | Average |
| Inputs | AC (g) | 186 | 186 | 186 | 186 | 186 | 186 |
| | NaCl (g) | 520 | 180 | 120 | 80 | 50 | 190 |
| | Cas (g) | 0.30 | 0.20 | 0.06 | 0.10 | 0.10 | 0.15 |
| | H$_2$SO$_4$ (mL) | 10.0 | 9.5 | 9.0 | 9.0 | 9.0 | 9.3 |
| | PE-10 (1 g/L) (mL) | 28 | 53 | 37 | 35 | 32 | 37 |
| Intermediaries | FC (g) | 100 | 100 | 100 | 100 | 100 | 100 |
| | Fli1 (mL) | 950 | 950 | 950 | 950 | 950 | 950 |
| | Fli2 (mL) | 300 | 300 | 300 | 300 | 300 | 300 |
| | Fli3 (mL) | 300 | 300 | 300 | 300 | 300 | 300 |
| | Fli4 (mL) | 300 | 300 | 300 | 300 | 300 | 300 |
| | Fli5 (mL) | 300 | 300 | 300 | 300 | 300 | 300 |
| | FLf (mL) | 580 | 600 | 540 | 630 | 540 | 578 |
| | FML | 780 | 1 000 | 1 500 | 1 200 | 1 000 | 1 096 |
| | FMR (mL) | 525 | 830 | 250 | 620 | 900 | 625 |
| | EDi (mL) | 1 620 (+180) | 1 600 (+790) | 1 600 (+650) | 1 600 (+850) | 1 600 (+840) | — |
| Outputs | AS (g) | 75.4 | 75.4 | 75.4 | 75.4 | 75.4 | 75.4 |
| | FS (g) | 60.6 | 58.3 | 59.3 | 57.5 | 59.6 | 59.1 |
| | FM (g) | 25.3 | 37.8 | 44.8 | 38.4 | 45.3 | 38.3 |
| | EDR (g) | 0.6 | 0.6 | 0.6 | 0.6 | 0.6 | 0.6 |
| | EDf (mL) | 1 620 | 1 600 | 1 580 | 1 600 | 1 580 | 1 600 |
| | FRes | 1 740 | 2 300 | 2 300 | 2 300 | 2 300 | 2 190 |
| | RP (mL) | 1 120 | 9 50 | 1 020 | 1 220 | 1 620 | 1 186 |
| Solid inputs | ACcalculated | 175 | 175 | 175 | 175 | 175 | 175 |
| Solid outputs | FS + FM + EDR | 162 | 172 | 180 | 172 | 181 | 173 |
| Ratio (%) | — | | 93% | 98% | 102% | 97% | 101% | 98% |

TABLE 30

Characteristics of the solid fractions after treatment (AFE) on TR23

| Process steps | Types | Loops | Mass (g) | PAH (mg/kg dry) | Pb (mg/kg dry) | Na (g/kg dry) |
| --- | --- | --- | --- | --- | --- | --- |
| Attrition | AC | Average | 200 | 906 | 1 260 | 598 |
| | | Standard deviation | 0 | 188 | 84 | 26 |

TABLE 30-continued

Characteristics of the solid fractions after treatment (AFE) on TR23

| Process steps | Types | Loops | Mass (g) | PAH (mg/kg dry) | Pb (mg/kg dry) | Na (g/kg dry) |
|---|---|---|---|---|---|---|
| | | CV | 0% | 21% | 7% | 4% |
| | | Nb | 5 | 4 | 3 | 3 |
| | AS | 1 | 86.6 | 4 | 520 | — |
| | | 2 | 106 | 528 | — | — |
| | | 3 | 91.5 | 290 | — | — |
| | | 4 | 94.6 | 324 | — | — |
| | | 5 | 99.4 | 323 | — | — |
| Flotation | FC | Average | 100 | 1 709 | 1 410 | 0.8 |
| | | Standard deviation | 0 | 110 | 63 | 0.1 |
| | | CV | 0% | 6% | 4% | 11% |
| | | Nb | 5 | 4 | 4 | 4 |
| | FS | 1 | 60.6 | 268 | 486 | 1.7 |
| | | 2 | 58.3 | 293 | 381 | 1.9 |
| | | 3 | 59.3 | 1 470 | 362 | 1.2 |
| | | 4 | 57.5 | 1 064 | 423 | 1.2 |
| | | 5 | 59.6 | 1 310 | 391 | 1.1 |
| | FM | 1 | 25.3 | 4 880 | 928 | 4.6 |
| | | 2 | 37.8 | 3 360 | 555 | 6.6 |
| | | 3 | 44.8 | 1 760 | 437 | 13.4 |
| | | 4 | 38.4 | 2 220 | 722 | 17.9 |
| | | 5 | 45.3 | 1 880 | 610 | 17.2 |

While the Pb concentration in the flotation froth (FM) stays quasi-constant over the loops, the PAH diminishes considerably for these same loops, reflecting the non-efficiency of the flotation step in relation to the removal of the latter. The Na concentrations also indicate a non-negligible accumulation of salt in this fraction, the Na content going from 4.6 à 17.2 g/kg respectively for loops 1 to 5, for an initial concentration of 0.8 mg/kg at the entrance to the flotation.

Table 32 presents the results obtained for PAH and Pb in loop 1: the recuperation of material is estimated at 90%, with 78% of decontaminated material, 13% waste destined for disposal or incineration, and 0.3% in the form of metallic deposit that can be revalorized by industry. The portion of contaminants present in the decontaminated soil at the end of the process (AS+FS) contain respectively 9% and 31% of the PAH and Pb initially present in the soil at the top of the process (AC). The process leads to the production of a waste product, in about 13% mass, from the flotation froth (FM), in which respectively 67% and 9% of the initial PAH and Pb are concentrated. The re-valorization of the concentrated Pb can be considered economically feasible starting from content around 5%, for example via a lead smelting.

Process Waters

According to the salt quantities and the operating water volumes presented in Table 29, the salt concentrations at the entrance to the flotation are maintained between 5 and 6 M during the five loops. The stability of the salt concentration appears clearly from the measurements of the Na concentrations in the process waters before the rinsing steps (Table 38). Samples FLi, FLf, FML, EDi, EDf, and FRes present similar concentrations over the loops which do not represent salt accumulation in the process waters.

TABLE 31

Reduction (%) of PAH and Pb for flotation steps over the loops on TR23

| | Flotation | |
|---|---|---|
| Loops | ΣPAH | Pb |
| 1 | 91% | 79% |
| 2 | 90% | 84% |
| 3 | 49% | 85% |
| 4 | 64% | 83% |
| 5 | 54% | 84% |

TABLE 32

Mass balance of different fractions of the process (AFE) in loop 1

| | Mass (g) | PAH (mg/kg) | FLR (mg/kg) | BJK (mg/kg) | BAP (mg/kg) | Pb (mg/kg) |
|---|---|---|---|---|---|---|
| Entering soil into the process (AC) | 200 | 906 | 143 | 108 | 68 | 1 263 |
| Soil > 2 mm (AS) | 96 | 4 | 1 | 0 | 0 | 520 |
| Soil < 2 mm (FS) | 59 | 268 | 50 | 32 | 20 | 486 |
| Flotation concentrate (FM) | 25 | 4879 | 794 | 683 | 382 | 928 |
| Metallic concentrate (EDR) | 0.6 | — | — | — | — | 91 000 |
| Level of recuperation | 90% | 76% | 80% | 88% | 79% | 62% |
| Proportion in decontaminated soil | 78% | 9% | 11% | 9% | 9% | 31% |
| Proportion in froth for disposal* | 13% | 67% | 69% | 79% | 70% | 9% |
| Metallic revaluation level | 0.3% | — | — | — | — | 22% |

*This value does not include the fraction FM, in the operating conditions, remained contaminated with PAH.

The portion of salt measured in the waters of the third soil rinsing step, realized using clear water, remains very low ([Na]=10 g/L in loop 5), confirming good rinsing of this fraction. The elimination of traces of residual salt in the soil at the end of the process could be performed by a longer rinsing and agitation time. The same concentration of Na does not reach more than 25 g/L in the second reservoir of the soil rinsing waters (RP) in loop 5. The froth rinsing waters, realized using clear water, present higher concentrations between 25 and 82 g/L. Thus, in light of these quantities, it seems that while the operating volumes are sufficient to limit the accumulation of salt in this fraction, good agitation during the rinsing step could improve these results.

TABLE 33

Concentration (g/L) of Na in the liquid fractions of the process (AFE)

| Fractions | Loops | | | | |
|---|---|---|---|---|---|
| | 1 | 2 | 3 | 4 | 5 |
| FLi | 132 | 128 | 111 | 115 | 102 |
| FLf | 120 | 98 | 115 | 106 | 115 |
| FML | — | 113 | 116 | 120 | — |
| FMR | 55 | 82 | 25 | 69 | 79 |
| Edi | 98 | 97 | 105 | 114 | 96 |
| Edf | 98 | 97 | 104 | 110 | 106 |
| FRes | — | 97 | 101 | 99 | 97 |
| R3 | 2 | 5 | 11 | 10 | 10 |
| RP | 13 | 16 | 17 | 20 | 25 |

Measurements of the redox potential, presented in Table 34, inform on the oxidating state of the medium. Thus, an overall increase in the redox potential is seen during the electrochemical treatment, going from 268 to 844 mV in loop 1, and saturating around this same value for the different liquid fractions in subsequent loops.

TABLE 34

Study of redox potential (in mV) over the loops in different liquid fractions of the process (AFE)

| | Redox potential | | | | |
|---|---|---|---|---|---|
| | 1 | 2 | 3 | 4 | 5 |
| FLi | 500 | 783 | 855 | 865 | 882 |
| FLf | 278 | 387 | 710 | 681 | 953 |
| FML | 280 | 375 | 713 | 686 | 964 |
| FMR | 276 | 383 | 665 | 611 | 965 |
| EDi | 268 | 442 | 696 | 679 | 960 |
| EDf | 844 | 825 | 850 | 883 | 869 |
| FRes | 886 | 839 | 888 | 873 | 870 |

Chlorine emissions are observed at the anodes of the electrochemical treatment cell resulting from emissions generated by oxidation of chloride ions into chlorine gas according to Equation 2. The increase in redox potential arises from the chlorine emission reactions (Equation 2), with hydroxide ions coming from the reduction of water (Equation 3), which generate the production of hypochlorite ions ($ClO^-$) according to Equation 4. At pH7, these hypochlorite ions are mostly present in the form of hypochlorous acid (HClO). At more acidic pH, the hypochlorous acid dissociates into chlorine gas according to Equation 5. Reduction reactions of this acid can also arise according to Equation 6. Sulfates that may be present can also be oxidized into peroxodisulfuric acid according to Equation 7. HClO and $H_2S_2O_8$ are strong oxidants capable of degrading the chemical structure of organic compounds.

$$2Cl^- \leftrightarrow Cl_{2(g)} + 2e^- \quad E_0 = 1.36\ V \quad \text{Equation 2}$$

$$4H_2O_{(l)} + 4e^- \leftrightarrow 2H_{2(g)} + 4OH^-_{(aq)} \quad E_0 = 0\ V \quad \text{Equation 3}$$

$$Cl_2 + 2(Na^+ + OH^-) \rightarrow (Na^+ + ClO^-) + (Na^+ + Cl^-) + H_2O \quad \text{Equation 4}$$

$$HClO + H^+ + Cl^- \leftrightarrow Cl_2 + H_2O\ \text{at pH3} \quad \text{Equation 5}$$

$$HClO + H_3O^+ + 2e^- \leftrightarrow Cl^- + 2H_2O \quad \text{Equation 6}$$

$$S_2O_8^{2-} + 2e^- \leftrightarrow 2SO_4^{2-} \quad \text{Equation 7}$$

This oxidizing strength, associated with the occurrence of hypochlorous acid, could be at the origin of the inefficiency of the process during the recirculation of the waters. Indeed, although the nature of the froth does not change during the flotation after recirculation of the waters, it does not seem unreasonable to suppose that the hypochlorous acid could be causing oxidation of the CAS surfactant or causing a simple inhibition of its capacity to solubilize the organic material. It should be noted, as presented in Table 34 and according to the results in Table 30, that the good results of PAH removal were pursued in loop 2 while the redox potential for these washing waters FLf and FML in these same loops reduced to values neighboring those in loop 1. This decrease in the redox potential results from the introduction of water, coming from RP (therefore not submitted to electrochemical treatment), conditioned at 5.5 M in NaCl and 0.2% w/w in CAS, on account of the application of the fourth and fifth flotation sequences starting at loop 2. Since these two last sequences are realized in a non-oxidized medium, the efficiency was able to be maintained over this loop.

Discussion

Regarding this follow-up test of the complete process using five cycles for the treatment of TR23, although it could not be fully validated at this stage, presents interesting results. The attrition step was improved such that the totality of the fraction above 2 mm was brought within the current regulatory limits. In the first loop, the recuperation of material is estimated to be 90%, with 77.5% decontaminated material, 12.5% ultimate waste material destined for disposal or incineration, and 0.3% in the form of metallic deposits that are potentially revaluated by industry.

At the operating rinsing volumes, traces of salt seem to subsist in the fraction below 2 mm at the end of the process which presents Na concentrations approximately two times those at the entrance. These quantities remain, however, relatively low compared to the Na content in other soils that have been studied. Increasing the contact time during the rinsing steps should respond to this shortcoming.

The non-reproducibility of the good removal results of PAH over the loops, during the flotation step, seems to arise from the state of the process waters at the exit of the electrochemical treatment. Indeed, the measurement of the redox potential of the process waters revealed a significant increase in the oxidating potential of the washing solution at the exit of the electrodeposition, and therefore at the beginning of the process in loops 2, 3, 4 and 5. Considering the elements present in the medium, and the observations made in the laboratory, in terms of the odors and the reactivity of the medium during the experiments, oxidation of the chloride ions into hypochlorous acid does occur and is responsible for the increase in redox potential.

At the operating salt concentrations, that is at 5.5 M, it is probable that the activity of the medium inhibits the surfactant's capacity to solubilize the organic material. While no reduction in frothing capacity was observed during the flotations performed at high redox potential, the reduction in PAH solubilization capacity is evident. Looking at the below formula, presenting the formula of CAS, it is highly probable that the polar group $SO_3^-$ at the head of the surfactant is oxidized to $SO_2$ gas, or solubilized in the medium in the form of $SO_3^{2-}$ or $SO_4^{2-}$. The degradation could also occur higher in the molecule at the level of the amine group. Whether or not the degradation of CAS is occurring, it is evident that the activity of the medium causes a different behavior in its hydrophilic-lipophilic balance, which is at the origin of its PAH mobilization properties.

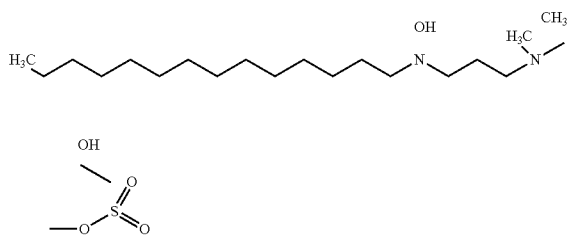

Chemical Formula of CAS

The formation of hypochlorous acid is without question at the source of the inactivation of CAS over the recirculation loops of the electrochemical waters. A material that is less and less contaminated with PAH is floated over the loops, which shows that the surfactant is probably not degraded in its hydrophobic portion.

One alternative to conserve the process as presently presented, could be to reduce the electrodeposition time. Indeed, the hypochlorous acid forms on account of the production of hydroxide OH⁻ ions at the cathode during the reduction of water. It was seen, in the second part of the results dedicated to studying this process, that the kinetics of the electrodeposition of Pb are rapid and according to the current and the treatment, it is possible to recuperate the effluents partially decontaminated at low pH, supposedly at low concentrations of HClO. It also seems possible to regenerate the medium by reducing the hypochlorous acid by using reducing salts, for example, sulfite/bisulfite-type salts.

Another aspect may curb the use of electrodeposition for the treatment for the generated effluents. Coagulation of metallic hydroxide occurs and increases the mass of material for disposal. The decantation steps occasionally use ferric chloride for facilitating and/or accelerating the separation. The metallic cations, essentially $Fe^{2+}$, can complex according to Equation 8, with hydroxide ions in solution, resulting in reduction reactions with water. These complexes agglomerate (Equation 9) and precipitate by density, co-precipitating by metallic pollutants in solution (Equation 10). The last test using loops on TR23 caused the production of metallic mud in an amount of 11 g/kg of treated soil (AC) which would increase the ratio destined for disposal presented in Table 15 from 12.5% to 13.6%.

$$Fe^{2+}+2OH^- \rightarrow Fe(OH)_2 \qquad \text{Equation 8}$$

$$Fe(OH)_2+Fe(OH)_2 \rightarrow (HO)Fe\text{—}O\text{—}Fe(OH)+H_2O \qquad \text{Equation 9}$$

$$HPbCl_{(aq)}+(HO)Fe\text{—}O\text{—}Fe(OH) \rightarrow Pb\text{—}OFe\text{—}O\text{—}Fe(OH)+H_2O \qquad \text{Equation 10}$$

One last aspect leads one to reconsider whether to use electrochemical means for the regeneration of the effluents at the operating saline conditions. The gas emissions ($Cl_2$ and $SO_2$) are noxious and dangerous, and require the installation of treatment units for treating these gases. Such an undertaking is a source of risk, and is also a source of increasing the costs of the process. It is possible that a much shorter electrodeposition time could overcome these drawbacks. Tests would have to be pursued in this regard. It would be also encouraged to study chemical precipitation.

Results of the Complete AFP Process (Attrition, Flotation, Precipitation) on TR23

First Test—Precipitation at pH7

In this section, it is proposed to use the process on TR23 and applying effluent treatment using chemical precipitation instead of an electrochemical treatment. The process under study is presented in FIG. 36. Table 35 presents the quantities introduced into each loop (in g for solids and in mL for the liquids). Three successive flotations are used for the five loops that were performed. The waters emitted from the froth (FML) and the froth rinsing waters (FMR) are combined to form a single effluent called FMLR. The precipitation pH of Pb is set at 7.

Attrition Step

In light of the results (AS) presented in Table 36 and FIG. 37, the attrition phase has been "optimized" since the PAH quantities in the fraction above 2 mm, are lowered below the LR in force in Quebec and this over all of the loops. Thus, the removal levels of PAHs (calculated as the concentration reduction between the soil fraction entering attrition (AC) and the soil fraction above 2 mm exiting attrition (AS)), presented in Table 37, attain respectively 93%, 80%, 63%, 85% and 99% for loops 1, 2, 3, 4 and 5. A removal of 59% of Pb is calculated for an initial concentration (AC) of 1 263 mg/kg and a final concentration of 598 mg/kg in the fraction above 2 mm (AS), thus making this coarse fraction satisfy the regulatory requirements. The attrition as operated ensures decontamination of the coarse fraction above 2 mm, which is 33% of the initial mass of the soil introduced into the attrition step (Table 38).

TABLE 35

Mass balance of the process over the treatments (AFP) on TR23

| Balance | Identifier | Loops 1 | 2 | 3 | 4 | 5 | Average |
|---|---|---|---|---|---|---|---|
| Inputs | AC (g) | 186 | 186 | 186 | 186 | 186 | 186 |
|  | NaCl (g) | 520 | 100 | 60 | 50 | 40 | 190 |
|  | Cas (g) | 0.7 | 0.2 | 0.1 | 0.2 | 0.1 | 0.2 |
|  | $H_2SO_4$ (mL) | 7.5 | 10 | 10 | 7.5 | 10 | 9 |
|  | NaOH (mL) | 17.3 | 18.2 | 17 | 18.5 | 16.3 | 17.5 |
|  | PE-10 (1 g/L) (mL) | 30 | 14 | 8 | 8 | 7 | 13.4 |
| Intermediaries | FC (g) | 100 | 100 | 100 | 100 | 100 | 100 |
|  | Fli1 (mL) | 950 | 950 | 950 | 950 | 950 | 950 |
|  | Fli2 (mL) | 300 | 300 | 300 | 300 | 300 | 300 |
|  | Fli3 (mL) | 300 | 300 | 300 | 300 | 300 | 300 |
|  | FLf (mL) | 600 | 460 | 420 | 480 | 600 | 512 |
|  | FMLR | 1 140 | 1 160 | 1 220 | 1 200 | 1 220 | 1 188 |
|  | Ppi (mL) | 1 660 | 1 640 | 1 640 | 1 690 | 1 800 | 1 686 |
| Outputs | AS (g) | 61 | 61 | 61 | 61 | 61 | 61 |
|  | FS (g) | 62.3 | 73.3 | 77.2 | 73.0 | 75.9 | 72.3 |

TABLE 35-continued

Mass balance of the process over the treatments (AFP) on TR23

| Balance | Identifier | Loops 1 | 2 | 3 | 4 | 5 | Average |
|---|---|---|---|---|---|---|---|
| | FM (g) | 28.5 | 28.7 | 27.7 | 29.4 | 30.5 | 29.3 |
| | Pp (g) | | | 0.31 | | | 0.31 |
| | Ppf (mL) | 1 640 | 1 640 | 1 660 | 1 680 | 1 800 | 1 680 |
| | FRes | 1 640 | 1 640 | 1 660 | 1 680 | 1 800 | 1 680 |
| | R (mL) | 1 060 | 1 640 | 2 220 | 2 600 | 3 100 | 2 120 |
| Solid inputs | Accalculated (g) | 175 | 176 | 177 | 178 | 179 | 177 |
| Solid outputs | FS + FM + EDR (g) | 152 | 163 | 166 | 163 | 167 | 162 |
| Ratio (%) | — | — | 87% | 93% | 94% | 92% | 94% | 92% |

TABLE 36

Characteristics of the solid fractions after treatment (AFP) on TR23

| Process steps | Types | Loops | Mass (g) | PAH (mg/kg dry) | Pb (mg/kg dry) | Na (g/kg dry) |
|---|---|---|---|---|---|---|
| Attrition | AC | Average | 186 | 937 | 1 260 | 0.6 |
| | | Standard deviation | 2 | 331 | 84 | 26 |
| | | CV | 1% | 35% | 7% | 4% |
| | | Nb | 5 | 5 | 3 | 3 |
| | AS | 1 | 61 | 62 | 520 | — |
| | | 2 | 61 | 183 | — | — |
| | | 3 | 61 | 347 | — | — |
| | | 4 | 61 | 142 | — | — |
| | | 5 | 61 | 9 | — | — |
| Flotation | FC | Average | 100 | 935 | 1 410 | 0.7 |
| | | Standard deviation | 0 | 105 | 63 | 0.1 |
| | | CV | 0% | 11% | 4% | 11% |
| | | Nb | 5 | 3 | 4 | 4 |
| | FS | 1 | 62.3 | 221 | 493 | 1.0 |
| | | 2 | 73.3 | 453 | 610 | 1.7 |
| | | 3 | 77.2 | 238 | 456 | 1.1 |
| | | 4 | 73.0 | 408 | 637 | 1.7 |
| | | 5 | 75.9 | 844 | 787 | 1.4 |
| | FM | 1 | 28.5 | 3 570 | 825 | 32.1 |
| | | 2 | 28.7 | 2 970 | 903 | 10.2 |
| | | 3 | 27.7 | — | 735 | 28.6 |
| | | 4 | 29.4 | 2 440 | 1 170 | 19.7 |
| | | 5 | 30.5 | 2 330 | 1 220 | 12.4 |

TABLE 37

Reduction (%) of PAHs and Pb for the steps of attrition and flotation over the loops (AFP) on TR23

| | Attrition | | Flotation | |
|---|---|---|---|---|
| Loops | ΣPAH | Pb | ΣPAH | Pb |
| 1 | 93% | 59% | 85% | 80% |
| 2 | 80% | — | 65% | 70% |
| 3 | 63% | — | 80% | 77% |
| 4 | 85% | — | 68% | 69% |
| 5 | 99% | — | 31% | 60% |

TABLE 38

Mass balance of the solid fractions of the process (AFP) in loop 1

| | Mass (g) | PAH (mg/kg) | FLR (mg/kg) | BJK (mg/kg) | BAP (mg/kg) | Pb (mg/kg) |
|---|---|---|---|---|---|---|
| Entering soil into the process (AC) | 186 | 937 | 173 | 130 | 48 | 1 263 |
| Soil > 2 mm (AS) | 61 | 62 | 14 | 6 | 3 | 520 |
| Soil < 2 mm (FS) | 78 | 221 | 50 | 21 | 10 | 493 |
| Flotation concentrate (FM) | 36 | 3 568 | 685 | 467 | 245 | 825 |
| Metallic concentrate (EDR) | 0.1 | — | — | — | — | 59 361 |
| Level of recuperation | 94% | 86% | 91% | 78% | 110% | 44% |
| Proportion in decontaminated soil | 75% | 12% | 15% | 8% | 11% | 30% |
| Proportion in froth for disposal* | 19% | 74% | 77% | 70% | 99% | 13% |
| Metallic revaluation level | 0.03% | — | — | — | — | 22% |

*This value does not include the fraction FM which, in the operating conditions, remains contaminated with PAH.

Step of Flotation and Rinsing

Solid Fractions

Figure 37:
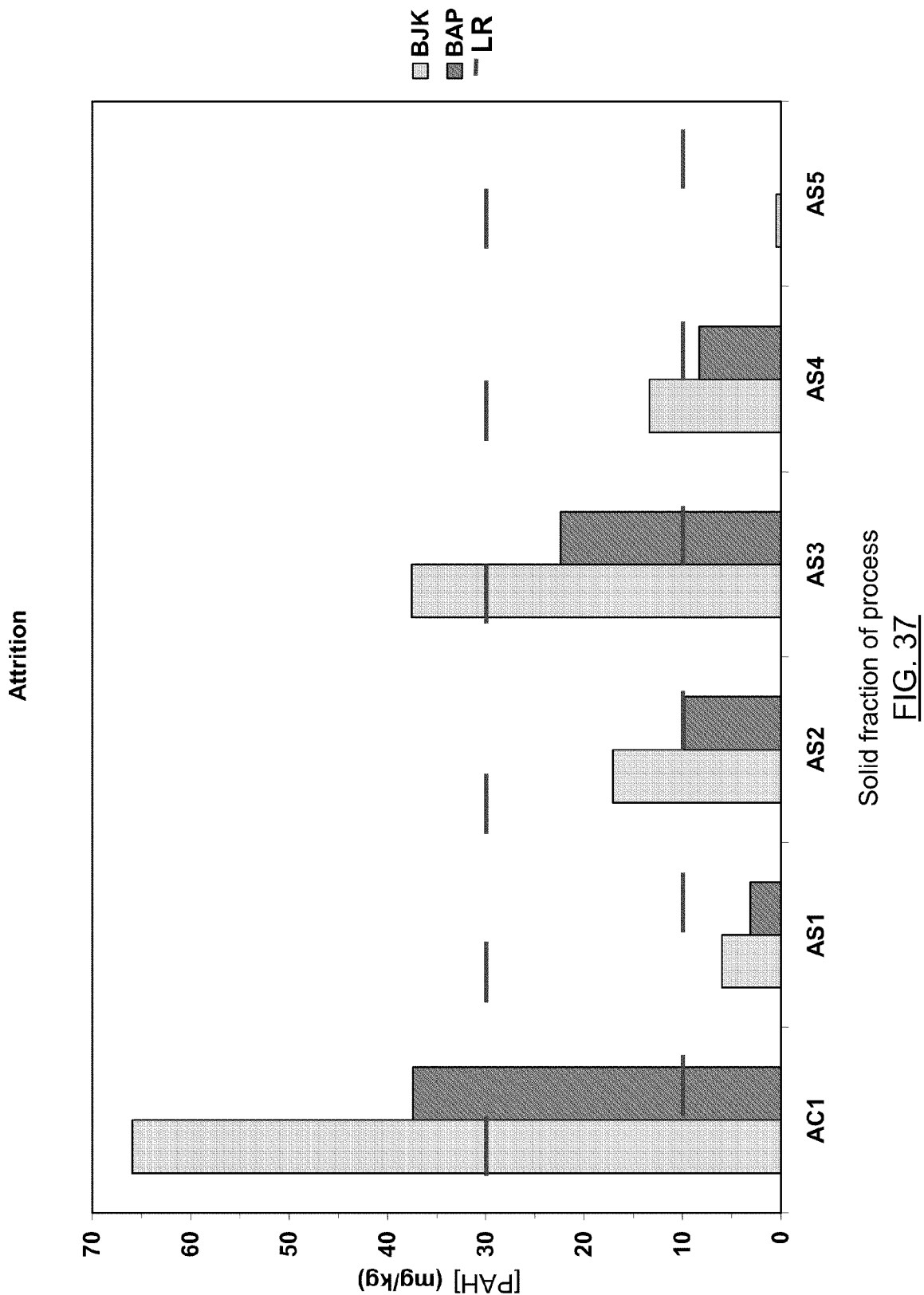
FIG. 37 presents graphs showing the quantities of BJK and BAP in mg/kg of the fractions of soil at the entrance and exit of the process (AS1 to AS5 and FS1 to FS5) for the steps of attrition and flotation over the loops.
Figure 37:
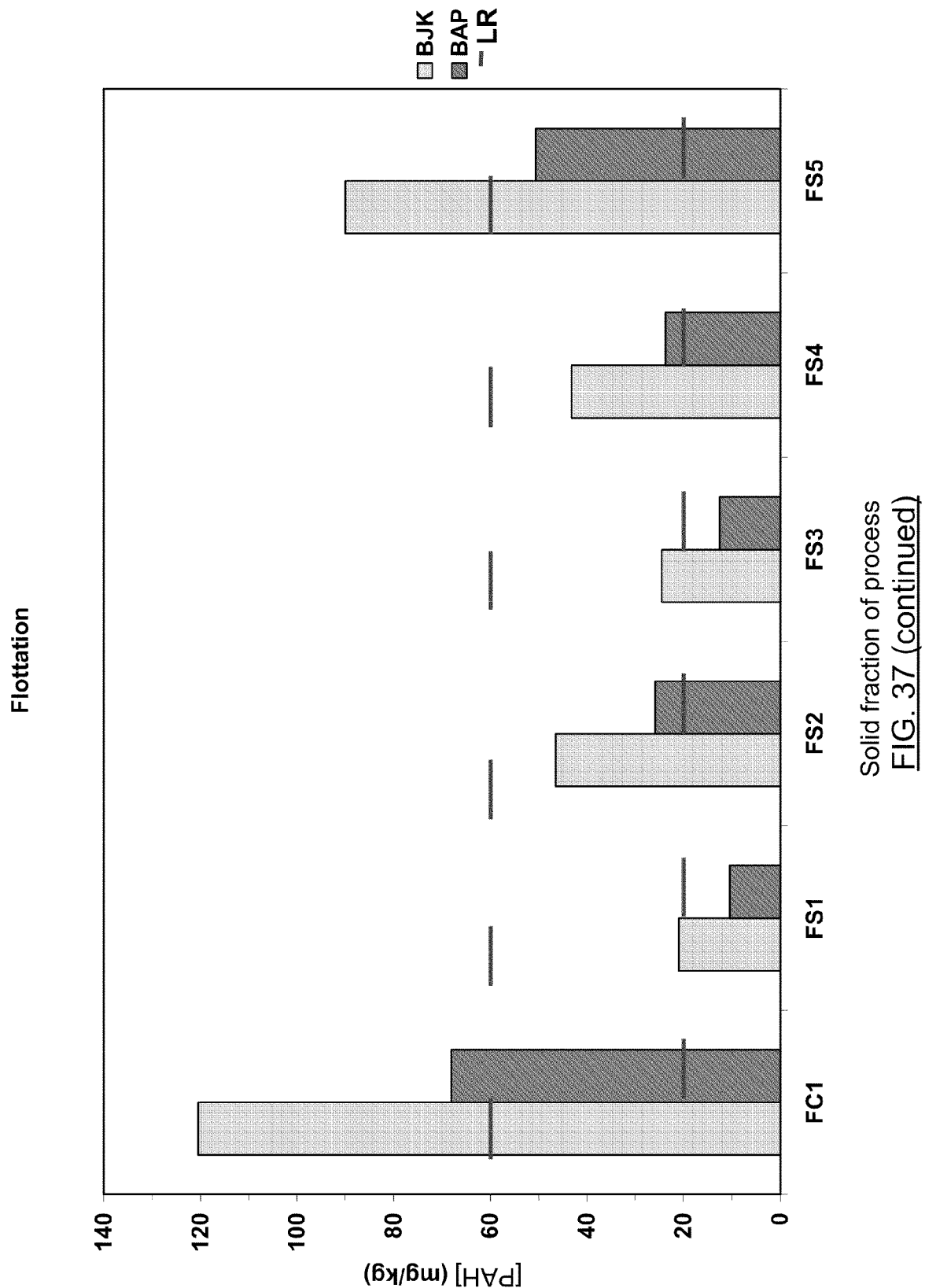

The results presented in Table 36 and FIG. 37 indicate good maintaining of the efficiency of the flotation process over loops 1, 2, 3 and 4, with respective reductions in this step of 85%, 65%, 80%, 68% for total PAHs, and 80%, 70%, 77%, 69% for Pb. Thus, for these four consecutive loops, the fractions below 2 mm (FS) satisfy the regulatory requirements. Traces of Na subsist in this fraction with maximum measured contents of 1.7 g/kg, for entering quantities into the flotation of 0.7 g/kg.

The study of the froth quality, according to Table 36, shows that the particle entrainment does not increase over the loops, confirming, according to the measured salt contents, the absence or very low accumulation of salt in this fraction (FM). While the PAH contents in the FM decrease slightly over the loops, the Pb contents in this same fraction increase more significantly.

Table 38 presents the results obtained for PAH and Pb in loop 1: the recuperation of material is estimated at 94%, with 75% decontaminated material, 19% waste for disposal or incineration, and 0.03% in the form of metallic deposits. The portion of contaminants present in the decontaminated soil at the end of the process (AS+FS) contain respectively 12% and 30% PAH and Pb initially present in the soil entering the process (AC). The process results in the production of a waste product, at 19% mass, coming from flotation froth (FM), in which respectively 74% and 13% of the original PAH and Pb are concentrated.

Process Waters

According to the quantities of salt and the operating volumes of water presented in Table 35, the concentrations of salt at the entrance to flotation are maintained between 5 and 6 M during the five loops. This stability in the concentration of salt appears clearly from the measurement of the Na concentration in the process waters before the rinsing steps (Table 39). The samples FLi, FLf, FMLR, Ppi and Ppf present similar concentrations over the loops, which does not indicate accumulation of salt in the process waters. The portion of salt measured in the waters from the third rinsing of the soil, performed using clear water, remains quite low ([Na]=23 g/L in loop 5), confirming good rinsing of this fraction. The same concentration of Na reaches only 29 g/L in the reservoir of rinsing waters of the soil (RP) in loop 5.

TABLE 39

Concentration (g/L) of Na in the process liquid fractions (AFP)

| Fractions | Loops | | | | |
|---|---|---|---|---|---|
| | 1 | 2 | 3 | 4 | 5 |
| Fli | 109 | 98 | 91 | 90 | 79 |
| FLf | 106 | 107 | 98 | 87 | 67 |
| FMRL | 84 | 82 | 75 | 66 | 65 |
| Ppi | 93 | — | 87 | 74 | 64 |
| Ppf | 92 | 88 | 81 | 69 | 62 |
| R3 | 5 | — | 12 | 14 | 23 |
| RP | 22 | — | 31 | 31 | 29 |

The measurements of Pb in the waters entering and exiting the chemical precipitation step show a low amount of precipitation of Pb during this step. Table 40 presents concentrations of Pb in these effluents and the calculated removal quantities, which do not exceed 19% (best result observed for loop 3). There is therefore accumulation of Pb in the process water.

TABLE 40

Concentrations of Pb in the effluents and removal of Pb (%) after chemical precipitation

| Loops | Volume NaOH (mL) | Ppi (mg/L) | Ppi (mol/L)* | Ppf (mg/L) | Ppf (mol/L)* | Volume (mL) | Reduction |
|---|---|---|---|---|---|---|---|
| 1 | 16.9 | 51.2 | 1.8E−04 | 48.9 | 1.8E−04 | 1 640 | 4% |
| 2 | 15.8 | — | — | 86.9 | 3.1E−04 | 1 640 | — |
| 3 | 17.0 | 129.6 | 4.7E−04 | 104 | 3.8E−04 | 1 660 | 19% |
| 4 | 18.5 | 129.9 | 4.7E−04 | 123 | 4.4E−04 | 1 680 | 5% |
| 5 | 16.3 | 146.7 | 5.3E−04 | 139 | 5.0E−04 | 1 800 | 6% |

*The calculated mole concentrations considered the lead to be mostly present in the form of $PbCl_2$ hydrosoluble (P.M. = 278 g/mol)

Measurements of the redox potential, presented in Table 41, show that the oxidating state of a medium is retained over the loops, since for the entirety of the effluents this value only faintly fluctuated around 250 mV.

TABLE 41

Study of oxidation potential (in mV) over the loops in the different liquid fractions of the process (AFP)

| | Loops | | | | |
|---|---|---|---|---|---|
| | 1 | 2 | 3 | 4 | 5 |
| Fli | 282 | 179 | 237 | 163 | 169 |
| FLf | 280 | 288 | 329 | 283 | 248 |
| FMLR | 249 | 258 | 295 | 278 | 258 |
| Ppi | 242 | 272 | 294 | 285 | 261 |
| Ppf | 216 | 260 | 260 | 185 | 192 |
| RP | 250 | 173 | 235 | 202 | 201 |

Discussion

The complete process under study in this test ensures obtaining decontaminated material at the regulatory limits and good reproducibility of process efficiency for loops 1 to 4. Only loop 5 presents a soil fraction under 2 mm still contaminated above the regulatory limits. Table 42 shows the average recuperation levels, average decontamination levels, and average disposal levels obtained for loops 1 to 4. Thus, over the four loops, 99±4% of the mass of the soil is recovered via various fractions of the process; 85±7% of PAHs are recovered over the same loops while only 52±7 of Pb is recovered. This unrecovered quantity of Pb is in fact solubilized in the process waters and was not precipitated in the precipitation step. While the flotation and rinsing steps seem to be improved and "optimized" in light of the results obtained on the treatment of TR23, the treatment of the effluents by chemical precipitation remains a step to improve.

7 to 8 or more, it is probable from the saline conditions of the medium and the various ions therein, that the precipitation pH of $Pb(OH)_2$ increases. $Na_2S$ can also be an agent for precipitating Pb in the form of PbS.

TABLE 42

| | Balance of process (AFP) - Average of loops 1 to 4 | | | | | |
|---|---|---|---|---|---|---|
| | Mass (g) | PAH (mg/kg) | FLR (mg/kg) | BJK (mg/kg) | BAP (mg/kg) | Pb (mg/kg) |
| Recuperation level | 99 ± 4% | 85 ± 7% | 93 ± 6% | 74 ± 8% | 109 ± 8% | 52 ± 7% |
| Proportion in decontaminated soil | 81 ± 4% | 23 ± 8% | 28 ± 9% | 17 ± 6% | 26 ± 10% | 34 ± 4% |
| Proportion for disposal* | 20 ± 0% | 62 ± 11% | 66 ± 10% | 57 ± 12% | 84 ± 14% | 15 ± 3% |
| Metal revalorization level | 0% | — | — | — | — | 22% |

The study of the solubility product (Kps) provides information on the state of the reaction medium. The medium formed during the flotation step ensures the presence of $Cl^-$ and $SO_4^{2-}$ susceptible of being involved in complexation with $Pb^{++}$ ions in the form of chloro-complexes ($PbCl^+$, $PbCl_2^0$, $PbCl_3^-$) and sulfato-complexes $PbSO_4^0$. The Kps presented in Table 43, show the insoluble character of the Pb II hydroxides compared to the sulfate and chloride lead complexes. In addition, the soluble chloro-complexes and sulfato-complexes have a strong tendency to form in an acidic and saline medium. Below are their formation constants:

$$Pb^{2+} + SO_4^{2-} \rightarrow PbSO_4^0 \quad K_{co} = 10^{2.75} \quad \text{Equation 11}$$

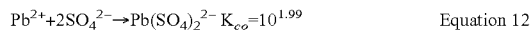
$$Pb^{2+} + 2SO_4^{2-} \rightarrow Pb(SO_4)_2^{2-} \quad K_{co} = 10^{1.99} \quad \text{Equation 12}$$

$$Pb^{2+} + Cl^- \rightarrow PbCl^+ \quad K_{co} = 10^{1.6} \quad \text{Equation 13}$$

$$Pb^{2+} + 2Cl^- \rightarrow PbCl_2^0 \quad K_{co} = 10^{1.8} \quad \text{Equation 14}$$

$$Pb^{2+} + 3Cl^- \rightarrow PbCl_3^- \quad K_{co} = 10^{1.7} \quad \text{Equation 15}$$

TABLE 43

| Products of solubility of Pb (II) complexes | |
|---|---|
| $PbL_X$ | Kps |
| $PbCl_2$ | $1.6 \cdot 10^{-5}$ |
| $PbSO_4$ | $1.8 \cdot 10^{-8}$ |
| $PbCO_3$ | $7.9 \cdot 10^{-14}$ |
| $Pb(OH)_2$ | $1.2 \cdot 10^{-15}$ |
| $PbPO_4$ | $2.0 \cdot 10^{-20}$ |
| PbS | $3.2 \cdot 10^{-28}$ |

At the inlet to precipitation in the first loop, the medium is made of $PbCl_2$. The strong concentration of chloride strongly encourages the formation of chloro-complexes even at pH 7; it is normal that the added $OH^-$ precipitate only a small part of the $Pb^{2+}$ in equilibrium with the chloro-complexes. Over the loops, the quantities of sulfates in solution increase and the precipitation of $Pb^{2+}$ as $PbSO_4$ is very conceivable. This hypothesis is raised due to the quantities of Pb seen in the froth over the loops. Indeed, these quantities go from 825 to 1 216 mg/kg in this fraction FM between loops 1 and 5. This increase could result: 1) from possible flotation of $PbSO_4$, formed during the loops on account excess $SO_4^{2-}$ in the medium; 2) from accumulation of Pb in the waters coming from the froth (FMLR). By raising the precipitation pH from Second Test—Precipitation at pH 8.5

In this section, it is proposed to study, as done previously, the process with precipitation pH further increased to 8.5. The process under study is the same as the process presented in FIG. 36. The quantities of materials and products introduced into each loop are identical to those presented in Table 35 (in g for solids and in mL for liquids). Only the quantities of NaOH (0.1 M) added during the precipitation at pH 8.5 are different, that is, respectively 8.8-36.1-49.0-25.0-38.3 mL for loops 1-2-3-4-5. Three successive flotations were performed for the five loops. The waters coming from the froth (FML) and the froth rinsing waters (FMR) are combined to form a single effluent called FMLR.

Solid Fractions

Figure 38:
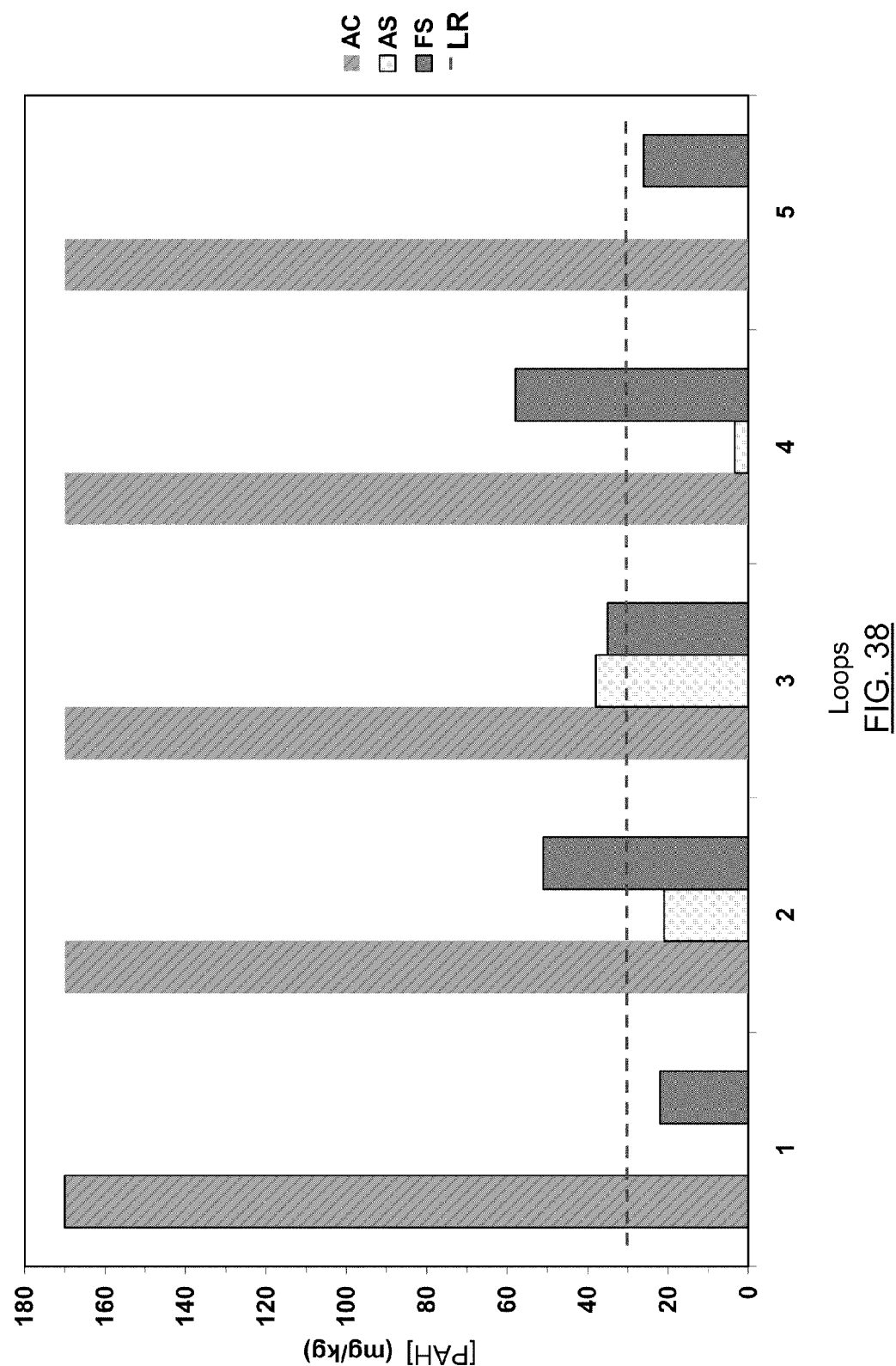
FIG. 38 presents graphs showing the quantities of BAP and BJK in mg/kg of the fractions of soil at the entrance and exit of the process (AS and FS) for the steps of attrition and flotation over the loops.
Figure 38:
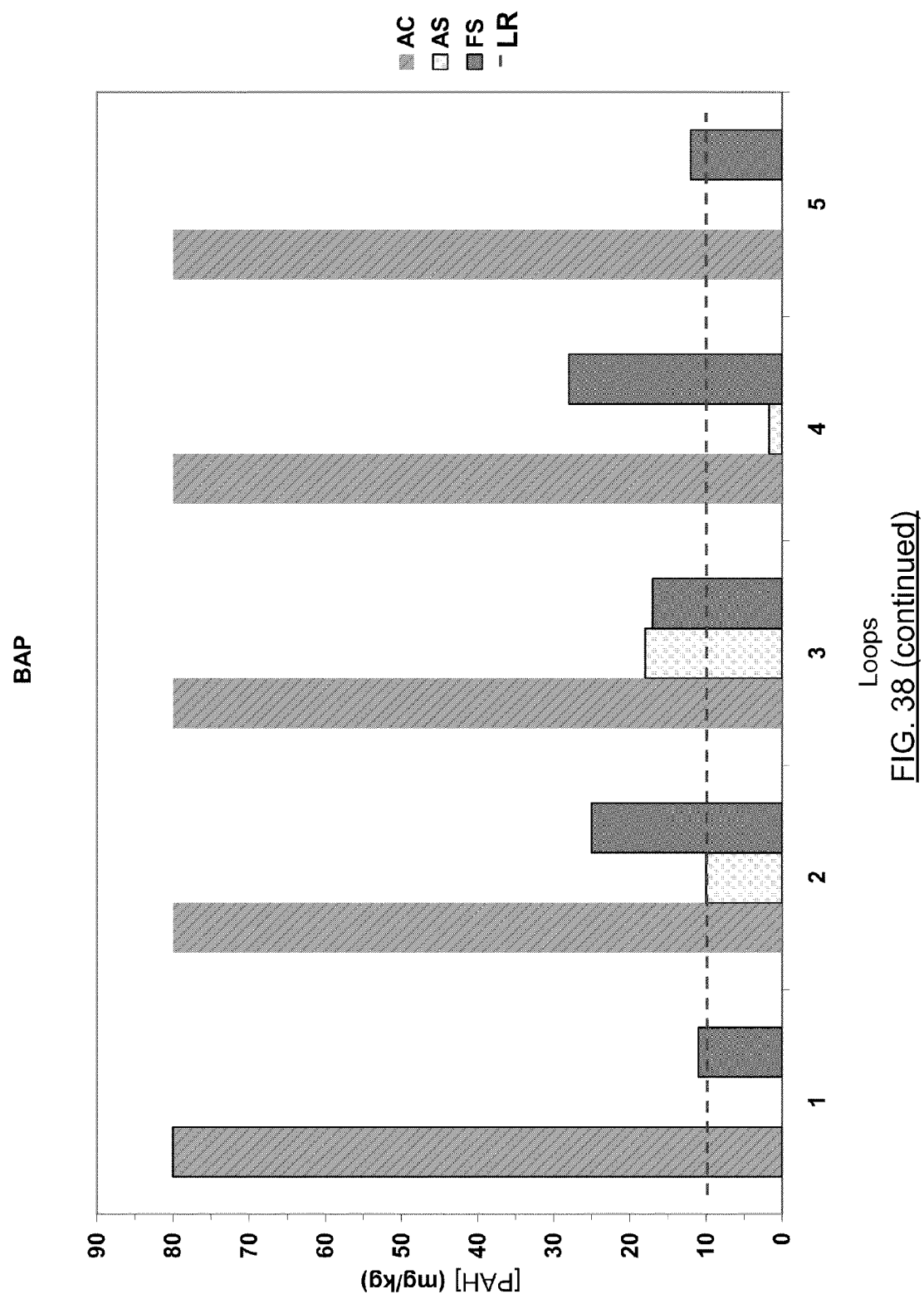

Table 44 and FIG. 38 illustrates that the regulatory limits currently in force in Quebec were respected for the soil fractions above and below 2 mm (respectively AS and FS) at the outlet of the process and this for all five loops. Only fraction AS3 presented a Pb concentration above the regulatory limit (1 300>1 000 mg/kg). This high measured value, compared to the values obtained for the other loops, would seem to result from a metallic aggregate highly loaded with hidden lead in this fraction. Another possibility that cannot be dismissed is that there may have been a mix-up in the samples since this value strangely corresponds to the value of the non-treated soil. Assuming that this excess is a result of a metallic nugget and in order to respond to this problem independently from the mode of treatment that is applied, it is suggested to place a physical separation unit (magnetic separator type) upstream of the chemical treatment in order to extract all metallic residues present in the matrix.

A metallic residue is produced during the electrochemical treatment in the amount of 4.27 g for the five loops combined (that is, 0.85 g per loop for 186 g of soil—all granulometric fractions together), which amounts to a production on the order of 4.6 kg of metallic residue per dry ton of treated soil. This fraction remains loaded with Na in amounts of 130 g/kg (supposedly NaCl), which is why a rinsing step of this fraction could be performed to thus reduce the production of metallic residue at the output of the effluent treatment by chemical precipitation (0.46%). The amount of Pb in this residue of the chemical precipitation is about 52 000 mg/kg (that is, 5.2% mass). At this quantity, economic revalorization of the precipitate can be envisioned.

TABLE 44

Characteristics of the solid fractions after treatment (AFP) on TR23

| Process fractions | Samples | Loops | Mass (g) | ΣPAH (mg/kg dry)* | Pb (mg/kg dry)* | Na (g/kg dry)* |
|---|---|---|---|---|---|---|
| Supply | AC | Average | 186 | 1257 | 1280 | 0.6 |
| | | Standard deviation | 2 | 158 | 72 | 26 |
| | | CV | 1% | 13% | 6% | 4% |
| | | Nb | 5 | 4 | 4 | 3 |
| Attrition reject | AS | 1 | 97.1 | — | 18 | — |
| | | 2 | 98.7 | 187 | 30 | — |
| | | 3 | 83.1 | 303 | 1300 | — |
| | | 4 | 97.1 | 26.1 | 210 | — |
| | | 5 | 78.8 | — | 200 | — |
| Flotation reject | FS | 1 | 62.3 | 181 | 480 | 8 |
| | | 2 | 75.6 | 403 | 430 | 1.8 |
| | | 3 | 73.6 | 302 | 450 | 1 |
| | | 4 | 77.1 | 451 | 420 | 1.5 |
| | | 5 | 75.6 | 209 | 440 | 1.1 |
| Precipitation reject | Pp | 5 | 4.27 | — | 52 000 | 130 |

Process Waters

Since the rinsing volumes of the soil and the froth remained constant and followed the low quantities of measured Na in the rinsing waters presented in Table 39, the analysis of these effluents was only done on the test done in loops. The low Na contents seen in the soil fraction below 2 mm at the end of the process confirms the perfect optimization of this step of rinsing the solid fractions at the output of the process.

Only the effluents at the input and output of the chemical precipitation treatment were analyzed for Pb (Table 45). The results show values of Pb removal between 13% and 70%. The best results, obtained in loop 3, result from the addition of 200 µL of FeCl₃ for this loop, as illustrated in Equations 8, 9 and 10 previously presented.

TABLE 45

Concentrations of Pb in the effluents and removal of Pb (%) after chemical precipitation

| Loops | NaOH volume (mL) | Ppi (mg/L) | Ppf (mg/L) | Volume (mL) | Reduction |
|---|---|---|---|---|---|
| 1 | 8.8 | 54.9 | 44.2 | 1 500 | 19% |
| 2 | 36.1 | 88 | 76.6 | 1 750 | 13% |
| 3 | 49.0 | 109 | 33.2 | 1 900 | 70% |
| 4 | 25.0 | 73.3 | 32.9 | 1 950 | 55% |
| 5 | 38.3 | 73.9 | 52.0 | 2 000 | 30% |

Discussion

The complete process under study in this test ensured obtaining a decontaminated material that met the regulatory limits (criterion C of the soil quality guide of Quebec) for the fine and coarse fractions, and also for Pb and all analyzed PAHs. The efficiency of the process is reproducible over all of the loops. In order to respond to the possible presence of metallic residues in the fraction above 2 mm, it is suggested to place a unit of physical separation upstream of the attrition step. A magnetic separator would seem to be appropriate. Indeed, reddish metallic residues (ferric) remain in the fraction above 2 mm and seem to be at the origin of the high concentration of Pb obtained for fraction AS3. The use of these ferromagnetic properties is at the origin of the suggestion concerning implementing a magnetic separator. In light of the target granulometries (above 2 mm), a permanent magnet belt conveyor or a co-current electromagnet and wet scrubber are possible technologies (Table 46). In the case where the coarse concentrates of Pb are not concentrated in residues with ferromagnetic properties, gravimetric separation techniques could be envisioned.

TABLE 46

Application and capacity of magnetic separation apparatuses

| Apparatus | Granulometric limit | Maximum capacity |
|---|---|---|
| Magnetic belt conveyor (permanent magnet) | >0.5 cm | 130.5 m/min |
| Magnetic belt conveyor (electromagnet) | >0.5 cm | 150 m/min |
| Drum wet scrubber (concurrent) | <6.36 mm | 1875 l/min.m |
| Drum wet scrubber (counter-rotation) | <1.70 mm | 1500 l/min.m |
| Drum wet scrubber (counter-current) | <0.21 mm | 900 l/min.m |

In addition, in light of the Na concentration in the chemical precipitation residue, it is proposed to introduce a rinsing step for this fraction in order to limit the proportion of residue that is produced per ton of treated soil and to increase its lead content for a more feasible economic revalorization thereof.

Finally, while chemical precipitation seems to be an ideal treatment method for effluents generated by flotation and ensures good reproducibility of efficiency of the overall process during recirculation of the effluents back into the beginning of the process, this step does not enable a complete recuperation of the solubilized Pb and therefore could be "optimized". Increasing the precipitation pH and adding ferric chloride seem to be favorable parameters to improve in this step.

Following all of these tests, it was possible to target the key parameters of the technology: the solid content in the reactor, the dosage of the reactants, and importantly, the dosage of CAS and NaCl The latter can, indeed, over-saturate in the reaction medium and therefore lead to non-optimal functioning. Electrodeposition also has negative effects via the formation of chlorine-based oxidizing compounds when it is operated for too long of a time. The precipitation of Pb in the form of hydroxide requires a pH of at least 8.5 in order to be efficient and the recirculation of the effluent enables maintaining a relatively constant quantity of Pb after leaching. The process in this context has revealed itself to be more efficient. The process is therefore capable of decontaminating, in a single reactor and at the same time, a soil contaminated by PAHs and Pb.

The invention claimed is:

1. A process for decontaminating a medium polluted with metals and hydrophobic organic compounds (HOC), the process comprising:
   a) providing an acidic slurry comprising water, an acid, a chloride salt, a surfactant, and the polluted medium;
   b) performing an initial flotation step on the acidic slurry including injecting gas into the acidic slurry in order to form:
      an HOC-rich froth depleted in metals; and
      an HOC-depleted slurry;
   c) recovering the HOC-rich froth;
   d) separating the HOC-depleted slurry into a treated solid and a liquid effluent rich in the metallic ions;
   wherein step b) of performing the flotation step is optionally repeated.

2. The process of claim 1, wherein the HOCs comprise polycyclic aromatic hydrocarbons (PAH).

3. The process of claim 1, wherein the metals comprise lead.

4. The process of claim 1, wherein the water in step a) is provided in order to obtain a concentration of the acidic slurry between about 1% and about 25% w v$^{-1}$ total solids.

5. The process of claim 1, wherein:
   the acid is inorganic and is sulfuric acid, hydrochloric acid, nitric acid, or phosphoric acid, or a mixture thereof;
   the acid is organic and is acetic acid, propionic acid, butyric acid, citric acid, or malic acid, or a mixture thereof;
   the acid is a used sulfuric acid, or a used phosphoric acid, or a mixture thereof; or
   the acid is a mixture of at least two types of inorganic, organic, and used acids.

6. The process of claim 5, wherein the acid in step a) is provided in order to obtain a pH of the acidic slurry between about 1 and about 5.

7. The process of claim 6, wherein the acid is provided to obtain a pH of the acidic slurry of about 3.

8. The process of claim 1, wherein the chloride salt is a chloride of sodium, potassium, calcium, or magnesium, or a mixture thereof.

9. The process of claim 8, wherein the chloride salt of step a) is provided in order to obtain a concentration of at least about 0.5 M in the acidic slurry.

10. The process of claim 9, wherein the chloride salt is provided in order to obtain a concentration in the acidic slurry of between about 4.0 M and about 6.0 M.

11. The process of claim 1, wherein the chloride salt is provided in order to obtain a concentration below the saturation limit thereof within the acidic slurry.

12. The process of claim 1, wherein the surfactant is a non-ionic, cationic, anionic, or amphoteric surfactant, or a combination of two or more of such surfactants.

13. The process of claim 12, wherein the surfactant comprises or is cocamidopropyl hydroxysultaine (CAS).

14. The process of claim 13, wherein the surfactant in step a) is provided in order to obtain a concentration between about 0.05% and about 2% w/w with respect to the dry weight of the polluted medium.

15. The process of claim 14, wherein the surfactant is provided in order to obtain a concentration between about 0.1% and about 0.3% w/w with respect to the dry weight of the polluted medium.

16. The process of claim 1, wherein the surfactant in step a) is provided in order to obtain a concentration above or at the effective critical micellar concentration ($CMC_{eff}$) thereof.

17. The process of claim 1, wherein the surfactant in step a) is provided in order to obtain a concentration hindering solid particle entrainment in the froth during flotation.

18. The process of claim 1, further comprising step e) of recuperating the metals by chemical precipitation, by electrodeposition, or by a combination thereof, to recuperate metallic compounds and obtain a treated solution.

19. The process of claim 18, wherein at least a portion of the treated solution is reused for at least a part of the water in step a).

20. The process of claim 18, wherein the treated solution contains dissolved chloride salt that is recycled for reuse in step a) and the reuse of at least a part of the treated solution following steps a) to d) constitutes a loop and the process comprises at least three loops, so that the treated solution is reused at least three times.

21. A process for decontaminating a medium polluted with metals and hydrophobic organic compounds (HOC), the process comprising:
   a) providing an acidic slurry comprising water, an acid, a chloride salt, a surfactant, and the polluted medium;
   b) performing an initial flotation step on the acidic slurry including injecting gas into the acidic slurry in order to form:
      an HOC-rich froth depleted in metals; and
      an HOC-depleted slurry;
   c) recovering the HOC-rich froth;
   d) separating the HOC-depleted slurry into a treated solid and a liquid effluent rich in the metallic ions;
   wherein step b) of performing the flotation step is repeated.

* * * * *